United States Patent

Sasagawa et al.

[11] Patent Number: 6,008,914
[45] Date of Patent: Dec. 28, 1999

[54] LASER TRANSFER MACHINING APPARATUS

[75] Inventors: Tomohiro Sasagawa; Kenyu Haruta; Yukio Sato, all of Hyogo; Hitoshi Wakata, deceased, late of Hyogo, by Hiromi Wakata, heir; Mitsuo Inoue, Hyogo; Akihiro Suzuki, Hyogo; Shuichi Fujikawa, Hyogo; Yoshio Saito, Hyogo, all of Japan

[73] Assignee: Mitsubishi Denki Kabushiki Kaisha, Tokyo, Japan

[21] Appl. No.: 08/935,161

[22] Filed: Sep. 22, 1997

Related U.S. Application Data

[63] Continuation of application No. 08/420,941, Apr. 11, 1995, abandoned.

[30] Foreign Application Priority Data

Apr. 28, 1994 [JP] Japan .................................. 6-092716

[51] Int. Cl.⁶ ............................ G02B 5/32; G02B 27/46; G02B 27/44; G03H 1/16
[52] U.S. Cl. .............................. 359/15; 359/29; 359/559; 359/565; 359/566
[58] Field of Search ................................ 359/29, 15, 559, 359/562, 563, 565, 566, 569; 355/53; 219/121.68; 250/201.2

[56] References Cited

U.S. PATENT DOCUMENTS

| | | | |
|---|---|---|---|
| 5,029,243 | 7/1991 | Dammann et al. ................. | 219/121.77 |
| 5,124,843 | 6/1992 | Leger et al. ............................ | 359/565 |
| 5,286,963 | 2/1994 | Torigoe ................................ | 250/201.2 |
| 5,302,798 | 4/1994 | Kaisha . | |

FOREIGN PATENT DOCUMENTS

| | | |
|---|---|---|
| 0419069 | 3/1991 | European Pat. Off. . |
| 0575850 | 12/1993 | European Pat. Off. . |
| 57-081986 | 5/1982 | Japan . |
| 63-220126 | 9/1988 | Japan . |
| WO89/05995 | 6/1989 | WIPO . |
| WO94/17953 | 8/1994 | WIPO . |

OTHER PUBLICATIONS

Dammann et al. "High–Efficiency In–Line Multiple Imaging By Means of Multiple phase Holograms", Optics Communication vol. 3, No. 5. p. 312 (1971).

A. Engel, J. Steffen and G. Herziger "Laser Machining with Modulated Zone Plates" Applied Optics, Feb. 1974 pp. 269–273.

M. Ekberg, et al "Nd: YAG Laser Machining with Multilevel Resist Kinoforms" Applied Optics, Sep. 1991 pp. 3604–3607.

*Primary Examiner*—Thong Nguyen
*Assistant Examiner*—Audrey Chang
*Attorney, Agent, or Firm*—Wolf, Greenfield & Sacks, P.C.

[57] ABSTRACT

The laser transfer machining apparatus comprises a shaping unit for shaping the laser beam so that the laser beam has a beam pattern which corresponds to a desired pattern to be machined in the object to be machined and a generating unit disposed separately from the shaping unit for simultaneously generating a plurality of laser beams each having the beam pattern from the laser beam shaped by the shaping unit. The generating unit is adapted to emit the plural laser beams while simultaneously defining a plurality of radiation directions of the generated plural laser beams to the object to be machined. The laser transfer machining apparatus can provide a high efficiency of utilization of light and reduce the time required for machining. Furthermore, the laser transfer machining apparatus can utilize a laser with a relatively low spatially coherence such as an eximer laser.

37 Claims, 74 Drawing Sheets

500a 500b

501

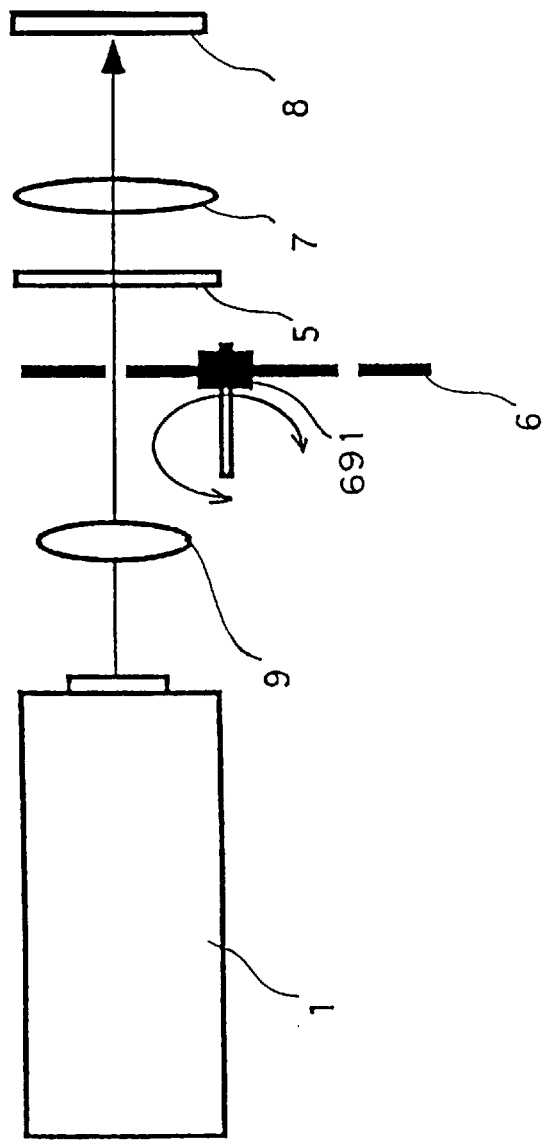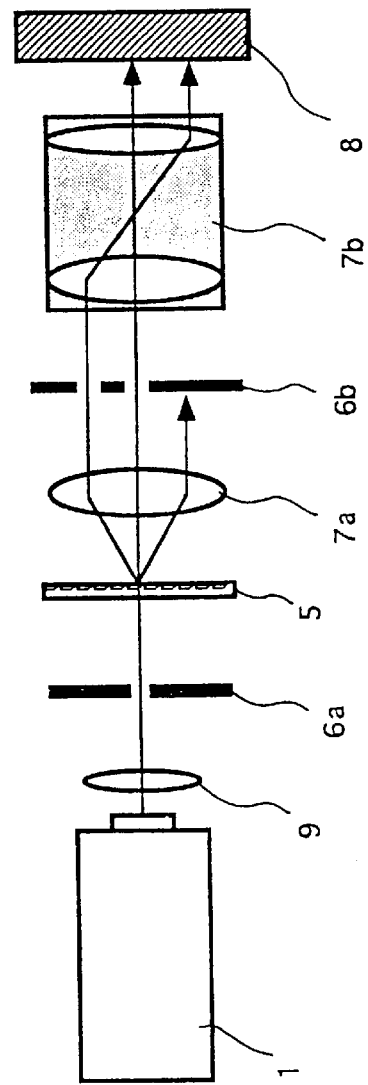

ANGLE BETWEEN INCIDENT LIGHT AND PHASE HOLOGRAM

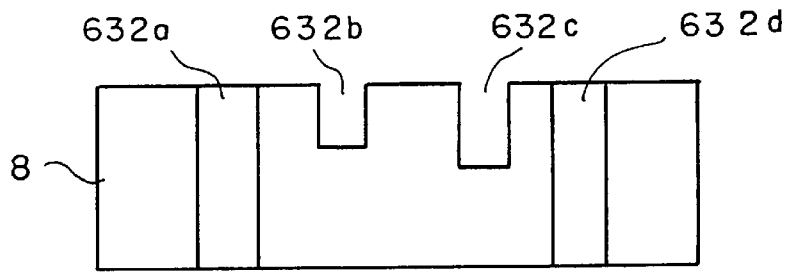
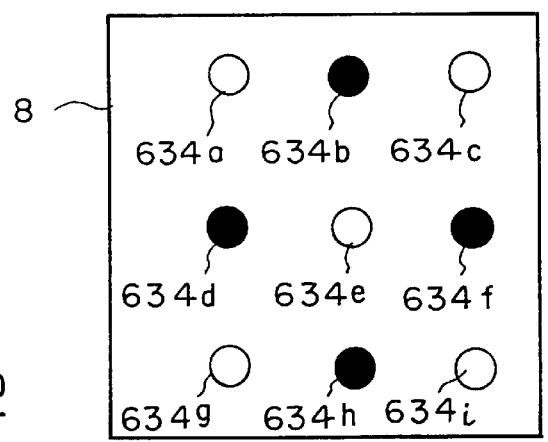
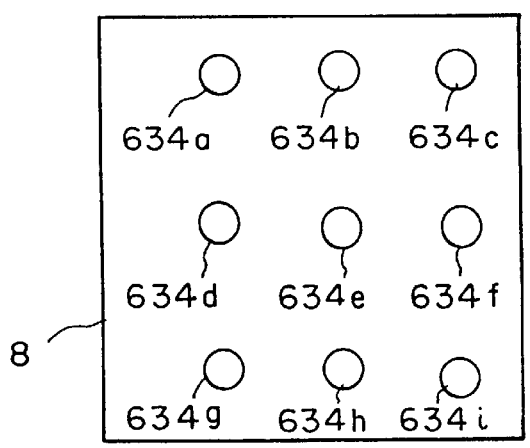
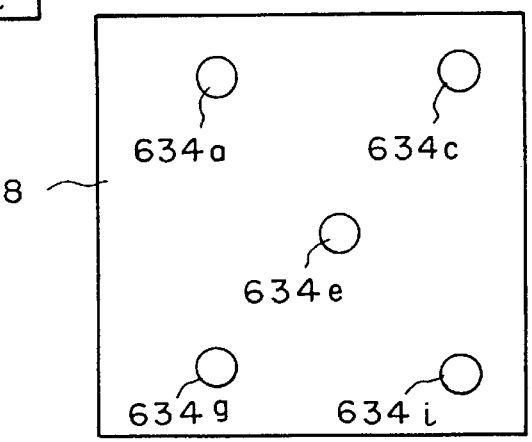

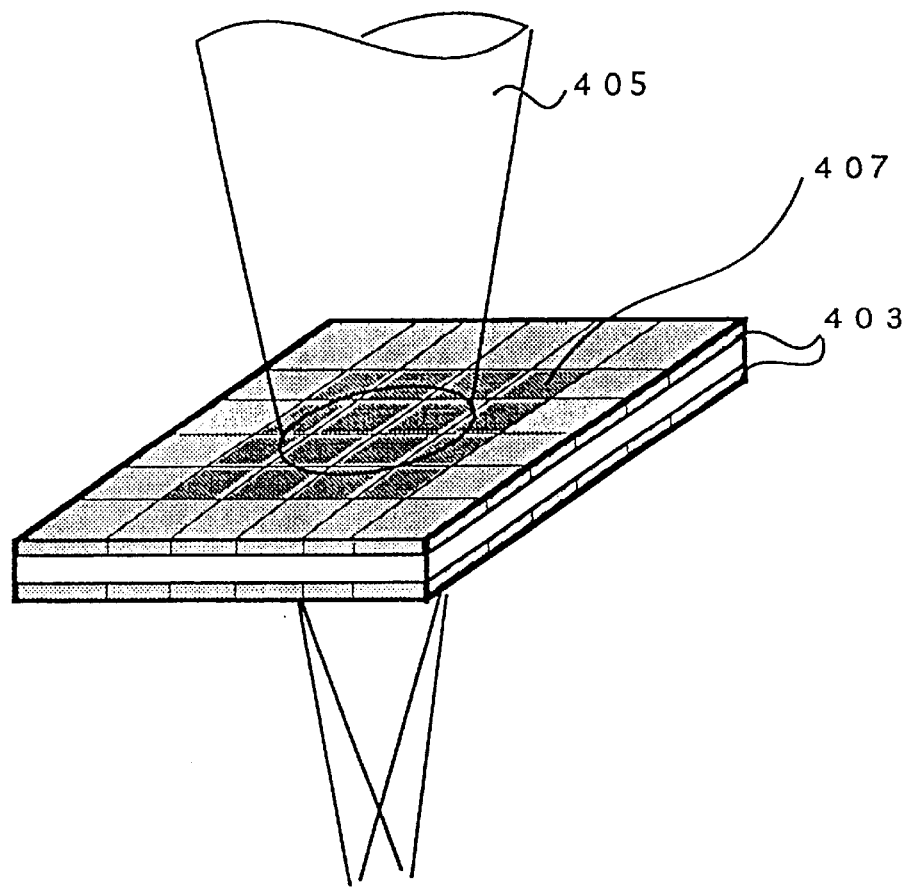
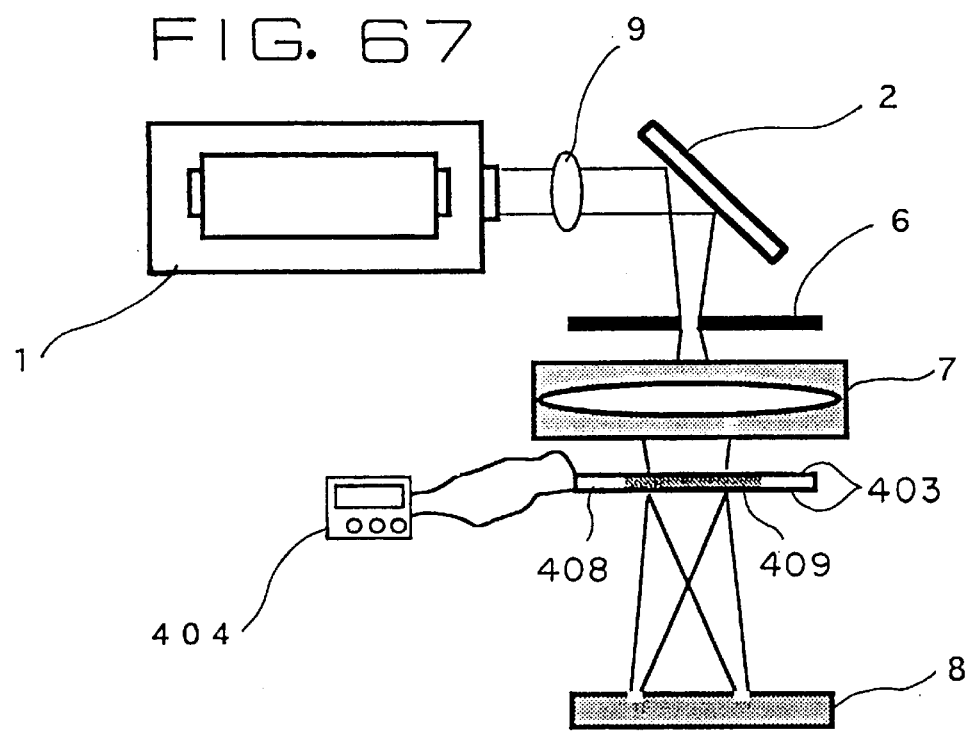

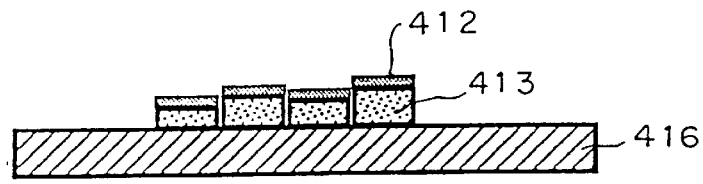
FIG.70
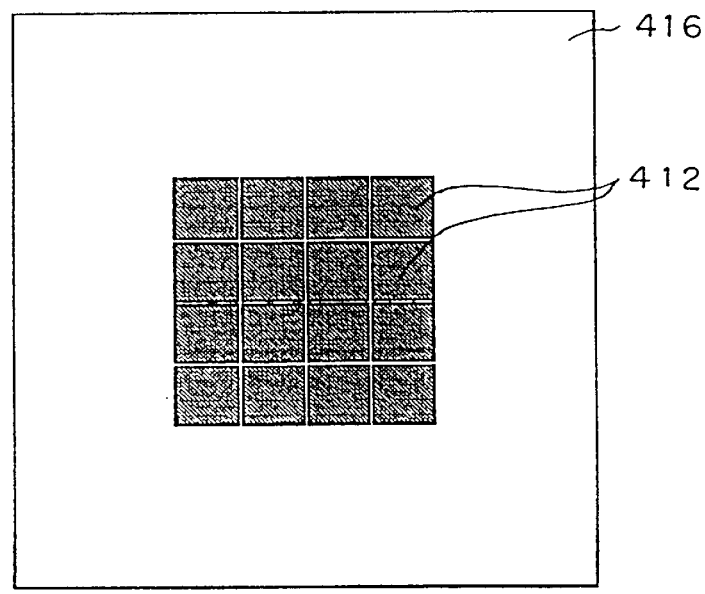
FIG. 71
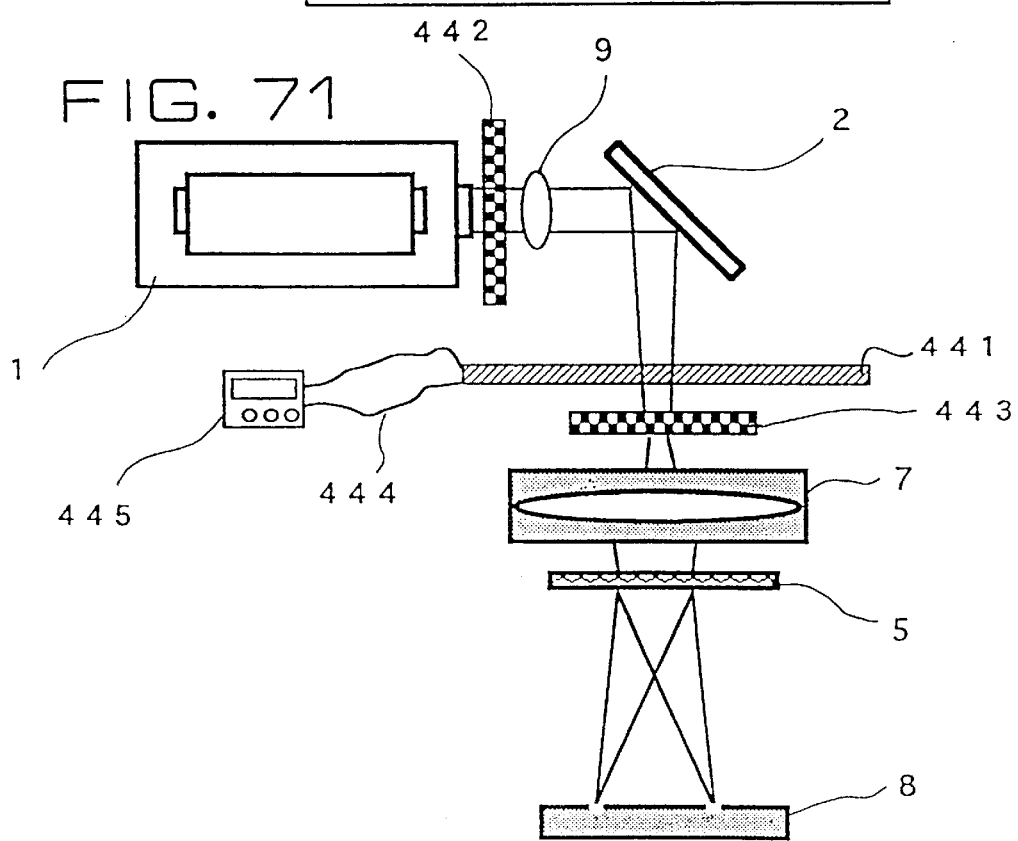

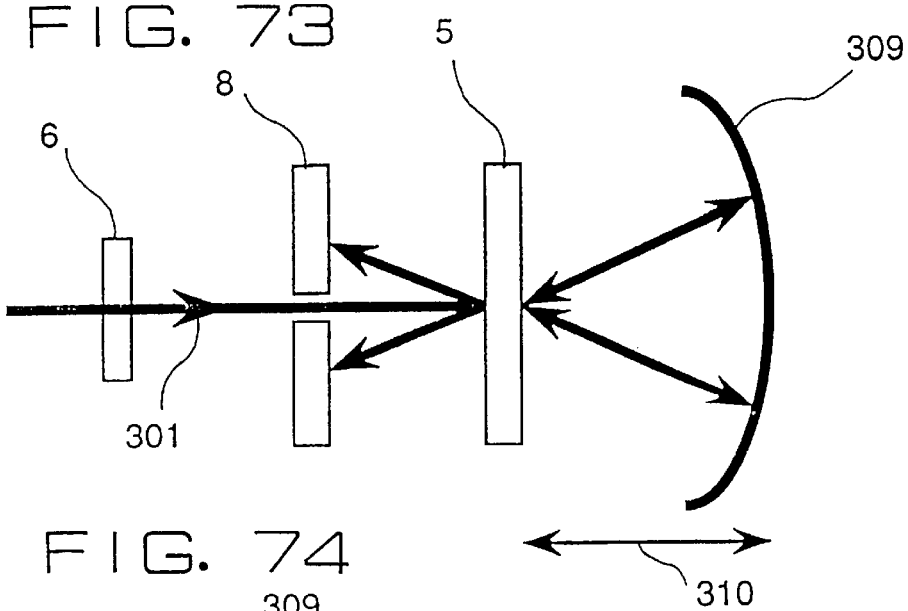
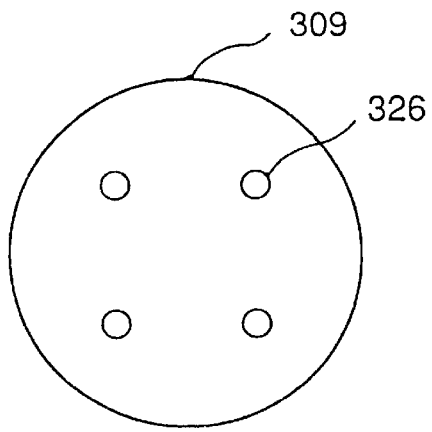
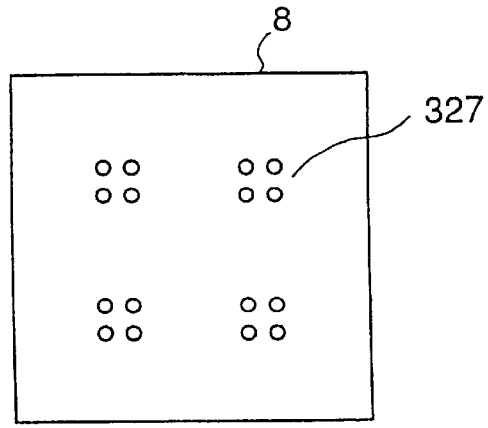
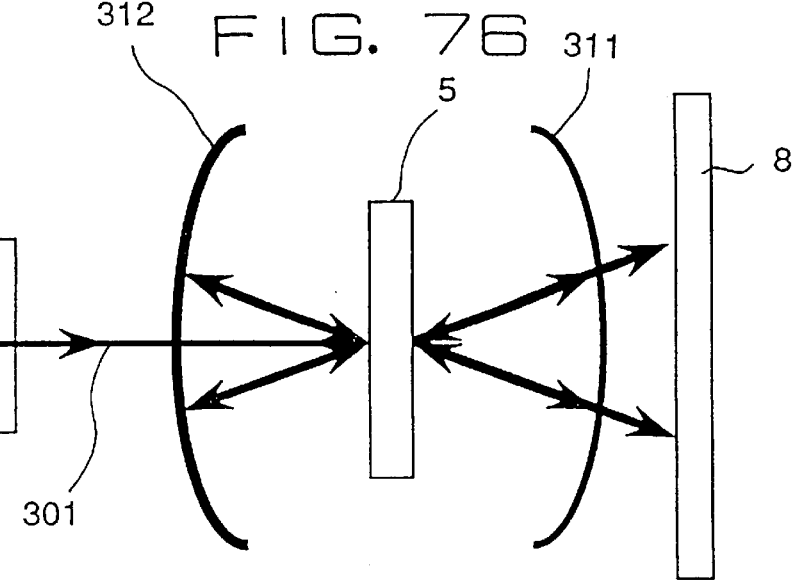

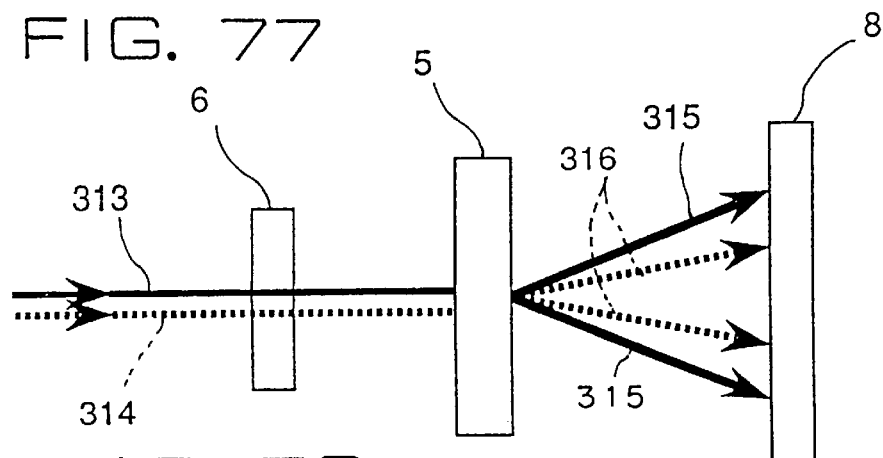
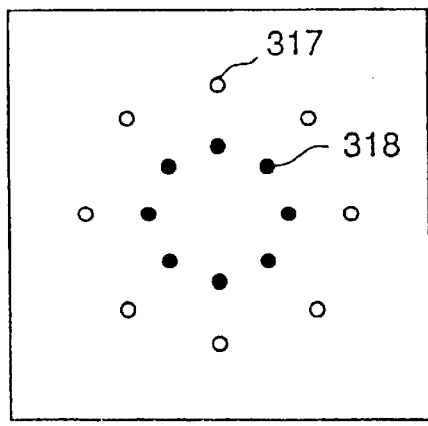
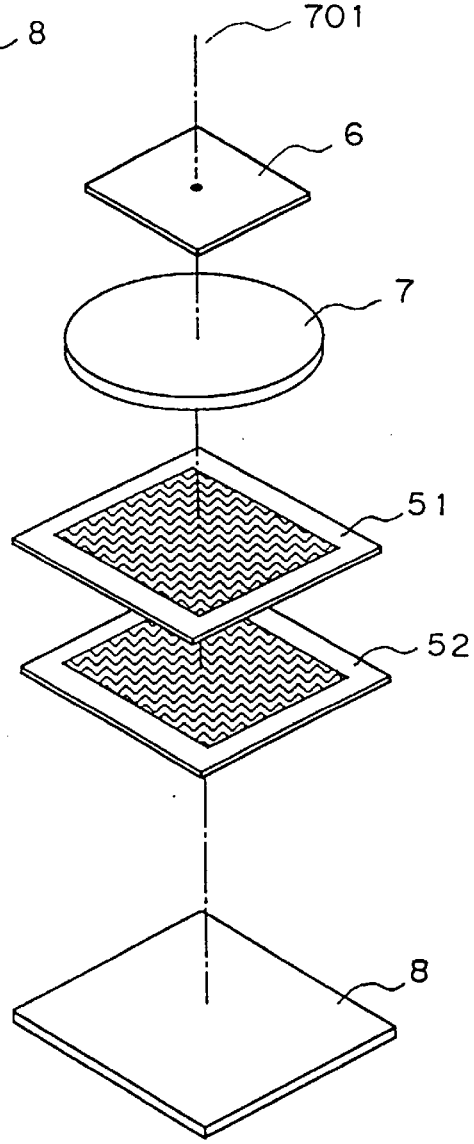

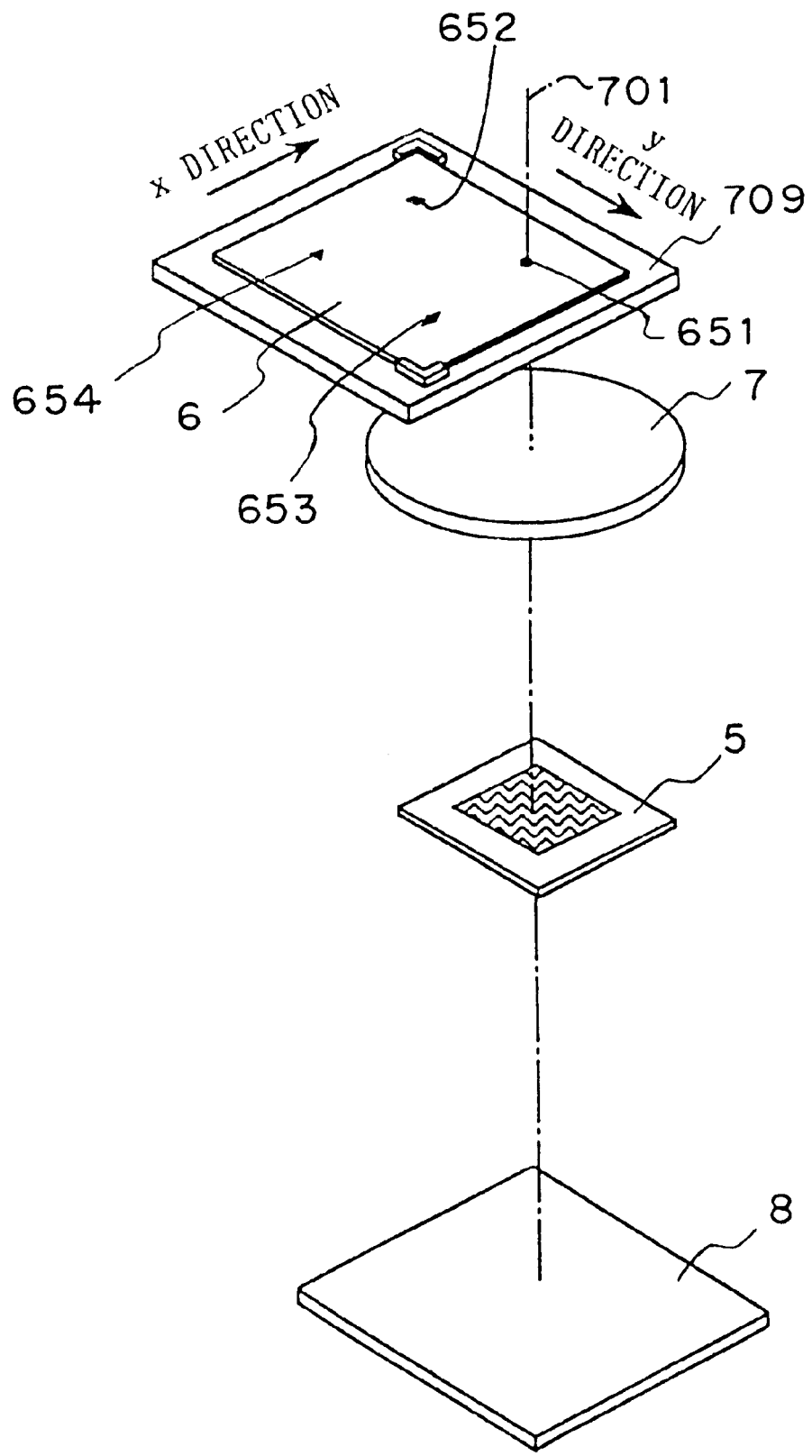

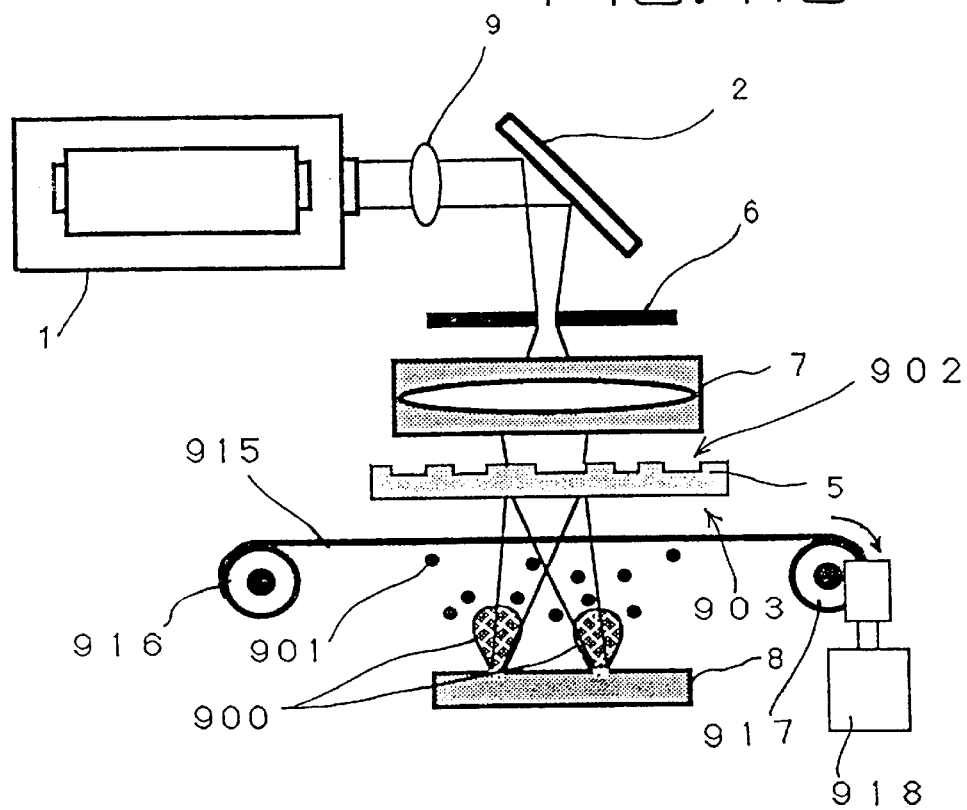
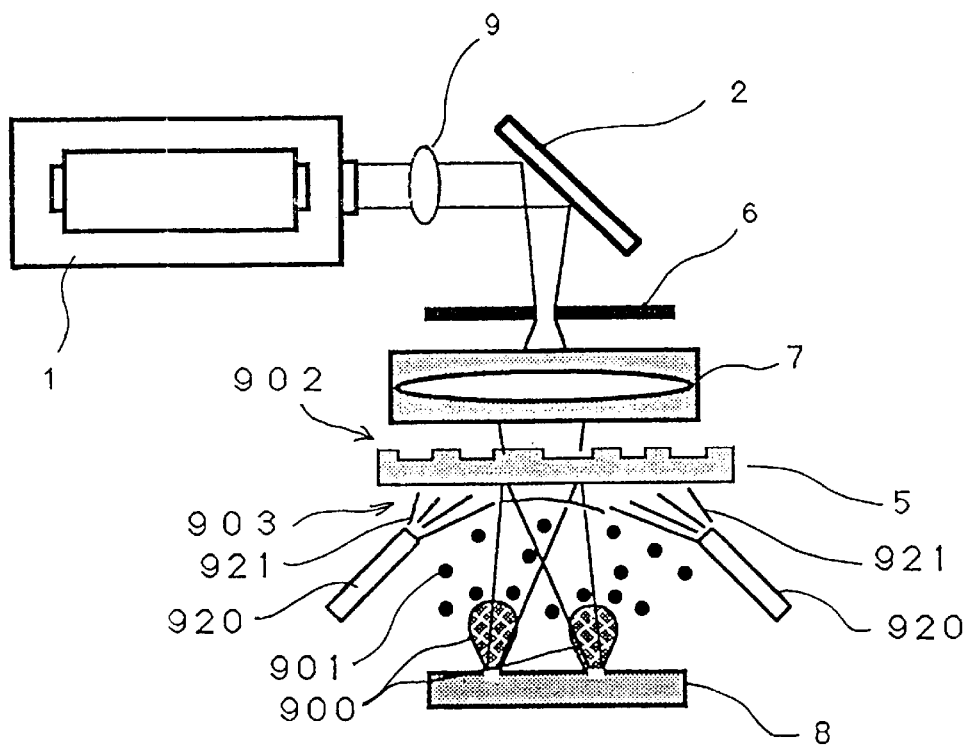

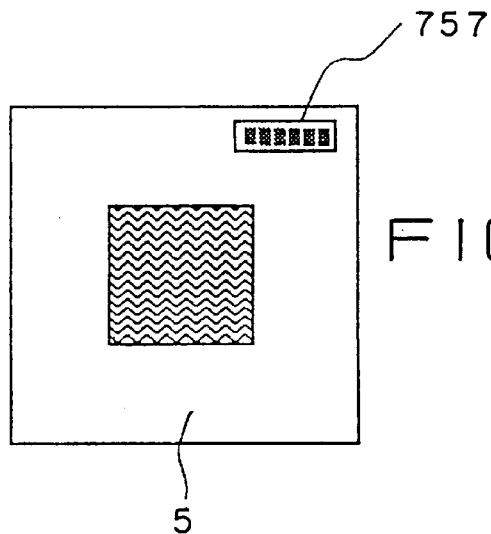
FIG.149
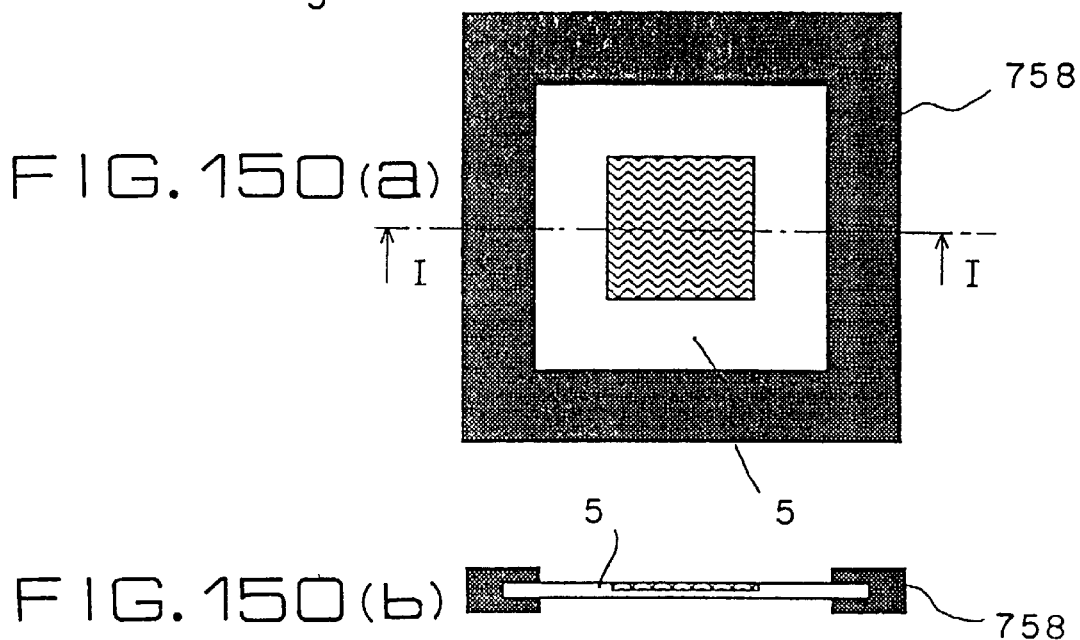
FIG.150(a)
FIG.150(b)
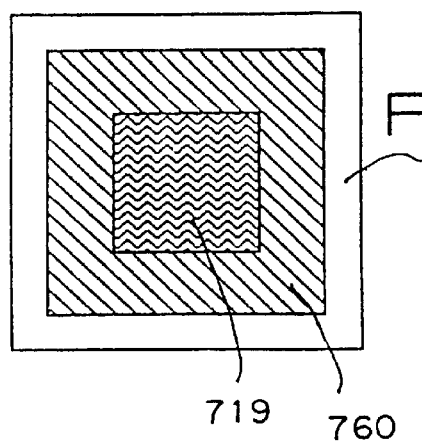
FIG.151

LASER TRANSFER MACHINING APPARATUS

This application is a continuation of application Ser. No. 08/420,941, filed Apr. 11, 1995, abandoned.

BACKGROUND OF THE INVENTION

1. Field of the Invention

The present invention relates to a laser transfer machining apparatus provided with a means for simultaneously generating a plurality of images to be transferred for laser machining, such as a hologram element.

2. Description of the Related Art

FIG. 1 is a schematic view of a known laser transfer machining apparatus, for example, an apparatus disclosed in Proceeding of SPIE, Vol.1377 p30–35. Shown in the figure are a laser oscillator 1, a deflecting mirror 2, a homogenizing optical system 3 for laser beam illuminating a mask, a mask 6, a transferring lens 7 for transferring a mask pattern image of the mask 6, and a target 8 to be machined which is an object to be machined.

In operation, the intensity distribution of a laser light emitted by the laser oscillator 1, e.g. an eximer laser is made uniform by the homogenizing optical system 3 for a laser beam illuminating a mask and then the uniform laser beam enters the mask 6. The laser light passing through the pattern to be transferred of the mask 6 is imaged as an transferred image on the target 8 by the transferring lens 7 and the illuminated part of the target is machined. The laser beam has been deflected by the deflecting mirror 2 before it is incident on the target 8.

Furthermore, as disclosed in Applied Optics Vol.13 No.2 p269–273, Japanese Patent Laid-open No.51-73698, Japanese Patent Laid-open No.54-102692, Japanese Patent Laid-open 57-81986, and Applied Optics Vol.30 No.25 p3604–3606, an optical system for machining with a hologram can be used in order to perform a laser machining operation as well as the laser transfer machining apparatus shown in FIG. 1. FIG. 2 is a schematic view of a conventional optical system using a hologram element which is called "Modulated Zone Plate", or a kind of hologram, which is disclosed in Applied Optics Vol.13 No.2 p269–273. Shown in FIG. 2 are a laser oscillator 1, a hologram element 5, a target 8 and an optical system 24 for expanding incident laser light.

In operation, a laser beam emitted by the laser oscillator 1 is expanded in size by the optical system 24 for expanding incident laser light and then is incident on the hologram element 5. A pattern to be machined is generated by the diffraction of the laser light incident on the hologram element 5 and is imaged on the target 8 to be machined. Thus, a few of the patterns are drilled simultaneously on the target. FIG. 3 is a schematic view of a known optical system for machining using a hologram disclosed in Japanese Patent Laid-open No.57-81986. A laser beam emitted by the laser oscillator 1 is expanded in size by the optical system 24 for expanding incident laser light and then is incident on the hologram element 5. The hologram element 5 is designed such that the laser beam passing through the hologram element has a predetermined pattern to be machined. The pattern is imaged on the surface to be machined of the target 8. Thus, the predetermined pattern is drilled on the target 8. The basic structure of the conventional optical system is the same as that of the system of FIG. 2.

Such a conventional laser transfer machining apparatus suffers from a drawback that most of a laser light incident on the mask enters an opaque part of the mask and therefore cannot pass through the mask, and this results in reducing the efficiency of utilization of light. For example, in a method of transfer machining using an eximer laser, in general, only a small part of the whole surface of a workpiece is machined. When the method is applied for a machining application to drill holes for conducting in a polyimide board in use for an electronic circuit, in general, about one hundred holes with diameters of about 100 $\mu$m are drilled per square cm. In such a case, the ratio of the area of a part machined to the area of the whole surface of the board is 0.8% or less. When such a machining operation is performed in the conventional laser transfer machining apparatus shown in FIG. 1, most of energy of the incident laser light is scattered and absorbed by the mask and 0.8% or less of the beam power of the laser light emitted by the laser oscillator is utilized for the laser machining operation. Thus, a significant disadvantage of the prior laser transfer machining apparatus is that the efficiency of machining is very low.

When a hole drilling operation as mentioned above is performed using the laser transfer machining apparatus as shown in FIG. 1, there is an applicable method of scanning a laser light beam at many times, with the beam area on the workpiece being narrowed for the purpose of utilizing the laser light efficiently, such as a method of illuminating the workpiece with a light spot to drill holes one by one. However, since most of the region illuminated by the laser beam should transmit the laser light in order to improve the efficiency of utilization of light substantially, the area of the region illuminated at once should be very small. In the case of hole drilling, holes will be drilled one by one or two by two. Therefore, the whole region to be machined of a workpiece will be divided into many very small regions and the divided regions will be machined successively. Thus, in the case that this type of machining method is applied, the time required for machining is increased and hence the efficiency of machining becomes lower since the method wastes time for scanning a laser beam, followed by positioning the workpiece.

The machining optical system including the aforementioned conventional holograms was intended to eliminate the drawback of this type of transferring optical system. However, in the optical system for laser machining using the prior hologram as shown in FIG. 2, the hologram should be illuminated by a laser light with highly spatial and temporal coherence in order to re-create a precise pattern to be machined. The pattern reproduced by the hologram directly depends on the quality (or coherence) of the laser beam incident on the hologram; that is, the accuracy or the like of a machined pattern obtained by the method of machining is determined by the performance of the hologram and the quality of the incident laser light. In the case of a low spatially coherent light such as a light emitted by an eximer laser, in order to obtain a precise pattern to be machined the spatial coherence of the light has to be improved by using a spatial filter as described in reference books for optics, e.g. "Optical engineering", pp.250–252, by K. Iizuka. The spatial filter consists of a plate 21 having a pin-hole, the diameter of which is very small. As shown in FIG. 4, the plate is arranged such that the pin-hole is at the image focal point f of a lens 20 to eliminate a light component with disturbed wave fronts from a light incident on the pin-hole. In order to eliminate the light component with disturbed wave fronts effectively, the diameter of the pin-hole should be equal to the width of the main lobe of the incident laser light at the focal point of the lens. When a low spatially coherent laser light is incident on such a spatial filter, only a part of the laser light can pass through the spatial filter and hence the transmissibility of the filter is reduced sharply and a high efficiency of utilization of light cannot be obtained. Therefore, the conventional optical systems using such holograms are able to use only a highly coherent laser and are not able to use a relatively low coherent laser such as an eximer laser.

As mentioned above, the efficiency of machining provided by such a conventional laser transfer machining apparatus is low. In addition, it is impossible to reduce the time required for machining without reducing the total reliability of the machining apparatus because the laser oscillator must output a high power laser light at the sacrifice of the life time and stability thereof. Furthermore, laser transfer machining apparatuses using a conventional hologram suffer from a disadvantage that the apparatus must use a laser which is able to emit a highly and spatially coherent light. Therefore, when using a relatively low coherent laser such as an eximer laser, an optical system for improving coherence of incident light such as a spatial filter is needed and this results in reducing the efficiency of machining very much.

SUMMARY OF THE INVENTION

The present invention has been made to solve the foregoing problems and it is therefore an object of the present invention to provide a laser transfer machining apparatus having a high efficiency of utilization of light and capable of reducing the time required for machining.

Another object of the present invention is to provide a laser transfer machining apparatus having a high efficiency of utilization of light, and capable of reducing the time required for machining and using a laser with a relatively low spatial coherence such as an eximer laser.

Still another object of the present invention is to provide a laser transfer machining apparatus which permits low cost laser machining capable of providing a symmetric and precise pattern to be machined.

A further object of the present invention is to provide a laser transfer machining apparatus which permits laser machining capable of providing a non-symmetric and precise pattern to be machined.

Another object of the present invention is to provide a laser transfer machining apparatus capable of transferring images to be transferred for machining with a high efficiency and a high resolution.

A further object of the present invention is to provide a laser transfer machining apparatus capable of utilizing zero-order diffracted light generated by a hologram.

Another object of the present invention is to provide a laser transfer machining apparatus which improves the efficiency of utilization of laser light by increasing a laser light transmissibility of a mask.

A further object of the present invention is to provide a laser transfer machining apparatus having a high efficiency of utilization of laser light and capable of providing a uniform and stable pattern to be machined.

Another object of the present invention is to provide a laser transfer machining apparatus which improves the efficiency of utilization of laser light by increasing a laser light transmissibility of a mask and is able to provide a precise machining operation with a high accuracy of machining.

A further object of the present invention is to provide a laser transfer machining apparatus capable of adjusting positions to be machined of a workpiece with high precision and providing patterns to be machined each having a similar pattern arrangement.

Another object of the present invention is to provide a laser transfer machining apparatus capable of performing a three-dimensional machining operation when a three-dimensional structure or the like is formed on a surface of a workpiece.

A further object of the present invention is to provide a laser transfer machining apparatus which permits stable laser machining.

Another object of the present invention is to provide a laser transfer machining apparatus capable of machining a relatively thick or hard object to be machined.

A further object of the present invention is to provide a laser transfer machining apparatus capable of easily changing a pattern to be machined.

Another object of the present invention is to provide a laser transfer machining apparatus capable of simultaneously providing a plurality of images to be transferred with different capabilities to machine.

A further object of the present invention is to provide a laser transfer machining apparatus capable of providing a pattern to be machined with a large area and a complicated pattern to be machined.

Another object of the present invention is to provide a laser transfer machining apparatus which permits high quality laser machining with a high accuracy of machining.

A further object of the present invention is to provide a laser transfer machining apparatus capable of easily controlling the position of a pattern to be machined and providing a high quality laser machining operation with a high accuracy of machining.

Another object of the present invention is to provide a laser transfer machining apparatus capable of providing various kinds of patterns to be machined.

According to the invention, a laser transfer machining apparatus comprises a shaping unit for shaping a laser beam so that the laser beam has a beam pattern which corresponds to a desired pattern to be machined in an object to be machined, and a generating unit disposed separately from the shaping unit for simultaneously generating a plurality of laser beams each having the beam pattern from the laser beam shaped by the shaping unit. The generating unit is adapted to emit the plural laser beams while simultaneously defining a plurality of radiation directions of the generated plural laser beams to the object to be machined.

In operation, the shaping unit shapes the laser beam, which is emitted by the laser light source so that the laser beam has a beam pattern which corresponds to a desired pattern to be formed in the object to be machined. The generating unit generates a plurality of laser beams each having the beam pattern from the laser beam shaped by the shaping unit. When the plural images are generated, the generating unit emits the plural laser beams while simultaneously defining a plurality of radiation directions of the generated plural laser beams to the object to be machined. Therefore, the laser transfer machining apparatus can provide a high efficiency of utilization of light and reduce the time required for machining.

In a preferred embodiment, the generating unit of the laser transfer machining apparatus comprises a Fourier-transform hologram. The Fourier-transform hologram transfers plural images to be transferred with arbitrary phases as plural laser beams which correspond to a desired whole pattern to be machined on a surface to be machined of a workpiece. Since the Fourier-transform hologram has a high efficiency of utilization of light, the hologram can reduce the time required for machining. The hologram can be applied to a laser with a relatively low spatial coherence such as an eximer laser.

Preferably, the Fourier-transform hologram is a digital phase hologram having two-level phases in a symmetric pattern arrangement with respect to the incident laser beam for generating the plural laser beams. Conjugate images are generated by the digital phase hologram having two-level phases, too. The plural laser beams produce a symmetric pattern with respect to the incident laser light. Since the phase hologram can be easily fabricated and has a high efficiency of utilization of light, the laser transfer machining apparatus permits low cost laser machining capable of providing a symmetric and precise pattern to be machined.

According to a preferred embodiment of the invention, the Fourier-transform hologram is a digital phase hologram having at least three-level phases. Since no conjugate image is generated by the digital phase hologram having three-level phases, the plural laser beams produce an unsymmetric pattern with respect to the incident laser light. Since the phase hologram has a high efficiency of utilization of light, the laser transfer machining apparatus permits laser machining capable of providing an unsymmetric and precise pattern to be machined.

Preferably, the Fourier-transform hologram is a hologram consists of a plurality of hologram elements, which are arranged like tiles, with the same hologram pattern. Since the Fourier-transform hologram has a large area and the numerical aperture of the whole optical system is high, the laser transfer machining apparatus can transfer images to be transferred for machining with a high efficiency and a high resolution.

According to a preferred embodiment of the invention, the laser transfer machining apparatus is adapted to machine the object to be machined by utilizing a zero-order diffracted light emitted by the Fourier-transform hologram. Thus, the laser transfer machining apparatus can utilize lights generated by the Fourier-transform hologram more effectively to machine a workpiece.

Preferably, the shaping unit of the laser transfer machining apparatus comprises a beam shaping optical system for adjusting the size of the laser beam emitted by the laser light source and a mask, on which a laser beam with a beam pattern adjusted by the optical system is incident, for allowing a component of the incident laser light with a beam pattern which corresponds to a desired pattern to be machined to pass therethrough. In operation, the beam shaping optical system adjusts the size of the laser beam emitted by the laser light source. When the laser beam adjusted by the optical system is incident on the mask, the beam pattern is shaped like a predetermined beam pattern, which corresponds to a desired pattern to be machined. Then the mask transmits the laser beam with the shaped beam pattern. Therefore the laser light transmissibility of the mask is increased and hence the efficiency of utilization of the laser light is improved.

According to a preferred embodiment of the invention, the shaping unit of the laser transfer machining apparatus comprises an optical fiber for guiding the laser beam emitted by the laser light source and a mask, on which a laser beam with a beam pattern emerges from the optical fiber is incident, for allowing a component of the incident laser light with a beam pattern which corresponds to a desired pattern to be machined to pass therethrough. In operation, the laser beam emitted by the laser light source is guided by the optical fiber. When the laser beam adjusted by the optical fiber is incident on the mask, the beam pattern is shaped like a predetermined beam pattern, which corresponds to a desired pattern to be machined. Then the mask transmits the laser beam with the shaped beam pattern. Therefore the laser transfer machining apparatus provides a high efficiency of utilization of laser light and the light intensity distribution of the laser light passing through the optical fiber is uniform. Thereby the apparatus can provide an uniform and stable pattern to be machined.

Preferably, the shaping unit of the laser transfer machining apparatus comprises an optical fiber, the output face of which is shaped like the beam pattern which corresponds to a desired pattern to be machined, for guiding the laser beam emitted by the laser light source. The laser light emitted by the laser light source is guided by the optical fiber and the laser light with the shaped beam pattern is emitted out of the emergent face which is shaped like the beam pattern. Therefore the laser transfer machining apparatus provides a high efficiency of utilization of laser light and the light intensity distribution of the laser light passing through the optical fiber is uniform. Thereby the apparatus can provide a uniform and stable pattern to be machined.

According to a preferred embodiment of the invention, the shaping unit of the laser transfer machining apparatus is disposed in an optical cavity of the laser light source and comprises a mask for defining a beam pattern of a laser beam generated in the optical cavity so that the laser beam has the beam pattern which corresponds to a desired pattern to be machined and for transmitting a laser beam with the shaped beam pattern. In operation, the mask, which is disposed in the optical cavity of the laser light source, defines a beam pattern of a laser beam generated in the optical cavity so that the laser beam has the beam pattern which corresponds to a desired pattern to be machined, and the mask transmits a laser beam with the shaped beam pattern. The efficiency of utilization of laser light is increased because the laser light emitted by the laser source are passed through the mask and hence the laser light transmissibility of the mask is improved and the laser beam has a high quality. Thereby the laser transfer machining apparatus provides a precise machining operation with a high accuracy of machining.

Preferably, the laser transfer machining apparatus comprises a transferring optical system for projecting images to be transferred corresponding to the plural laser beams generated by the generating unit onto the object to be machined, and the generating unit is arranged between the transferring optical system and the object to be machined. Therefore, the positions of transferred images are adjusted by translating the generating unit in parallel with the optical axis of the laser light. The positions to be machined of a workpiece can be adjusted with high precision and patterns to be machined each having a similar pattern arrangement can be provided easily.

According to a preferred embodiment of the invention, the laser transfer machining apparatus comprises a transferring optical system for projecting images to be transferred corresponding to the plural laser beams generated by the generating unit onto the object to be machined, and the generating unit is arranged between the transferring optical system and the shaping unit. Therefore, the incident angle of the laser beams incident on the object to be machined can be adjusted. The laser transfer machining apparatus can perform a three-dimensional machining operation when a three-dimensional structure or the like is formed on a surface of a workpiece.

Preferably, the laser transfer machining apparatus comprises a transferring optical system for projecting images to be transferred corresponding to the plural laser beams generated by the generating unit onto the object to be machined, and the transferring optical system comprises at least one lens disposed on optical paths of the laser beams generated by the generating unit and the object to be machined is arranged at the image focal point of the lens. Therefore, the positions of images on the object to be machined does not change even if the generating unit is shifted in parallel with the optical axis of the laser light. The laser transfer machining apparatus permits stable laser machining.

According to a preferred embodiment of the invention, the laser transfer machining apparatus comprises a transferring optical system for projecting images to be transferred corresponding to the plural laser beams generated by the generating unit onto the object to be machined, and the transferring optical system comprises at least one lens disposed on optical paths of the laser beams generated by the generating unit. The aperture stop of the lens in the downstream side of the generating unit is equal to the object focal length of the lens and the generating unit is positioned at the object focal point of the lens. Therefore, the main rays, which are included in the transfer images projected on the object to be machined, are incident on the object at right angles. The laser transfer machining apparatus is able to machine a relatively thick or hard object to be machined.

Preferably, the laser transfer machining apparatus comprises a shielding unit for selectively shielding a part of the plural laser beams which emerge from the generating unit. The shielding unit selectively shields a part of the plural laser beams which emerge from the generating unit. Therefore, the laser transfer machining apparatus is able to easily change a pattern to be machined.

According to a preferred embodiment of the invention, the generating unit of the laser transfer machining apparatus is adapted to simultaneously generate the plurality of laser beams each having its own light intensity depending upon the light intensity of the incident laser beam. The laser transfer machining apparatus is able to define the laser light intensity of each transferred image and to simultaneously provide a plurality of images to be transferred with different capabilities to machine a workpiece.

Preferably, the generating unit of the laser machining apparatus is adapted to simultaneously generate the plurality of laser beams in such a manner that each of the images to be transferred corresponding to the plural generated laser beams overlap or abut on at least another image to be transferred on the object to be machined. Therefore, a continuous machined hole is made at positions where the plural images are imaged such that the corresponding plural laser beams overlap or abut on at least another beam on the object. The laser transfer machining apparatus is able to provide a pattern to be machined with a large area and a complicated pattern to be machined.

According to a preferred embodiment of the invention, the laser light source of the laser transfer machining apparatus comprises a unit for narrowing a band width of wavelengths of the laser light emitted thereby. The band of wavelengths of the laser light is narrowed by this mechanism. Therefore, the chromatic aberration of the optical system including the hologram can be reduced and hence the laser transfer machining apparatus permits high quality laser machining with a high accuracy of machining.

Preferably, the generating unit of the laser transfer machining apparatus is adapted to generate at least one laser beam for positioning the plurality of laser beams on the object to be machined in addition to the plural laser beams for machining the object to be machined. Therefore, by detecting the added laser beam the adjustment of the positions of the generating unit and the like can be easily performed and hence the laser transfer machining apparatus is able to easily control the position of a pattern to be machined and to provide a high quality laser machining operation with a high accuracy of machining.

According to a preferred embodiment of the invention, the laser transfer machining apparatus comprises a plurality of generating units and an arranging unit for choosing one of the plural generating units and for arranging the chosen generating unit on the optical path of the laser light from the shaping unit to the object to be machined. Therefore, by selecting a desired generating unit and replacing one unit already set with another one, the plural generating units are used together for machining. The laser transfer machining apparatus is able to provide various kinds of patterns to be machined.

In another preferred embodiment of the invention, the shaping unit of the laser machining apparatus is a mask in which a predetermined pattern is formed to shape the laser beam passing therethrough so that the laser beam has a beam pattern which corresponds to a desired pattern to be machined in the object to be machined.

Preferably, the Fourier-transform hologram is designed such that reproduced images have an arbitrary phase distribution.

Further objects and advantages of the present invention will be apparent from the following description of the preferred embodiments of the invention as illustrated in the accompanying drawings.

BRIEF DESCRIPTION OF THE DRAWINGS

FIG. 31 is a diagrammatic view showing the structure of a laser transfer machining apparatus provided with a rotary mask-changing driving unit according to an embodiment of the present invention.

FIG. 38 is a diagrammatic view showing the structure of a laser transfer machining apparatus according to an embodiment of the present invention.

FIG. 40 is a cross-sectional view of a target to be machined which is machined by using an example of the hologram shown in FIG. 39 and is taken along the line I–I' of FIG. 39.

FIG. 41 is a plane view of a target to be machined which is machined by using an example of the hologram shown in FIG. 39.

FIG. 42 is a plane view of a target to be machined which is machined by using an example of the hologram shown in FIG. 39.

FIG. 43 is a plane view of a target to be machined which is machined by using an example of the hologram shown in FIG. 39.

FIG. 66 is a perspective view of the phase hologram of FIG. 65.

FIG. 67 is a diagrammatic view showing the structure of a laser transfer machining apparatus provided with a phase hologram using a micro-discharge tube according to an embodiment of the present invention.

FIG. 70 is a schematic view of the phase hologram of FIG. 69.

FIG. 71 is a diagrammatic view showing the structure of a laser transfer machining apparatus provided with an electro-optical element plate for changing a mask pattern according to an embodiment of the present invention.

FIG. 73 is a diagrammatic view showing the structure of a laser transfer machining apparatus provided with a spherical mirror for returning a laser light into a phase hologram several times according to an embodiment of the present invention.

FIG. 74 is a view showing positions of diffracted lights on the spherical mirror according to the embodiment of FIG. 73.

FIG. 75 is a plane view of an example of a target to be machined which is machined by the laser transfer machining apparatus according to the embodiment of FIG. 53.

FIG. 76 is a diagrammatic view showing the structure of a laser transfer machining apparatus provided with a partially reflecting spherical mirror and a fully reflecting spherical mirror for returning a laser light into a phase hologram several times according to an embodiment of the present invention.

FIG. 77 is a diagrammatic view showing the structure of a laser transfer machining apparatus using two laser lights with different wavelengths according to an embodiment of the present invention.

FIG. 78 is a plane view of an example of a target to be machined which is machined by the laser transfer machining apparatus according to the embodiment of FIG. 77.

FIG. 79 is a diagrammatic view showing the structure of a laser transfer machining apparatus adapted simultaneously to use a hologram with two different hologram patterns according to an embodiment of the present invention.

FIG. 93 is a diagrammatic view showing the structure of a laser transfer machining apparatus adapted to use four different mask patterns disposed on a mask by selecting one of them according to an embodiment of the present invention.

FIG. 112 is a diagrammatic view showing the partial structure of a laser transfer machining apparatus provided with a convex lens and a concave lens for cancelling chromatic aberration according to an embodiment of the present invention.

FIG. 113 is a diagrammatic view showing the partial structure of a laser transfer machining apparatus provided with a convex lens and a concave lens for cancelling chromatic aberration according to an embodiment of the present invention.

FIG. 114 is a diagrammatic view showing the partial structure of a laser transfer machining apparatus provided with a phase hologram the front face of which is directed toward the direction from which a laser light is incident on the hologram according to an embodiment of the present invention.

FIG. 115 is a diagrammatic view showing the structure of a cleaning mechanism of a laser transfer machining apparatus according to an embodiment of the present invention.

FIG. 116 is a plane view showing the cleaning mechanism of FIG. 115.

FIG. 117 is a diagrammatic view showing the structure of a cleaning mechanism of a laser transfer machining apparatus according to an embodiment of the present invention.

FIG. 118 is a plane view showing the cleaning mechanism of FIG. 117.

FIG. 119 is a diagrammatic view showing the structure of a cleaning mechanism of a laser transfer machining apparatus provided with a laser light transparent sheet for preventing particlurates generated upon machining from sticking to a phase hologram according to an embodiment of the present invention.

FIG. 120 is a diagrammatic view showing the structure of a laser transfer machining apparatus for feeding a gas flow for preventing particlurates generated upon machining from sticking to a phase hologram according to an embodiment of the present invention.

FIG. 121 is a diagrammatic view showing the structure of a laser transfer machining apparatus which is able to produce a gas flow layer for preventing particlurates generated upon machining from sticking to a phase hologram according to an embodiment of the present invention.

FIG. 122 is a diagrammatic view showing the structure of a laser transfer machining apparatus provided with a container for preventing particlurates generated upon machining from sticking to a phase hologram according to an embodiment of the present invention.

FIG. 123 is a diagrammatic view showing the structure of a laser transfer machining apparatus provided with a phase hologram generating laser beams, which are imaged outside a target to be machined, for positioning a pattern to be machined according to an embodiment of the present invention.

Figure 124:
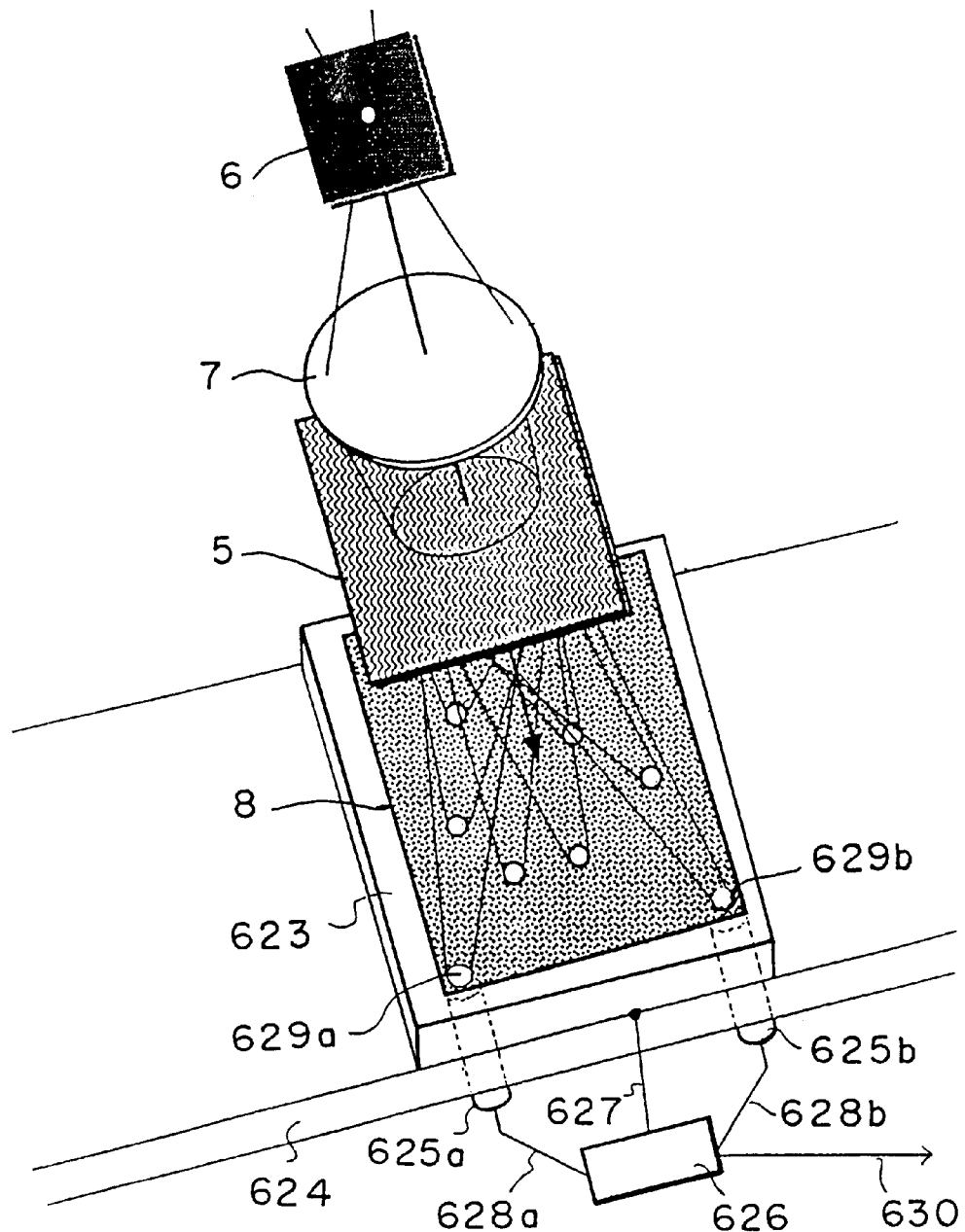

FIG. 124 is a diagrammatic view showing the structure of a laser transfer machining apparatus provided with a phase hologram generating laser beams, which are imaged on a target to be machined, for positioning a pattern to be machined according to an embodiment of the present invention.

Figure 125:
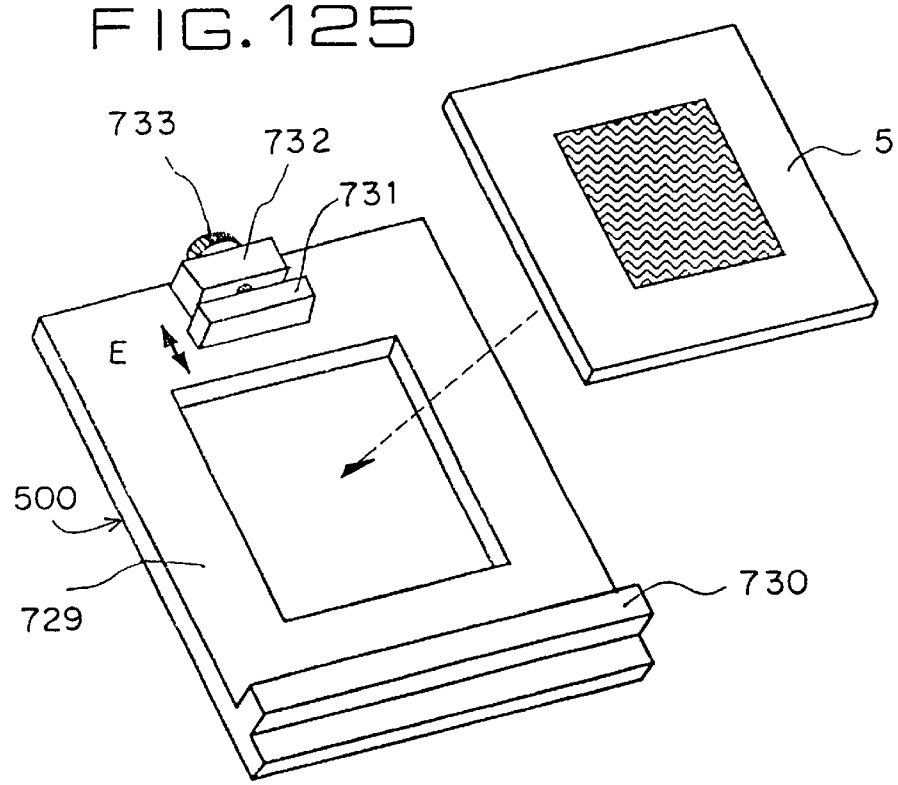

FIG. 125 is a diagrammatic view showing the structure of a hologram holder according to an embodiment of the present invention.

Figure 126:
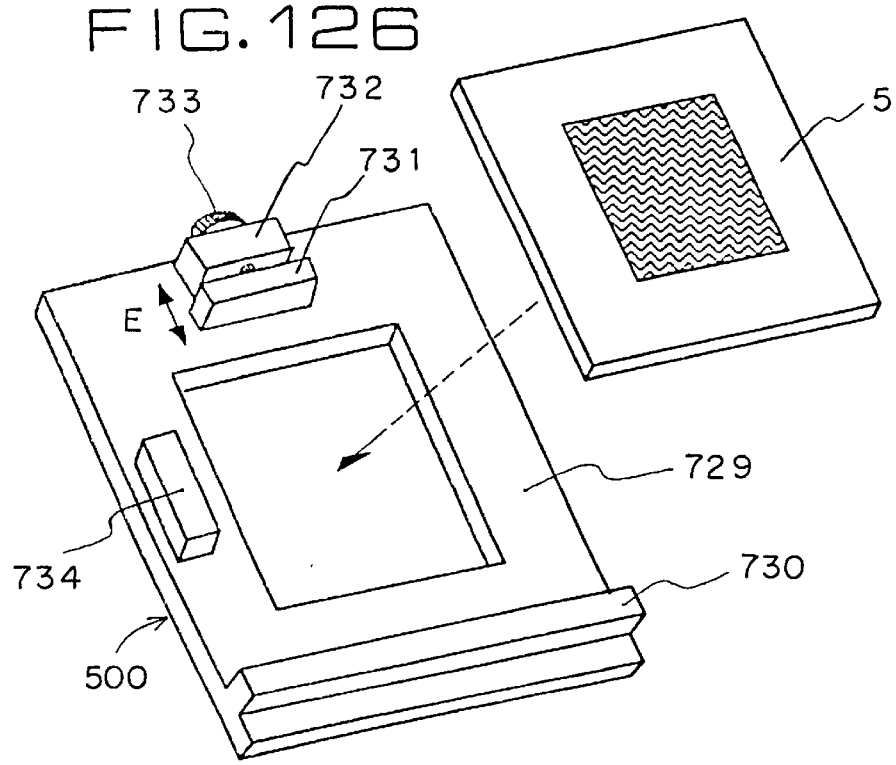

FIG. 126 is a diagrammatic view showing the structure of a hologram holder according to an embodiment of the present invention.

Figure 127:
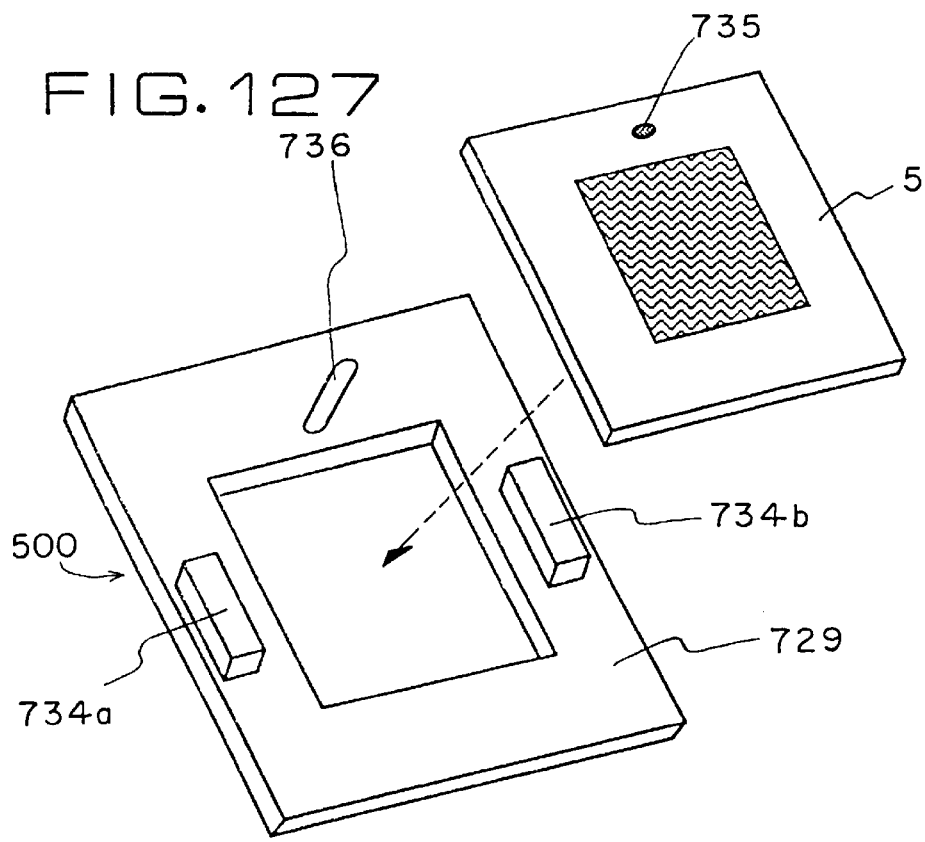

FIG. 127 is a diagrammatic view showing the structure of a hologram holder and a hologram according to an embodiment of the present invention.

Figure 128:
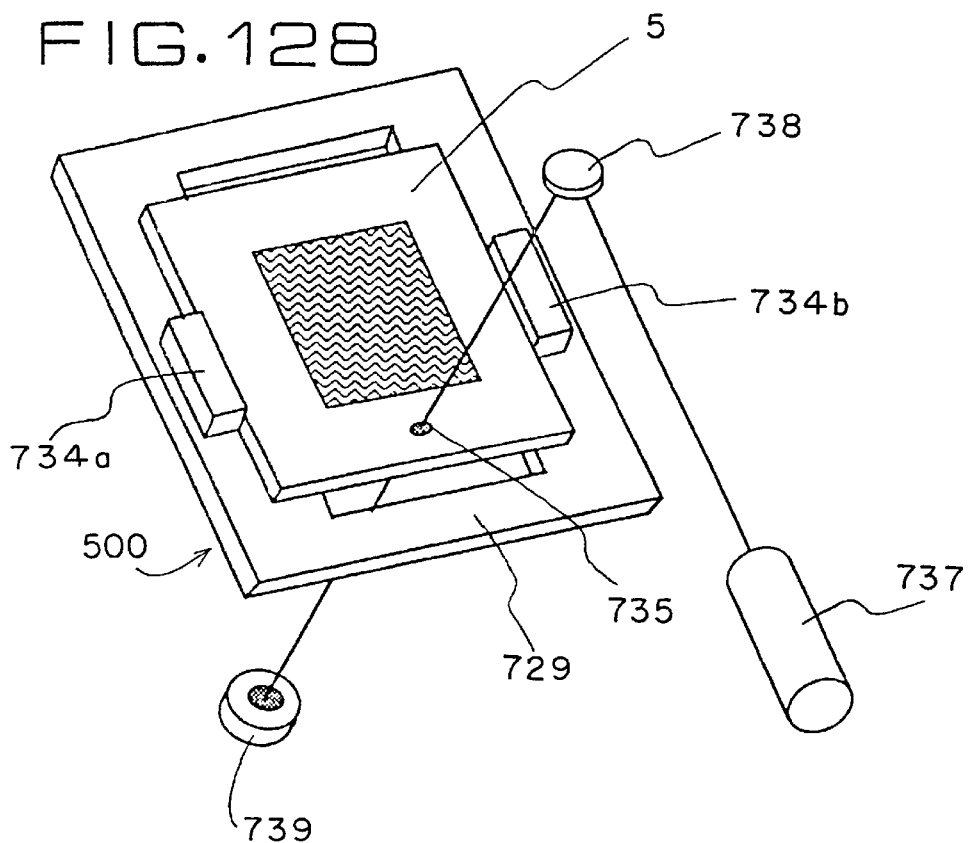

FIG. 128 is a diagrammatic view showing the structure of a hologram holder a laser for detecting the position of a hologram according to an embodiment of the present invention.

Figure 129:
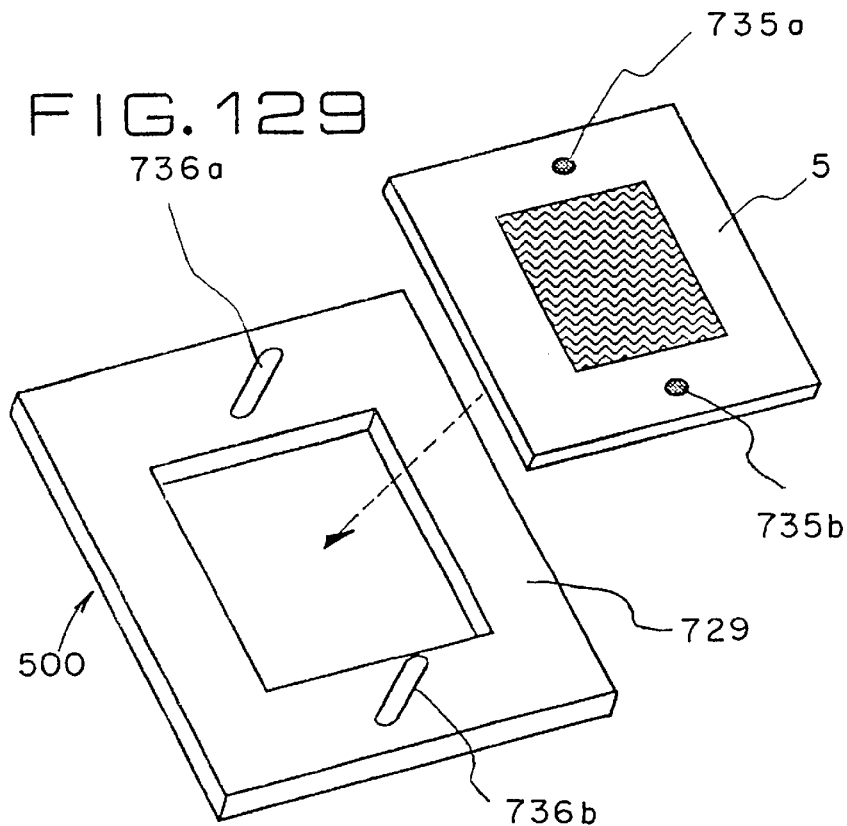

FIG. 129 is a diagrammatic view showing the structure of a hologram holder and a hologram according to an embodiment of the present invention.

Figure 130:
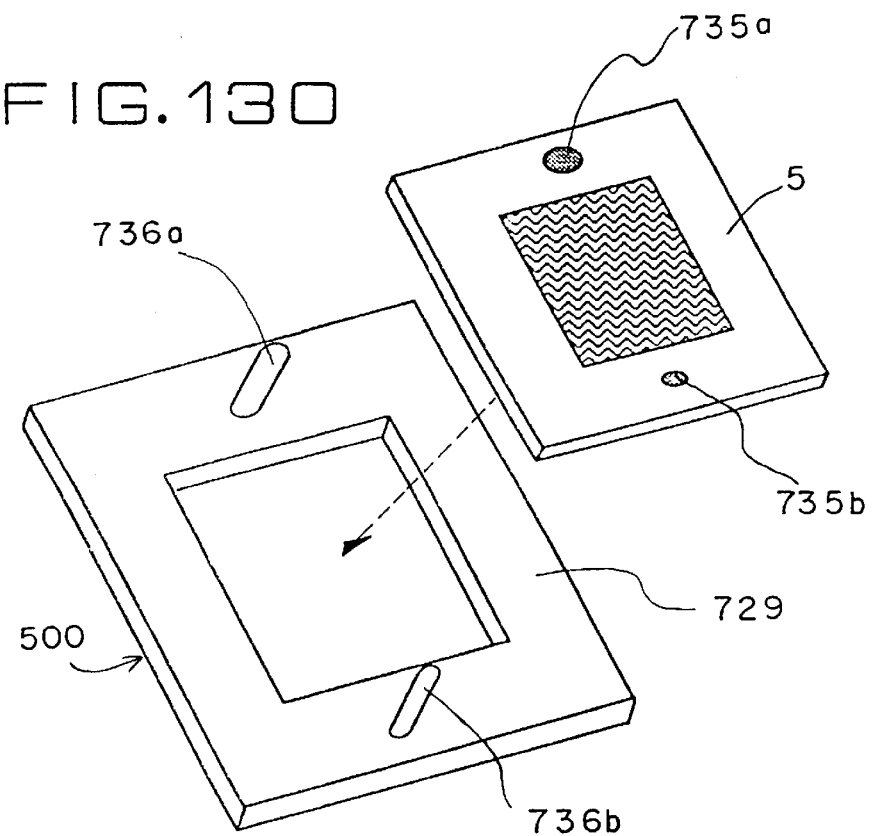

FIG. 130 is a diagrammatic view showing the structure of a hologram holder and a hologram according to an embodiment of the present invention.

Figure 131:
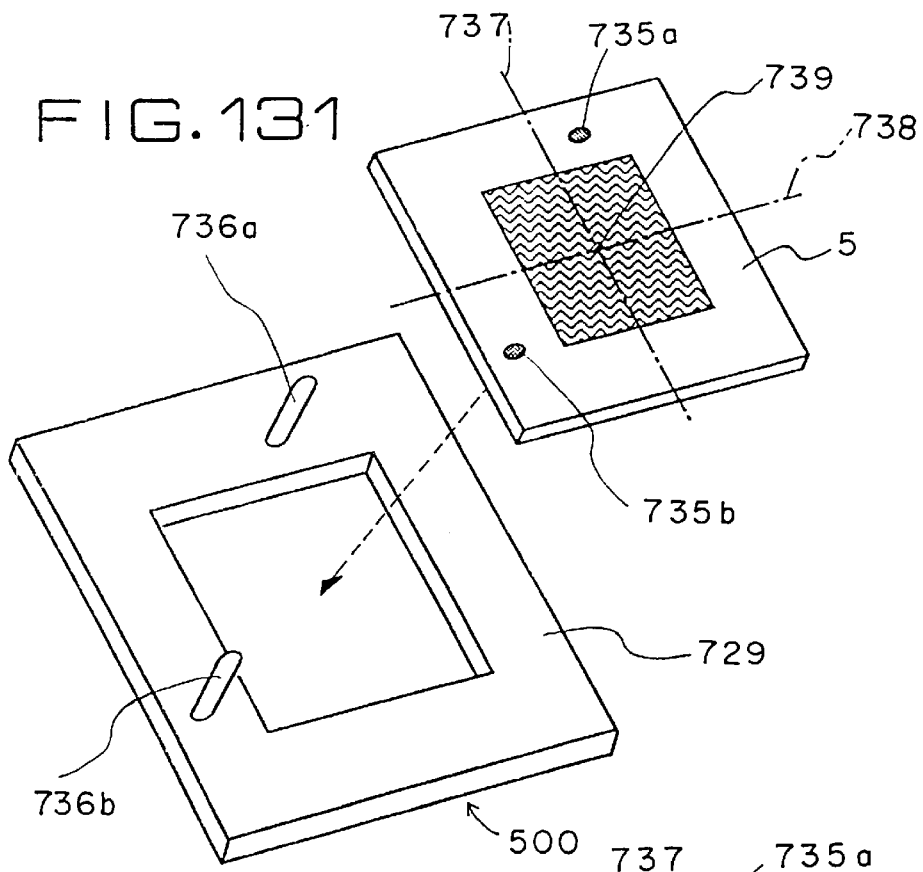

FIG. 131 is a diagrammatic view showing the structure of a hologram holder and a hologram according to an embodiment of the present invention.

Figure 132:
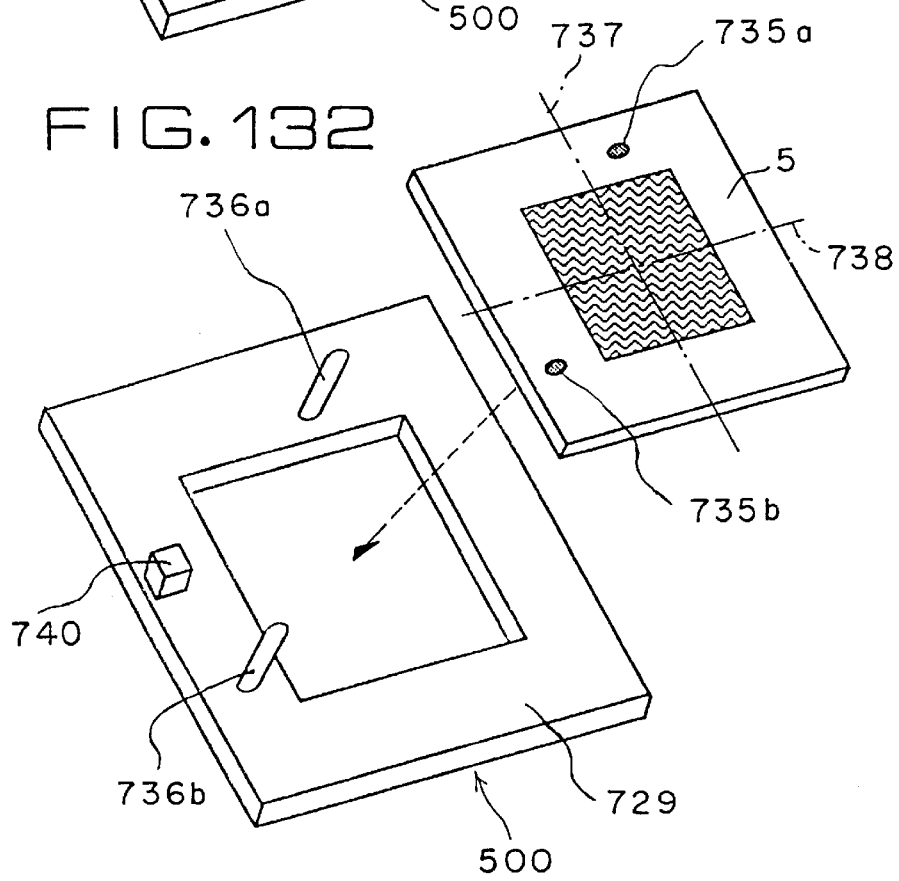

FIG. 132 is a diagrammatic view showing the structure of a hologram holder and a hologram according to an embodiment of the present invention.

Figure 133:
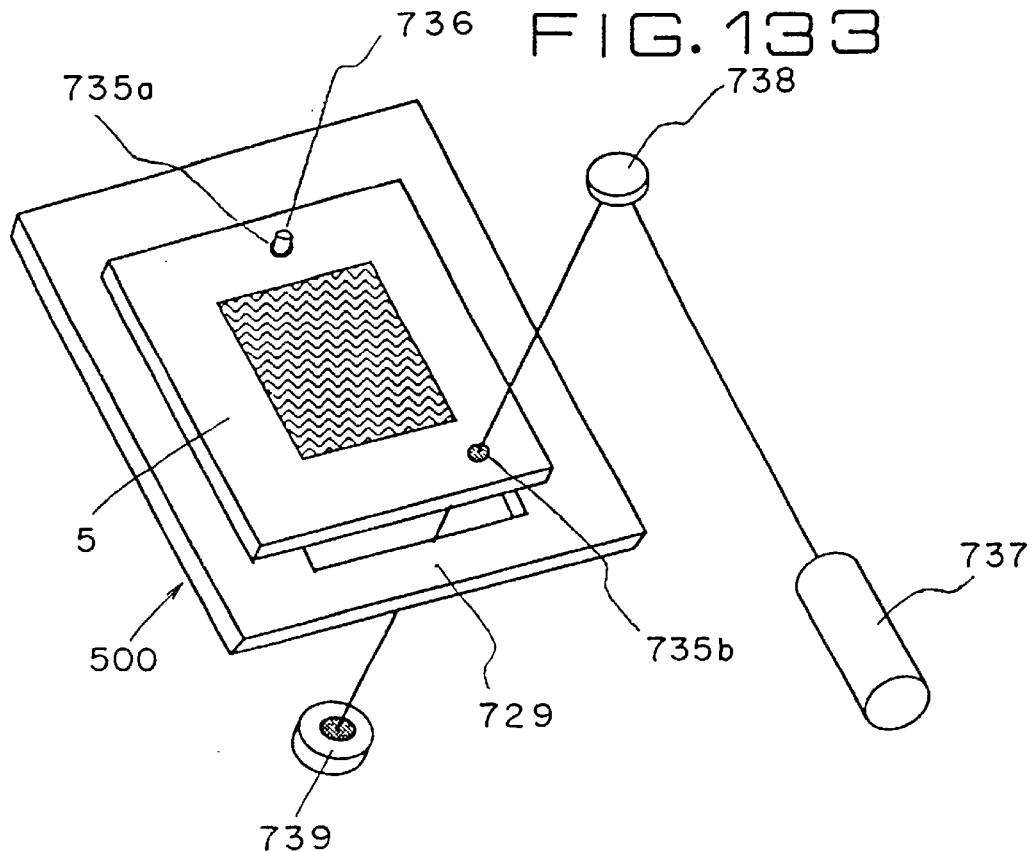

FIG. 133 is a view showing a means for preventing incorrect attachments shown in FIG. 132 in the hologram holder and hologram according to the embodiment shown in FIG. 131.

Figure 134:
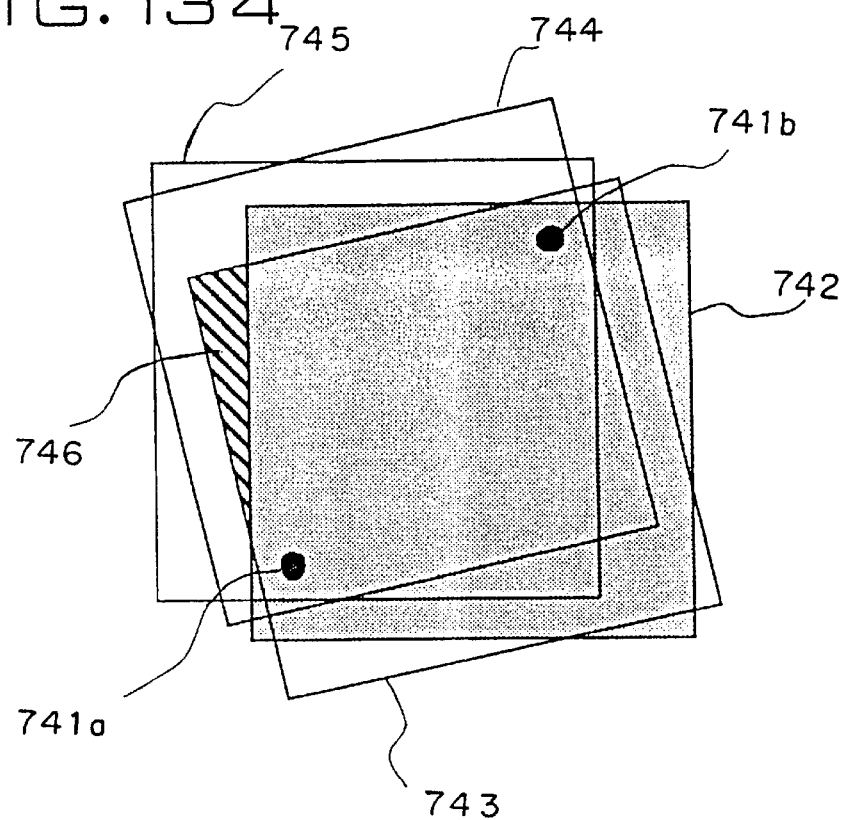

FIG. 134 is a diagrammatic view showing the structure of a hologram holder a laser for detecting the position of a hologram according to an embodiment of the present invention.

Figure 135:
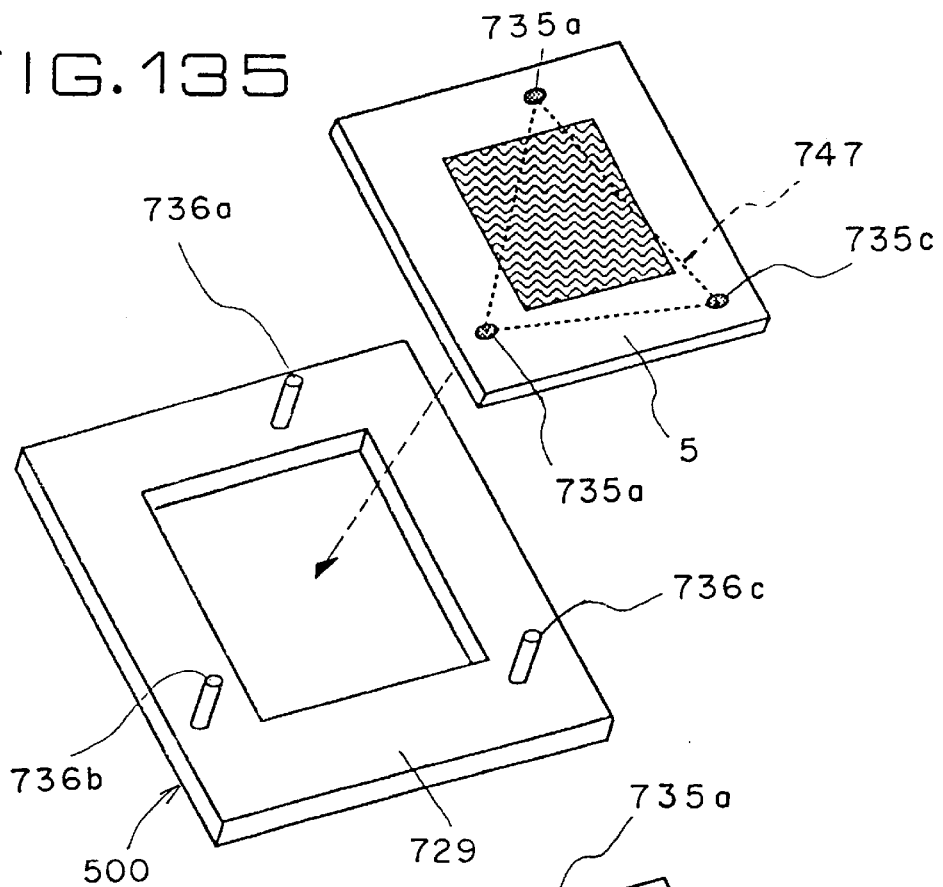

FIG. 135 is a diagrammatic view showing the structure of a hologram holder and a hologram according to an embodiment of the present invention.

Figure 136:
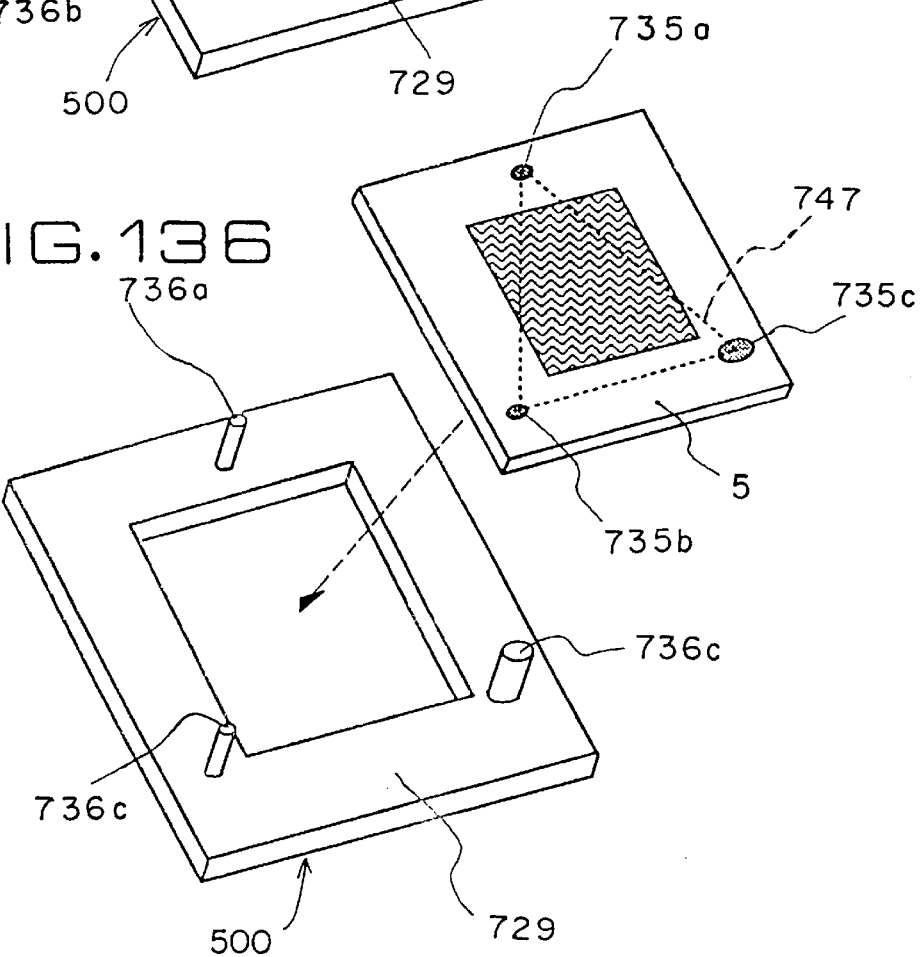

FIG. 136 is a diagrammatic view showing the structure of a hologram holder and a hologram according to an embodiment of the present invention.

Figure 137:
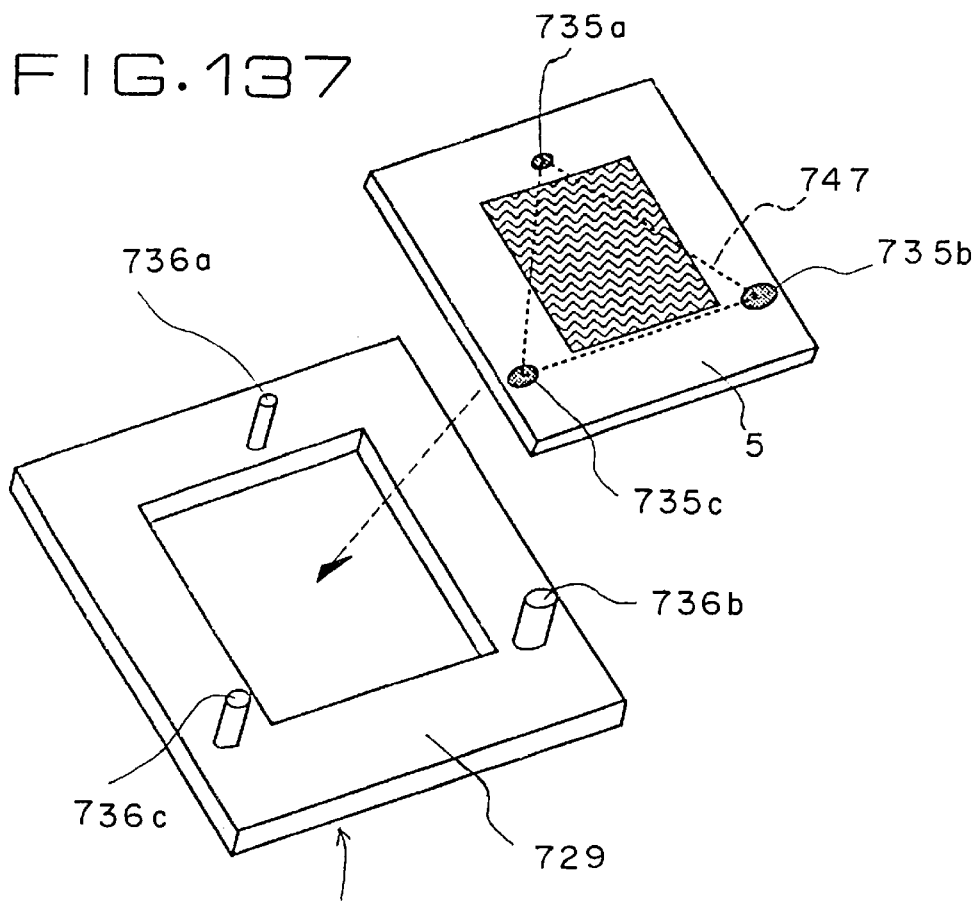

FIG. 137 is a diagrammatic view showing the structure of a hologram holder and a hologram according to an embodiment of the present invention.

Figure 138:
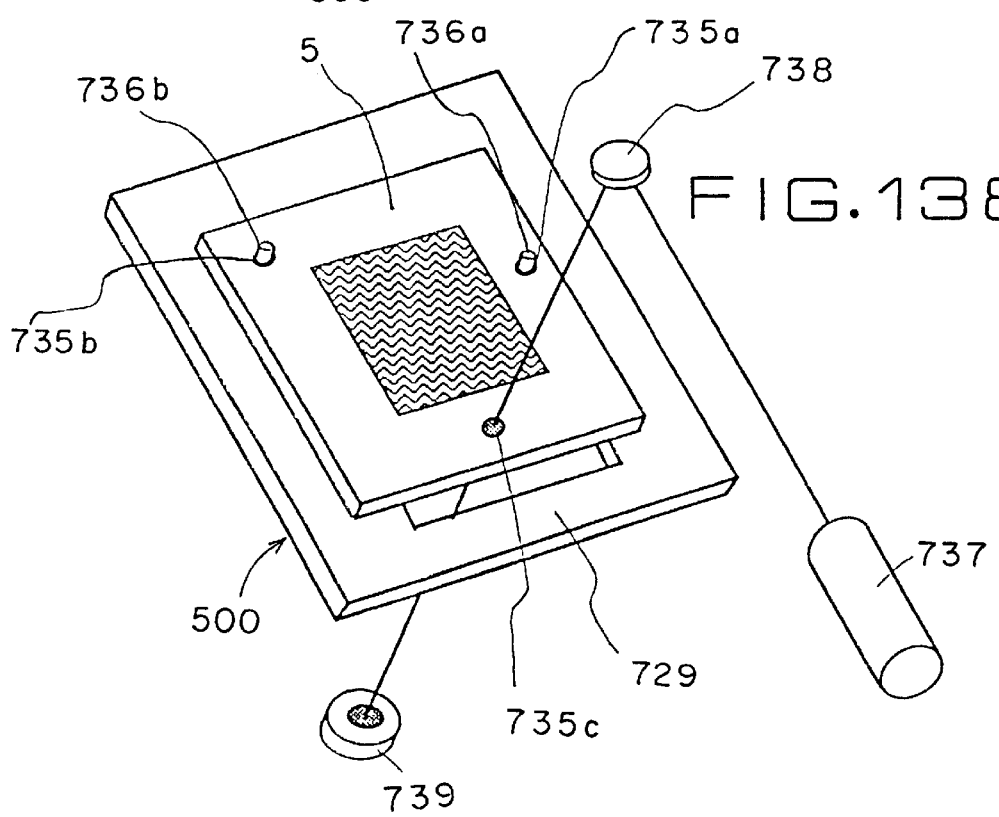

FIG. 138 is a diagrammatic view showing the structure of a hologram holder a laser for detecting the position of a hologram according to an embodiment of the present invention.

Figure 139:
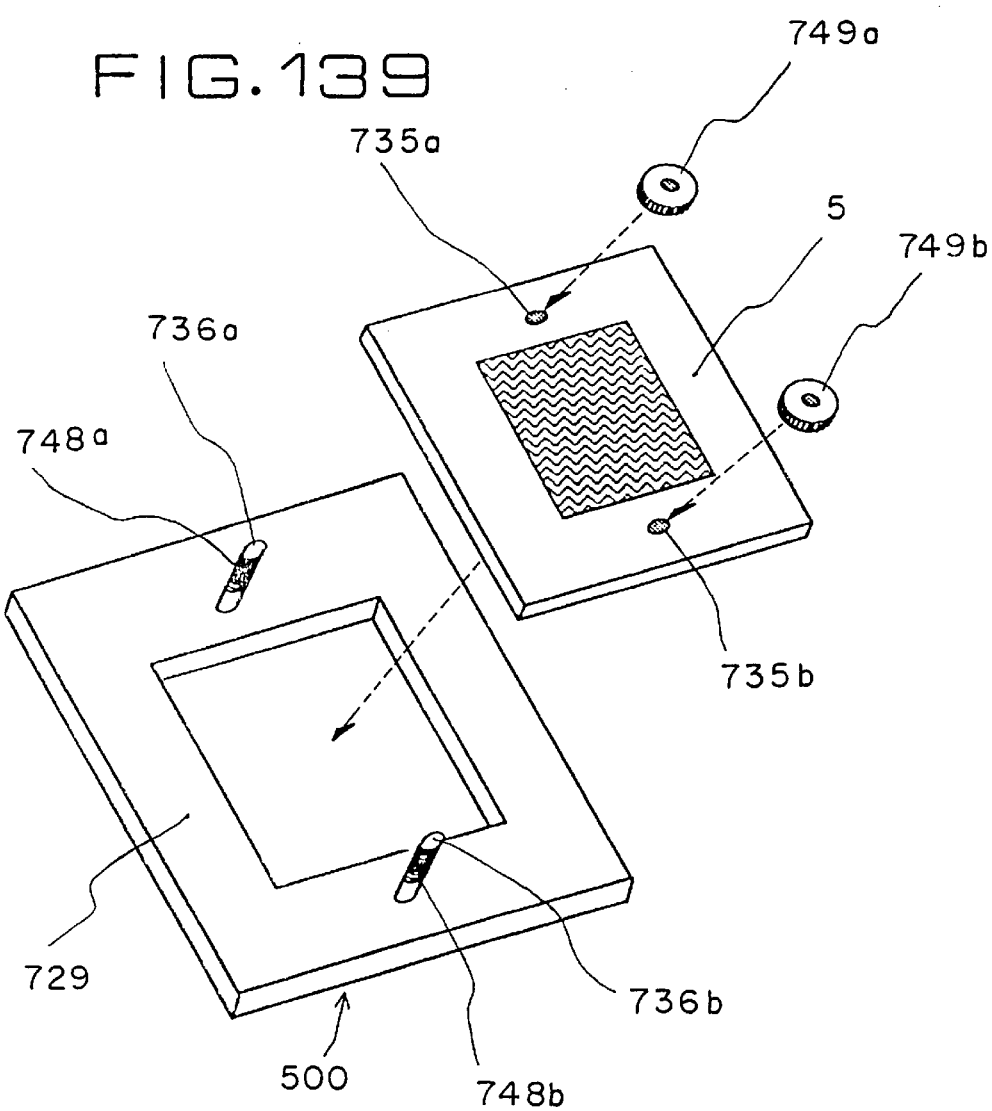

FIG. 139 is a diagrammatic view showing the structure of a hologram holder and a hologram according to an embodiment of the present invention.

Figure 140:
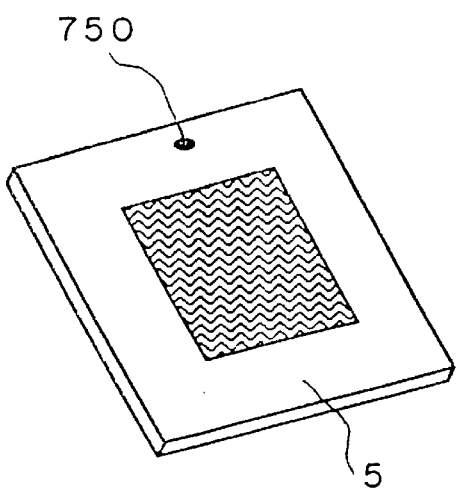

FIG. 140 is a diagrammatic view showing the structure of a hologram provided with a mark according to an embodiment of the present invention.

Figure 141:
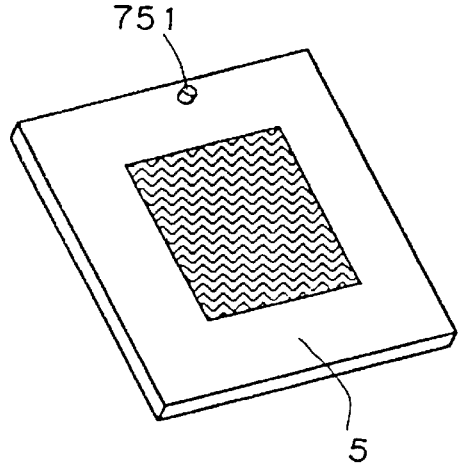

FIG. 141 is a diagrammatic view showing the structure of a hologram provided with a projection according to an embodiment of the present invention.

Figure 142:
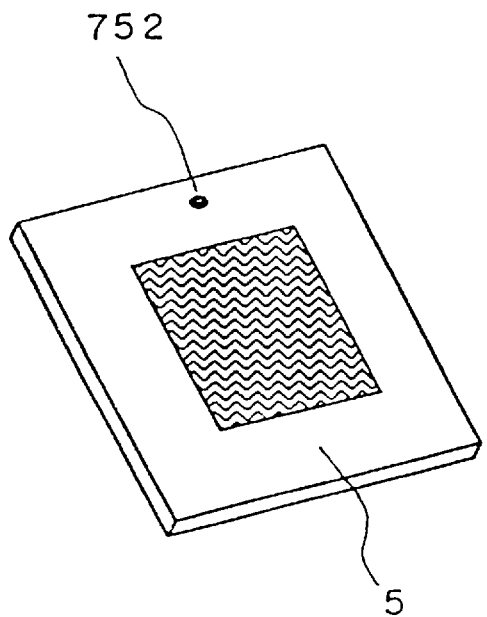

FIG. 142 is a diagrammatic view showing the structure of a hologram provided with a blind hole according to an embodiment of the present invention.

Figure 143:
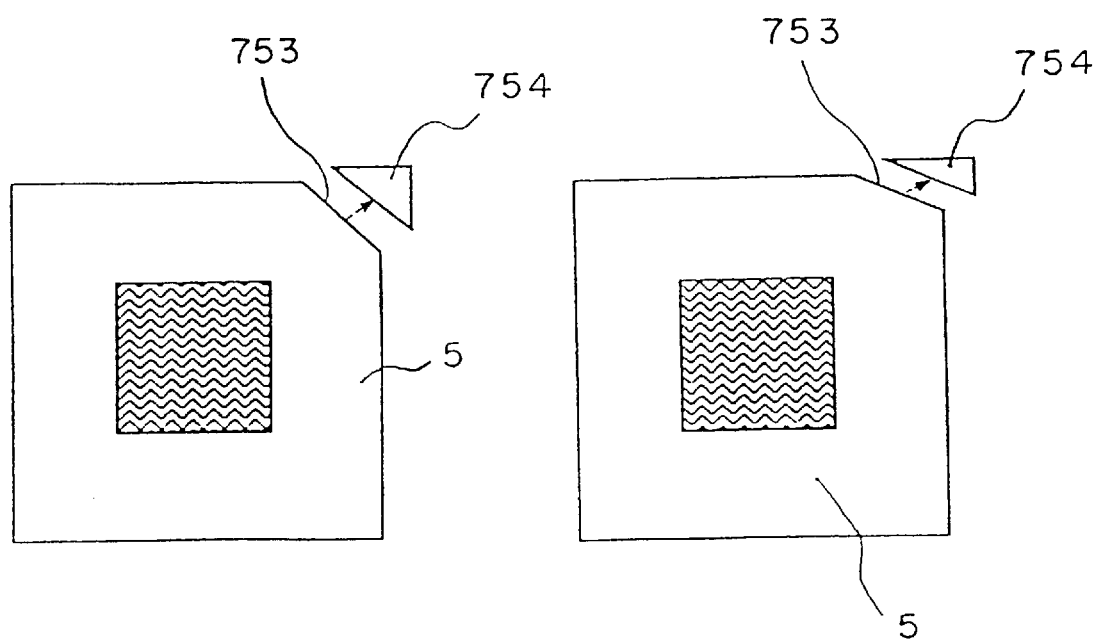

FIG. 143 is a diagrammatic view showing the structure of a hologram provided with a chamfered corner according to an embodiment of the present invention.

Figure 144:
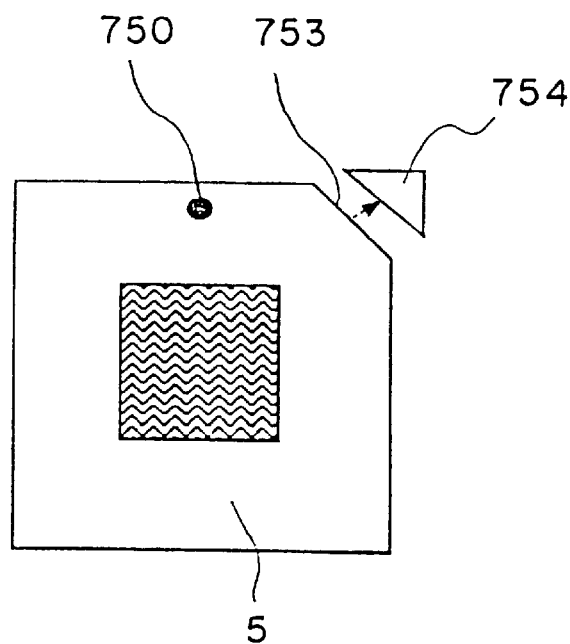

FIG. 144 is a diagrammatic view showing the structure of a hologram provided with a mark and a chamfered corner according to an embodiment of the present invention.

Figure 145:
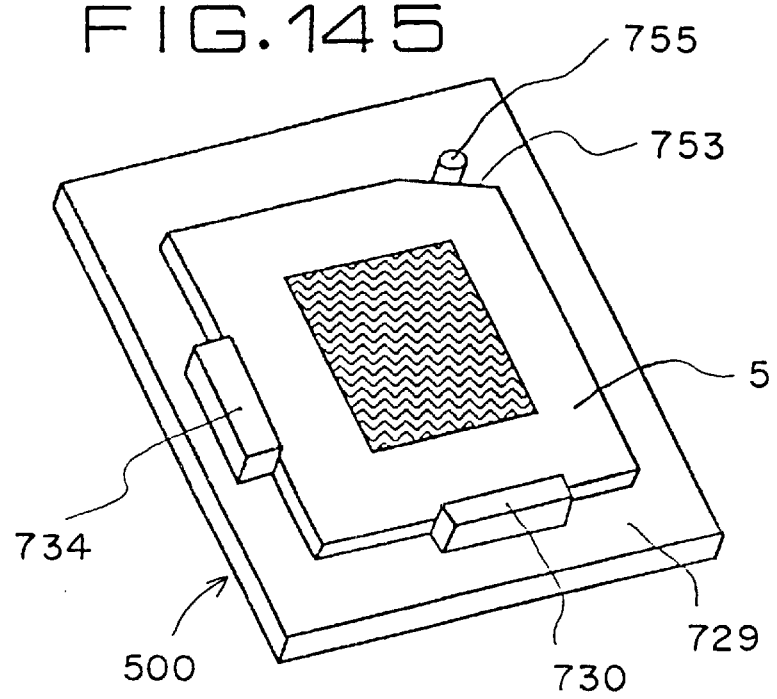

FIG. 145 is a diagrammatic view showing the structure of a hologram holder and a hologram according to an embodiment of the present invention.

Figure 146:
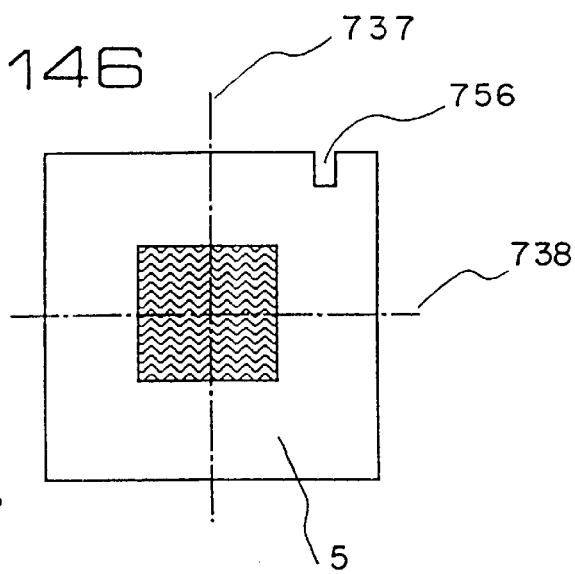

FIG. 146 is a diagrammatic view showing the structure of a hologram provided with a notch according to an embodiment of the present invention.

Figure 147:
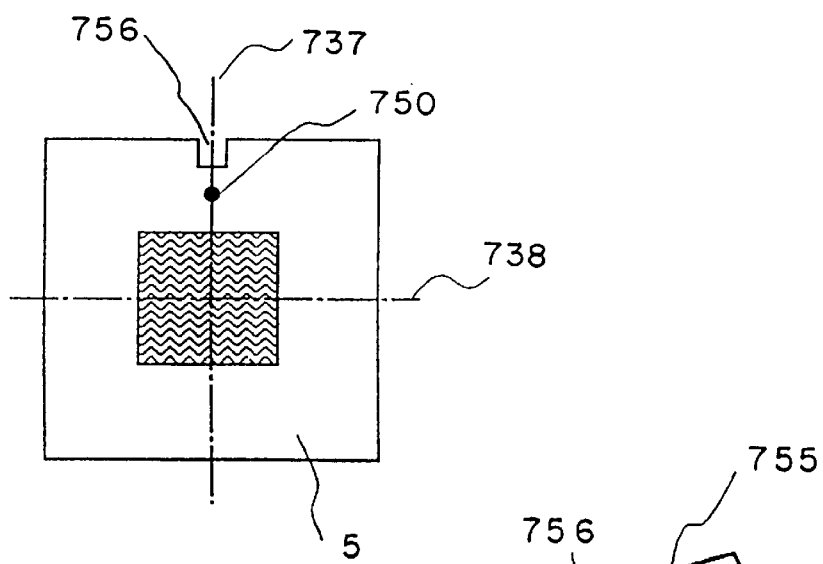

FIG. 147 is a diagrammatic view showing the structure of a hologram provided with a mark and a notch according to an embodiment of the present invention.

Figure 148:
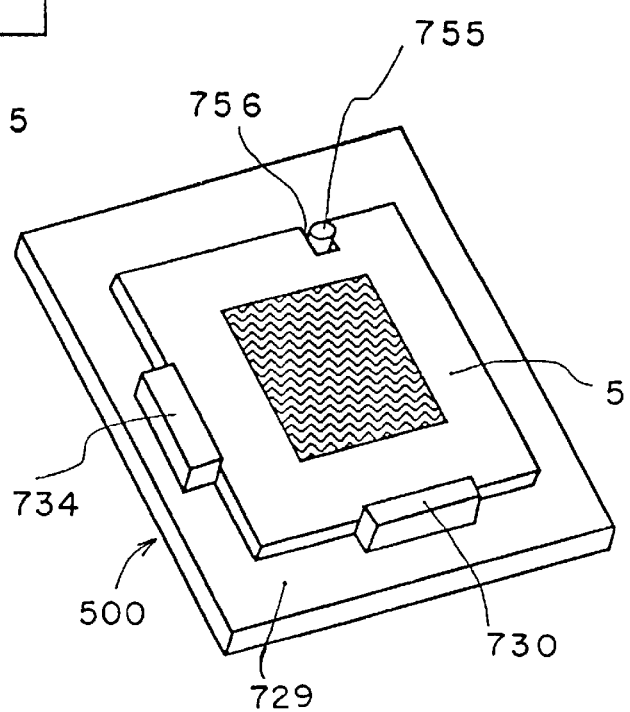

FIG. 148 is a diagrammatic view showing the structure of a hologram holder and a hologram according to an embodiment of the present invention.

FIG. 149 is a diagrammatic view showing the structure of a hologram provided with a label according to an embodiment of the present invention.

FIG. 150($a$) is a diagrammatic view showing the structure of a hologram provided with an elastic frame according to an embodiment of the present invention.

FIG. 150($b$) is a cross-sectional along the line II–II' of FIG. 150($a$).

FIG. 151 is a diagrammatic view showing the structure of a hologram on which a fluorescent material is painted in the circumference of the hologram pattern according to an embodiment of the present invention.

DETAILED DESCRIPTION OF THE PREFERRED EMBODIMENTS

Figure 1:
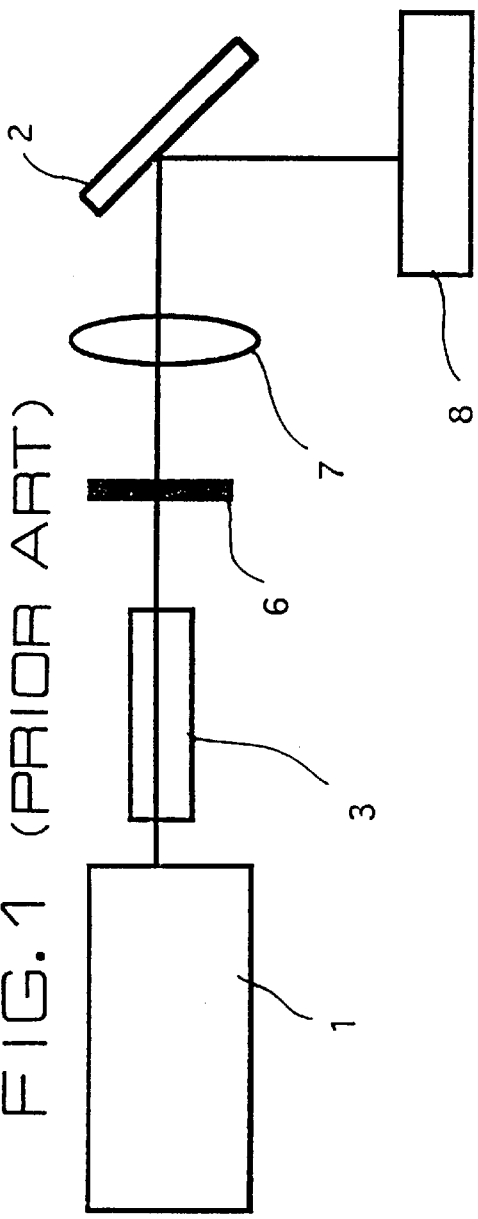
FIG. 1 is a schematic view of a conventional laser transfer machining apparatus.
Figure 2:
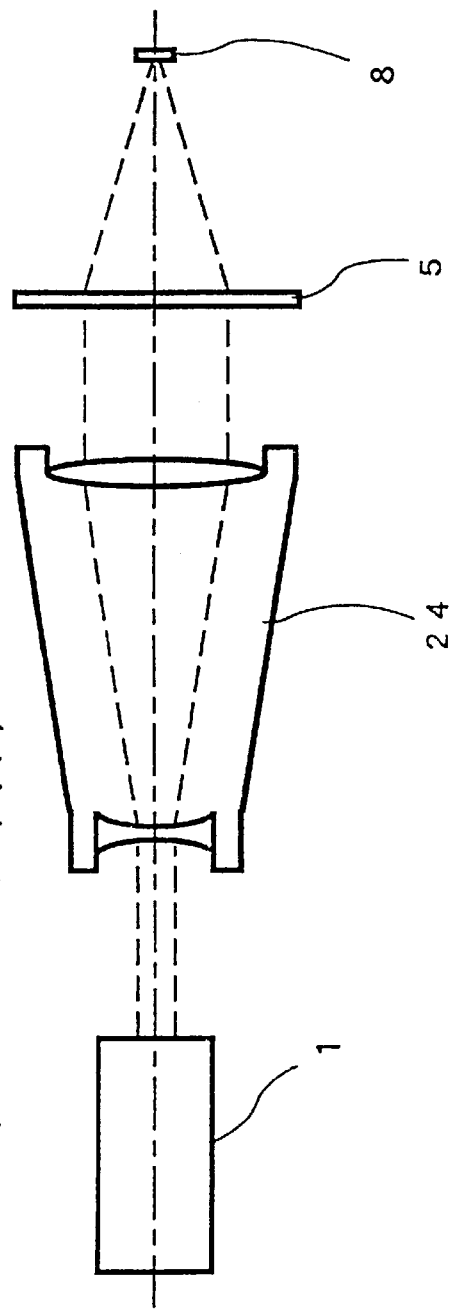
FIG. 2 is a schematic view of a conventional laser transfer machining apparatus using a hologram.
Figure 3:
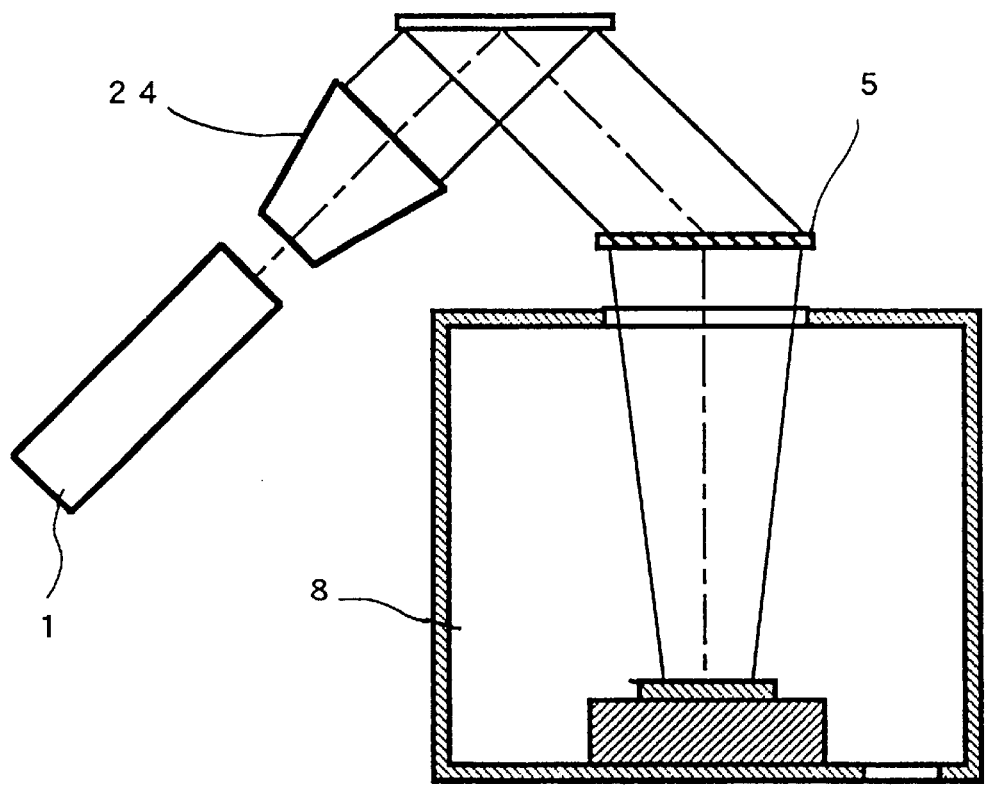
FIG. 3 is a schematic view of a conventional laser transfer machining apparatus.
Figure 4:
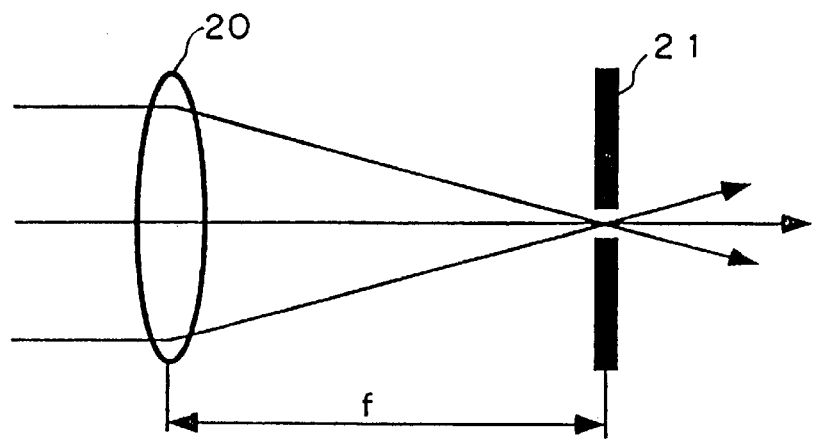
FIG. 4 is a schematic view of a spatial filter.
Figure 5:
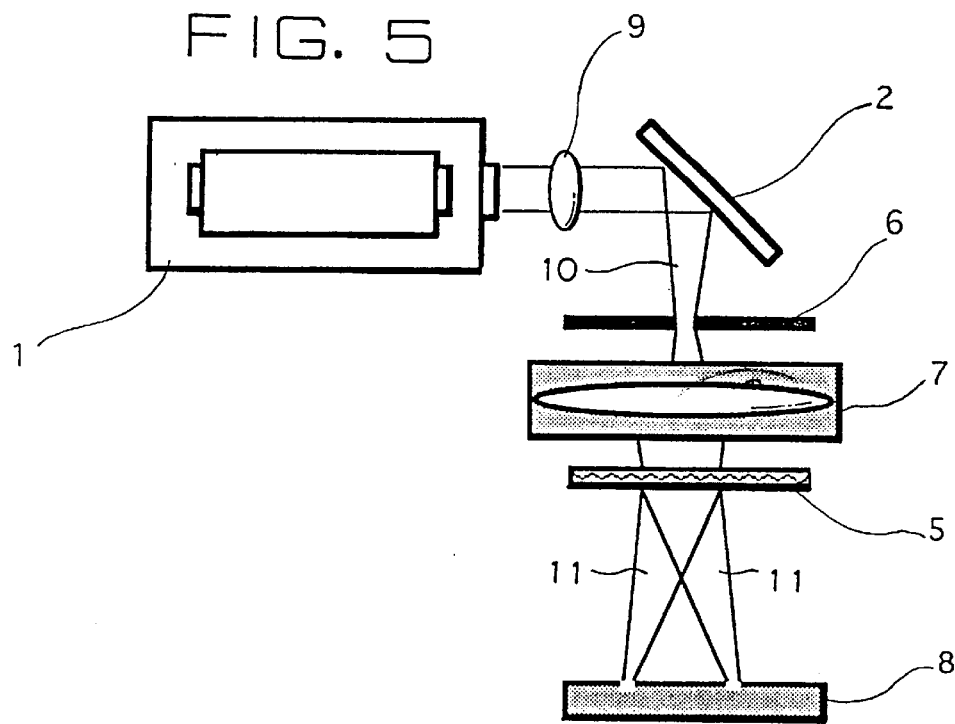
FIG. 5 is a schematic view showing the structure of a laser transfer machining apparatus.
Figure 6:
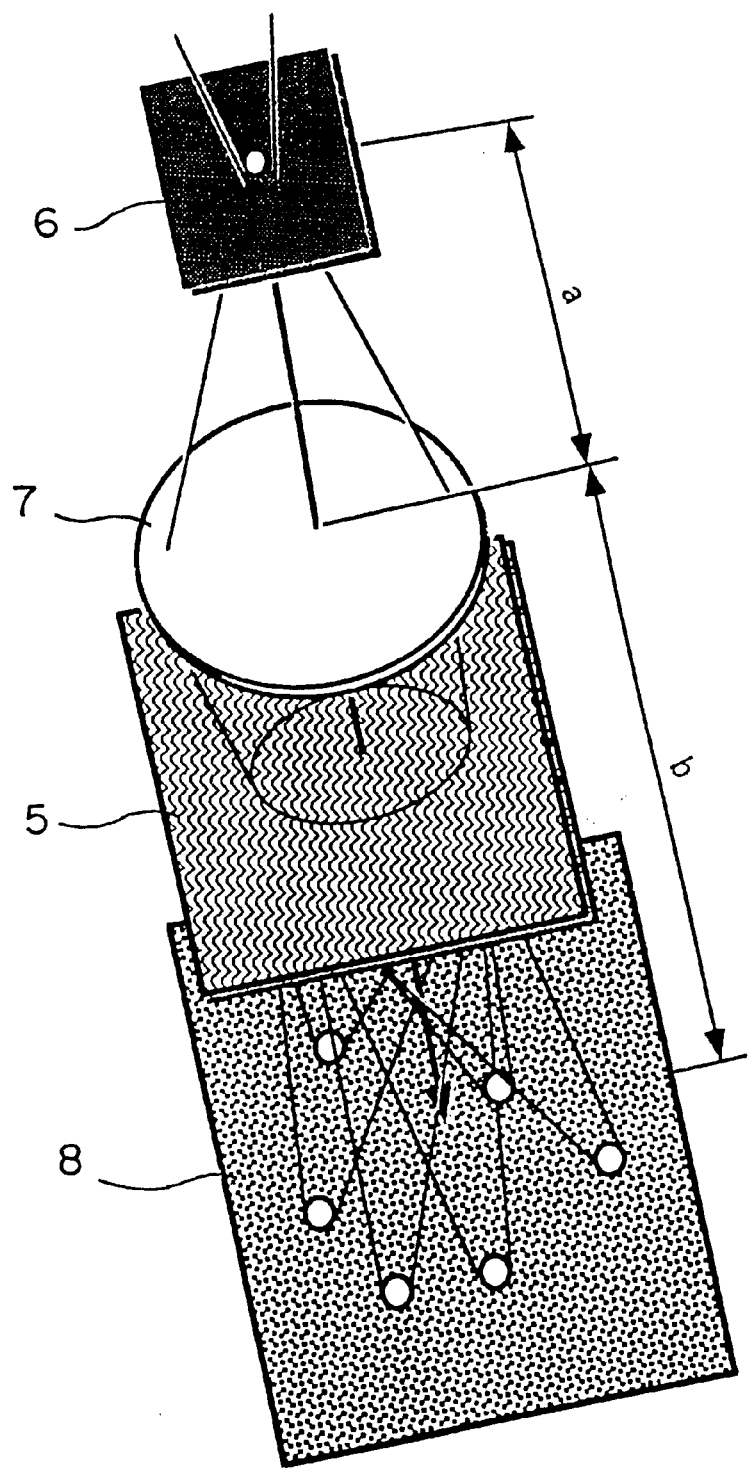
FIG. 6 is a perspective illustration of the main elements of the laser transfer machining apparatus shown in FIG. 5.

The description will be directed to an embodiment of the present invention with reference to FIG. 5. FIG. 5 is a schematic view showing the structure of a laser transfer machining apparatus. In the figure, shown are a laser oscillator 1 (a laser source), a deflecting mirror 2, a hologram 5 (a generating means), a mask 6 ( a shaping means), a transferring lens 7 (a transferring optical system) for transferring a mask pattern which is formed in the mask 6, a target 8 (a workpiece) which is an object to be machined, and an illuminating lens 9. FIG. 6 shows a perspective illustration of the main elements of the laser transfer machining apparatus shown in FIG. 5.

In operation, a laser light, which is emitted by the laser oscillator 1, is deflected by the deflecting mirror 2 on its way to the mask 6. The illuminating lens 9 directs the laser light to the mask pattern, which is to be transferred, of the mask 6. The mask 6 is an element for allowing a component of the incident laser light with a desired pattern to be machined to pass therethrough. The shaped pattern is imaged on the target 8 to be machined after it is expanded or reduced in size by the transferring optical system with the transferring lens 7 and is passed through the hologram 5. Therefore the pattern is a basic element of the whole pattern to be machined on the target 8.

As shown in FIGS. 5 and 6, the laser light is focused by the transferring lens 7 after it is passed through the mask 6, and it is spatially modulated by the hologram 5 which is inserted between the mask 6 and the target 8 to be machined, so that a number of transferred images each corresponding to the mask pattern of the mask are formed on the target 8 to be machined. Between the distance a from the mask 6 shown in FIG. 6 to the transferring lens 7 and the distance b from the transferring lens 7 to the target 8 to be machined there is a relationship given by 1/F=1/a+1/b, where F is the focal distance of the transferring lens 7.

The hologram 5 serves to divide the incident laser beam from which a number of transferred images are generated and to distribute the divided or reconstructed laser beams as the transferred images at predetermined positions on the target 8 to be machined. That is, the hologram 5 has the function of simultaneously defining the relative positions of the plural transferred images on the target 8 to be machined which is a workpiece. Thus, a number of images can be projected simultaneously on the target 8 to be machined by using the single mask pattern of the mask 6. Since each element pattern machined corresponds to the pattern which is transferred from the mask pattern formed on the mask 6, each element pattern has a similar contour strictly defined by the mask pattern of the mask 6. The contour of each element pattern is determined by the mask 6 and the relative positions of the plural machined element patterns are determined by the hologram 5. Therefore the whole machined pattern is determined by both the mask 6 and the hologram 5.

According to the laser transfer machining apparatus of this embodiment, a plurality of same element patterns to be machined are projected on the target 8 to be machined by using the mask pattern formed on the mask 6 and hence holes or the like having the same contour or shape are drilled on the target 8 to be machined. The mask 6 only has the single mask pattern for the purpose of generating a single transferred image. In the case that the contour of the element pattern is maintained and a change of only the positions of the element patterns is required in order to machine another workpiece, it is not necessary to change the mask 6 and it is enough merely to exchange the hologram 5 for another one. Therefore, the aforementioned laser transfer machining apparatus is suitable for a hole drilling operation to drill plural holes having the same machined element patterns.

As shown in FIG. 6, the laser light 10, which is emitted by the laser oscillator 1, is incident on only the mask pattern of the mask 6 by the illuminating lens. Focusing the laser light on the mask pattern can eliminate the energy loss of the laser light in the mask 6, and therefore the laser transfer machining operation can be performed more efficiently. A spatial filter, which is to be placed at the image focal point of a focus lens, have been used generally in order to improve the coherence of an illuminating laser directed to a hologram. In contrast it is not necessary for the mask 6, on which the laser light is incident by the illuminating lens 9, to be placed at the image focal point of the illuminating lens. The mask 6 does not have to be a pin-hole, which has been used as a spatial filter, having a small size corresponding to a cross-sectional width of the main lobe of the laser beam at the position where the laser beam is focused. The mask 6 may have a mask pattern of an arbitrary shape. Thus, the laser light passing through the mask 6 is not always a coherent light having an even wave front.

For example, a phase hologram having a high diffraction efficiency can be used as the hologram 5. Such a phase hologram can be designed so that several 10% of incident laser light is diffracted into the desired patterns on the target. The structure of the hologram will be described in detail below, and now the description will be directed to the spatial modulation of incident laser light by means of the hologram.

As shown in some references, for example, "LASERS" by A. E. Siegman, the following equation can represent the diffraction image of the light which propagates through the optical system which can be characterized by an ABCD ray matrix.

$$g(x_2) = \sqrt{\frac{i}{B\lambda}} \ e^{-ikL_o} \int u(x_1) e^{-i\frac{\pi}{B\lambda}[Ax_1^2 - 2x_1 x_2 + Dx_2^2]} dx_1$$

If the input image $u(x_1)$ in the above equation is passed through a modulation plate in which a phase varies at a spatial frequency a, the diffraction image can be written by $$g'(x_2) = \sqrt{\frac{i}{B\lambda}} \ e^{-ikL_o} \int u(x_1) e^{-i(2\pi a x_1 + \phi)} e^{-i\frac{\pi}{B\lambda}[Ax_1^2 - 2x_1 x_2 + Dx_2^2]} dx_1$$

$$= \sqrt{\frac{i}{B\lambda}} \ e^{-ikL_o} \int u(x_1) e^{-i\phi} e^{-i\frac{\pi}{B\lambda}[Ax_1^2 - 2x_1 x_2 + Dx_2^2 + 2B\lambda a x_1]} dx_1$$

$$= e^{iDB\lambda \pi a^2} \cdot e^{-i(2\pi Dax_2 + \phi)} \cdot$$

$$\sqrt{\frac{i}{B\lambda}} \ e^{-ikL_o} \int u(x_1) e^{-i\frac{\pi}{B\lambda}[Ax_1^2 - 2x_1(x_2 - B\lambda a) + D(x_2 - B\lambda a)^2]} dx_1$$

$$= e^{iDB\lambda \pi a^2} \cdot e^{-i(2\pi Dax_2 + \phi)} \cdot g(x_2 - B\lambda a)$$

The $g(x_2)$, which is the diffraction image in the case that no modulation plate is inserted, is translated by $B\lambda a$, and then $g(x_2 - B\lambda a)$ in the right side of the above equation is obtained. The multiplied coefficient of the $g(x_2 - B\lambda a)$ in the right side varies only the phase. Therefore, if the modulation plate with the spatial frequency a is superimposed, an image appears at a position apart from the original position by $B\lambda a$. Furthermore, if a modulation plate, through which a light is modulated at both a spatial frequency $a_1$ and a spatial frequency $a_2$ with the same intensities, is inserted, two images appear at two positions apart from the original position by $B\lambda a_1$ and $B\lambda a_2$, respectively. Thus, plural images are formed simultaneously at positions corresponding to plural spatial frequencies respectively by inserting a hologram, which serves as a modulation plate having a phase distribution composed of several spatial frequency components superimposed, in the optical system of the laser transfer machining apparatus. In this case, if the positions of transferred images are separated in such a manner that they are to incoherent to each other, no interference fringes are generated, no matter what each image has a phase of an arbitrary value. Therefore, φ of the above equation may be arbitrary. Thus, a desired number of images can be formed at desired positions on the target 8 to be machined by using the hologram 5 composed of a plurality of spatial frequency components corresponding to the positions of the images, respectively.

Since the positions of transferred images are determined by spatial frequencies included in the hologram 5, the arrangement distribution of the transferred images in the whole pattern to be machined corresponds to the spectrum of the spatial frequencies of the hologram pattern of the hologram 5. The distribution of images is associated with the hologram pattern of the hologram 5 by the relationship of the Fourier transformation. A Fourier-transform hologram, which reconstructs reproduced images in a far-field to form the images with a circular contour at the image position, satisfies the relationship. The hologram in use for the embodiment can be manufactured easily by recording a hologram pattern forming a pin-hole in each image position by means of a general Fourier-transform hologram recording method. The hologram pattern can be designed by using a computer and hence the hologram is manufactured easily. Furthermore, the Fourier-transform hologram is applicable to a laser with a low spatial coherence such as an eximer laser. Preferably, the hologram 5 is a phase hologram having a high diffraction efficiency. Thus, the efficiency of utilization of light is improved.

Therefore, the laser transfer machining apparatus according to the embodiment improves the efficiency of machining, reduces the time required for machining, and improves the reliability of the apparatus.

The description will be directed to an embodiment of the present invention employing a phase hologram as the hologram 5 with reference to figures. FIGS. 7(a) to 7(c) illustrate the phase distribution patterns of phase holograms according to embodiments of the invention.

The phase distribution pattern of the hologram 5 shown in FIG. 5 is determined by superimposing plural frequencies each corresponding the position of each transferred pattern on the target. Furthermore, the phase distribution pattern can be determined by a calculation using a computer. The hologram 5 has a smooth phase distribution, which can be quantized to several levels and can be fabricated every level in a manufacturing process. In this embodiment, the hologram is such that various spatial frequency components each having an initial phase are superimposed. When the phase of such a hologram is quantized, the quantization can be optimized so that the quantization error is minimized by varying the superimposed initial phases as parameters. Thus, the hologram pattern with a high diffraction efficiency and a low noise can be computed.

In the patterning process, first the whole hologram is divided into a number of cells as shown in FIG. 7(a) and the phase of each cell is quantized to two levels of 0 degrees and 180 degrees and the phase is computed for each cell. Then, the phase distribution pattern is computed to obtain a desired arrangement of transferred patterns. In FIG. 7(a), the cells 500a of 0 degrees phase are represented by white squares and the cells 500b of 180 degrees phase are represented by black squares. FIG. 7(b) shows an example of the phase distribution pattern of a phase hologram. FIG. 7(c) illustrates the distribution of transferred images formed by the phase hologram with the phase distribution pattern of FIG. 7(b). The transferred images appear at the positions of the white points 501 in FIG. 7(c). Though materials, which are applicable to the phase hologram in use for laser light, are limited, the quantization of the phases of cells and the determination of the phase distribution pattern by a computer make it possible to fabricate the phase hologram relatively easily in an actual situation, no matter that there are no best applicable materials.

In the embodiment, the phase hologram without portions shielding incident light is used in order to improve the diffraction efficiency, but a hologram of amplitude modulation type which shields incident light can be used instead of the phase hologram. The latter hologram can be manufactured more easily at a lower cost. In such a hologram, the portions painted by black color in FIG. 7(a) are made of shielding films for shielding incident light. Therefore, since the function of the hologram is achieved by only the shielding films disposed on predetermined cells, the hologram can be fabricated easily at a lower cost. However, the diffraction efficiency of the hologram will be lower than that of the phase hologram.

Next, the description will be directed to examples of the phase hologram in use for the laser beam machining apparatus of the embodiment. FIGS. 8(a) to 8(d) show cross-sectional views for explaining the structures of various phase holograms with two-level phases shown in FIGS. 7(a) to 7(c).

Figure 8A:
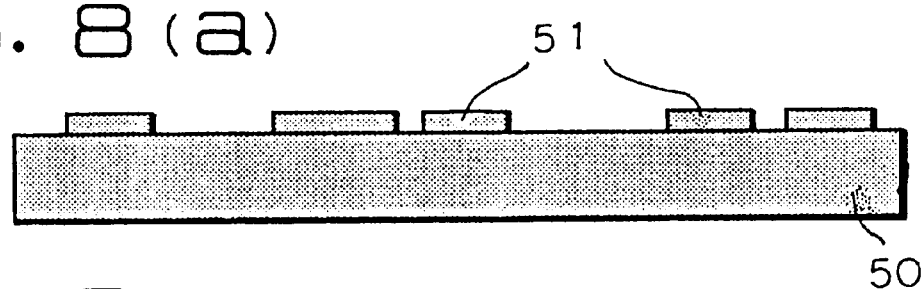
FIGS. 8(a) to 8(e) are cross-sectional views for explaining the structures of various phase holograms with two-level phases shown in FIGS. 7(a) to 7(c).
Figure 8B:
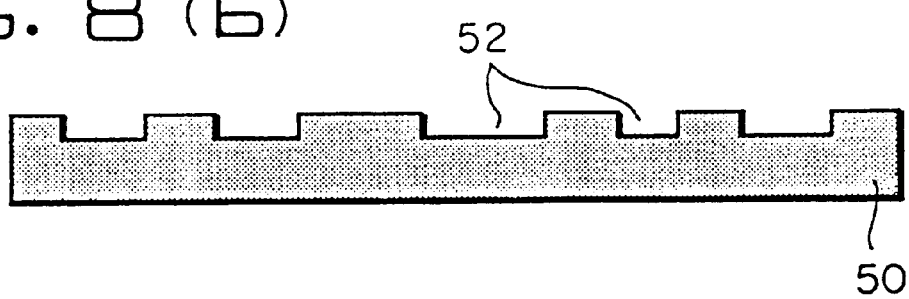
Figure 8C:
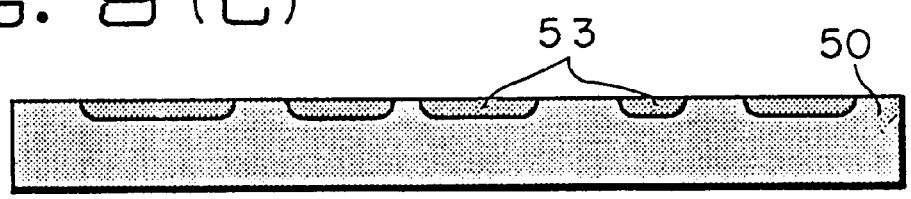

In FIG. 8(a), a phase shift film 51 is disposed on a substrate 50 such as a quartz or the like. The arrangement of the phase shift films 51 each having a predetermined width provides a phase distribution pattern. In FIG. 8(b), phase shift portions 52 are arranged. The portions 52 consist of etching recesses formed by an etching process. The arrangement of the phase shift films 52 each having a predetermined width provides a phase distribution pattern. In FIG. 8(c), refractive index changing portions 53 with a index of refraction, which is different from that of the substrate, are arranged on the substrate 50 such as a quartz or the like. The arrangement of the refractive index changing portions 53 each having a predetermined depth provides a phase distribution pattern. In the hologram in which the phase shift films 51 are arranged as shown in FIG. 8(a), the amounts of the phase shifts are determined in accordance with the widths of the shift films 51, and the film widths are controlled easily. Therefore errors of the phase shifts are small. However, since there is a boundary between the phase shift films 51 and the substrate 50, the light-proof intensity of this type of hologram is low relatively. On the other hand, since the phase hologram shown in FIG. 8(b) is constructed such that the substrate 50 is etched directly and the hologram does not have a boundary, it has a higher light-proof intensity. Similarly, the hologram of FIG. 8(c), in which the refractive index changing portions are arranged, does not have a boundary and hence it has a higher light-proof intensity.

Figure 8D:
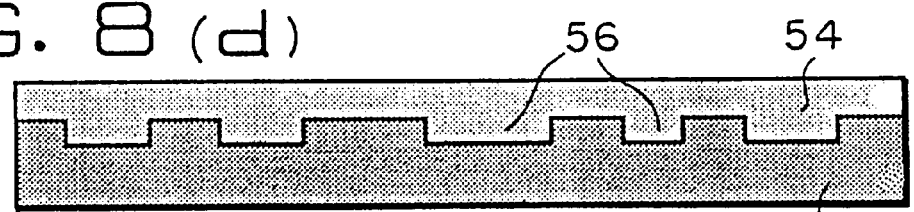
Figure 8E:
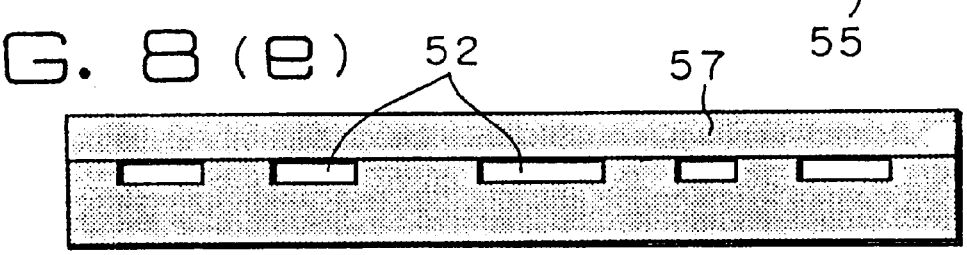

The unevenness of the surface of the phase hologram is easily damaged and is often covered with a dust or the like. In a preferred embodiment, the hologram is provided with phase shift portions 56 disposed at the boundary between the substrates 54 and 55 made of two different materials with different indices of refraction as shown in FIG. 8(d). Preferably, the hologram includes a guard plate 57 laminated on the surface of the substrate 50 in which the phase shift portions 56 are arranged, as shown in FIG. 8(e). In the hologram having such a structure, since the rugged surface is not exposed to the atmosphere in the apparatus, the hologram is not easily damaged and has a longer life. Furthermore, the surface of the hologram can be cleaned.

The materials applicable for the phase hologram used for laser machining are limited. Since such a phase hologram is illuminated by a high energy laser light and, the hologram has to have a high transmissibility at the wavelength of the illuminating laser light. If the transmissibility is low, a greater energy of the laser light is absorbed in the material constituting the hologram. This causes the thermal distortion and damage of the hologram. Therefore, the hologram must be made of the material having a transmissibility equal or higher than 90% at the wavelength of the illuminating laser light.

Figure 9:
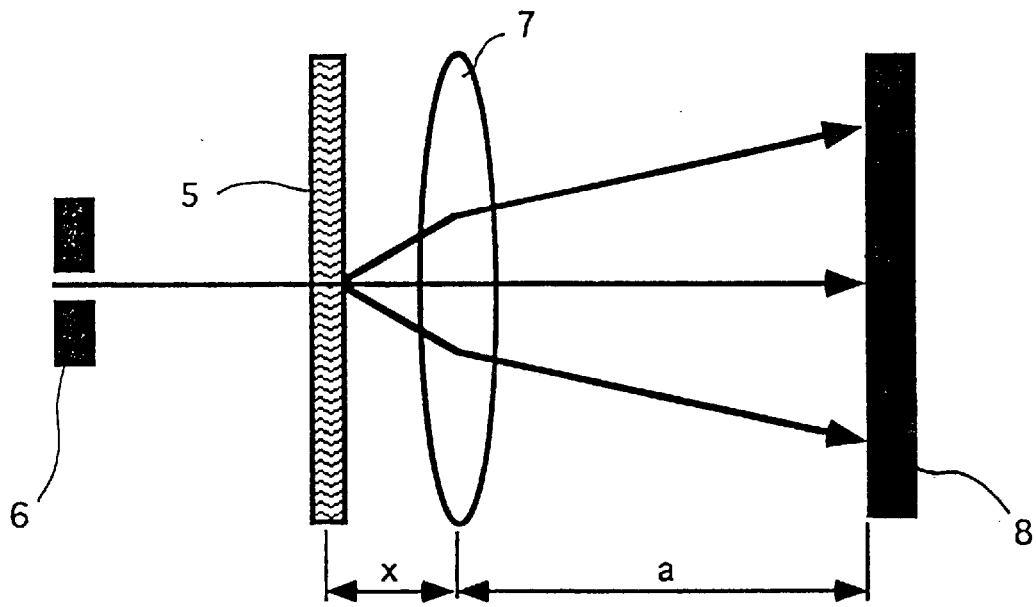
FIG. 9 is a partial block diagram of a laser beam machining apparatus with the hologram shown in FIGS. 7(a) to 7(c).

FIG. 9 illustrates a partial block diagram of a laser beam machining apparatus with a hologram according to an embodiment of the invention. In the figure the same reference numeral as in FIG. 5 denotes the same part or a like part.

The description will be directed to an operation of the embodiment. The laser light passing through the mask 6 is spatially modulated by the hologram 5, which is a phase hologram with two-level phases, to generate a number of transferred images. Each transferred image is projected on the target 8 to be machined by the transferring lens 7. The positional relationship between the transferring lens 7 and the hologram 5 of the embodiment is different from that of the above embodiment in FIG. 5. Therefore, a different advantageous effect is achieved by this embodiment. There can be various arrangements of the illuminating lens, the transferring lens, the mask and the hologram. Such arrangements will be described below in detail.

Since the aforementioned hologram is structured such that each phase of each cell is quantized to two-levels, the pattern of the component of a spatial frequency f is the same as that of the component of a spatial frequency –f. The spatial frequency spectrum of the hologram is symmetric with respect to the origin of the hologram. Therefore, when a symmetric pattern with respect to the optical axis is desired as the whole pattern to be machined, applying the phase hologram with two-level phases to the apparatus makes it possible to form a precise symmetric pattern. Furthermore, such a hologram can be easily fabricated.

Figure 10A:
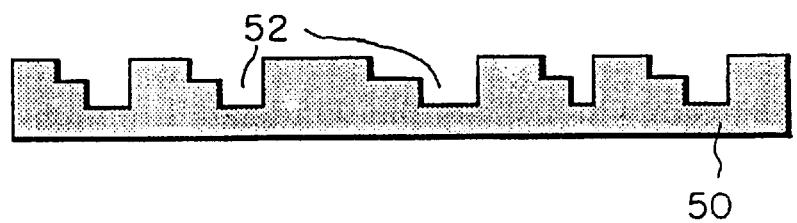
FIGS. 10(a) to 10(c) are cross-sectional views showing the structures of laser beam machining apparatuses according to embodiments of the present invention.
Figure 10B:
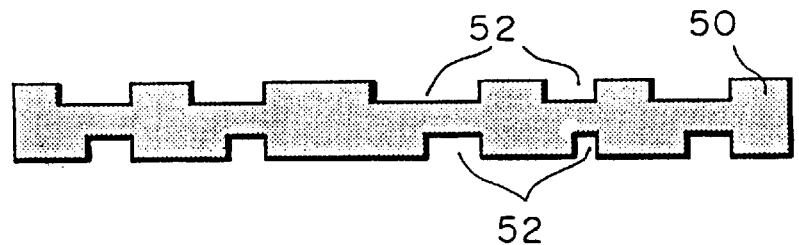
Figure 10C:
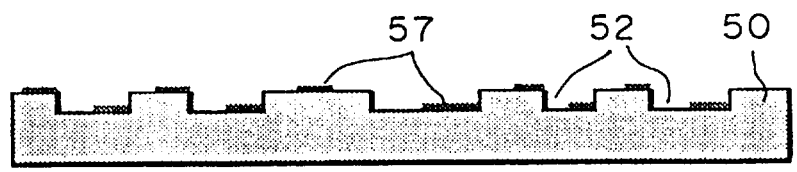

FIGS. 10(a) to 10(c) are cross-sectional views showing the structures of laser beam machining apparatuses according to embodiments of the present invention. As seen from the aforementioned embodiment of FIGS. 7(a) to 7(c), in the case of a phase hologram with two-level phases conjugate images appear at positions which are symmetric to the positions, where the designed patterns are to be projected, with respect to the optical axis because the frequency spectrum is symmetric with respect to the origin of the hologram. Thus, no unsymmetric patterns can be obtained by the holograms of FIGS. 7(a) to 7(c). In the case that an unsymmetric pattern is desired, applying the hologram in which each phase of each cell is quantized to plural levels equal to or more than three levels to the laser transfer machining apparatus makes it possible to reconstruct an unsymmetric pattern precisely and machine a workpiece precisely and efficiently because the patterns generated by the components of spatial frequencies f and –f are unsymmetric. Furthermore, since the phase distribution of the hologram can be approximate to the computed phase distribution more precisely by using the multi-level quantization, conjugate images are eliminated and, a noise, such as high frequency components of spatial waves written in the hologram, is reduced extremely. Thus, applying the phase hologram with three or more level phases makes it possible to form a pattern more precisely.

The description will be directed to three examples of the phase hologram with a multi-level phases in use for the embodiment with reference to FIGS. 10(a) to 10(c). The hologram of FIG. 10(a) comprises phase shift portions 52 constructed by stepped recesses having two stairs or more. The hologram of FIG. 10(b) includes phase shift portions 52 constructed by recesses formed on both surfaces of the substrate. Advantageously, the hologram can be easily manufactured because each of the surfaces have half the total number of phase steps formed thereon. The hologram of FIG. 10(c) is provided with phase shift portions 52 constructed by recesses formed in the hologram substrate 50 as well as partial transparent films 57. The hologram provided with them modulates the phase and amplitude of an incident light. To be exact, this type of phase hologram of FIG. 10(c) is not a hologram with multi-level phases, however, it provides the same advantageous effects as the above holograms with three-level phases do.

The description will be directed to an operation of such a hologram. When the phase hologram structured as previously mentioned is used in the apparatus of FIG. 5 or FIG.

9, it acts in the same way as the phase hologram according to the embodiment of FIGS. 7(a) to 7(c). The hologram 5, which is a multi-level phase hologram with three-level phases or more, spatially modulates the laser light 10 passing through the mask 6 to form a number of transferred images. Each image is projected on the target 8 to be machined by the transferring lens 7. The relationship of the positions between the transferring lens 7 and the hologram 5 is different from that of the embodiment shown in FIG. 5. Thus, the arrangement causes a different advantageous effect. Another arrangement of the illuminating lens, transferring lens and hologram can be designed, which will be described in detail below.

According to the aforementioned hologram with three-level phases or more, since the spatial frequency components f and −f of the hologram generate different patterns without generating conjugate images, an unsymmetric whole pattern to be machined is reconstructed precisely and hence the target is machined precisely and efficiently by the reproduced unsymmetric images. Furthermore, the multiple quantization of phases can reduce a noise such as high frequency components of spatial waves written in the hologram because of the accurately approximated phase distribution of the hologram in addition to the elimination of conjugate images. The phase hologram with three-level phases or more makes it possible to form a pattern more precisely in a workpiece.

Figure 11:
FIG. 11 is a cross-sectional view showing the structure of a hologram in use for a laser transfer machining apparatus according to an embodiment of the present invention.

FIG. 11 illustrates a cross-sectional view showing the structure of a hologram in use for a laser transfer machining apparatus according to an embodiment of the present invention. The phase hologram 5 is disposed integrally on the transferring lens 7. As shown in FIG. 11, the phase hologram 5 is formed on the flat surface of the transferring lens 7. In the figure, the phase hologram with two-level phases structure is illustrated, however, the hologram in use for the embodiment is not limited to the specific hologram and the phase hologram with three-level phases or more may be formed on the transferring lens 7. The integral structure in which the phase hologram 5 is formed directly on the transferring lens 7 reduces the number of optical elements constituting the laser transfer machining apparatus, thereby the arrangement and structure of the apparatus being simplified.

Figure 12:
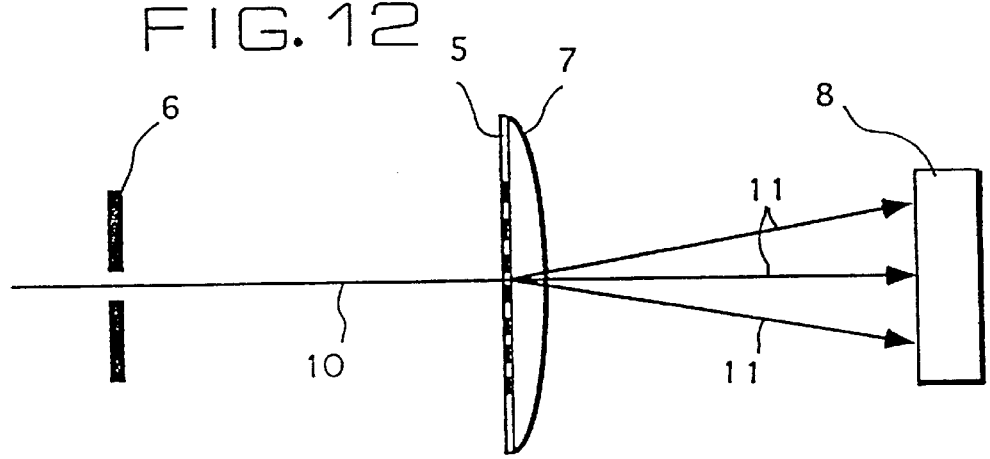
FIG. 12 illustrates a cross-sectional view showing the partial structure of the laser transfer machining apparatus using the hologram shown in FIG. 11.

The phase hologram constructed as mentioned above can be used in the apparatus shown in FIG. 12. The hologram 5, which is a multi-level phase hologram with three-level phases or more and is formed on the transferring lens 7, spatially modulates the laser light 10 passing through the mask 6 to form a number of transferred images. Each image is projected on the target 8 to be machined by the transferring lens 7. The simple integral structure of the hologram makes it easy to align the optical system in the apparatus because there in no necessity for adjusting the hologram 5 and the transferring lens 7 separately. Therefore the cost of the laser transfer machining apparatus can be reduced and the stability of machining is improved.

Figure 13:
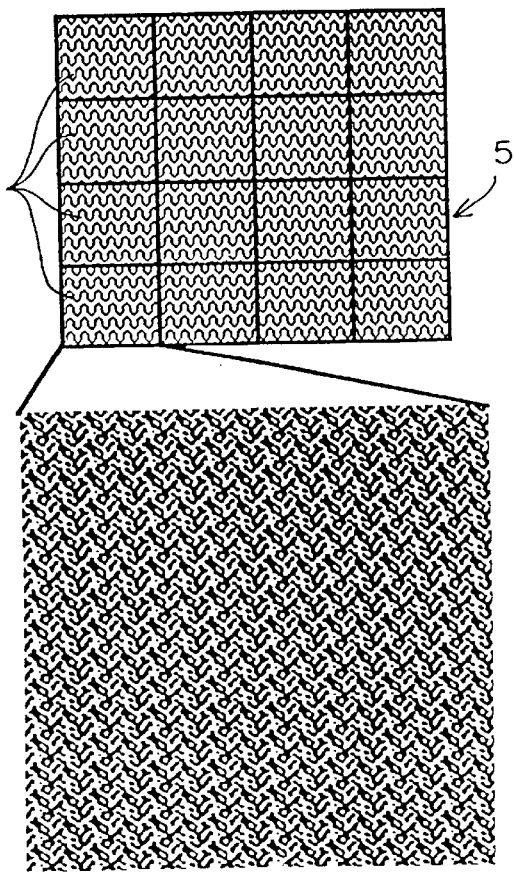
FIG. 13 is a view showing the structure of a hologram in use for the laser transfer machining apparatus according to an embodiment of the present invention.

FIG. 13 is a view showing the structure of a hologram in use for the laser transfer machining apparatus according to an embodiment of the present invention. The hologram 5 according to the embodiment is constructed such that a plurality of hologram plates (or hologram elements) 59 with the same pattern are arranged like tiles, as shown in FIG. 13. To this end, the pattern of one hologram plate 59 must be continuous to the patterns of the other plates surrounding the former plate at the edges thereof. Generally, it is difficult to manufacture a hologram having a wide surface area. For example, in the case of computing a hologram pattern, when increasing the area of the hologram by two times the amount of memory size and the time required for computing are increased by four times on condition that the density of calculating meshes is constant. Therefore, the hologram having a relatively small area is easily designed and fabricated. However, as the area of hologram is decreased the numerical aperture of the whole transferring optical system is reduced, thereby images getting dark and hence the resolution being lowered. In contrast, since the hologram according to the embodiment comprises the plural hologram plates 59, laid like tiles, with the same hologram pattern, and provides a wide area surface, the hologram pattern can be easily computed and fabricated and hence the area of the hologram can be increased. Furthermore, the hologram prevents the reconstructed images from being darkened and the resolution from being lowered. As previously mentioned, the hologram is a Fourier-transform hologram projecting images at the image positions and information associated with the image positions are recorded in the form of a spatial frequency spectrum of the hologram. The image positions correspond to peaks of the spatial frequency spectrum, respectively. Therefore, the positions of the peaks in the spectrum must be maintained while setting the patterns of the plural plates like tiles. To this end, when the hologram pattern is made, each wave having a spatial frequency corresponding to one of the spectrum peaks (or a frequency corresponding to one of the image positions) has to have a wavelength equal to the pattern size divided by a positive integer (not zero).

Preferably, the hologram plates, which are arranged like tiles, may have different hologram patterns from each other. In this case, the numerical aperture of the hologram for each image is defined by the area of one hologram pattern and hence the resolution is defined by the area of the pattern produced at first. Combining hologram plates having various patterns can produce a complicated pattern to be machined, and the whole hologram pattern is therefore manufactured easily. Thus, the hologram, which can be easily fabricated, constitutes the optical system with a high numerical aperture, thereby providing a high efficiency and resolution machining operation without reducing brightness of the transferred images.

FIGS. 14(a) and 14(b) are partial diagrammatic views showing the partial structures of laser transfer machining apparatuses according to embodiments of the present invention. In the figure, the same reference numeral as in FIG. 5 denotes the same part or a like part. As shown in FIGS. 14(a) and 14(b), in the laser transfer machining apparatus according to the embodiment the hologram is arranged between the transferring lens 7 and the target 8 to be machined.

The hologram 5 in the form of a phase hologram spatially modulates the incident laser light 10 passing through the transferring lens 7 to form a number of transferred images. Each image is projected on the target 8 to be machined by the transferring lens 7.

The ABCD ray matrix from the hologram 5 to the target 8 to be machined is given by $$\begin{pmatrix} 1 & a-x \\ 0 & 1 \end{pmatrix}$$

Figure 14:
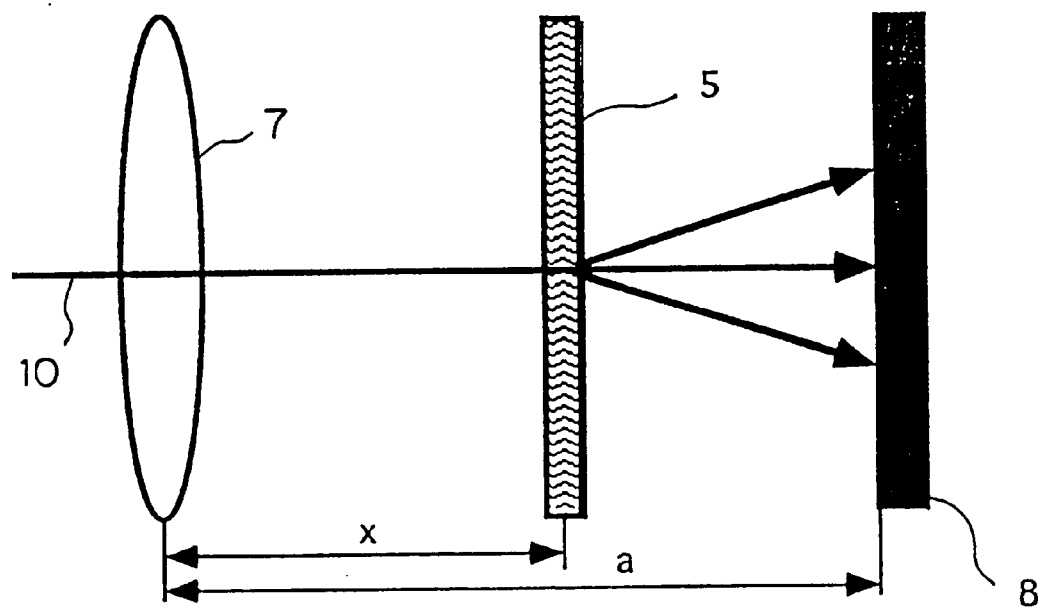
FIGS. 14(a) and 14(b) are partial diagrammatic views showing the arrangements of transferring lenses of laser transfer machining apparatuses according to embodiments of the present invention.
Figure 14:
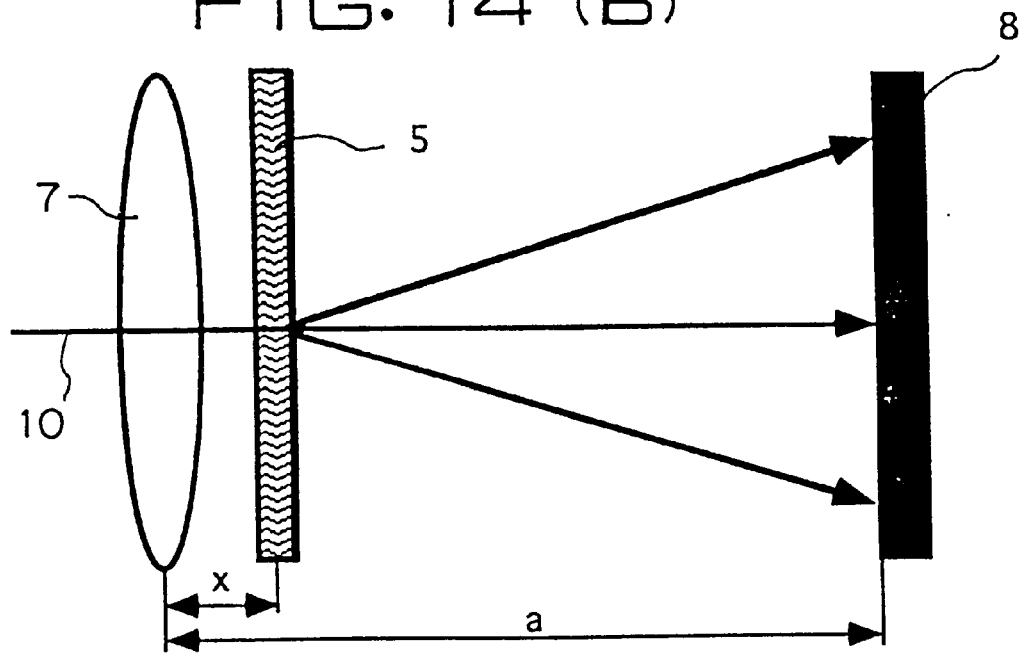

If the hologram 5 is translated in parallel with the optical axis, the value of the element B, or (a−x) in the ABCD ray matrix varies. The distance between the optical axis and a position where one transferred image is projected is proportional to the value of the element B. As shown in FIGS. 14(a) and 14(b), the positions of the transferred images varies with a variation of the element B. Therefore, the parallel translation of the hologram along the optical axis makes it possible to adjust the positions of the transferred images. When a very high accuracy is required for machining, or when performing some machining operations by which similar image patterns are formed on the target, only the translation of the hologram 5 makes it easy to adjust the positions of the target to be machined and to vary the whole pattern to be formed. In the arrangement of FIG. 14, the wave front of the incident laser light to be focused is divided by the hologram 5 after it passes through the transferring lens 7, and therefore it is enough for the transferring lens 7 to merely focus the transferred images in a smaller region than the whole region of the target to be machined, without distorting the images. Thus, since the diameter of the lens can be reduced and the correction of aberration is easily made, a lower-priced transferring lens is available for the transferring optical system.

Figure 15:
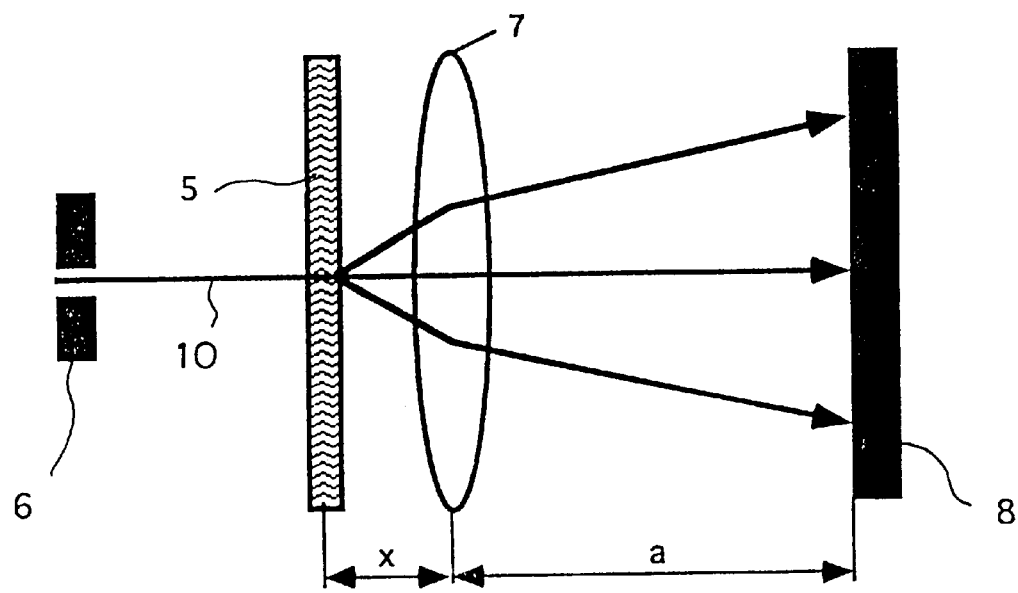
FIGS. 15(a) and 15(b) are partial diagrammatic views showing the arrangements of transferring lenses of laser transfer machining apparatuses according to embodiments of the present invention.
Figure 15:
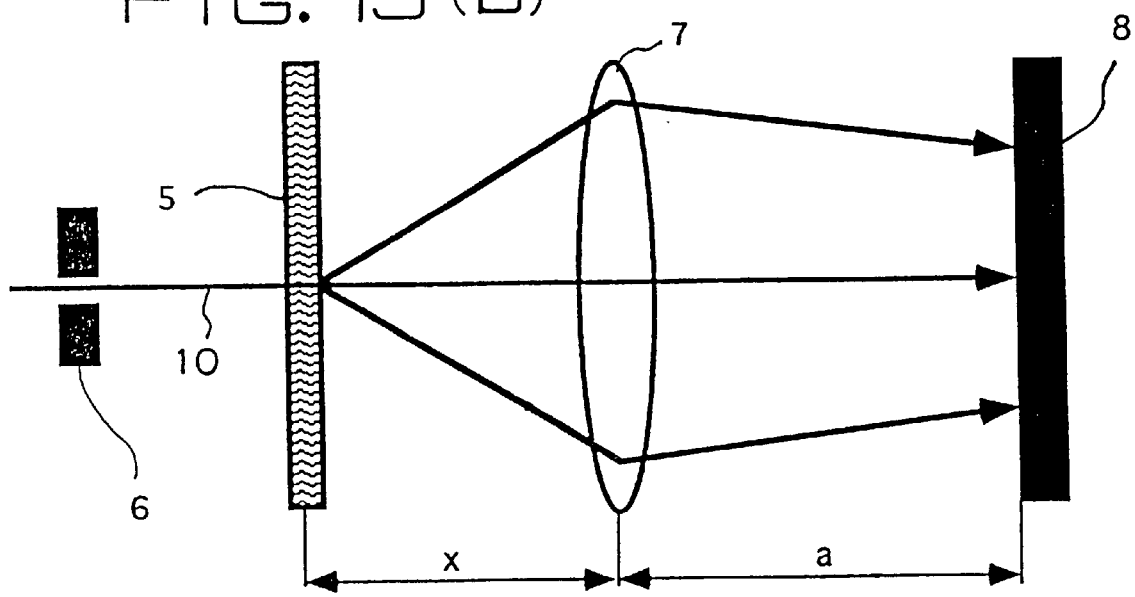

FIGS. 15(a) and (b) are partial diagrammatic views each showing the partial structure of a laser transfer machining apparatus according to an embodiment of the present invention. In the figure, the same reference numeral as in FIG. 5 denotes the same part or a like part. As shown in FIGS. 15(a) and 15(b), in the laser transfer machining apparatus according to the embodiment the hologram 5 is arranged between the transferring lens 7 and the mask 6.

In operation, the hologram 5 in the form of a phase hologram spatially modulates the incident laser light 10 passing through the mask 6 to form a number of transferred images. Each image is projected on the target 8 to be machined by the transferring lens 7.

If the hologram 5 is translated in parallel with the optical axis in the same manner as the embodiment of FIG. 14, the value of the element B, or (a–x) in the ABCD ray matrix varies. Furthermore, in this embodiment shown in FIGS. 15(a) and 15(b), the incident angle of each laser beam incident on the target 8 to be machined varies as the hologram 5 is translated in parallel with the optical axis. Therefore, the arrangement of the optical system makes it possible to adjust the incident angle of each laser beam, corresponding to each transferred image projected on the target 8 to be machined, within a certain range of degrees in addition to the positions of the transferred images. When a laser beam for machining is required to be incident on a rugged surface on the target 8 to be machined from a desired direction, the arrangement of the optical system according to the embodiment makes it easy to align the laser beam.

Figure 16:
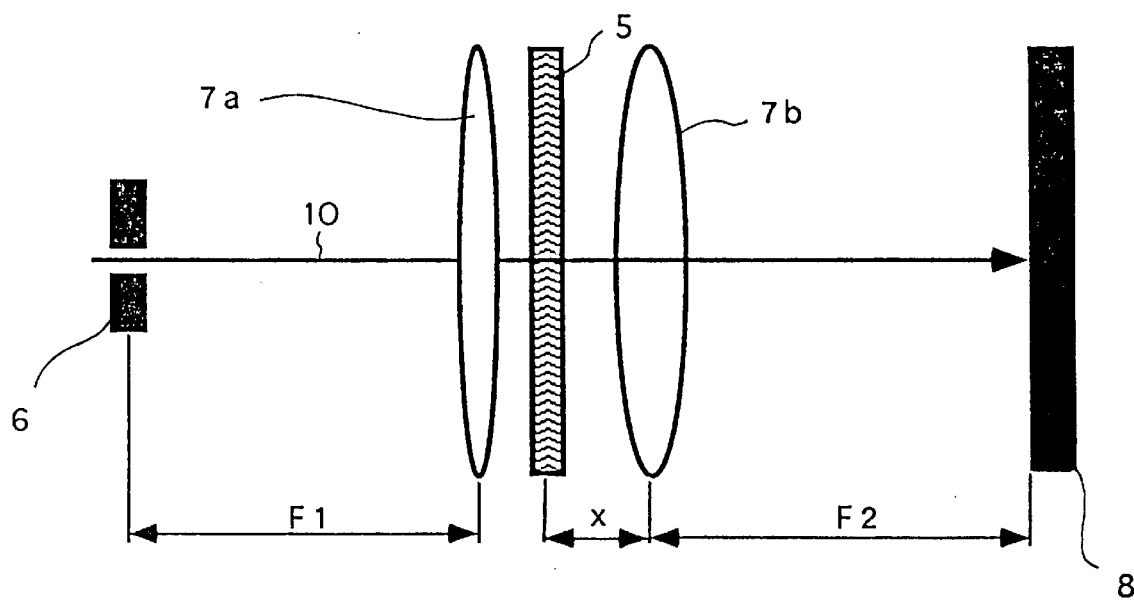
FIG. 16 is a partial diagrammatic view showing the arrangement of a transferring lens of a laser transfer machining apparatus according to an embodiment of the present invention.

FIG. 16 is a partial diagrammatic view showing the partial structure of a laser transfer machining apparatus according to an embodiment of the present invention. In the figure, the same reference numeral as in FIG. 5 denotes the same part or a like part. As shown in FIG. 16 the laser transfer machining apparatus is provided with the transferring optical system constituted by two transferring lenses 7a and 7b and the hologram is disposed between the transferring lenses 7a and 7b. The mask 6 is placed at the object focal point of the transferring lens 7a (focal distance F1) and the target 8 to be machined is placed at the image focal point of the transferring lens 7b (focal distance F2).

In operation, the hologram 5, for example in the form of a phase hologram, spatially modulates the incident laser light 10 passing through the transferring lens 7a to form a number of transferred images. The plural spatially modulated laser beams are projected on the target 8 to be machined by the transferring lens 7b, forming the transferred images respectively.

Since the laser transfer machining apparatus has the arrangement of the optical system as shown in FIG. 16, the value of the element B in the ABCD ray matrix does not vary as the hologram 5 is translated in parallel with the optical axis. Therefore, the projected pattern on the target is constant even if the position of the hologram 5 is changed, and therefore the stability of the pattern is improved.

Figure 17:
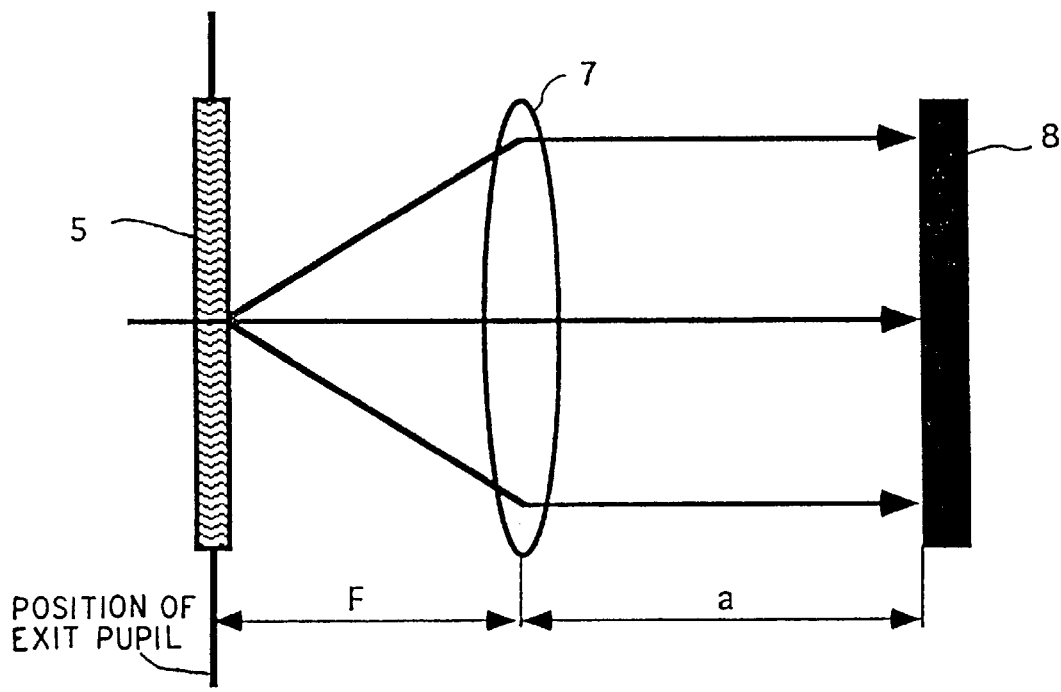
FIG. 17 is a partial diagrammatic view showing the arrangement of a transferring lens of a laser transfer machining apparatus according to an embodiment of the present invention.

FIG. 17 is a partial diagrammatic view showing the partial structure of a laser transfer machining apparatus according to an embodiment of the present invention. In the figure, the same reference numeral as in FIG. 5 denotes the same part or a like part. As shown in FIG. 17 the transferring lens 7 of the laser transfer machining apparatus according to the embodiment is disposed in a lens arrangement which is referred to a telecentric optical system on the image side in which the aperture stop (or the pupil) is at the object focal point of a lens. That is, the hologram 5 is placed at the aperture stop of the transferring lens 7.

The description will be directed to an operation of the embodiment. The hologram 5, for example in the form of a phase hologram, spatially modulates the incident laser light 10 passing through the transferring lens 7a to form a number of transferred images. The plural spatially modulated laser beams are projected on the target 8 to be machined by the transferring lens 7, forming the transferred images respectively.

Since the laser machining apparatus of the embodiment is arranged as shown in FIG. 17, all the laser lights leaving passing through the object focal point of the transferring lens 7 become a parallel laser beam travelling along the optical axis after they pass through the lens. Therefore, all the chief rays of the laser beam which are imaged as the transferred images on the target 8 to be machined are perpendicular to the target 8 to be machined as shown in FIG. 17. Generally, in the case of the chief rays of the laser beam which are imaged as the transferred images being inclined to the target 8 to be machined, the depth of focus becomes shallower and hence drilled holes are inclined or distorted if the target 8 to be machined has a certain width. On the contrary, according to the arrangement as shown FIG. 17 since the chief rays which are imaged as each transferred image are perpendicular to the target 8 to be machined, the depth of focus is made deeper and therefore a thick target can be machined easily.

Figure 18:
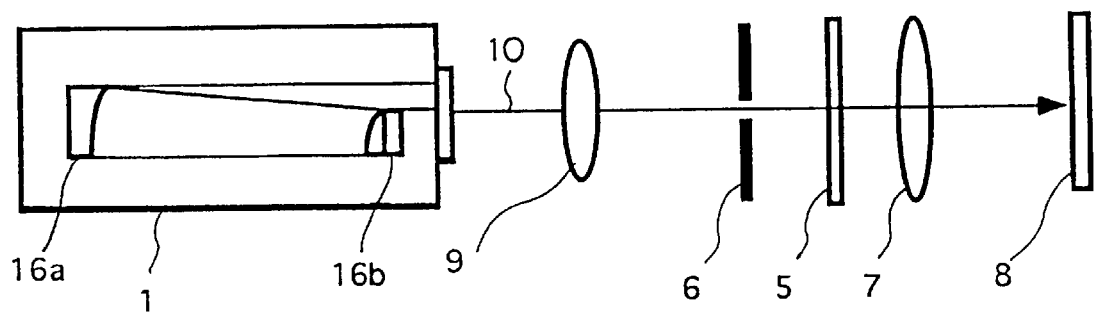
FIG. 18 is a diagrammatic view showing the structure of a laser transfer machining apparatus according to an embodiment of the present invention.

FIG. 18 is a diagrammatic view showing the structure of a laser transfer machining apparatus according to an embodiment of the present invention. In the figure, the same reference numeral as in FIG. 5 denotes the same part or a like part and reference numerals 16a and 16b denote mirrors forming an optical cavity of the laser oscillator 1.

In operation, the laser light 10 which is emitted by the laser oscillator 1 is focused and incident on the mask pattern of the mask 6 by the illuminating lens 9. As previously mentioned, the mask 6 is an element for allowing a component of incident laser light with a beam pattern for machining to pass therethrough. The shaped beam pattern is expanded or reduced in size by the transferring optical system before it is transferred on the target 8 to be machined and becomes an basic element of the pattern to be machined. The hologram 5, for example in the form of a phase hologram, spatially modulates the incident laser light 10 passing through the mask 6 to form a number of transferred images. The plural spatially modulated laser beams are projected on the target 8 to be machined by the transferring lens 7, forming the transferred images respectively.

In this embodiment, the laser light is merely incident on the mask pattern on the mask 6. Since the laser light is easily focused to the mask pattern, the transmissibility of the laser light of the mask is made higher. As a result, the efficiency of transferring is improved and hence the efficiency of machining of the machining apparatus can be improved. To obtain the advantageous effect, the arrangement of the mask 6 and the method of illuminating the target by the laser light are important.

In the embodiment shown in FIG. 18, the laser light 10 is focused to the mask pattern on the mask 6 by the illuminating lens 9, and therefore the energy transmissibility of the mask 6 is made higher and the efficiency of utilization of light is improved. The optical cavity of the laser oscillator 1 is in the form of an unstable optical cavity constituted by the mirrors 16a and 16b, and hence the divergence of the laser light emitted by the oscillator 1 can be reduced. The reduced divergence of the laser light makes it possible to lengthen the focal distance of the illuminating lens 9 required for obtaining an illuminated spot, formed on the mask 6, having a predetermined size. As a result, the divergence of the light passing through the mask can be reduced and hence the numerical aperture of the whole transferring optical system can be kept in a lower level, thereby the structure of the whole optical system being simplified.

Figure 19:
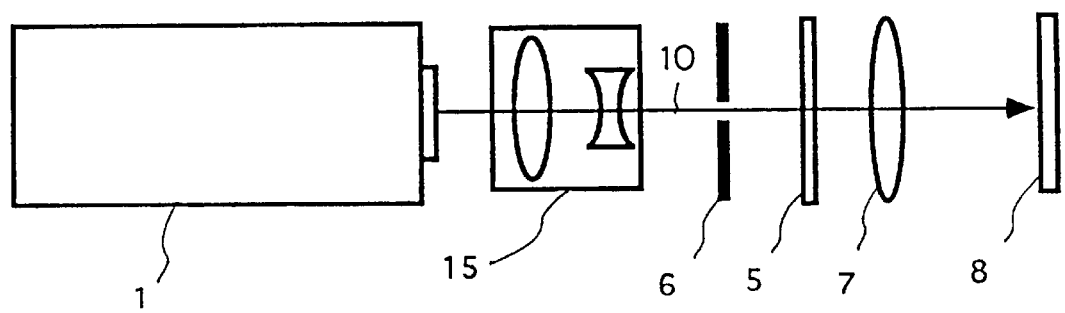
FIG. 19 is a diagrammatic view showing the structure of a laser transfer machining apparatus according to an embodiment of the present invention.

FIG. 19 is a diagrammatic view showing the structure of a laser transfer machining apparatus according to an embodiment of the present invention. In the figure, the same reference numeral as in FIG. 5 denotes the same part or a like part and a reference numerals 15 denotes a laser beam shaping optical system (shaping means) for an incident laser beam.

In operation, the laser light 10 which is emitted by the laser oscillator 1 is focused and incident on the mask pattern of the mask 6 after the beam pattern of the laser beam is shaped by the laser beam shaping optical system 15. As previously mentioned, the mask 6 is an element for allowing a component of the incident laser beam with a beam pattern for machining to pass therethrough. The shaped pattern is expanded or reduced in size by the transferring optical system before it is transferred on the target 8 to be machined and becomes a basic element of the whole pattern to be machined. The hologram 5, for example in the form of a phase hologram, spatially modulates the incident laser light 10 passing through the mask 6 to form a number of transferred images. The plural spatially modulated laser beams are projected on the target 8 to be machined by the transferring lens 7, forming the transferred images respectively.

The laser beam shaping optical system 15 is adapted to shape the laser beam by expanding or reducing the size of the laser beam such that the cross-sectional beam shape is similar to the mask pattern shape of the mask 6. Thus, the energy transmissibility of the mask 6 is improved and hence the efficiency of utilization of light is improved. Thereby the efficiency of machining of the machining apparatus is improved.

Figure 20:
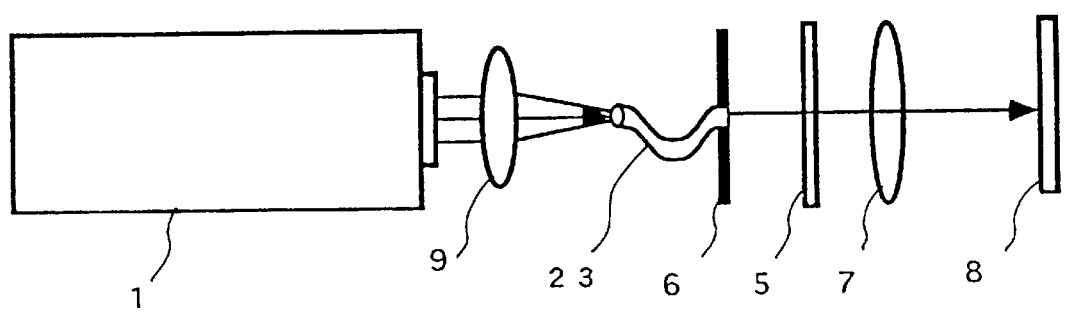
FIG. 20 is a diagrammatic view showing the structure of a laser transfer machining apparatus according to an embodiment of the present invention.

FIG. 20 is a diagrammatic view showing the structure of a laser transfer machining apparatus according to an embodiment of the present invention. In the figure, the same reference numeral as in FIG. 5 denotes the same part or a like part and a reference numeral 23 denotes an optical fiber (a shaping means).

The description will be directed to an operation of the embodiment. The laser light 10 which is emitted by the laser oscillator 1 is focused and is incident on the incident face of the optical fiber 23. The laser light which is guided by the optical fiber 23 emerges from the emergent face of the optical fiber 23. The mask 6 is disposed in the vicinity of the emergent face of the optical fiber 23. As previously mentioned, the mask 6 is an element for allowing a component of the incident laser light with a beam pattern for machining to pass therethrough. The shaped pattern is expanded or reduced in size by the transferring optical system before it is transferred on the target 8 to be machined and becomes an basic element of the whole pattern to be machined. The hologram 5, for example in the form of a phase hologram, spatially modulates the incident laser light 10 passing through the mask 6 to form a number of transferred images. The plural spatially modulated laser beams are projected on the target 8 to be machined by the transferring lens 7, forming the transferred images respectively.

In order to improve the energy transmissibility of laser light incident on the mask 6, it is necessary to obtain a laser light with a laser beam pattern similar to the mask pattern if possible. However, when the beam pattern of incident light is shaped to be similar to the mask pattern by means of a conventional technique it is difficult to illuminate the whole mask pattern with a laser light having an uniform light itensity profile. On the contrary, the optical fiber 23 according to the embodiment can obtain the laser beam with an uniform light intensity profile at the emergent face thereof. Furthermore, the mask 6 having a mask pattern, which is similar to the cross-sectional shape of the optical fiber 23, is arranged just behind the fiber. Therefore, the transmissibility of the mask is made higher when shaping the laser beam to obtain a desired pattern for machining while the light intensity profile of the incident laser light is made uniform. As a result, high efficiency and stable laser machining can be provided. The emergent face of the optical fiber can be utilized as the mask pattern instead of the mask.

Figure 21:
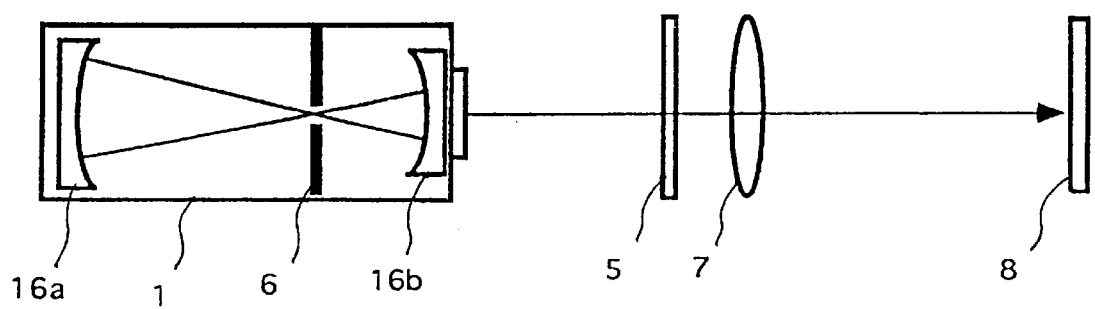
FIG. 21 is a diagrammatic view showing the structure of a laser transfer machining apparatus according to an embodiment of the present invention.

FIG. 21 is a diagrammatic view showing the structure of a laser transfer machining apparatus according to an embodiment of the present invention. In the figure, the same reference numeral as in FIG. 5 denotes the same part or a like part and reference numerals 16a and 16b denote mirrors of an optical cavity of the laser oscillator 1. The mask 6 is disposed in the optical cavity of the laser oscillator 1.

The description will be directed to an operation of the embodiment. All the laser beams which are generated in the laser oscillator 1, pass through the mask 6 and emerge from the laser oscillator 1 via the cavity mirror 16b. As previously mentioned, the mask 6 is an element for allowing a component of incident laser light with a beam pattern for machining to pass therethrough. The shaped pattern is expanded or reduced in size by the transferring optical system before it is transferred on the target 8 to be machined and becomes an basic element of the whole pattern to be machined. The hologram 5, for example in the form of a phase hologram, spatially modulates the incident laser light 10 passing through the mask 6 and emerges from the laser oscillator 1 to form a number of transferred images. The plural spatially modulated laser beams are projected on the target 8 to be machined by the transferring lens 7, forming the transferred images respectively.

In the laser oscillator 1 including the optical cavity in which the mask 6 is arranged, a part of all the laser lights passing through the mask 6 becomes the laser light emitted by the oscillator 1. Therefore, according to the embodiment a higher efficiency can be obtained compared with in the case that the laser light is coupled with the mask 6 outside the optical cavity. Furthermore, since only the laser light travelling along an optical axis which goes through the mask pattern of the mask 6 is emitted, a high quality laser light having a smaller divergence can be obtained. In a preferred embodiment, the mirrors 16a and 16b of the laser optical cavity are concentric optical cavity mirrors and the mask pattern of the mask 6 is positioned on the axis connecting the centers of curvature of the mirrors, as shown in FIG. 21. This configuration can obtain the laser beam with a basic pattern for machining without lowering the efficiency of the laser oscillator. As a result, a high efficiency of utilization of light is obtained and the efficiency of machining of the laser transfer machining apparatus is improved.

Figure 22:
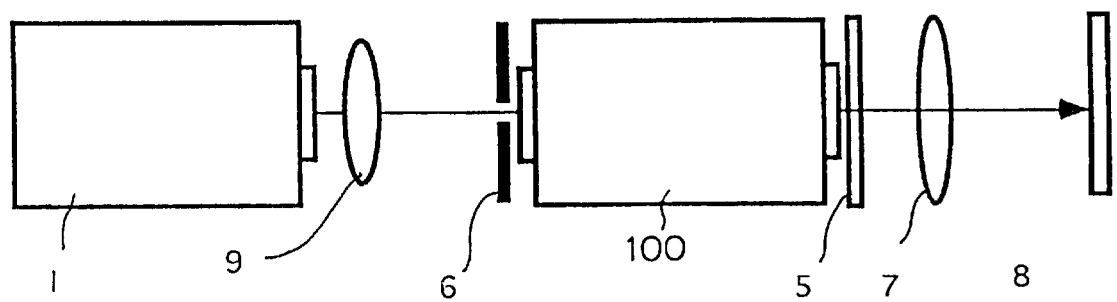
FIG. 22 is a diagrammatic view showing the structure of a laser transfer machining apparatus according to an embodiment of the present invention.

FIG. 22 is a diagrammatic view showing the structure of a laser transfer machining apparatus according to an embodiment of the present invention. In the figure, the same reference numeral as in FIG. 5 denotes the same part or a like part and a reference numeral 100 denotes a laser amplifier.

The description will be directed to an operation of the embodiment. The laser light 10 which is emitted by the laser oscillator 1 is focused and is incident on the mask pattern of the mask 6 by the illuminating lens 9. As previously mentioned, the mask 6 is an element for allowing a component of incident laser light with a beam pattern for machining to pass therethrough. The shaped pattern is expanded or reduced in size by the transferring optical system before it is transferred on the target 8 to be machined and becomes an basic element of the whole pattern to be machined. The hologram 5, for example in the form of a phase hologram, spatially modulates the incident laser light 10 passing through the mask 6 to form a number of transferred images. The laser light is amplified by the laser amplifier 100 to increase the laser intensity before the spatial modulation of the hologram. The plural spatially modulated laser beams are projected on the target 8 to be machined by the transferring lens 7, forming the transferred images respectively.

The mask 6 should pass all the energy of laser light which is divided into all the transferred images by the hologram. The illuminated intensity of the laser light is very large on the mask. As a result, there occurs a risk damaging the mask 6. Therefore, the intensity of the laser light incident on the mask 6 is limited in the aforementioned embodiments. In contrast, according to the laser machining apparatus as shown in FIG. 22 it is not necessary for the laser light to have a large laser intensity upon passing through the mask 6 because the laser light is amplified by the laser amplifier 100 after it passes through the mask 6. The laser beam with a higher energy can be extracted from the laser amplifier 100. Hence, the laser amplifier permits laser machining with high energy laser light without applying a great heat load to the mask 6.

Figure 23:
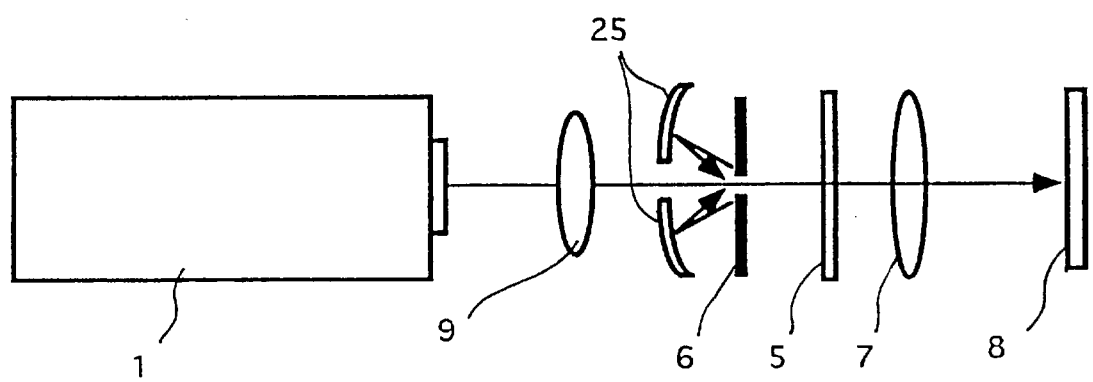
FIG. 23 is a diagrammatic view showing the structure of a laser transfer machining apparatus provided with a mirror for returning a reflected light to a mask pattern according to an embodiment of the present invention.

FIG. 23 is a diagrammatic view showing the structure of a laser transfer machining apparatus according to an embodiment of the present invention. In the figure, the same reference numeral as in FIG. 5 denotes the same part or a like part and a reference numeral 25 denotes a mirror for returning the laser light, which is reflected from the vicinity of the mask pattern of the mask 6, toward the mask pattern of the mask 6. A mirror is disposed in the vicinity of the mask pattern on the surface of the mask 6 on which the light is incident, or a mirror is disposed on the whole surface of the mask 6 on which the light is incident.

The description will be directed to an operation of the embodiment. The laser light 10 which is emitted by the laser oscillator 1 is focused and is incident on the mask pattern of the mask 6 by the illuminating lens 7. As previously mentioned, the mask 6 is an element for allowing a component of incident laser light with a beam pattern for machining to pass therethrough. The shaped pattern is expanded or reduced in size by the transferring optical system before it is transferred on the target 8 to be machined and becomes an basic element of the whole pattern to be machined. The hologram 5, for example in the form of a phase hologram, spatially modulates the incident laser light 10 passing through the mask 6 to form a number of transferred images. The plural spatially modulated laser beams are projected on the target 8 to be machined by the transferring lens 7, forming the transferred images respectively. A laser light, which is reflected from the vicinity of the mask pattern without passing through the mask 6, is reflected and returned to the mask pattern again by the mirror 25.

Normally, the laser light which collides with the opaque portion of the mask is dispersed and hence is not utilized. The dispersed light is a loss of laser energy. On the contrary, according to the laser transfer machining apparatus of this embodiment the mirror is disposed on at least the opaque portion in the vicinity of the mask pattern of the mask 6, as shown in FIG. 23 and therefore a laser light, which is reflected without passing through the mask 6, is reflected and returned to the mask pattern again by the mirror 25. As a result, the loss of the laser light is reduced and the efficiency of utilization of light is improved, thereby the efficiency of machining of the laser transfer machining apparatus being improved.

Figure 24:
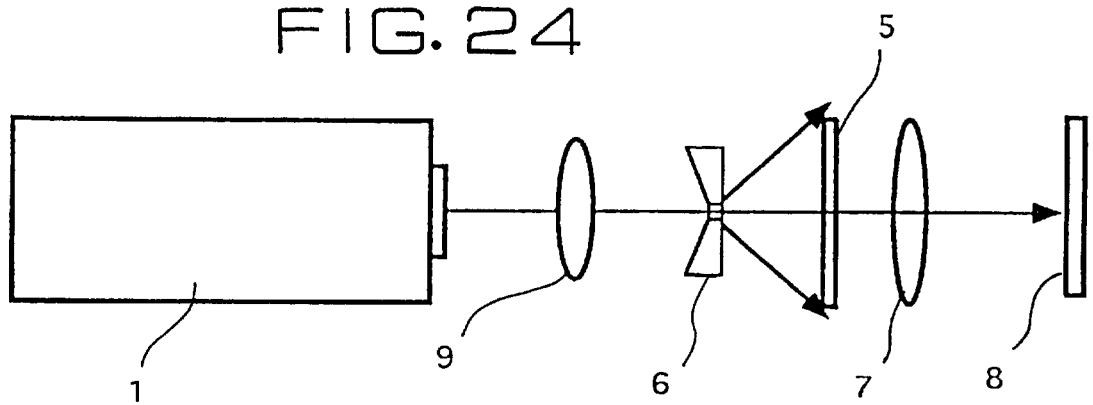
FIG. 24 is a diagrammatic view showing the structure of a laser transfer machining apparatus provided with a prism for refracting a laser light incident on a part except a mask pattern according to an embodiment of the present invention.

FIG. 24 is a diagrammatic view showing the structure of a laser transfer machining apparatus according to an embodiment of the present invention. In the figure, the same reference numeral as in FIG. 5 denotes the same part or a like part. The mask 6 is not a mere element for shielding a laser light except a laser light incident on the mask pattern and the part of the mask except the mask pattern is constructed by a prism element for refracting incident laser light outside the optical axis of the apparatus.

The description will be directed to an operation of the embodiment. The laser light 10 which is emitted by the laser oscillator 1 is focused and is incident on the mask pattern of the mask 6 by the illuminating lens 9. As previously mentioned, the mask 6 is an element for allowing a component of incident laser light with a beam pattern for machining to pass therethrough. The shaped pattern is expanded or reduced in size by the transferring optical system before it is transferred on the target 8 to be machined and becomes an basic element of the whole pattern to be machined. The hologram 5, for example in the form of a phase hologram, spatially modulates the incident laser light 10 passing through the mask 6 to form a number of transferred images. The plural spatially modulated laser beams are projected on the target 8 to be machined by the transferring lens 7, forming the transferred images respectively. The laser light, which is not incident on the mask pattern of the mask 6 and then enters the prism disposed in the vicinity of the mask pattern, is refracted outside the optical axis.

The mask 6 should pass all the energy of the laser light which is divided into all the transferred images by the hologram. The illuminated intensity of the laser light is very large on the mask. As a result, there occurs a risk damaging the mask 6. Therefore, the aforementioned masks having such a structure for merely shielding a laser light except a laser light incident on the mask pattern may absorb the former laser light, so that the masks are damaged by heat. On the contrary, the mask 6 according to this embodiment as shown in FIG. 24 makes the laser light pass through itself without absorbing the laser light. The laser light passed through is dispersed. Hence, the heat load applied to the mask 6 is reduced and the heat damage can be prevented, and therefore a laser machining process can be performed stably using a high energy laser light.

Figure 25:
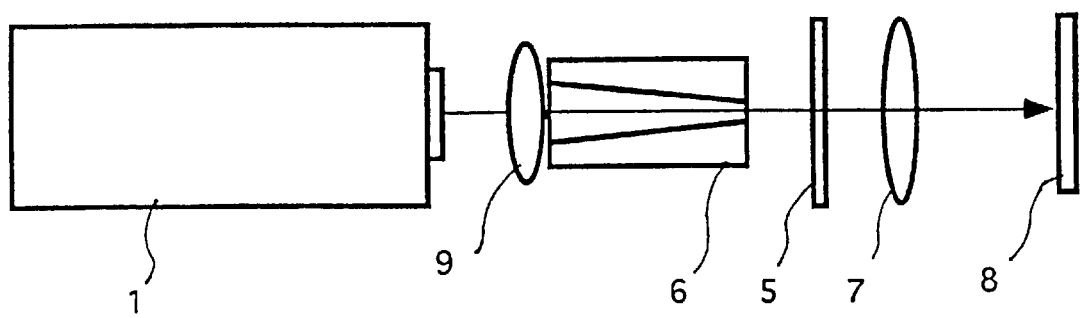
FIG. 25 is a diagrammatic view showing the structure of a laser transfer machining apparatus provided with a mask in the form of a condenser cone according to an embodiment of the present invention.

FIG. 25 is a diagrammatic view showing the structure of a laser transfer machining apparatus according to an embodiment of the present invention. In the figure, the same reference numeral as in FIG. 5 denotes the same part or a like part. The mask 6 is not a mere element for shielding a laser light except a laser light incident on the mask pattern and is in the form of a condenser cone as shown in FIG. 25.

The description will be directed to an operation of the embodiment. The laser light 10 which is emitted by the laser oscillator 1 is focused and is incident on the mask pattern of the mask 6 by the illuminating lens 9. As previously mentioned, the mask 6 is an element for allowing a component of incident laser light with a beam pattern for machining to pass therethrough. The shaped pattern is expanded or reduced in size by the transferring optical system before it is transferred on the target 8 to be machined and becomes an basic element of the whole pattern to be machined. The hologram 5, for example in the form of a phase hologram, spatially modulates the incident laser light 10 passing through the mask 6 to form a number of transferred images. The plural spatially modulated laser beams are projected on the target 8 to be machined by the transferring lens 7, forming the transferred images respectively. The laser light is incident on the mask 6 in the form of a condenser cone and the beam pattern of the laser is defined by the outlet shape of the cone which corresponds to the mask pattern of the mask 6. A laser light incident on a part except the mask pattern collides with the inner surface of the condenser cone and is reflected at random by the inner surface, and thereby the energy of the reflected laser light is absorbed in the whole condenser cone.

The mask 6 should pass all the energy of the laser light which is divided into all the transferred images by the hologram. The illuminated intensity of the laser light is very large on the mask 6. As a result, there occurs a risk damaging the mask 6. Therefore, the aforementioned masks having such a structure for merely shielding a laser light except a laser light incident on the mask pattern may absorb the former laser light greatly, and thereby the marks are damaged by heat. On the contrary, the mask 6 according to this embodiment as shown in FIG. 25 reflects the laser light at random and absorbs the laser light not passing through the mask 6 with the wide area thereof. Hence, the heat load applied to the mask 6 is reduced and the heat damage can be prevented, and therefore a laser machining process can be performed stably using a high energy laser light.

Figure 26:
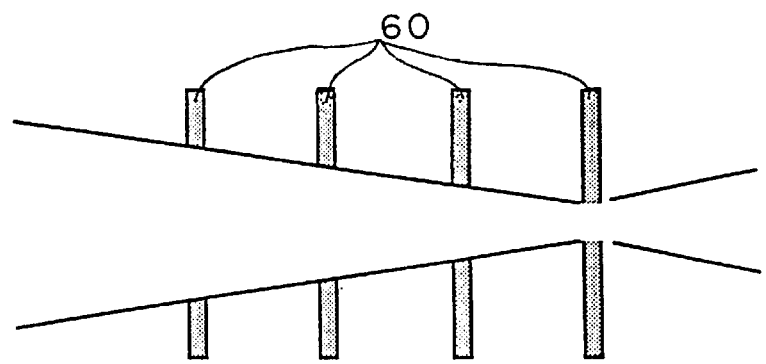
FIG. 26 is a diagrammatic view showing the structure of another example of the mask in the form of a condenser cone shown in FIG. 25.

Alteratively, the mask 6 in the form of a condenser cone can be constituted by a multi-stage mask provided with a plurality of masks 60 for allowing a component of incident laser light with the mask pattern to pass therethrough, as shown in FIG. 26. The laser light is partially intercepted stage by stage by the masks 60. Thus, an energy absorbed in one mask 60 can be reduced and the reduction results in the heat load of the mask being reduced and the elimination of the damage and distortion of the mask.

Figure 27:
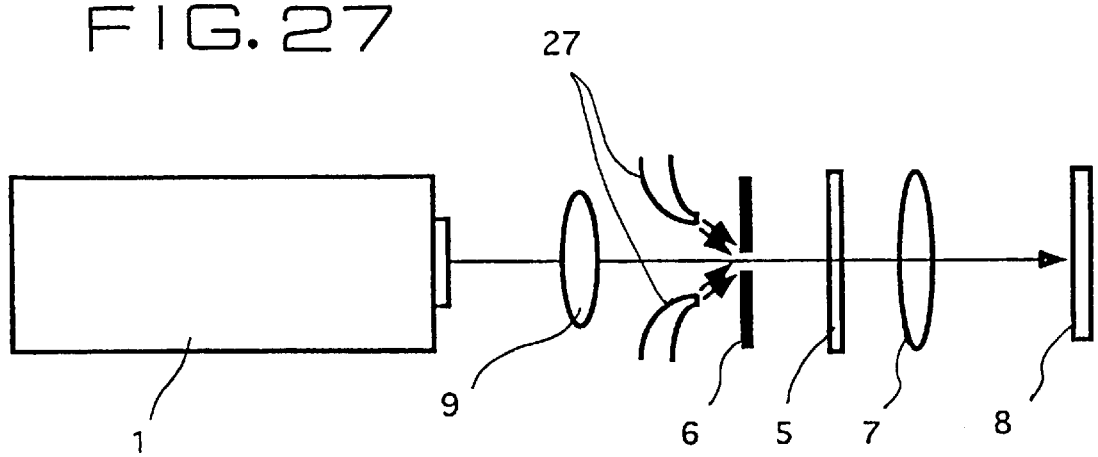
FIG. 27 is a diagrammatic view showing the structure of a laser transfer machining apparatus provided with nozzles for feeding a cooling gas flow to a mask according to an embodiment of the present invention.

FIG. 27 is a diagrammatic view showing the structure of a laser transfer machining apparatus according to an embodiment of the present invention. In the figure, the same reference numeral as in FIG. 5 denotes the same part or a like part and a reference numeral 27 denotes a nozzle for feeding a gas flow such as an air flow around the mask pattern of the mask 6.

The description will be directed to an operation of the embodiment. The laser light 10 which is emitted by the laser oscillator 1 is focused and is incident on the mask pattern of the mask 6 by the illuminating lens 9. As previously mentioned, the mask 6 is an element for allowing a component of incident laser light with a beam pattern for machining to pass therethrough. The shaped pattern is expanded or reduced in size by the transferring optical system before it is transferred on the target 8 to be machined and becomes an basic element of the whole pattern to be machined. The hologram 5, for example in the form of a phase hologram, spatially modulates the incident laser light 10 passing through the mask 6 to form a number of transferred images. The plural spatially modulated laser beams are projected on the target 8 to be machined by the transferring lens 7, forming the transferred images respectively. The nozzles 27 feed a gas flow to the vicinity of the mask pattern of mask 6 to cool the mask 6.

The mask 6 should pass all the energy of the laser light which is divided into all the transferred images by the hologram. The illuminated intensity of the laser light is very large on the mask 6. As a result, there occurs a risk damaging the mask 6. Therefore, the aforementioned masks having such a structure for merely shielding a laser light except a laser light incident on the mask pattern may absorb the former laser light, and thereby the masks are damaged by heat. On the contrary, according to this embodiment as shown in FIG. 27 since the cooling gas flow at a high speed is fed to the mask 6 by the two nozzles 27, the cooling gas flow is directed effectively to the vicinity of the mask pattern of the mask 6 to obtain a greater cooling effect. Hence, the heat damage of the mask can be prevented, and therefore a laser machining process can be performed stably using a high energy laser light. In the embodiment, a cooling fan or the like can be used instead of the nozzles for feeding and concentrating the cooling gas into the mask.

Figure 28:
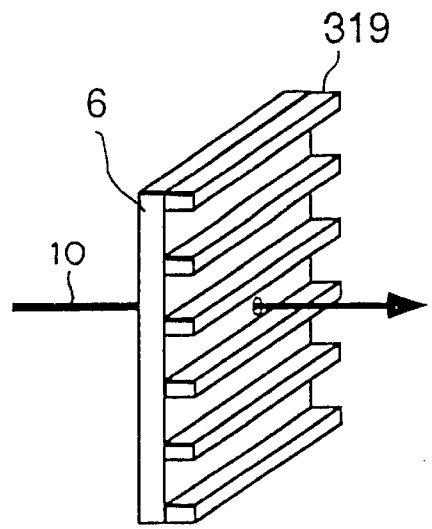
FIG. 28 is a perspective view showing a mask with fins according to an embodiment of the present invention.

FIG. 28 is a perspective view showing an embodiment of to an embodiment of the present invention. In the figure, the same reference numeral as in FIG. 5 denotes the same part or a like part and a reference numeral 319 denotes a fin disposed on one surface of the mask 6. The mask of the embodiment is intended to restrain a rise of temperature of the mask 6 during laser transfer machining operations in order to prevent the damage of the mask and the deterioration of the machining accuracy in the same manner as the mask of the aforementioned embodiment of FIG. 27.

The description will be directed to an operation of the embodiment. The fins 319 increase the surface area of the mask, thereby reducing the rise of temperature of the mask 6. This results in reducing the distortion of the mask 6 due to the thermal expansion and the distortion of the beam pattern of the laser light passing through the mask, thereby preventing the mask from being damaged and the machining accuracy from going worse. Thus, the reliability of the machining apparatus is improved.

Figure 29:
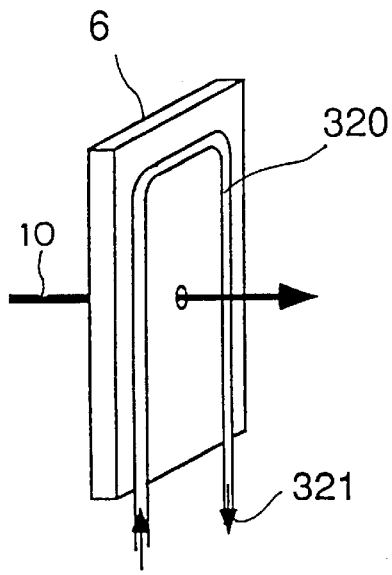
FIG. 29 is a perspective view showing a mask provided with a cooling pipe according to an embodiment of the present invention.

FIG. 29 is a perspective view showing a mask according to an embodiment of the present invention. In the figure, the same reference numeral as in FIG. 5 denotes the same part or a like part and a reference numeral 320 denotes a cooling pipe which is disposed on one surface of the mask 6 such that the pipe abuts the surface. The mask of the embodiment is intended to restrain a rise of temperature of the mask 6 during laser transfer machining operations in order to prevent the damage of the mask and the deterioration of the machining accuracy in the same manner as the mask of the aforementioned embodiment of FIG. 27.

The description will be directed to an operation of the embodiment. A cooling water 321 flowing via the cooling pipe 320 reduces the rise of temperature of the mask 6 due to the laser light 10. This results in reducing the distortion of the mask 6 due to the thermal expansion and the distortion of the laser light passing through the mask, thereby preventing the mask from being damaged and the machining accuracy from going worse. Thus, the reliability of the machining apparatus is improved.

Figure 30:
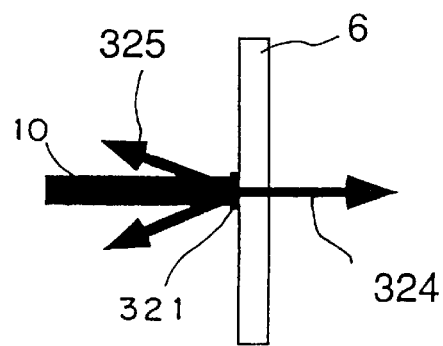
FIG. 30 is a perspective view showing a mask provided with a mirror portion according to an embodiment of the present invention.

FIG. 30 is a perspective view showing a mask according to an embodiment of the present invention. In the figure, the same reference numeral as in FIG. 5 denotes the same part or a like part and a reference numeral 321 denotes a mirror portion disposed in the vicinity of the mask pattern of the mask 6 for reflecting a light incident on to a part except the mask pattern. The mask of the embodiment is intended to restrain a rise of temperature of the mask 6 while machining by transferring images in order to prevent the damage of the mask and the deterioration of the machining accuracy in the same manner as the mask of the aforementioned embodiment of FIG. 27.

The description will be directed to an operation of the embodiment. The light incident on a part except the mask pattern is reflected by the mirror portion 321 disposed in the shielding portion adjacent to the mask pattern. The absorption of the laser light is reduced in the mask 6, thereby reducing the rise of temperature of the mask 6 due to the laser light 10. This results in reducing the distortion of the mask 6 due to the thermal expansion and the distortion of the laser light passing through the mask. Thus, the reliability of the machining apparatus is improved.

FIG. 31 is a diagrammatic view showing the structure of a laser transfer machining apparatus according to an embodiment of the present invention. In the figure, the same reference numeral as in FIG. 5 denotes the same part or a like part and a reference numeral 691 denotes a rotary mask-changing driving unit for selecting one of mask patterns formed on the mask 6 to change the mask pattern by rotating the mask 6 in the form of a disk. The mask 6 is made of a circle-shaped disk plate and is provided with a plurality of mask patterns the centers of which are arranged on the circumference of a circle, the central axis of which is identical to the central axis of the rotary shaft of the rotary mask-changing driving unit 691.

The description will be directed to an operation of the embodiment. The laser light 10 which is emitted by the laser oscillator 1 is focused and is incident on the mask pattern of the mask 6 by the illuminating lens 9. As previously mentioned, the mask 6 is an element for allowing a component of incident laser light with a beam pattern for machining to pass therethrough. The shaped pattern is expanded or reduced in size by the transferring optical system before it is transferred on the target 8 to be machined and becomes an basic element of the whole pattern to be machined. The hologram 5, for example in the form of a phase hologram, spatially modulates the incident laser light 10 passing through the mask 6 to form a number of transferred images. The plural spatially modulated laser beams are projected on the target 8 to be machined by the transferring lens 7, forming the transferred images respectively.

If one mask pattern on the mask 6 is damaged by the incident laser light, it is replaced by another mask pattern with no damage by means of a rotation of the mask 6 by the rotary mask-changing driving unit 691.

The mask 6 should pass all the energy of the laser light which is divided into all the transferred images by the hologram. The illuminated intensity of the laser light is very large on the mask 6. As a result, there occurs a risk damaging the mask 6. Therefore, the aforementioned masks having such a structure for merely shielding a laser light except a laser light incident on the mask pattern may absorb the former laser light, and thereby the masks are damaged by heat. On the contrary, according to this embodiment as shown in FIG. 30 the plural mask patterns are provided and the current mask pattern is replaced easily by another mask pattern. The maintenance for the mask can be easily performed when the current mask pattern is damaged. That is, another mask pattern will be placed on the optical path of the laser light in order to reactivate the laser transfer machining apparatus. Thus laser machining operations can be performed successively.

Figure 32:
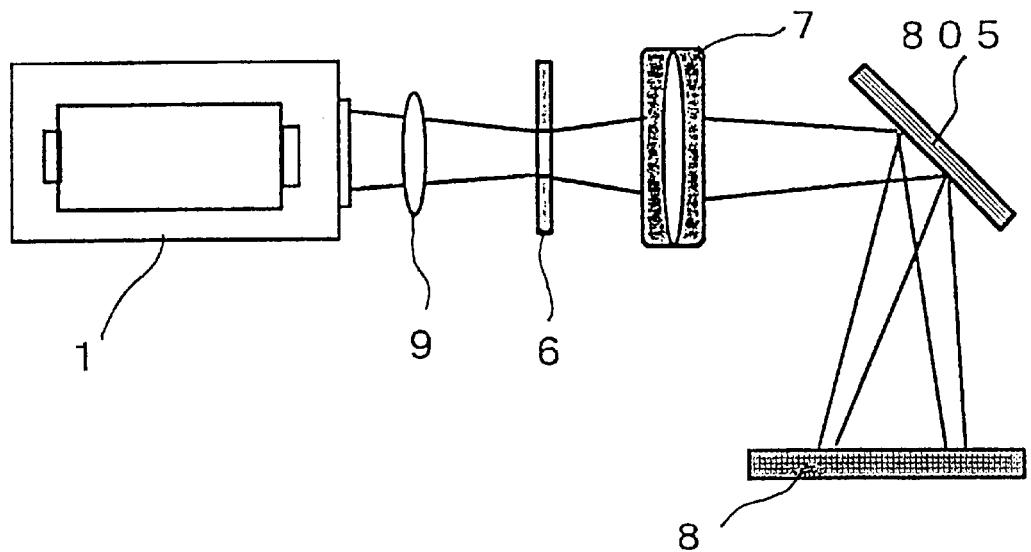
FIG. 32 is a diagrammatic view showing the structure of a laser transfer machining apparatus provided with a reflecting type phase hologram according to an embodiment of the present invention.
Figure 33:
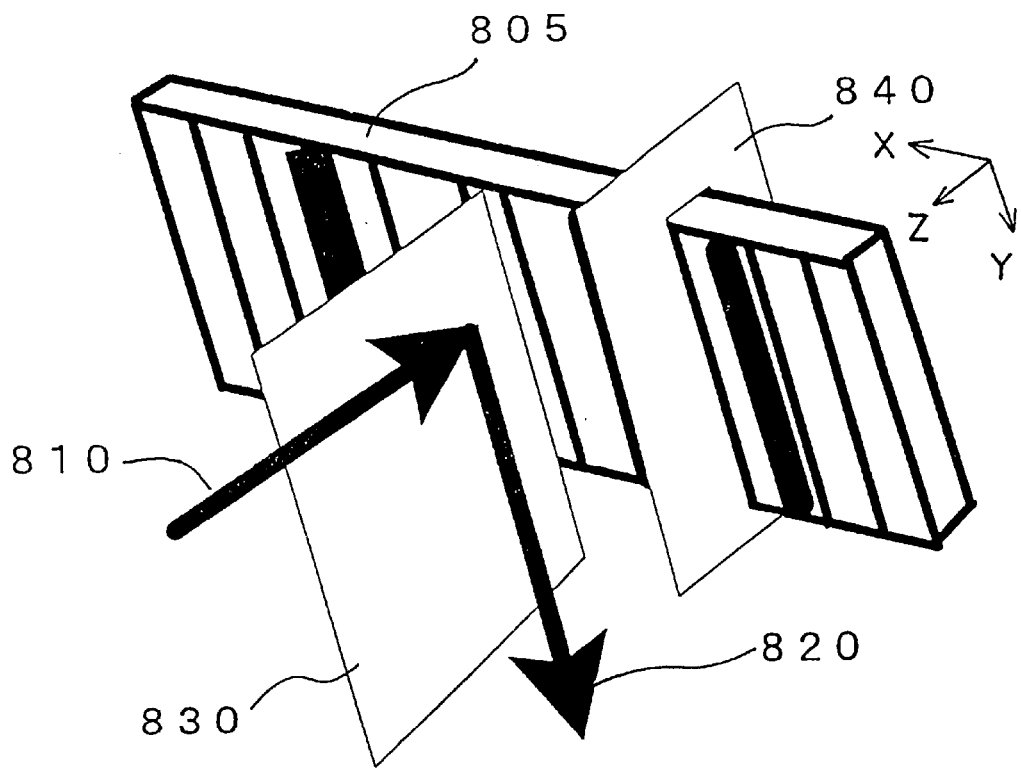
FIG. 33 is a view for showing an arrangement of the reflecting type phase hologram shown in FIG. 32 with respect to an incident laser light.
Figure 34:
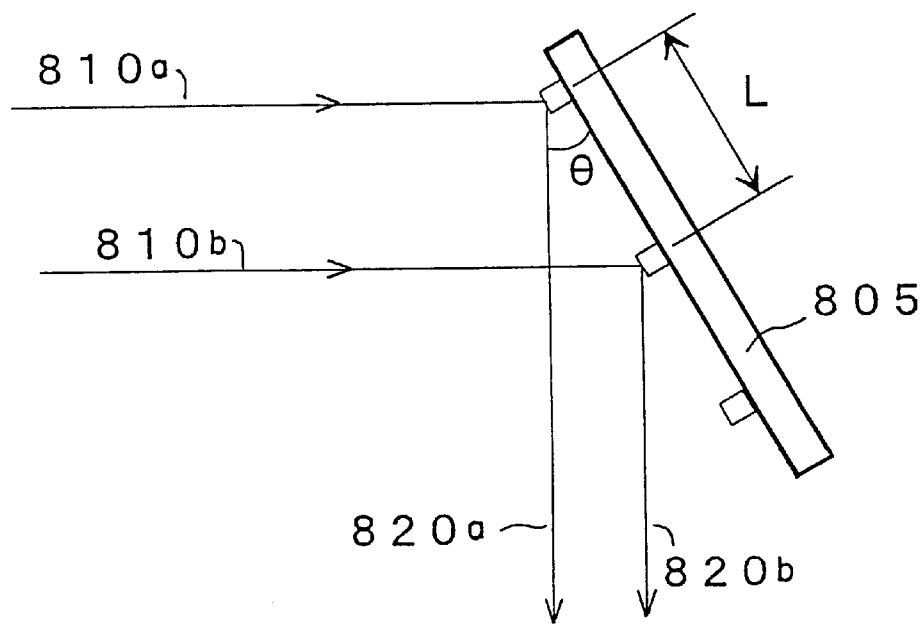
FIG. 34 is a view for showing an incident angle of a laser beam incident on the reflecting type phase hologram shown in FIG. 32 and a pitch of lines of the phase hologram.

FIG. 32 is a diagrammatic view showing the structure of a laser transfer machining apparatus according to an embodiment of the present invention. In the figure, the same reference numeral as in FIG. 5 denotes the same part or a like part and a reference numeral 805 denotes a phase hologram of a reflecting type. The reflecting type phase hologram 805 has a plurality of linear portions (e.g. reliefs) for providing an incident laser light with phase shifts according to positions thereof, as shown in FIG. 33. In the reflecting type phase hologram 805, the direction of a reflected laser beam 820 is determined by the interference between arbitrary two laser rays 810a and 810b (reflected rays 820a and 820b correspond to the laser rays 810a and 810b, respectively) of the laser rays group constituting the laser beam, as shown in FIG. 34. The direction is defined as a function of the pitch L of the liner portions and the incident angle θ of the incident laser beam.

As shown in FIG. 33, the reflecting type phase hologram 805 is arranged with respect to the incident laser light such that an imaginary plane 830 determined by the incident laser light 810 and its zero-order diffracted light 820 is in parallel with an imaginary plane 840 including one of the linear portions and orthogonal to the reflecting type phase hologram 805. In the arrangement of the phase hologram 805 with respect to the incident laser light 810, a movement of the phase hologram in the direction perpendicular to its surface (z direction in the figure) does not change the interference between the two laser rays essentially, and therefore the predetermined pattern, which is provided by the phase hologram 805, on the target 8 to be machined is unchanged. However, the direction of the reflected ray 820 is translated and hence the positions machined on the target are changed. Thus, the hologram according to the embodiment makes it possible to change the positions of the transferred images on the target 8 to be machined without changing the pattern to be machined.

Figure 35:
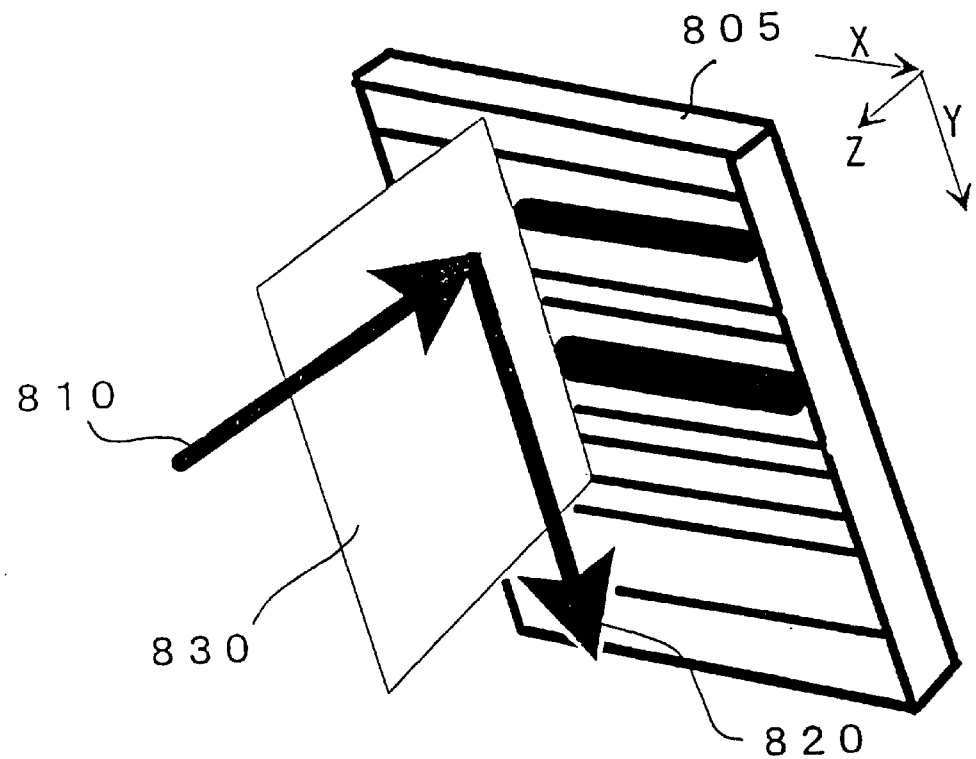
FIG. 35 is a view for showing an arrangement of the reflecting type phase hologram shown in FIG. 32 with respect to an incident laser light.

On the contrary, in the case that the phase hologram 805 is arranged such that an imaginary plane determined by the incident laser light 810 and its zero-order diffracted light 820 is orthogonal to the linear portions in the phase hologram 805, a movement of the phase hologram 805 in z direction in the figure causes a change of the pattern transferred on the target to be machined, as shown in FIG. 35.

Therefore, the reflecting type phase hologram 805 should be arranged as shown in FIG. 33 with respect to the incident laser beam. A change of the z position of the hologram makes it easy to position the pattern machined on the target 8 without changing the pattern machined.

Figure 36:
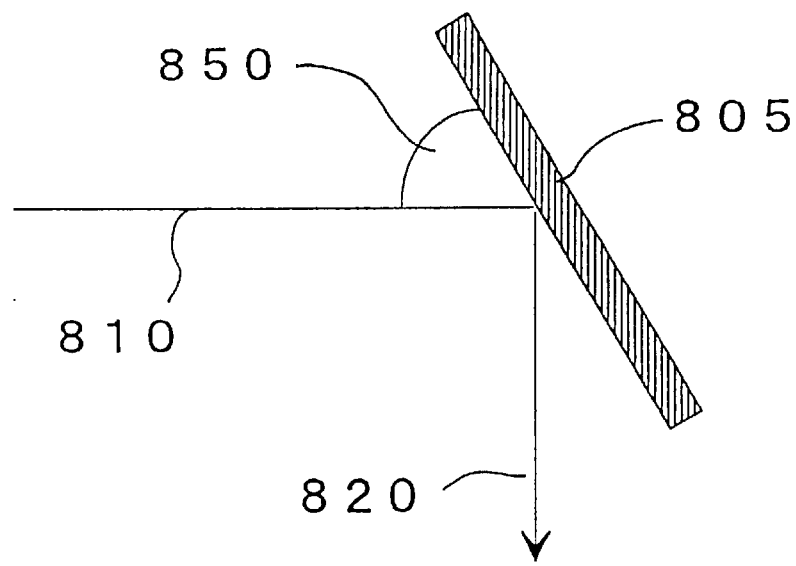
FIG. 36 is a view for showing an angle between the reflecting type phase hologram shown in FIG. 32 and an incident laser light.
Figure 37:
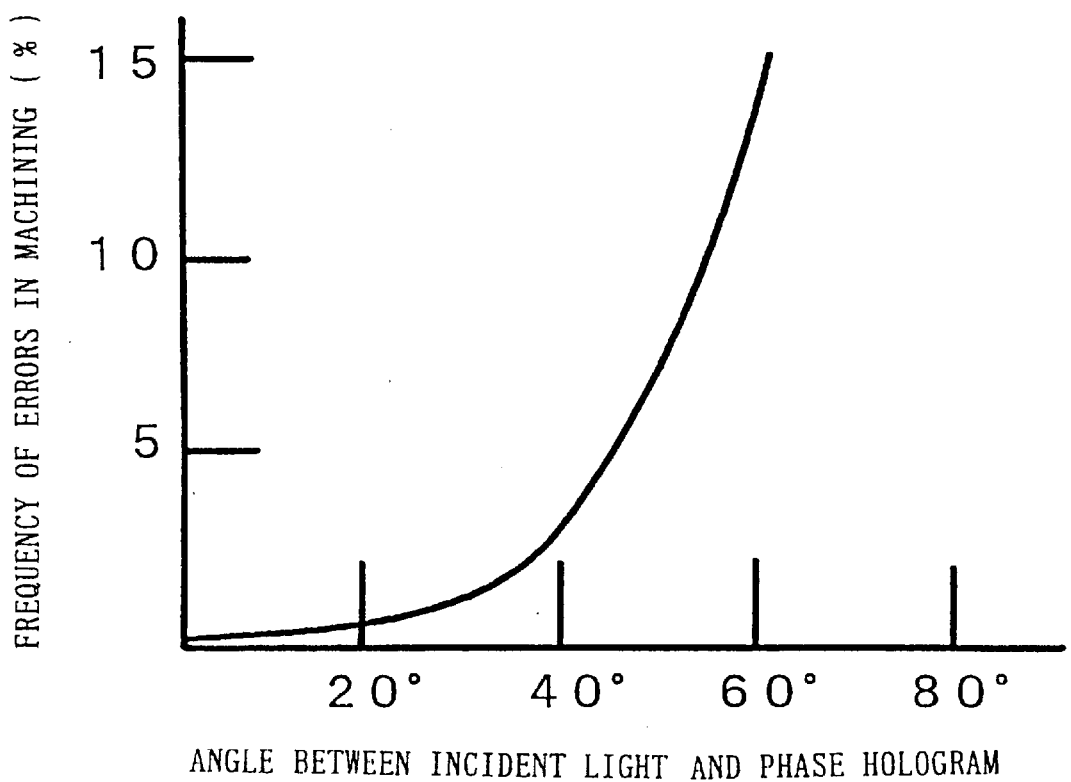
FIG. 37 is a graph showing a relationship between an angle defined by an incident laser beam and the reflecting type phase hologram and the frequency (%) of errors in machining.

The relationship between an angle defined by the laser beam and the reflecting type phase hologram 805 and a frequency of errors in machining will be described hereinafter. FIG. 36 is a schematic view showing a definition of the angle 850 between the laser beam 810 and the phase hologram 805 and FIG. 37 shows the relationship between the angle 850 defined by the laser beam 810 and the reflecting type phase hologram 805 and the frequency (%) of errors in machining. As can be seen from FIG. 37, the frequency of errors in machining is increased as the angle between the laser beam and the phase hologram 805 is increased. In an experiment under a specific condition, the frequency of errors in machining was about 5% when the angle between the laser beam and the reflecting type phase hologram 805 was set to be 45°. If the frequency of errors in machining which does not exceed about 5% is allowable, preferably, the angle between the laser beam and the phase hologram 805 is 45 degrees or less.

FIG. 38 is a diagrammatic view showing the structure of a laser transfer machining apparatus according to an embodiment of the present invention. In the figure, the same reference numeral as in FIG. 5 denotes the same part or a like part and a reference numeral 6a denotes a first mask in which the basic pattern to be machined is formed; 6b, a second mask for selectively passing a part of the plural transferred images generated by the hologram 5 and for shielding the remaining part; 7a, a first transferring lens; and 7b, a second transferring lens.

The description will be directed to an operation of the embodiment. The laser light 10 which is emitted by the laser oscillator 1 is focused and is incident on the mask pattern of the mask 6a by the illuminating lens 9. As previously mentioned, the mask 6a is an element for allowing a component of incident laser light with a beam pattern for machining as the basic pattern to be machined to pass therethrough. The laser light having the shaped pattern is incident on the hologram 5. The hologram 5, for example in the form of a phase hologram, spatially modulates the incident laser light 10 passing through the mask 6a to form a number of transferred images. The plural spatially modulated laser beams are incident on the second mask 6b by the transferring lens 7a. The second mask 6b transmits only a part of all the transferred images selectively and then the transferring lens 7b transfers the part of the transferred images passing through the second mask on the target to be machined one more time.

In many cases of hole drilling for an electronic printed circuit board, a number of patterns to be machined which are slightly different from each other are required. In such a case, a number of fine holograms each having a slightly different pattern to be machined must be manufactured and therefore the cost of manufacturing will go up. On the contrary, the second mask 6b according to the embodiment, which serves to selectively transmit a part of the plural transferred images generated by the hologram 5 to transfer the part to the target 8 to be machined, is easily manufactured and the cost of the second mask is lower, and therefore a machining process with various patterns to be machined can be easily performed at a high efficiency of utilization of light.

Figure 39:
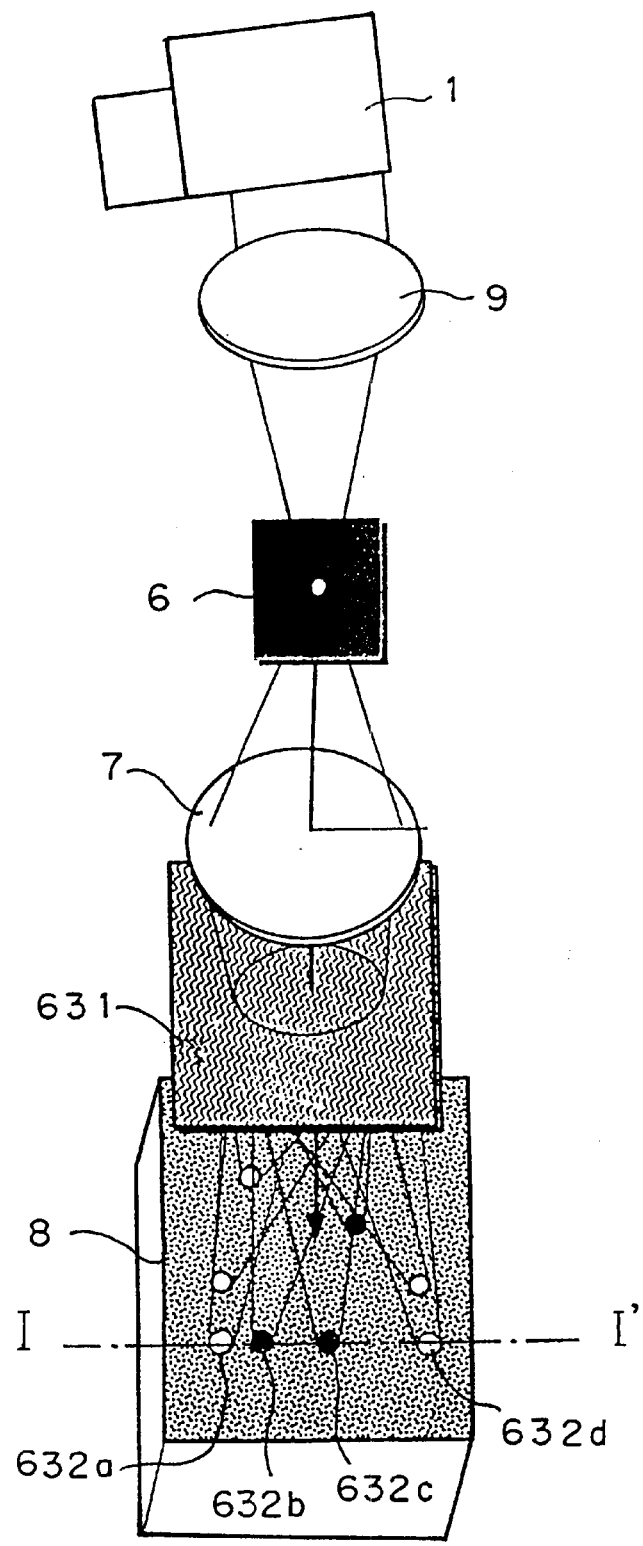
FIG. 39 is a diagrammatic view showing the structure of a laser transfer machining apparatus according to an embodiment of the present invention.

FIG. 39 is a diagrammatic view showing the structure of a laser transfer machining apparatus according to an embodiment of the present invention. In the figure, the same reference numeral as in FIG. 5 denotes the same part or a like part and a reference numeral 631 denotes a hologram having a hologram pattern which is formed such that the light intensities of some of a number of transferred images are different from those of the other images; 632a–632d, transferred images generated by the hologram 631; and 633, a control unit for the laser oscillator.

The description will be directed to an operation of the embodiment. The laser light 10 which is emitted by the laser oscillator 1 is focused and is incident on the mask pattern of the mask 6 by the illuminating lens 9. As previously mentioned, the mask 6 is an element for allowing a component of incident laser light with a beam pattern for machining to pass therethrough. The shaped pattern is expanded or reduced in size by the transferring optical system before it is transferred on the target 8 to be machined and becomes an basic element of the pattern to be machined. The hologram 631, for example in the form of a phase hologram, spatially modulates the incident laser light 10 passing through the mask 6a to form a number of transferred images after the size of the laser beam is changed by the transferring lens 7, so that the reconstructed laser beams are projected on the target 8 to be machined. The plural spatially modulated laser beams are projected on the target 8 to be machined to form the transferred images, respectively.

As shown in FIG. 39, the hologram pattern of the hologram 631 is formed such that the hologram re-creates a number of transferred images, the light intensities of some of which are different from those of the other images. For example, the light intensities of the transferred images 632a and 632d are less than those of the images 632b and 632c which are imaged on the target 8 to be machined as well as the images 623a and 632d. The target 8 to be machined is machined faster as the intensities of the incident light beams are increased. Therefore, according to the embodiment, when the target is successively illuminated with the laser beams until perforating holes emerge at the image positions on the target 8 where the images 632a and 632d are transferred, holes drilled at the image positions where the images 632b and 632c are transferred do not perforate the target. FIG. 40 illustrates a cross-sectional view of the target 8 to be machined in this case and is taken along the line I–I' of FIG. 39. Thus, the hologram according to the embodiment can drill holes having different drilled depths in accordance with the positions of the transferred images on the target.

FIG. 41 shows an example of a machined pattern on the surface machined of the target 8 which is a workpiece in the case of a machining process using this embodiment. The hologram 631 is fabricated such that it reconstructs nine transferred images 634a–634i on the target 8 to be machined and the light intensities of the transferred images 634a,634c, 634e,634g, and 634i are greater than those of the other images 634b,634d,634f and 634h on the target 8 to be machined. In the case, if the target is illuminated with the laser light until perforating holes are drilled at all the positions where the transferred images are projected, the nine perforating holes are made on the target 8 to be machined as shown in FIG. 42. If the illumination by the laser light is stopped when drilled holes perforate the target at the positions where the transferred images 634a,634c, 634e,634g, and 634i are projected, the other drilled holes do not perforate the target. In this machining operation, only 5 perforating holes are made, as shown in FIG. 43. Thus, the laser transfer machining apparatus makes it possible to form different patterns without replacing the hologram, thereby reducing the amount of machining equipment and the time required for machining.

The intensity of the laser light may be changed by the control unit 633 of the laser oscillator by changing an output voltage of a laser exciting circuit, or the like. Alteratively, the laser oscillation frequency may be changed to control the intensity of the laser light.

In the embodiment, instead of the hologram designed such that the light intensities of some of a number of transferred images are different from those of the other transferred images, a mask for attenuating lights can be used as a means for reducing the light intensity of incident laser light. The design of the hologram according to the embodiment provides a high efficiency of utilization of light because a reduction of the light intensity in one transferred image increases the light intensity of the other transferred images and hence the incident light can be utilized efficiently.

Figure 44:
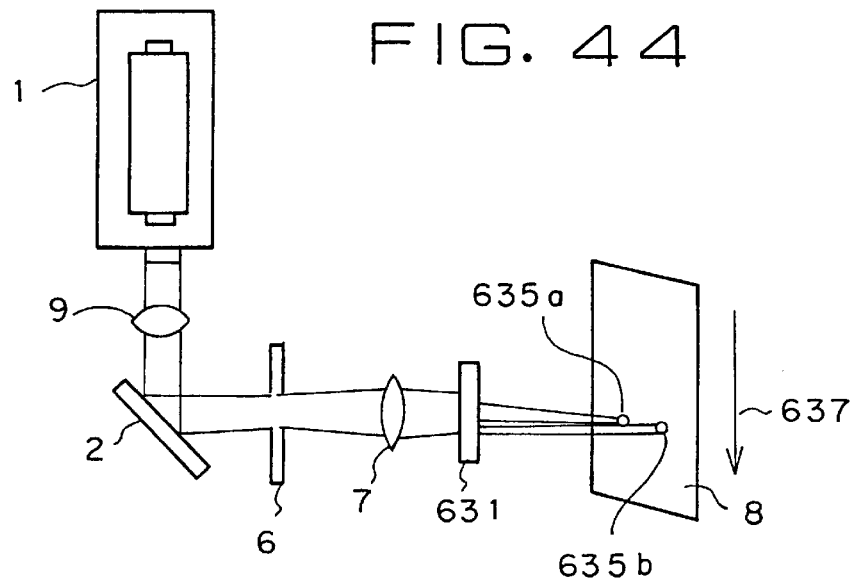
FIG. 44 is a diagrammatic view showing the structure of a laser transfer machining apparatus provided with a moving unit of moving a target according to an embodiment of the present invention.

FIG. 44 is a diagrammatic view showing the structure of a laser transfer machining apparatus according to an embodiment of the present invention. In the figure, the same reference numeral as in FIG. 39 denotes the same part or a like part and reference numerals 635a and 635b denote transferred images generated by the hologram 631.

Figure 45:
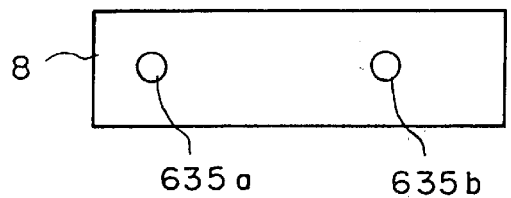
FIG. 45 is a plane view of a target to be machined which is machined by the laser transfer machining apparatus shown in FIG. 44.

The description will be directed to an operation of the embodiment. The hologram pattern of the hologram 631 reconstructs a number of transferred images, the light intensities of some of which are different from those of the other images. For example, the light intensity of the transferred image 635a is greater than that of the image 635b as shown in FIG. 45. When the transferred images are formed on the target 8 to be machined which is a workpiece, the target 8 to be machined is moved by a moving unit (not shown in the figure) for moving the target 8 to be machined. During the movement, the transferred images are maintained by the laser illuminating.

Figure 46:
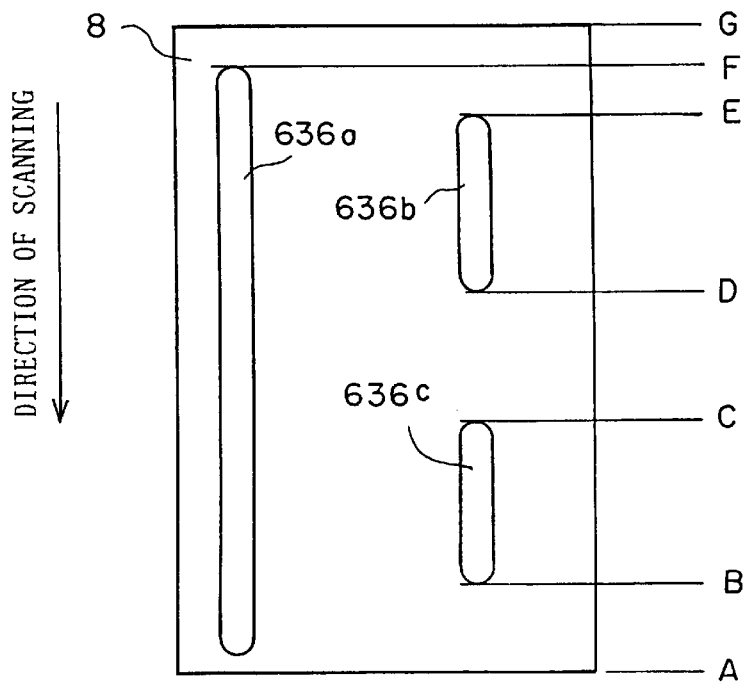
FIG. 46 is a plane view of a target to be machined which is machined by the laser transfer machining apparatus shown in FIG. 44.

An example of a laser machining process of the embodiment is shown in FIG. 46. The transverse positions of the transferred images in FIG. 46 correspond to those of the images in FIG. 45. The target 8 to be machined is translated downward in the figure. Thus, the target 8 is sequentially machined from A region at the most lower side to G region at the most upper side. Of course, the greater the laser light has the intensity, the faster the target is machined. In the example of FIG. 46, when machining the target from A region to B region, the target is illuminated with the laser light having such a intensity that the part of the transferred image 635a in FIG. 45 can be machined and the part of the transferred image 635b cannot be machined. Next, when machining the target from B region to C region, the target is illuminated with the laser light having such a intensity that both parts of the transferred images 635a and 635b in FIG. 45 can be machined, by increasing the intensity of the laser light. Similarly, when machining the target from C region to D region and from E region to G region, the target is illuminated with the laser light having such a intensity that only the part of the transferred images 635a in FIG. 45 can be machined. Furthermore, when machining the target from D region to E region, the target is illuminated with the laser light having such a intensity that both parts of the transferred images 635a and 635b in FIG. 45 can be machined. These operations can produce a pattern as shown in FIG. 46 on the target 8 to be machined. Thus, a non-uniform distribution of the total energy of the incident light to transferred images and a change of the intensity of the incident laser light can provide various patterns to be machined. Furthermore, the amount of machining equipment and the time required for machining can be reduced.

The intensity of the laser light may be changed by the control unit 633 of the laser oscillator by changing an output voltage of a laser exciting circuit, or the like. Alteratively, the laser oscillation frequency may be changed to control the intensity of the laser light.

Figure 47:
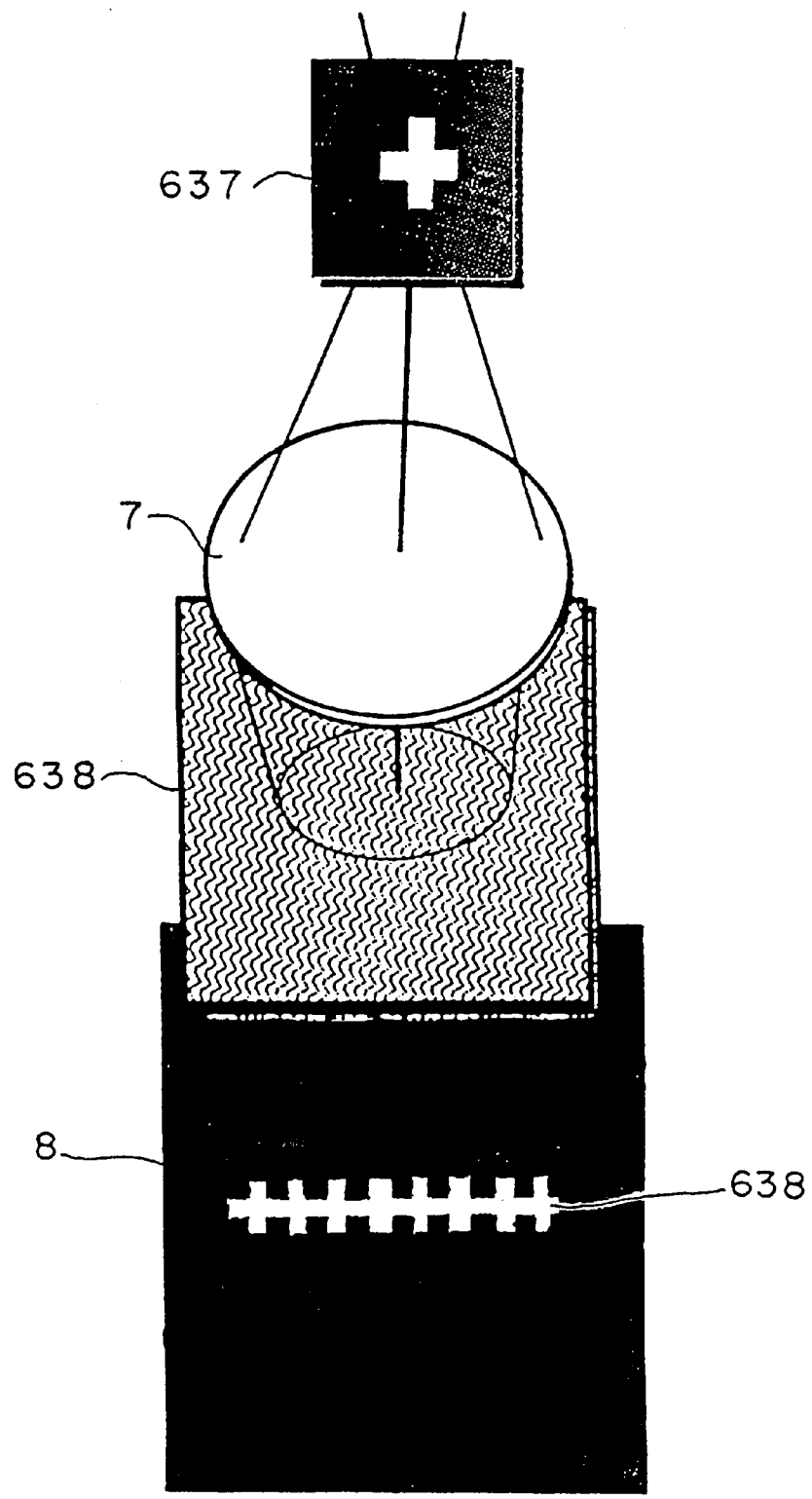
FIG. 47 is a diagrammatic view showing the structure of a laser transfer machining apparatus according to an embodiment of the present invention.

FIG. 47 is a diagrammatic view showing the structure of a laser transfer machining apparatus according to an embodiment of the present invention. In the figure, the same reference numeral as in FIG. 5 denotes the same part or a like part and a reference numeral 637 denotes a mask having a written mask pattern which corresponds to a basic pattern to be transferred which is equal to one pattern of repeated patterns to be machined formed on the target 8; 638, a hologram which is designed such that a plurality of transferred images are imaged in an arrangement that each of the plural transferred images each having a pattern defined by the mask 637 is positioned to overlap or abut on another image. In the embodiment of FIG. 47, the mask 637 has a cross-shaped mask pattern.

The description will be directed to an operation of the embodiment. As seen from the aforementioned embodiments, a cross-shaped pattern, which corresponds to the basic pattern to be machined of the mask 637, is formed on each image position of each transferred image if the hologram 638 is manufactured such that the basic pattern to be machined of the mask 637 at each image position of each image on the target to be machined does not abut another pattern and does not overlap another pattern. On the contrary, the hologram 638 is designed such that the plural transferred images run on a line and adjacent transferred images abut on or overlap each other. Therefore, the repeated patterns of the plural cross-shaped patterns like a scar due to a surgical operation is made as shown in FIG. 47.

Figure 48A:
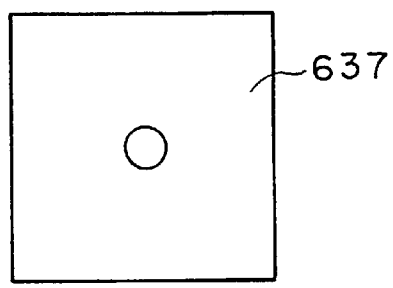
FIG. 48(a) is a plane view of an example of a mask pattern.
Figure 48B:
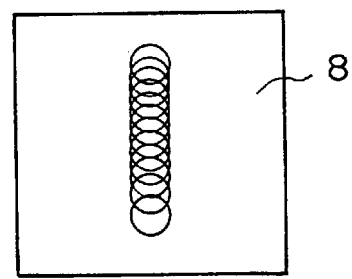
FIG. 48(b) is a plane view of an example of the hologram pattern of a hologram of the laser transfer machining apparatus according to the embodiment of FIG. 47.
Figure 48C:
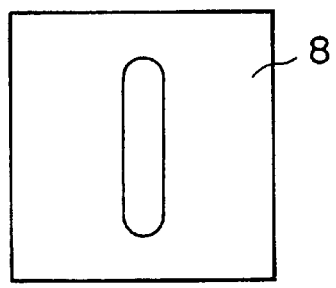
FIG. 48(c) is a plane view of an example of a target to be machined which is machined by using a hologram of the laser transfer machining apparatus according to the embodiment of FIG. 47.

Similarly, an elliptic hole can be drilled as shown in FIG. 48(c) using the mask 637 on which a circular mask pattern is disposed as shown in FIG. 48(a) and the hologram 638 adapted to reconstruct a plurality of transferred images running in a line with each image overlapping the adjacent images as shown in FIG. 48(b).

Figure 49A:
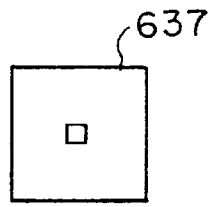
FIG. 49(a) is a plane view of an example of a mask pattern.
Figure 49B:
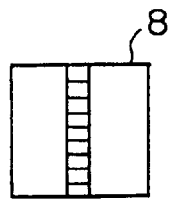
FIG. 49(b) is a plane view of an example of the hologram pattern of a hologram of the laser transfer machining apparatus according to the embodiment of FIG. 47.
Figure 49C:
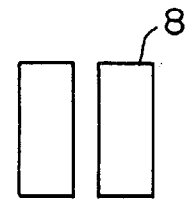
FIG. 49(c) is a plane view of an example of a target to be machined which is machined by using a hologram of the laser transfer machining apparatus according to the embodiment of FIG. 47.

Also, a cutting machining process can be performed as shown in FIG. 49(c) using the mask 637 on which a rectangular mask pattern is disposed as shown in FIG. 49(a) and the hologram 638 adapted to reconstruct a plurality of transferred images running in a line with each image overlapping or abutting on the adjacent images as shown in FIG. 49(b).

Figures 50A, 50B, 50C:
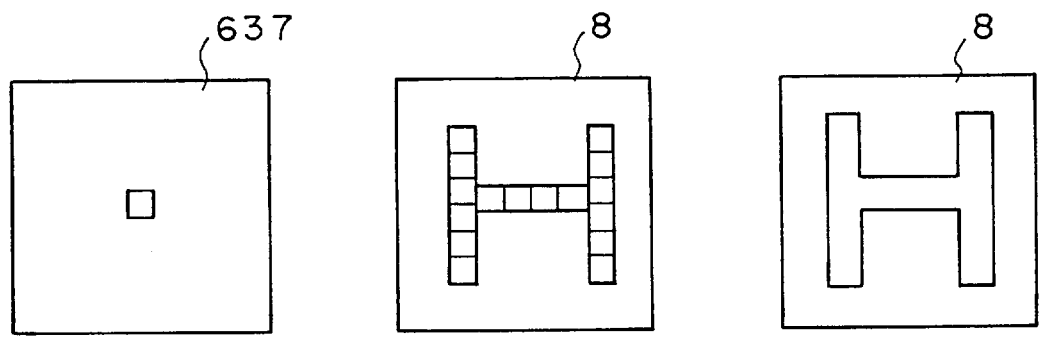
FIG. 50(a) is a plane view of an example of a mask pattern.
FIG. 50(b) is a plane view of an example of the hologram pattern of a hologram of the laser transfer machining apparatus according to the embodiment of FIG. 47.
FIG. 50(c) is a plane view of an example of a target to be machined which is machined by using a hologram of the laser transfer machining apparatus according to the embodiment of FIG. 47.

Furthermore, a H-shaped hole can be drilled as shown in FIG. 50(c) using the mask 637 on which a rectangular mask pattern is disposed as shown in FIG. 50(a) and the hologram 638 adapted to reconstruct a plurality of transferred images running in a H-shaped line with each image abutting on or overlapping the adjacent images as shown in FIG. 50(b).

Figures 51A, 51B, 51C:
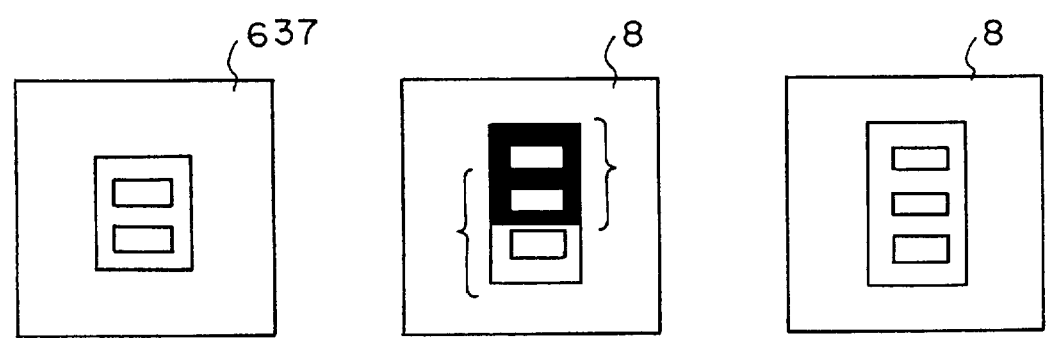
FIG. 51(a) is a plane view of an example of a mask pattern.
FIG. 51(b) is a plane view of an example of the hologram pattern of a hologram of the laser transfer machining apparatus according to the embodiment of FIG. 47.
FIG. 51(c) is a plane view of an example of a target to be machined which is machined by using a hologram of the laser transfer machining apparatus according to the embodiment of FIG. 47.

Similarly, a '目'-shaped hole, the shape of which is different from the mask pattern, can be drilled as shown in FIG. 51(c) using the mask 637 on which the '日'-shaped mask pattern is disposed as shown in FIG. 51(a) and the hologram 638 adapted to reconstruct a plurality of transferred images running in a '目'-shaped pattern with each image overlapping the adjacent image as shown in FIG. 51(b).

Thus, formed are not only copies of the mask pattern defined by the mask but also repeated patterns of copies of the mask pattern of the mask 637 or a pattern different from the mask pattern of the mask 637 by changing the mask pattern of the mask 637 and the image positions of the transferred images generated by the hologram, and combining them. As a result, the hologram provided with such a simple hologram pattern makes it possible to machine a wide area pattern and a complicated pattern on the target.

Figure 52:
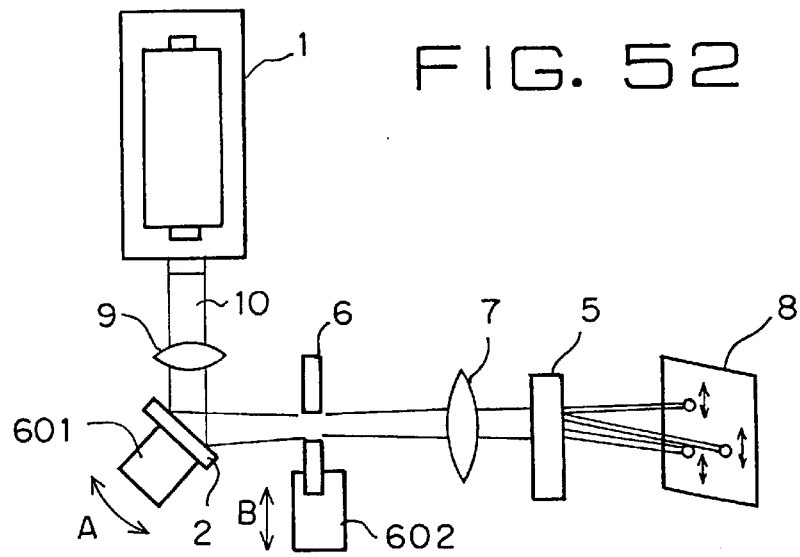
FIG. 52 is a diagrammatic view showing the structure of a laser transfer machining apparatus provided with a deflecting mirror driving unit and a mask driving unit according to an embodiment of the present invention.

FIG. 52 is a diagrammatic view showing the structure of a laser transfer machining apparatus according to an embodiment of the present invention. In the figure, the same reference numeral as in FIG. 5 denotes the same part or a like part and a reference numeral 601 denotes a deflecting mirror driving unit for rotating or translating the deflecting mirror 2 in the direction of the arrow A shown in the figure;

and 602, a mask driving unit for moving the mask 6 in the direction of the arrow B shown in the figure.

The description will be directed to an operation of the embodiment. The laser light 10 which is emitted by the laser oscillator 1 is focused and is incident on the mask pattern of the mask 6 via the illuminating lens 9 and the deflecting mirror 2. As previously mentioned, the mask 6 is an element for allowing a component of incident laser light with a beam pattern for machining to pass therethrough. The shaped pattern is expanded or reduced in size by the transferring lens 7 of the transferring optical system before it is transferred on the target 8 to be machined and becomes an basic element of the pattern to be machined. The hologram 5, for example in the form of a phase hologram, spatially modulates the incident laser light 10 passing through the mask 6 to form a number of transferred images. The plural spatially modulated laser beams are projected on the target 8 to be machined, forming the transferred images respectively.

When the deflecting mirror 2 and the mask 6 are fixed, the laser light 10, which is emitted by the laser oscillator 1, constantly travels on a certain optical path and is constantly incident on the same part of the hologram after passing through the transferring lens 7. As a result, the laser light beams re-created by the hologram are constantly focused on the same portions on the surface to be machined of the target 8 which is a workpiece and hence the same pattern is machined always.

The laser transfer machining apparatus according to the embodiment comprises the mask driving unit 602 for translating the mask 6 to change its position, as shown in FIG. 52. The mask driving unit 602 can change the optical path of the laser light passing through the mask 6 by translating the mask 6 in the direction orthogonal to the optical axis, thereby the image positions of the transferred images on the target 8 to be machined being changed depending upon the change of the optical path of the laser light. In the case that the movable range of the mask is larger than the beam size of the laser light incident on the mask 6, the beam position of the laser beam incident on the mask 6 should be changed in accordance with the change of the position of the mask, too. To this end, the laser transfer machining apparatus according to the embodiment comprises the deflecting mirror driving unit 601. The deflecting mirror driving unit 601 rotates or translates the deflecting mirror 2 in the direction of the arrow A as occasion demands, in order to change the deflecting direction of the laser light passing through the illuminating lens 9 and to change the optical path of the laser light to the hologram 5 and the target 8 to be machined. When the mask 6 is translated by the mask driving unit 602, the deflecting mirror driving unit 601 rotates or translates the deflecting mirror 2 to adjust the optical path of the incident light to the mask 6 in such a way that the laser light enters the mask pattern of the mask 6.

Such a change of the optical path of the incident laser light to the mask can change the positions of parts to be machined of the target without exchanging the optical elements like the mask and the hologram. This results in realizing a laser machining process of various patterns using the same mask and hologram. Thereby the amount of machining equipment and the time required for machining can be reduced.

Figure 53:
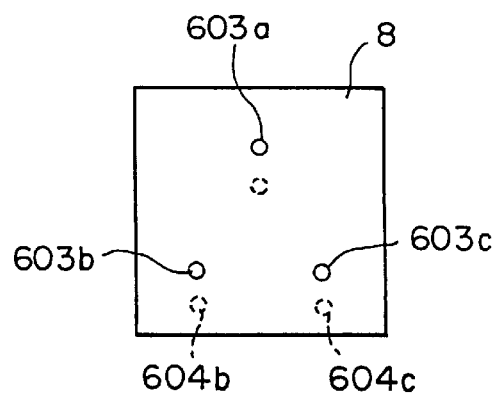
FIG. 53 is a plane view of an example of a target to be machined which is machined by the laser transfer machining apparatus according to the embodiment of FIG. 52.

FIG. 53 illustrates an example of the drilled pattern on the machined surface of the target 8 which is machined by a laser transfer machining apparatus according to an embodiment. When the mask 6 is fixed, holes are drilled at parts, e.g. the three parts where the transferred images 603a,603b and 603c are projected. A translation of the mask 6 by the mask driving unit 602 forms three transferred images 604a, 604b and 604c at positions different from the three positions of the transferred images 603a,603b and 603c and then three holes are drilled in the new three positions.

Figure 54:
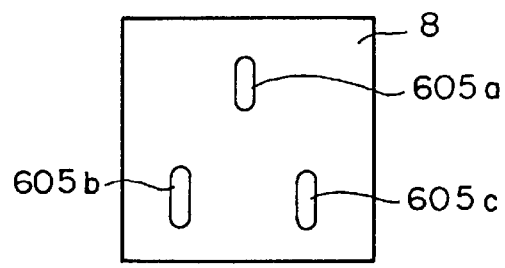
FIG. 54 is a plane view of another example of a target to be machined which is machined by the laser transfer machining apparatus according to the embodiment of FIG. 52.

FIG. 54 illustrates another example of the drilled pattern on the machined surface of the target 8 which is machined by a laser transfer machining apparatus according to an embodiment. When changes of the image positions of the three transferred images on the target 8 to be machined are made continuously by a translation of the mask 6 while the laser light is emitted continuously, three flattened circle shaped holes 605a,605b and 605c are drilled.

In this embodiment, the deflecting mirror 2 is disposed between the illuminating lens 9 and the mask 6. Instead of the arrangement, the deflecting mirror 2 can be arranged between the laser oscillator 1 and the transferring lens 9. In this case the same advantages as mentioned above are provided. Furthermore, instead of the deflecting mirror 2 an acoustic optical deflector (AOD element) can be used to change the optical path of the laser light. The AOD can provide the same advantages as mentioned above.

Figure 55:
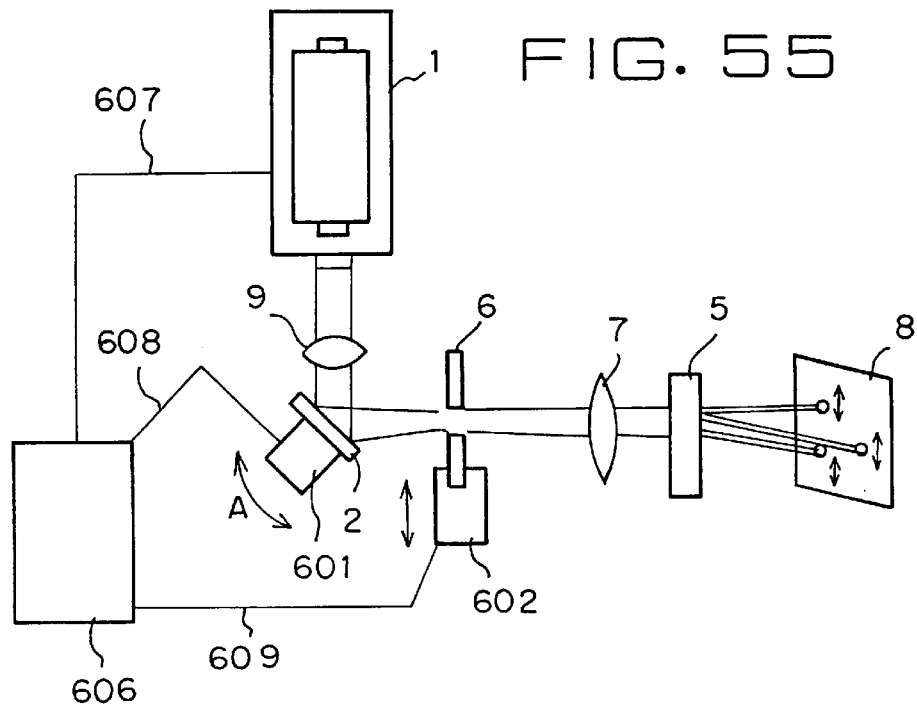
FIG. 55 is a diagrammatic view showing the structure of a laser transfer machining apparatus provided with a deflecting mirror driving unit, a mask driving unit and a control unit for controlling the driving units according to an embodiment of the present invention.

FIG. 55 is a diagrammatic view showing the structure of a laser transfer machining apparatus according to an embodiment of the present invention. In the figure, the same reference numeral as in FIG. 52 denotes the same part or a like part and a reference numeral 606 denotes a control unit for controlling the deflecting mirror driving unit 601, the mask driving unit 602 and the laser oscillator 1; 607, a signal line for electrically connecting the control unit 606 with the laser oscillator 1; 608, a signal line for electrically connecting the control unit 606 with the deflecting mirror driving unit 601; and 609, a signal line for electrically connecting the control unit 606 with the mask driving unit 602. This embodiment is a preferable variant of the embodiment of FIG. 52.

According to the laser transfer machining apparatus shown in FIG. 55, the deflecting mirror driving unit 601, the mask driving unit 602 and the laser oscillator 1 are controlled by the control unit 606 to obtain a desired pattern to be drilled on the target 8 to be machined. The machining apparatus can control the oscillating action of the laser oscillator 1 while changing the position of the mask and the incident direction of the laser light. Therefore, the laser transfer machining apparatus is able to draw an exact line between a machining operation of circle-shaped patterns in FIG. 53 and a machining operation of line-shaped patterns in FIG. 54.

Figure 56:
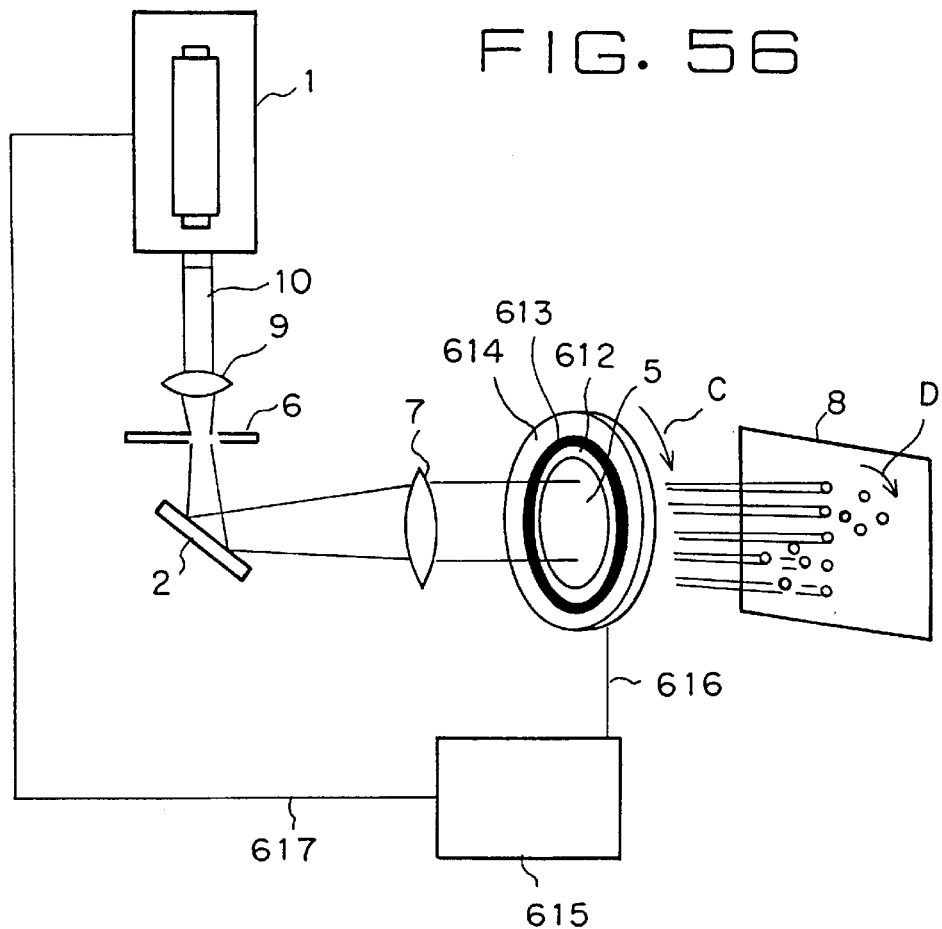
FIG. 56 is a diagrammatic view showing the structure of a laser transfer machining apparatus provided with a rotary driving mechanism for rotating a hologram according to an embodiment of the present invention.

FIG. 56 is a diagrammatic view showing the structure of a laser transfer machining apparatus according to an embodiment of the present invention. In the figure, the same reference numeral as in FIG. 5 denotes the same part or a like part and a reference numeral 612 denotes a holder for supporting the hologram 5; 613, a rotary driving unit for rotating the holder 612 with the hologram 5; 614, a circumferential holder of the rotary driving unit 613; 615, a control unit for controlling the rotary driving unit 613 and the laser oscillator 1; 617, a signal line for electrically connecting the control unit 615 with the laser oscillator 1; and 616, a signal line for electrically connecting the control unit 615 with the rotary driving unit 613.

In operation, when the hologram 5 is fixed and the optical path of the laser light is maintained constantly, the laser light 1, which is emitted by the laser oscillator 1, always travels on the optical path and the laser light passing through the transferring lens 7 is incident on to the same parts of the hologram 5 constantly. Thereby laser beams are focused on the same portions of a surface of the target 8 to be machined and the same pattern is always obtained.

Figure 57:
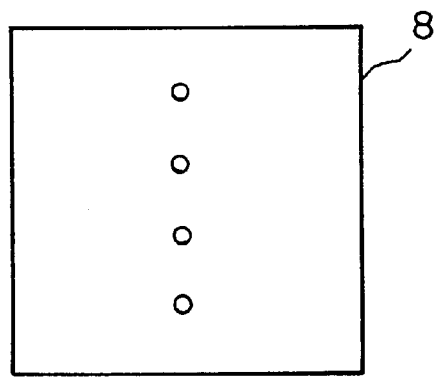
FIG. 57 is a plane view of an example of a target to be machined which is machined by the laser transfer machining apparatus according to the embodiment of FIG. 56 when a hologram is stopped.
Figure 58:
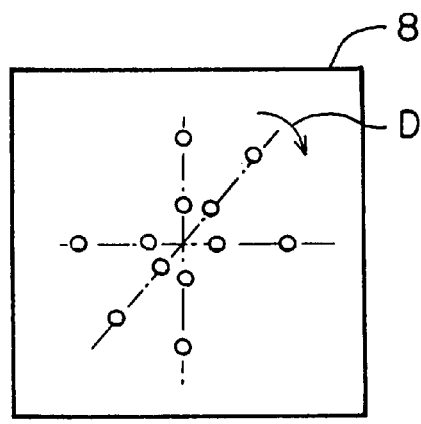
FIG. 58 is a plane view of an example of a target to be machined which is machined by the laser transfer machining apparatus according to the embodiment of FIG. 56 when a laser oscillator does not act while a hologram is rotating.
Figure 59:
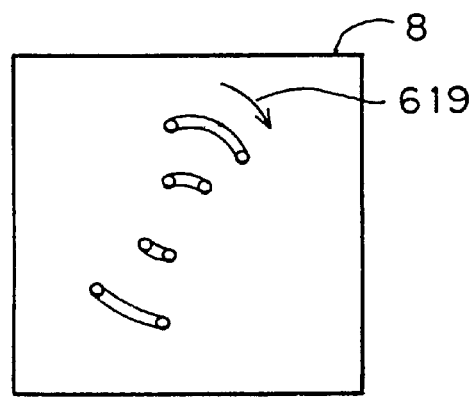
FIG. 59 is a plane view of an example of a target to be machined which is machined by the laser transfer machining apparatus according to the embodiment of FIG. 56 when a laser oscillator oscillates while a hologram is rotating.

The laser transfer machining apparatus according to the embodiment comprises the rotary driving unit 613 for rotating the hologram 5 as shown in FIG. 56. The rotary driving unit 613 is disposed between the holder 612 for supporting the hologram 5 and the holder 612 is adapted to turn against the holder 614. When the hologram 5 is rotated, the image positions of plural transferred images on the target 8 to be machined rotate on the surface to be machined of the target. For example, in the case that the hologram 5 is fabricated so as to re-create images to be transferred at four positions arranged as shown in FIG. 57, a rotation of the hologram 5 in the direction of the arrow C in FIG. 56 causes a rotation of the transferred images on the surface of the target 8 to be machined in the direction of the arrow D. During the rotation, if the laser oscillator 1 does not oscillate under the control of the control unit 615 circle-shaped patterns running on the circumference of a circle are drilled as shown in FIG. 58. Similarly, an arc-shaped linear pattern is drilled as shown in FIG. 59 if the hologram 5 is rotated with the laser oscillator 1 being maintained to oscillate.

Such a rotation of the hologram makes it possible to change the positions of the parts to be machined of the target without exchanging the optical elements such as the mask, the hologram or the like. Thereby, a laser machining process of various patterns can be realized using the same mask and hologram. Furthermore, the amount of machining equipment and the time required for machining can be reduced.

The rotary driving unit 613 according to the embodiment is not limited to the structure in which the unit is disposed between the two holders. Another rotating mechanism for rotating the holder by means of a motor can be used. In this case, the same advantages as mentioned above are provided.

Since the laser machining apparatus according to the embodiment comprises the control unit 615, the hologram 5 and the laser oscillator 1 can be controlled simultaneously. For example, the laser oscillator 1 is stopped during a rotation of the hologram 5. The laser transfer machining apparatus can control the oscillating action of the laser oscillator 1 while changing the image positions of the transferred images generated by the hologram 5. Therefore, the laser transfer machining apparatus is able to draw an exact line between a machining operation of circle-shaped patterns in FIG. 58 and a machining operation of line-shaped patterns in FIG. 59.

Figure 60:
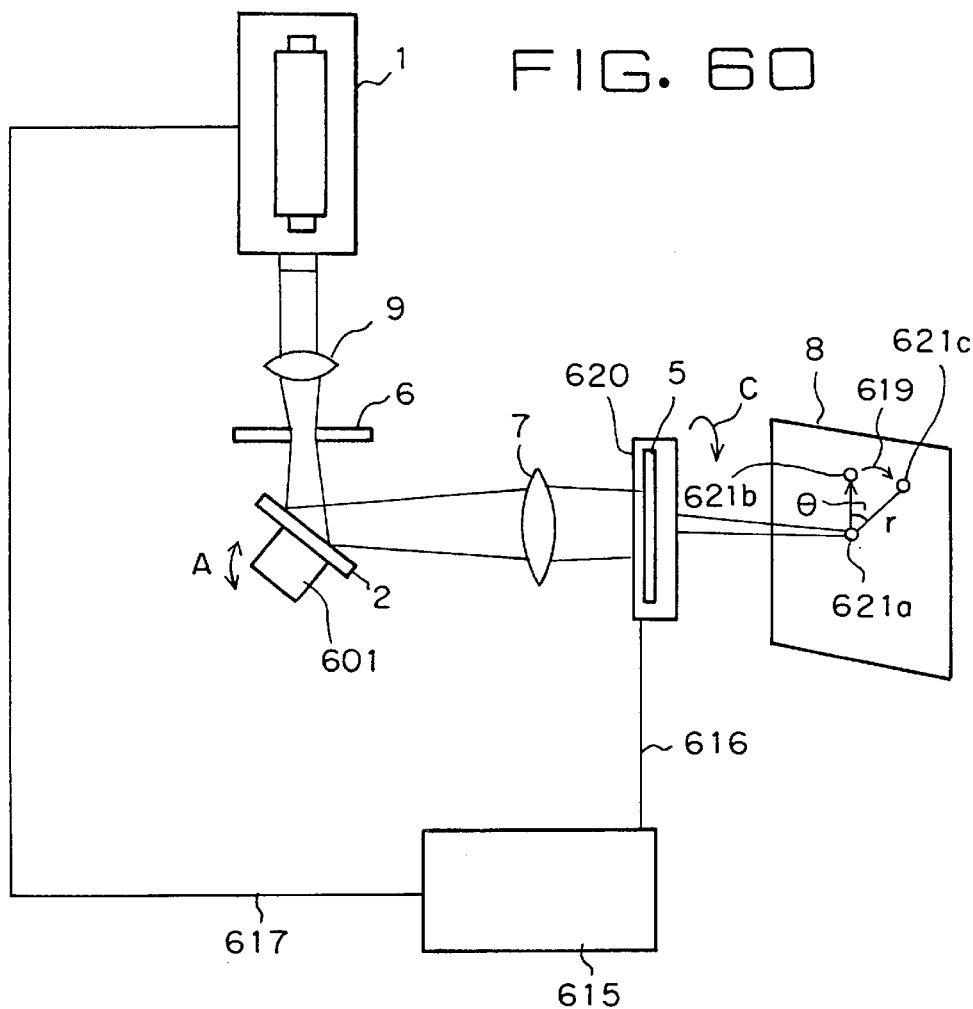
FIG. 60 is a diagrammatic view showing the structure of a laser transfer machining apparatus provided with a rotary driving mechanism for rotating a hologram and a deflecting mirror driving unit according to an embodiment of the present invention.

FIG. 60 is a diagrammatic view showing the structure of a laser transfer machining apparatus according to an embodiment of the present invention. In the figure, the same reference numeral as in FIG. 5 denotes the same part or a like part and a reference numeral 601 denotes a deflecting mirror driving unit for rotating or translating the deflecting mirror 2 in the direction of the arrow A in the figure; 620, a rotary driving unit for rotating the hologram 5 in the direction of the arrow C in the figure; 615, a control unit for controlling the rotary driving unit 620 and the laser oscillator 1; 617, a signal line for electrically connecting the control unit 615 with the laser oscillator 1; and 616, a signal line for electrically connecting the control unit 615 with the rotary driving unit 620.

In operation, when the deflecting mirror 2 and the hologram 5 are fixed, the laser light 1, which is emitted by the laser oscillator 1, always travels on the optical path and the laser light passing through the transferring lens 7 is incident on the same parts of the hologram 5 constantly. Thereby laser beams are focused on the same portions of a surface of the target 8 to be machined and the same pattern is always obtained.

The laser transfer machining apparatus according to the embodiment comprises the rotary driving unit 620 for rotating the hologram and the deflecting mirror driving unit 601 as shown in FIG. 60. The rotary driving unit 620 is provided with the same structure as the aforementioned embodiment shown in FIG. 56 to rotate the hologram 5, thereby rotating the positions of plural transferred images formed on the target 8 to be machined. Furthermore, when the deflecting mirror 2 is translated by the deflecting mirror driving unit 601, the image positions of the plural transferred images formed on the surface to be machined of the target 8 varies with the translation of the deflecting mirror. The combination of the two movements can move the transferred images formed on the surface to be machined of the target 8 to other arbitrary positions on the surface of the target. In the case that the hologram 5 is adapted to re-create an image on the image position 621$a$ on the surface to be machined as shown in FIG. 60, the image is translated to the image position 621$b$, which is apart from the original image position by a distance r, by changing the incident position of the illuminating laser light incident on the hologram 5 to translate the deflecting mirror 2. Furthermore, a rotation of the hologram 5 rotates the image about the origin by an angle θ and finally the image is moved to the image position 621$c$. Therefore, transferred images can be moved in an arbitrary direction (r, θ) on the surface to be machined of the target by choosing a distance r and an angle θ properly.

Such a change of the incident position of the laser light incident on the hologram makes it possible to change the positions of the parts to be machined of the target without exchanging the optical elements like the mask, the hologram or the like. Thereby, a laser machining process of drilling various patterns can be realized using the same mask and hologram. Furthermore, the amount of machining equipment and the time required for machining can be reduced.

In the embodiment, instead of the means for moving the deflecting mirror to change the image positions of transferred images by a distance r, a mechanism for translating the mask 6, or the like can be used. In this case, the same advantages as mentioned above can be attained.

Figure 61:
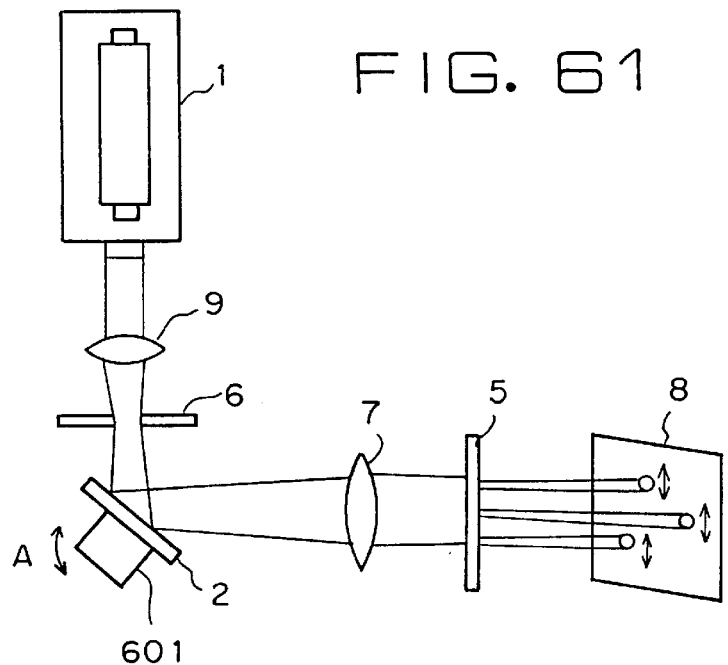
FIG. 61 is a diagrammatic view showing the structure of a laser transfer machining apparatus provided with a deflecting mirror driving unit according to an embodiment of the present invention.

FIG. 61 is a diagrammatic view showing the structure of a laser transfer machining apparatus according to an embodiment of the present invention. In the figure, the same reference numeral as in FIG. 5 denotes the same part or a like part and a reference numeral 601 denotes a deflecting mirror driving unit for rotating or translating the deflecting mirror 2 in the direction of the arrow A in the figure.

In operation, when the deflecting mirror 2 is fixed, the laser light 10, which is emitted by the laser oscillator 1, always travels on the optical path and the laser light passing through the transferring lens 7 is incident on the same parts of the hologram 5 constantly. Thereby laser beams are focused on the same portions of a surface of the target 8 to be machined and the same pattern is always obtained.

The laser transfer machining apparatus according to the embodiment comprises the deflecting mirror driving unit 601 for changing the position of the hologram 5 which is illuminated by the laser light, as shown in FIG. 61. The deflecting mirror 2 is disposed between the mask 6 and the transferring lens 7. The deflecting mirror driving unit 601 rotates or translates the deflecting mirror 2 in the direction of the arrow A as occasion demands to change the deflecting direction of the laser light passing through the illuminating lens 9 and to change the optical path of the laser light incident on the hologram 5 and the target 8 to be machined. As the position of the deflecting mirror 2 is changed by the deflecting mirror driving unit 601, the image positions of transferred images on the surface to be machined of the target 8 are changed. A variation of the position of the deflecting mirror can move the transferred images on the surface of the target 8 to be machined to other positions on the target to drill holes or the like at the new positions without exchanging the hologram 5. The laser transfer machining apparatus without a means for translating the mask 6 can provide a number of drilled circle-shaped pattern and a number of drilled line-shaped patterns as shown in FIGS. 53 and 54.

Such a change of the position of the hologram which is illuminated by the laser light makes it possible to change the positions of the parts to be machined on the target without exchanging the optical elements like the mask, the hologram or the like. This results in realizing a laser machining process of various patterns using the same mask and hologram. Thereby the amount of machining equipment and the time required for machining can be reduced. Furthermore, instead of the deflecting mirror 2 an acoustic optical deflector (AOD element) can be used to change the optical path of the laser light. The AOD can provide the same advantages as mentioned above.

Figure 62:
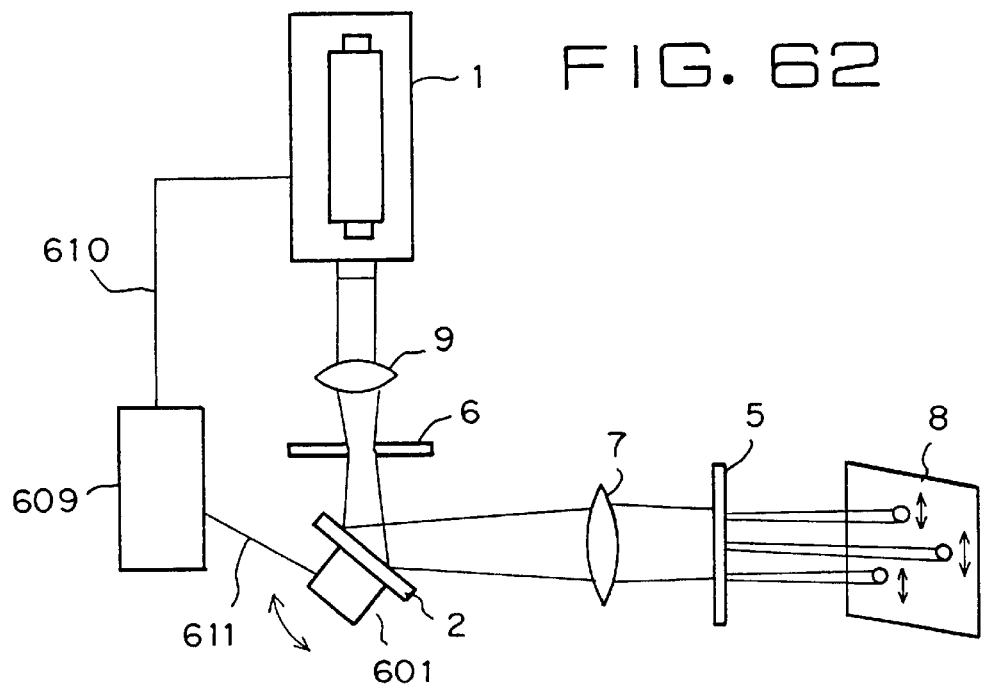
FIG. 62 is a diagrammatic view showing the structure of a laser transfer machining apparatus provided with a deflecting mirror driving unit and a control unit for controlling the driving unit and a laser oscillator according to an embodiment of the present invention.

FIG. 62 is a diagrammatic view showing the structure of a laser transfer machining apparatus according to an embodiment of the present invention. In the figure, the same reference numeral as in FIG. 61 denotes the same part or a like part and a reference numeral 609 denotes a control unit for controlling the deflecting mirror driving unit 601 and the laser oscillator 1; 610, a signal line for electrically connecting the control unit 609 with the laser oscillator 1; and 611, a signal line for electrically connecting the control unit 609 with the deflecting mirror driving unit 601. This embodiment is a preferable variant of the embodiment of FIG. 61.

According to the structure of FIG. 62, the deflecting mirror driving unit 601 and the laser oscillator 1 are controlled by the control unit 609 to obtain a desired pattern drilled on the target 8 to be machined. The apparatus can control the oscillating action of the laser oscillator 1 while changing the position of the incident laser light on the hologram. Therefore, the laser transfer machining apparatus is able to draw an exact line between a machining operation of circle-shaped patterns in FIG. 53 and a machining operation of line-shaped patterns in FIG. 54.

Figure 63:
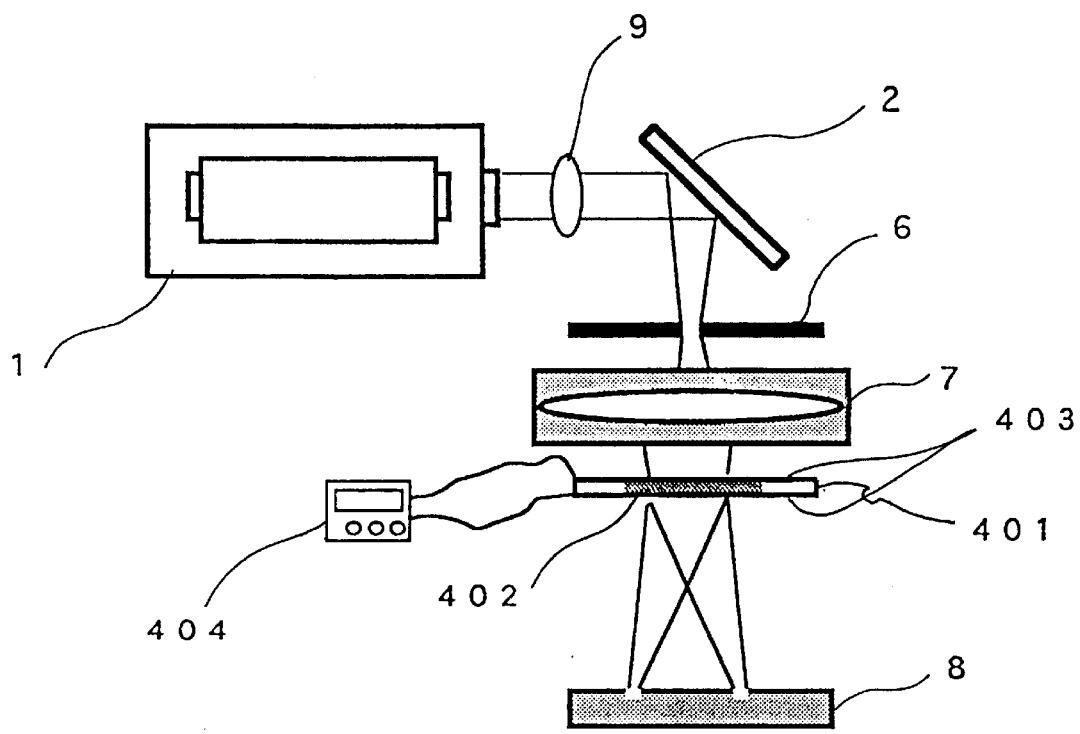
FIG. 63 is a diagrammatic view showing the structure of a laser transfer machining apparatus provided with a phase hologram using a material the index of refraction of which varies according to voltage or magnetism according to an embodiment of the present invention.
Figure 64:
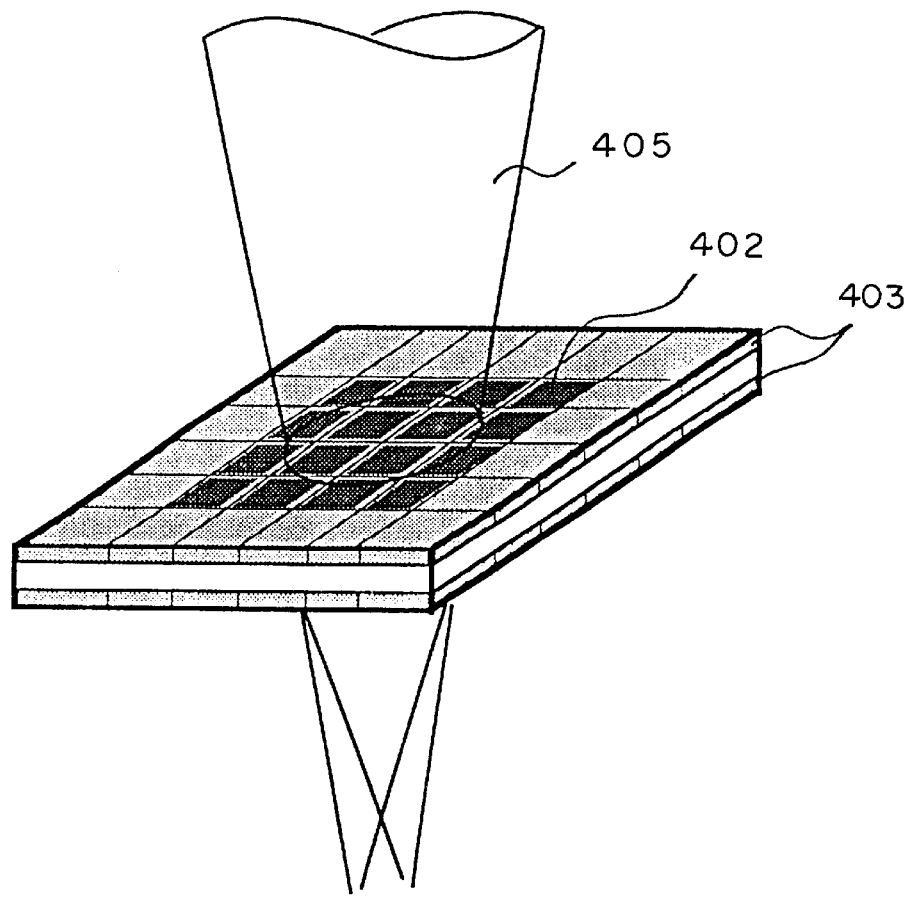
FIG. 64 is a perspective view of the phase hologram of FIG. 63.

FIG. 63 is a diagrammatic view showing the structure of a laser transfer machining apparatus according to an embodiment of the present invention. In the figure, the same reference numeral as in FIG. 5 denotes the same part or a like part and a reference numeral 401 denotes a phase hologram using a material the index of refraction of which varies according to voltage or magnetism, e.g. a liquid crystal; 402, a material the index of refraction of which varies according to voltage or magnetism, e.g. a liquid crystal; 403, an electrode for applying a voltage across the material 402 to cause a change of the index of refraction; and 404, a control power supply for supplying a voltage or a magnetic field to the material. FIG. 64 is a perspective view of the phase hologram of the embodiment.

Figure 7:
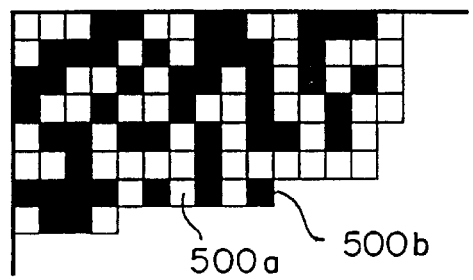
FIGS. 7(a) to 7(c) are views of the phase distribution patterns of phase holograms according to embodiments of the present invention.
Figure 7:
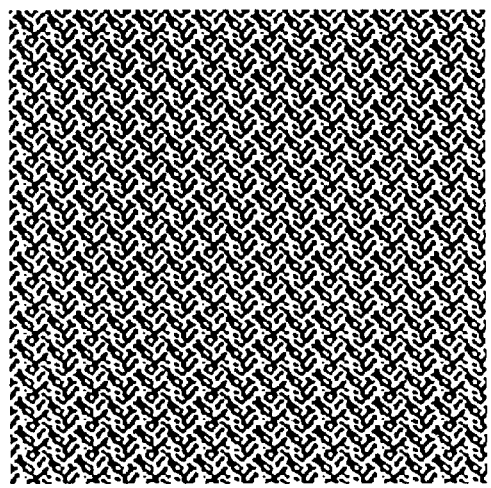
Figure 7:
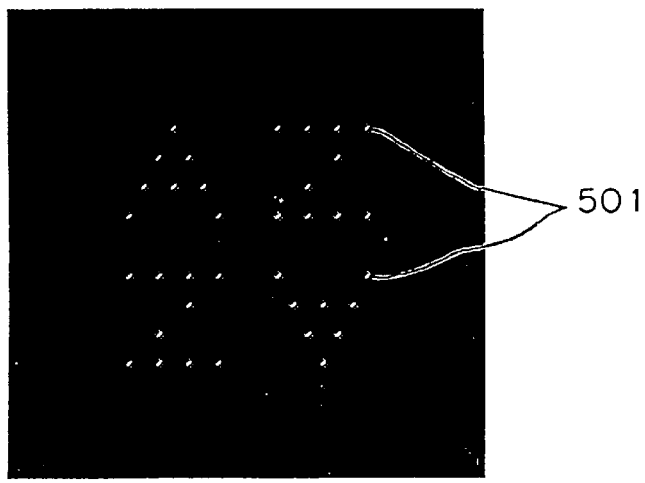

As previously mentioned in the embodiment of FIG. 7, there are several types of the phase hologram 5 such as a hologram in which a phase shift film is attached on the substrate made of a quartz or the like, a hologram in which a substrate made of a quartz or the like is etched and etching recesses are formed, and a hologram in which index of refraction changing portions are formed on a substrate made of a quartz or the like. The hologram, in which its substrate such as a quartz has been machined, provides a laser light passing through the phase hologram with phase shifts. A pattern to be drilled on the target is defined by the amount of the phase shifts generated. That is, one hologram generates one fixed pattern to be drilled. In the case of forming various patterns, plural phase holograms must be prepared. The exchange of the plural phase holograms requires much time.

The description will be directed to an operation of the embodiment. The phase hologram 401 according to the embodiment comprises a laser transparent portion including the liquid crystal 402, as shown in FIGS. 63 and 60. The electrodes 403 are disposed to apply voltages to parts of the liquid crystal optionally and independently. These electrodes 403 are connected to the control power supply 404. Arbitrary voltages are applied to the liquid crystal via the electrodes. Applying a voltage to the liquid crystal 402 causes a change of a physical characteristic of the liquid crystal 402 depending upon the voltage. Thereby, the index of refraction of the crystal varies for the laser light 405. Therefore, the optical path distance of the laser light 405 upon passing through the liquid crystal 402 varies. Applying different voltages to parts of the liquid crystal 402 causes path differences among optical path distances of components of the laser light travelling in the parts of the liquid crystal 402. When the laser light 405 emerges from the liquid crystal 402, the laser light 405 is partially phase-shifted. The phase hologram 401 can re-create an arbitrary pattern because it can change the image positions of images formed in a far field by applying proper voltages across the liquid crystal 402 to provide the laser light 405 with phase shifts. Therefore, it is not necessary to fabricate a plurality of phase holograms in accordance with various patterns or various illuminated spots. Furthermore, since no replacement of those phase holograms is required and an arbitrary pattern to be transferred is formed at a high speed, the cost required for the fabrication and the working process of the replacement can be reduced.

Figure 65:
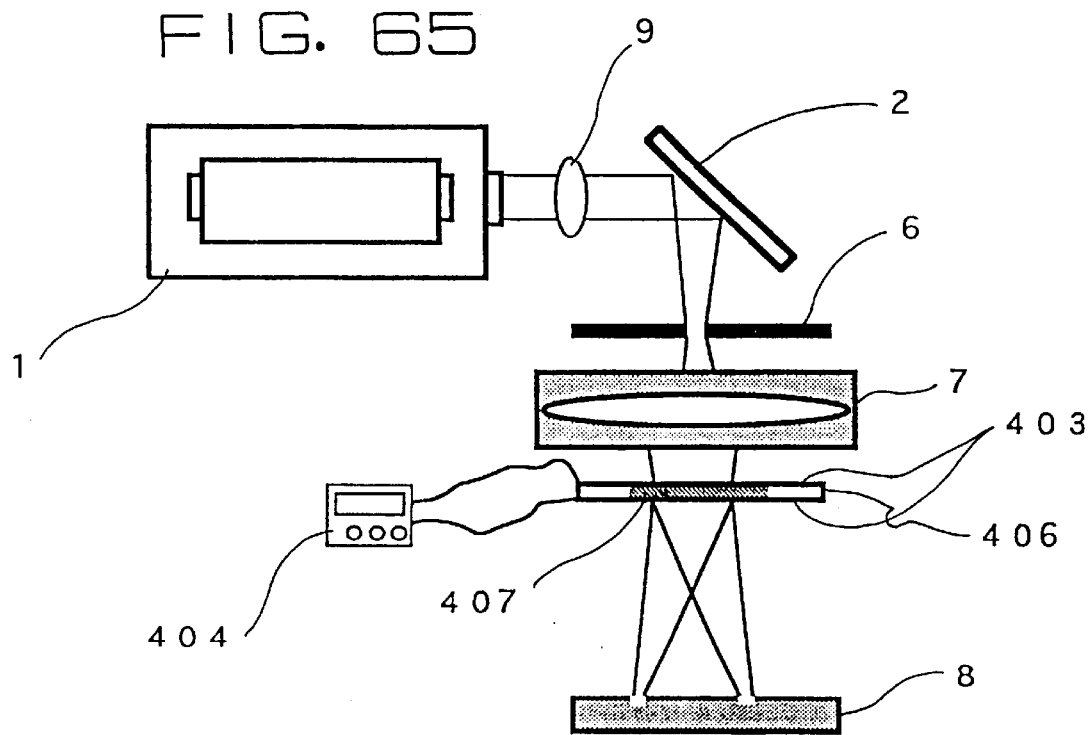
FIG. 65 is a diagrammatic view showing the structure of a laser transfer machining apparatus provided with a phase hologram using a PLZT according to an embodiment of the present invention.

FIG. 65 is a diagrammatic view showing the structure of a laser transfer machining apparatus according to an embodiment of the present invention. In the figure, the same reference numeral as in FIG. 5 denotes the same part or a like part and a reference numeral 406 denotes a phase hologram using a PLZT (plumbum-lanthanum-zirconium-titanium oxide); 407, a PLZT; 403, an electrode for applying a voltage across the PLZT to cause a change of the index of refraction in the PLZT; and 404, a control power supply for supplying the electrodes 403 of the PLZT with an arbitrary voltage. FIG. 66 is a perspective view of the phase hologram of the embodiment.

The description will be directed to an operation of the embodiment. The phase hologram 406 according to the embodiment comprises a laser transparent portion including the PLZT 407 instead of the liquid crystal of the aforementioned embodiment shown in FIG. 63, as shown in FIGS. 65 and 62. The electrodes 403 are disposed to apply voltages to parts of the PLZT optionally and independently. These electrodes 403 are connected to the control power supply 404. Arbitrary voltages are applied to the PLZT via the electrodes. Applying voltages to the PLZT 407 causes a change of a physical characteristic of the PLZT 407 depending upon the voltages. Thereby, the index of refraction of the PLZT varies for the laser light 405. Therefore the optical path distance of the laser light 405 upon passing through the PLZT 407 varies. Applying different voltages to parts of the PLZT 407 causes path differences among optical path distances of components of the laser light travelling in the parts of the PLZT 407. When the laser light 405 emerges from the PLZT 407, the laser light 405 is partially phase-shifted. The phase hologram 401 can re-create an arbitrary pattern because it can change the image positions of images formed in a far field by applying a proper voltage across the PLZT 407 to provide the laser light 405 with phase shifts. Therefore, it is not necessary to fabricate a plurality of phase holograms in accordance with various patterns or various illuminated spots. Furthermore, since no replacement of those phase holograms is required and an arbitrary pattern to be transferred is formed at a high speed, the cost required for the fabrication and the working processes of the replacement can be reduced.

In addition, the PLZT 407 functions as a memory. Once voltages are applied to the PLZT 407 via the electrodes 403 by the control power supply 409, the indices of refraction of the PLZT are maintained if the control power supply is stopped. Therefore, a power for keeping the state of the PLZT is not necessary after the PLZT 407 memorize its own state. The amount of the consumption of electric power by the phase hologram can be reduced.

Figure 68:
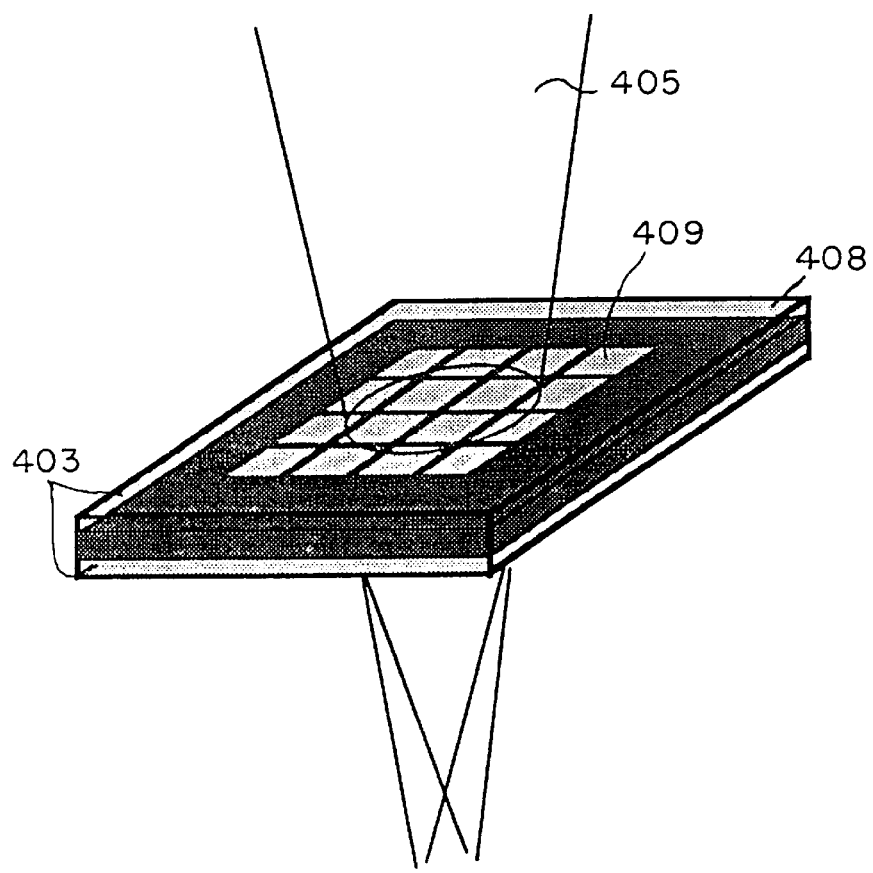
FIG. 68 is a perspective view of the phase hologram of FIG. 67.

FIG. 67 is a diagrammatic view showing the structure of a laser transfer machining apparatus according to an embodiment of the present invention. In the figure, the same reference numeral as in FIG. 5 denotes the same part or a like part and a reference numeral 408 denotes a phase hologram using a micro-discharge tube; 409, a micro-discharge tube; 403, an electrode for applying a voltage across the micro-discharge tube; and 404, a control power supply for supplying the electrodes 403 of the micro-discharge tube with an arbitrary voltage. FIG. 68 is a perspective view of the phase hologram 408 of the embodiment.

Instead of the liquid crystal or PLZT according to the aforementioned embodiments, the phase hologram employs a plasma generated in each micro-discharge tube to change the index of refraction of each tube. In the phase hologram 408, a plurality of micro-discharge tubes 409 are arranged in the form of an array in a portion through which the laser light 405 is transmitted. Each micro-discharge tube 409 is provided with a set of electrodes 403 for applying a voltage to each tube independently. These electrodes 403 are connected with the control power supply 404 to apply an arbitrary voltage across each tube via the electrodes.

The description will be directed to an operation of the embodiment. The phase hologram 408 according to the embodiment comprises a portion, through which the laser light is transmitted, having the plural micro-discharge tubes 409 arranged as shown in FIGS. 67 and 64. Applying a voltage to each micro-discharge tube 409 causes an electric breakdown of a gas in each micro-discharge tube 409 and hence a discharge in the tube. Once one micro-discharge tube is discharged, the electron density of the gas is increased. Therefore, when the laser light is transmitted in the micro-discharge tube which is discharging, the laser light travels an optical path distance depending on the index of refraction determined by a ratio between the electron density of the part through which the laser light is transmitted and the frequency of the laser light. A variance of the voltage applied across each micro-discharge tube 409 causes a discharge with a different electron density in each micro-discharge tube 409. This results in varying the index of refraction of each tube and hence providing the laser light 10 passing through each micro-discharge tube 409 with a phase difference. Thus, the phase hologram 408 using the micro-discharge tubes can provide the same advantages as the embodiments of FIGS. 63 and 65 do.

Generally, in the case of machining a target to be machined made of a material by illuminating the material by laser light, in order to perform the machining operation efficiently it is necessary to use a laser light which is well absorbed by the material. In the aforementioned embodiments of FIGS. 63 and 65, since the hologram utilizes a liquid crystal or a PLZT, the hologram shows a specific characteristic of the liquid crystal or the PLZT. When fabricating such a hologram, a material which is transparent to the laser light used must be chosen to constitute the liquid crystal or the PLZT. Therefore, since a type of available laser light is limited in view of the requirement for the material of the hologram, a laser which is suitable for the target to be machined is not always selected. In contrast, the discharge in the gas of each micro-discharge tube serves as a means for providing the incident light in this embodiment with a phase difference. Therefore, the phase hologram can employ a gas having a high transmissibility for a laser light which is the most suitable one for the target to be machined. In particular, for an ultraviolet laser such as an eximer laser which limits a material through which the laser light emitted by the laser is transmitted, a noble gas having a high transmissibility for the ultraviolet light is used for the tube. This results in resolving the problem mentioned above of said embodiments using a liquid crystal or a PLZT.

Figure 69:
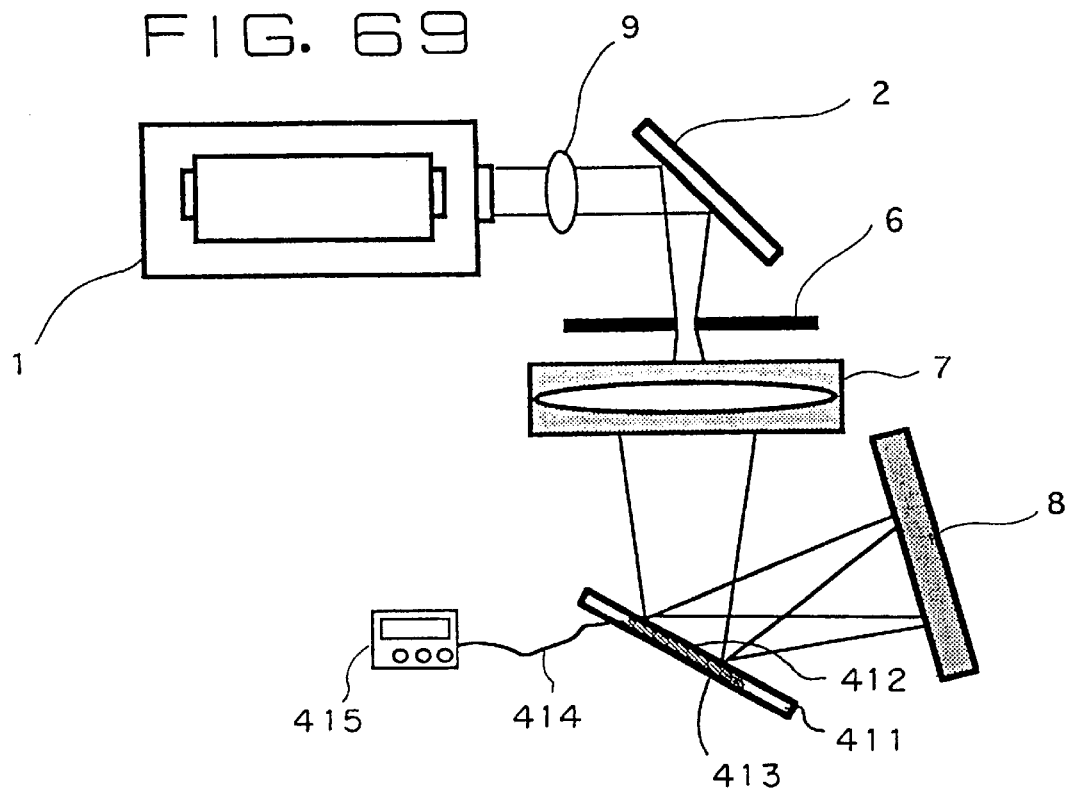
FIG. 69 is a diagrammatic view showing the structure of a laser transfer machining apparatus provided with a reflecting type phase hologram using a mechanism a partial width of which varies in response to a signal applied thereto from outside according to an embodiment of the present invention.

FIG. 69 is a diagrammatic view showing the structure of a laser transfer machining apparatus according to an embodiment of the present invention. In the figure, the same reference numeral as in FIG. 5 denotes the same part or a like part and a reference numeral 411 denotes a reflecting type phase hologram using a mechanism a partial width of which varies in response to a signal applied thereto from outside, e.g. a piezoelectronic element; 412, a laser light reflecting surface of the reflecting type phase hologram 411; 413, a mechanism disposed on the surface opposite to the reflecting surface 412, a partial width being changed in response to a signal applied thereto from outside, e.g. a piezoelectronic element; and 414, a lead line for supplying each mechanism a partial width of which varies in response to a signal applied thereto from outside, e.g. a piezoelectronic element with a voltage to cause a change of the width; and 415, a control power supply for supplying each mechanism a partial width of which varies in response to a signal applied thereto from outside, e.g. a piezoelectronic element with a voltage. FIGS. 70(*a*) and 70(*b*) are schematic views each showing the phase hologram 411 of the embodiment and a reference numeral 416 denotes a substrate for supporting the mechanisms a partial width of which varies in response to a signal applied thereto from outside, e.g. piezoelectronic elements, and the reflecting surface.

As previously mentioned, the phase hologram provides a laser light passing through the hologram with phase shifts. A pattern to be drilled on the target is defined by the amount of the phase shifts generated. That is, one hologram generates one fixed pattern to be drilled. In the case of forming various patterns, plural phase holograms must be prepared. The replacement of the plural phase holograms requires much time.

In operation, the laser light passing through the transferring lens 7 is incident on the reflecting type phase hologram 411 and is spatially modulated to form a plurality of images transferred by the phase hologram 411. The plural spatially modulated laser beams are projected on the target 8 to be machined to form the transferred images, respectively.

The laser light reflecting surface of the phase hologram 411 according to the embodiment is divided into at least two segments 412, as shown in FIGS. 70(*a*) and 70(*b*). In each segment 412 of the reflecting surface 412, an independent piezoelectronic element 413 is disposed on the opposite side of the reflecting surface and the piezoelectronic element 413 is connected to the lead line 414 for supplying the piezoelectronis element with a voltage. The lead lines 414 are connected with the control power supply 415 to provide each piezoelectronic element optionally and independently with a voltage. When the laser light is incident on the reflecting surface 412 and then is reflected by the reflecting surface, the reflecting surface 412 is uneven due to different widths of the plural piezoelectronic elements 413. A laser light wave reflected by the surface of a recess and a laser light wave reflected by the surface of a projecting part travel in the same direction, however, the light wave to be reflected by the recess has travelled a longer distance by the difference between the heights of the recess and projecting part compared with the laser light wave reflected by the projecting part before the light wave arrives at the reflecting surface of the recess and then the laser light wave reflected by the recess has travelled a distance equal to the difference between the heights of the recess and light wave arrives at the laser light wave arrives at the height of the reflecting surface of the projecting part. As a result, there causes an optical path difference, which is equal to twice the difference between the heights of the recess and projecting part, between the light waves reflected by the recess and projecting part. Therefore, the phase differences corresponding to such path differences are introduced to the laser light. The heights of the recess and projecting parts are determined by a magnitude of an electric signal applied to each piezoelectronic element 413 via the lead line 414 by the control power supply 415 and hence the phase differences of the laser light are controlled by the magnitudes of the signals applied to the piezoelectronic elements.

The phase hologram 411 can re-create an arbitrary pattern by changing the electric signal applied to each piezoelectronic element to change the image positions of reconstructed images in a far field by means of the phase differences of the laser light. Therefore, it is not necessary to fabricate a plurality of phase holograms in accordance with various patterns or various illuminated spots. Furthermore, since no replacement of those phase holograms is required, the cost required for the fabrication and the working processes of the replacement can be reduced.

Figure 72:
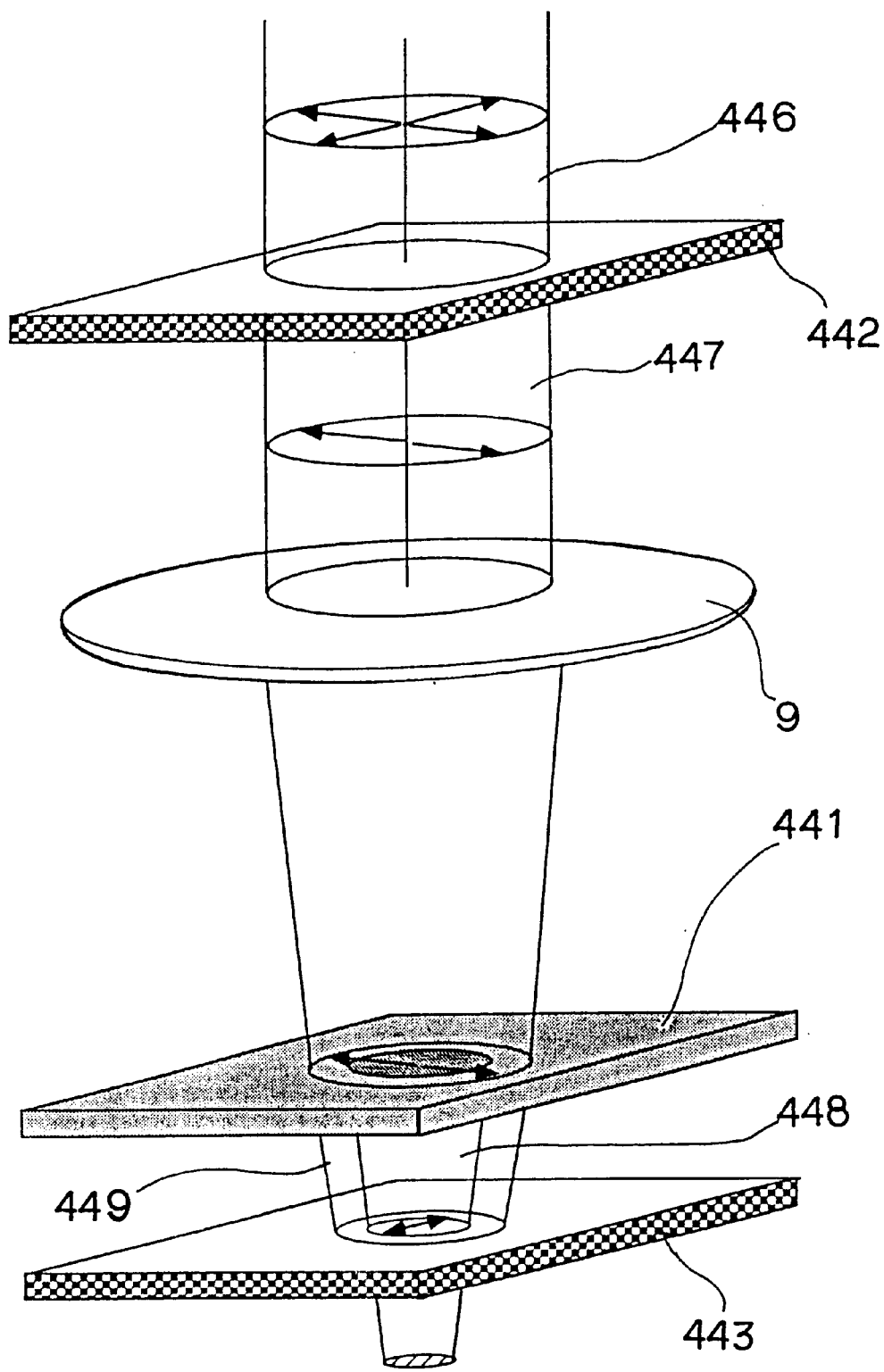
FIG. 72 is a perspective view for showing the structure of the electro-optical element plate of FIG. 71.

FIG. 71 is a diagrammatic view showing the structure of a laser transfer machining apparatus according to an embodiment of the present invention. In the figure, the same reference numeral as in FIG. 5 denotes the same part or a like part and a reference numeral 441 denotes an electro-optical element plate; 442, a polarizer disposed between the laser oscillator 1 and the electro-optical element plate 441; 443 an analyzer disposed between the target 8 to be machined and the electro-optical element plate 441; 444, a lead line for supplying an arbitrary part of the electro-optical element plate 441 with a voltage; and 445, a control power supply for supplying an arbitrary part of the electro-optical element plate 441 with a voltage. FIG. 72 is a schematic view of the phase hologram of the embodiment and a reference numeral 446 denotes a laser light incident on the polarizer 442; 447, a laser light linearly polarized by the polarizer 442; 448, a laser light the direction of polarization of which is turned by 90° by the electro-optical element plate 441; and 449, a laser light the direction of polarization of which does not vary when the light is transmitted by the electro-optical element plate 441.

As previously mentioned, a number of images each having a pattern defined by a mask are formed on a target to be machined by the phase hologram and, therefore, the target is machined. In order to obtain a basic pattern to be drilled corresponding to a mask pattern, a mask with the mask pattern must be arranged in the laser transfer machining apparatus. Furthermore, in order to obtain various basic patterns to be drilled, the mask must be replaced by another mask. On the contrary, the laser transfer machining apparatus of the embodiment can transfer images each having an arbitrary mask pattern without replacing the mask.

In operation, the laser light 446 passing the polarizer 442 becomes the laser light 447 which is linearly polarized in the direction defined by the direction of the polarizer 442 because the laser transfer machining apparatus according to the embodiment is structured as shown in FIGS. 71 and 68. The laser light is focused by the illuminating lens 9. When the laser light 447 passes through the electro-optical element plate 441 disposed in the vicinity of the point where the laser light is focused, a voltage is applied to a part of the electro-optical element plate 441 which corresponds to a mask pattern via a part of the lead lines 444 by the power supply 445. Only the part of the electro-optical element plate 441, through which a component of the laser light having the mask pattern is transmitted, is affected by the electro-optical effect. The direction of polarization of the component is turned by 90°. Both the laser light 448 the direction of polarization of which is turned by 90° after passing the electro-optical element 441 and the laser light 449 the direction of polarization of which does not vary upon passing the electro-optical element plate 441 are directed to the analyzer 443 disposed behind the electro-optical element plate 441. In this case, the analyzer 443 is arranged so as to transmit only the laser light 448 the direction of polarization of which is turned by the electro-optical element 441. Thus, the passing laser light 448 the direction of polarization of which is turned by 90° can be separated from the passing laser light 449 the direction of polarization of which does not vary. The passing laser light 448 the direction of polarization of which is turned by 90°, i.e. only the laser light corresponding to the mask pattern is incident on the target 8 to be machined through the phase hologram 5. Applying an arbitrary voltage to the electro-optical element 441 via the lead line 444 by the power supply 445 can produce an arbitrary mask pattern without exchanging a mask. The embodiment provides such a laser machining apparatus which can reduce the cost of fabricating a mask and can omit the replacement operation of a mask.

In the embodiment, the direction of polarization of the laser light passing through the optical system and having a mask pattern is turned by 90° by the electro-optical element plate 441. Alternatively, the laser light the direction of polarization of which is not changed by the electro-optical element plate 441 may be transmitted and hence may be the light with the mask pattern. In this case, the direction of polarization of the remaining component of the incident laser light except the component of the incident laser light corresponding to the mask pattern is turned by 90° by the electro-optical element plate 441.

The illuminating lens 9 is disposed behind the polarizer 442. Alternatively, the polarizer 442 may be disposed behind the illuminating lens 9. In this case, the same advantages as mentioned above can be provided. The polarizer 442 of the embodiment is arranged for defining the direction of polarization of the laser light emitted by the laser oscillator 1. In a preferred embodiment, the polarizer 442 is inserted into the laser oscillator, or the polarizer is omitted if the laser oscillator is adapted to emit a linearly polarized light by using another means.

FIG. 73 is a diagrammatic view showing the structure of a laser transfer machining apparatus according to an embodiment of the present invention. In the figure, the same reference numeral as in FIG. 5 denotes the same part or a like part and a reference numeral 309 denotes a spherical mirror.

As previously mentioned, the phase hologram provides a laser light passing through the hologram with phase shifts. A pattern to be drilled on the target is determined by the amount of the phase shifts generated. That is, one hologram generates a fixed pattern to be drilled. In the case of forming various patterns, a plurality of phase holograms must be prepared. When fabricating such holograms, a number of processes are needed. Furthermore, the replacement of plural phase holograms requires much time. The laser transfer machining apparatus can obtain a fine pattern drilled by using a phase hologram having such a simple structure as will be described hereinafter.

The description will be directed to an operation of the embodiment. As previously mentioned, the mask 6 is an element for allowing a component of incident laser light with a beam pattern for machining to pass therethrough. After the laser light 301 having the shaped pattern passes through the target 8 to be machined, the laser light enters the phase hologram 5 from one surface thereof. Then the diffracted light arrives at the spherical mirror 309. The phase hologram 5 spatially modulates the incident laser light passing through the mask 6 to form a number of transferred images. The plural spatially modulated laser beams arrive at the spherical mirror 309. The spherical mirror 309 is disposed such that a part of the hologram illuminated by the laser light 301 is located at the focal point of the mirror. Therefore, the diffracted light is returned to the other surface of the phase hologram 5. The diffracted light is passed through the phase hologram 5 again. Finally, the target 8 is machined. If the diffracted light 326 which passes through the phase hologram 5 for once and emerges on the spherical mirror 309 has a pattern as illustrated in FIG. 74, the diffracted light 327 which is imaged on the target 8 to be machined after passing through the phase hologram 5 again has a pattern as shown in FIG. 75. Thus the embodiment provides a fine pattern to be machined.

As mentioned above, according to the embodiment a complicated pattern can be made using a phase hologram having a simple structure and hence the reliability of the machining apparatus is improved.

FIG. 76 is a diagrammatic view showing the structure of a laser transfer machining apparatus according to an embodiment of the present invention. In the figure, the same reference numeral as in FIG. 5 denotes the same part or a like part and a reference numeral 311 denotes a partially reflecting mirror; and 312, a fully reflecting mirror. The laser transfer machining apparatus can provide a fine pattern machined using a phase hologram having a simple structure in the same way as the aforementioned embodiment of FIG. 73.

The description will be directed to an operation of the embodiment. As shown in FIG. 76, the laser light 301 passing through the mask 6 is incident on the phase hologram 6, and a part of the diffracted light is transmitted by the partially reflecting spherical mirror 311 and then it arrives at the target 8 to be machined. The remaining part of the diffracted light reflected by the partially reflecting spherical mirror 311 passes through the phase hologram 5 again and then it is reflected by the fully reflecting spherical mirror 312 after it arrives at the mirror 312. Furthermore, the light fully reflected passes through the phase hologram 5 and arrives at the partially reflecting spherical mirror 311. Then it is partially transmitted and machines the target 8 to be machined. The laser light is divided every when the light is passed through the phase hologram 5. This results in providing a fine pattern to be machined.

As mentioned above, according to the embodiment a complicated pattern can be made using a phase hologram having a simple structure and hence the reliability of the machining apparatus is improved.

FIG. 77 is a diagrammatic view showing the structure of a laser transfer machining apparatus according to an embodiment of the present invention. In the figure, the same reference numeral as in FIG. 5 denotes the same part or a like part and a reference numeral 313 denotes a laser light with a wavelength $\lambda 1$; 314, a laser light with a wavelength $\lambda 2$; 315, a diffracted component of the laser light with a wavelength $\lambda 1$; and 316, a diffracted component of the laser light with a wavelength $\lambda 2$. FIG. 78 shows an example of a pattern to be machined formed by the laser transfer machining apparatus. In the figure, a reference numeral 317 denotes a hole drilled by the diffracted component 315; and 318, a hole drilled by the diffracted component 316.

The description will be directed to an operation of the embodiment. Both the laser light 313 with a wavelength $\lambda 1$ and the laser light 314 with a wavelength $\lambda 2$, which are emitted by the laser oscillator such as an eximer laser, is focused and incident on the mask pattern on the mask 6. As previously mentioned, the mask 6 is an element for allowing a component of incident laser light with a beam pattern corresponding a basic pattern to be machined to pass therethrough. The laser lights 313 and 314 having the shaped pattern enter the hologram 5 and each light is divided into a plurality of laser beams in the hologram. Then the laser beams are expanded or reduced in size by the transferring lens in the transferring optical system (not shown in the figure) and are imaged on the target 8 to be machined. The hologram 5, for example in the form of a phase hologram, spatially modulates the incident laser light passing through the mask 6 to form a number of transferred images. The plural spatially modulated laser beams are projected on the target 8 to be machined by the transferring lens to form the transferred images.

An emergent angle of a diffracted light is dependent upon the wavelength of light. The optical paths of the plural diffracted lights 315 of the laser light 313 with a wavelength $\lambda 1$ are different from those of the plural diffracted lights 316 of the laser light 314 with a wavelength $\lambda 2$. Therefore, there are differences between the image positions of the transferred images formed by the diffracted lights 315 and 316. A plurality of holes 317 and 318 are drilled and the arrangement of the holes 317 is analogous to that of the holes 318.

Thus, the laser transfer machining apparatus can provide a complicated pattern to be machined by merely using a hologram having a simple structure.

FIG. 79 is a diagrammatic view showing the structure of a laser transfer machining apparatus according to an embodiment of the present invention. In the figure, the same reference numeral as in FIG. 5 denotes the same part or a like part and a reference numerals 51 and 52 denote holograms.

Generally, when using a single hologram, only one type of pattern to be machined is formed on a target to be machined. When various patterns to be machined must be formed, it is necessary to prepare holograms of various types. The replacement of the various holograms requires much time.

The embodiment is intended to provide various patterns to be machined using a plurality of holograms simultaneously.

The ABCD ray matrix from the first hologram 51 to the target 8 to be machined is given by $$\begin{pmatrix} 1 & x_1 \\ 0 & 1 \end{pmatrix}$$

where $x_1$ is the distance from the first hologram 51 to the target 8 to be machined, and $x_2$ is the distance from the first hologram 52 to the target 8 to be machined. Also, the ABCD ray matrix from the second hologram 52 to the target 8 to be machined is shown by $$\begin{pmatrix} 1 & x_2 \\ 0 & 1 \end{pmatrix}$$

In a laser transfer machining process, as previously described, in which only the first hologram 51 having n components of spatial frequencies $a_1, a_2, \ldots, a_n$ is used, n transferred images are formed on the image positions of the target 8 to be machined which are apart from the origin by $x_1 \lambda a_1, x_1 \lambda a_2, \ldots, x_1 \lambda a_n$, respectively. On the other hand, in this embodiment, since the second hologram 52 is disposed between the first hologram 51 and the target 8 to be machined, the laser light passing through the first hologram 51 is further spatially modulated by the second hologram 52. If the second hologram 52 has m components of spatial frequencies $b_1, b_2, \ldots, b_m$, (n×m) transferred images are formed on the target 8 to be machined. In this case, the variations of the positions of the transferred images are shown by $$x_1 \lambda \vec{a}_i + x_2 \lambda \vec{b}_j \quad (i = 1, 2 \ldots n, j = 1, 2 \ldots n)$$

Figures 80A, 80B, 80C:
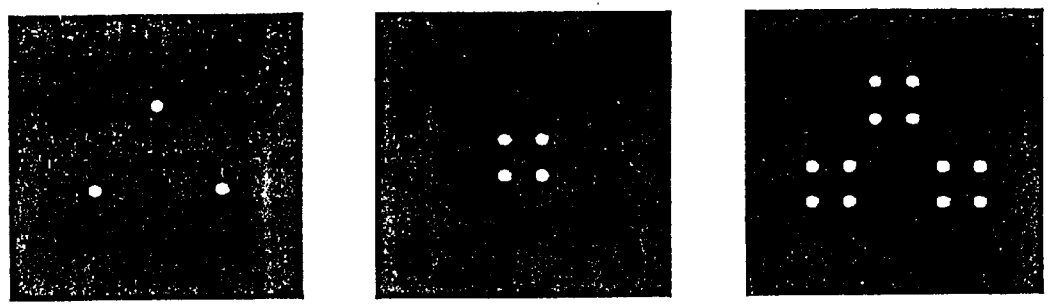
FIGS. 80(a) to 80(c) are plane views of examples of targets to be machined which is machined by the laser transfer machining apparatus according to the embodiment of FIG. 79.

The description will be directed to an operation of the embodiment. FIG. 80(a) illustrates a pattern machined when only the first hologram 51 is used in the laser transfer machining apparatus according to the embodiment shown in FIG. 79. The first hologram 51 is designed such that three circle-shaped images are arranged at vertices of a triangle. FIG. 80(b) illustrates a pattern machined when only the second hologram 52 is used in the laser transfer machining apparatus according to the embodiment shown in FIG. 79. The second hologram 52 is designed such that four circle-shaped images are arranged at vertices of a rectangle. FIG. 80(c) illustrates a pattern machined when both the first hologram 51 and the second hologram 52 are used simultaneously in the laser transfer machining apparatus according to the embodiment shown in FIG. 79. The incident laser light is divided into three light components traveling three directions by the first hologram 51 and the divided lights are further spatially modulated by the second hologram 52. Then four circle-shaped images arranged at vertices of a rectangle are formed in each vertex of a triangle. As can be seen from the above equation of the variations of the positions of transferred images, distances between the transferred images can be adjusted by virtue of changing the distances from the holograms to the target 8 to be machined.

Figure 81:
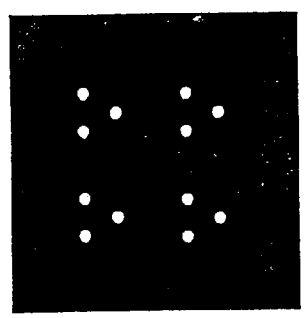
FIG. 81 is a plane view of an example of a target to be machined which is machined by the laser transfer machining apparatus according to the embodiment of FIG. 79.

FIG. 81 shows a pattern machined when the first and second holograms are exchanged in the example of FIG. 80(c). In this case, the incident laser light is divided into four light components traveling in four directions by the first hologram 51 and the divided lights are further spatially modulated by the second hologram 52. Then three circle-shaped images arranged at vertices of a triangle are formed in each vertex of a rectangle.

As mentioned above, combining a plurality of holograms, which are composed of a relatively small number of spatial frequency components and hence can be easily designed, and using them simultaneously makes is possible to increase the number of transferred images formed simultaneously. Furthermore, machining speed is improved. Adjusting the distances between the holograms and the target can adjust the distances between transferred images easily. In addition, since the order of the plural holograms can be changed easily, the diversity of patterns to be machined is improved greatly.

In this embodiment, two holograms are employed simultaneously. Preferably, three holograms or more may be used simultaneously, thereby the number of transferred images formed simultaneously are increased greatly. Thus, the diversity of patterns to be machined can be further improved.

Figure 82:
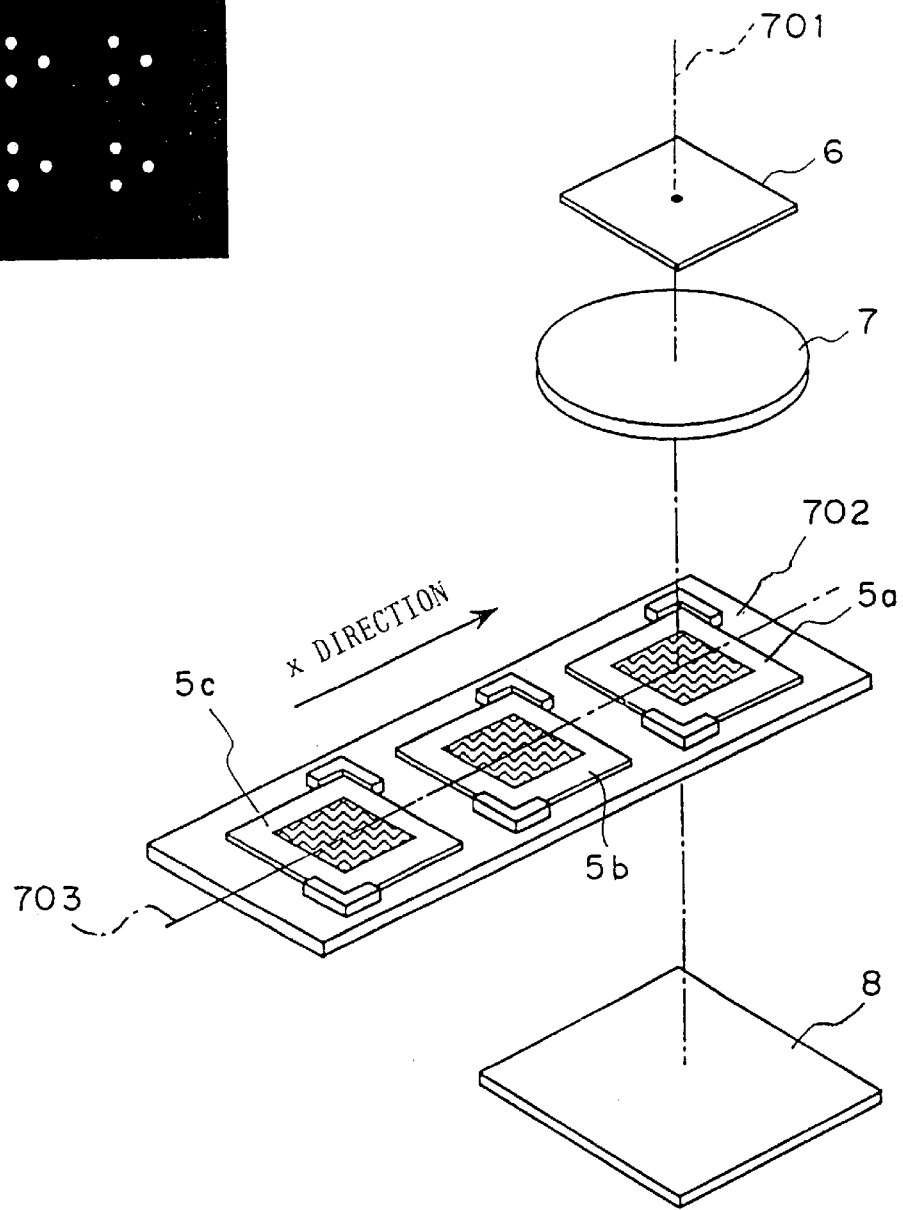
FIG. 82 is a diagrammatic view showing the structure of a laser transfer machining apparatus adapted to use three different holograms by selecting one of them according to an embodiment of the present invention.

FIG. 82 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light in use for machining; 702, a x-direction movable hologram holder (means for arranging a generating means) movable in a direction (x-direction) perpendicular to the optical axis 701 of the laser light for supporting three holograms; and 5a, 5b, and 5c, holograms.

The first, second and third holograms 5a, 5b and 5c are arranged in a nearly linear arrangement on the x-direction movable hologram holder 702. The holograms are arranged along the x-direction such that the line 703 running on nearly the centers of the holograms intersects with the optical axis 701 of the laser light.

The description will be directed to an operation of the embodiment. In FIG. 82, the first hologram 5a, which is selected from the three holograms attached on the x-direction movable hologram holder 702, is arranged in the optical path of the laser light and is used for machining. When the first hologram 5a, which is being used for machining, is replaced by the second hologram 5b or the third hologram 5c, the x-direction movable hologram holder 702 is translated in the x-direction such that the center of the second hologram 5b or the third hologram 5c is on the optical axis 701 of the laser light.

Figure 83A:
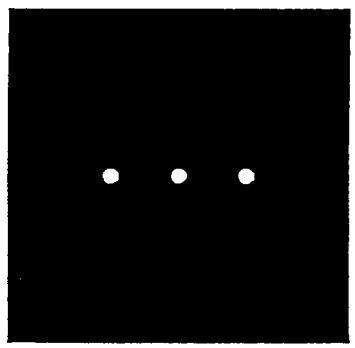
FIGS. 83(a) to 83(d) are plane views of examples of a target to be machined which is machined by the laser transfer machining apparatus according to the embodiment of FIG. 82.
Figure 83B:
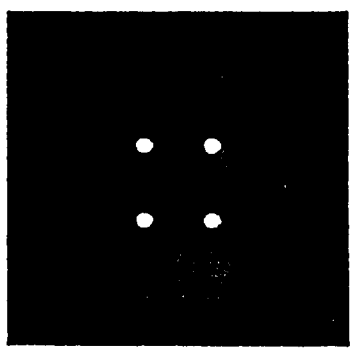
Figure 83C:
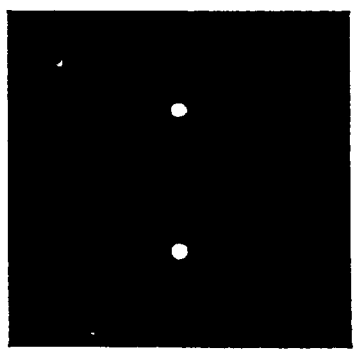
Figure 83D:
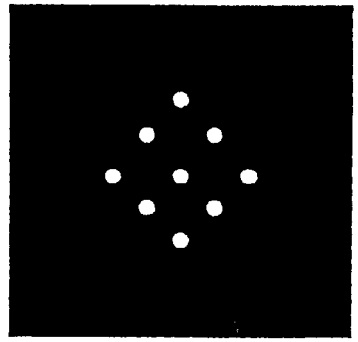

FIG. 83(a) shows an example of the pattern transferred on the target 8 to be machined when using the first hologram 5a of FIG. 82. FIG. 83(b) shows an example of the pattern transferred on the target 8 to be machined when using the second hologram 5b of FIG. 82. FIG. 83(c) shows an example of the pattern transferred on the target 8 to be machined when using the third hologram 5c of FIG. 82. FIG. 83(d) illustrates an example of the patterns transferred and superimposed on the target 8 to be machined when using the first, second and third holograms 5a, 5b and 5c having the patterns as shown in FIGS. 83(a), 83(b) and 83(c), respectively. In the case of drilling a transferred pattern having the three superimposed patterns formed by the three holograms shown in FIG. 83(d) on the target to be machined, the three holograms 5a, 5b and 5c are placed in turn in no particular order on the optical axis 701 of the laser light by means of the x-direction movable hologram holder 702 so that the same target 8 is machined by the successively transferred images.

When a plurality of holograms are required for a machining process, or a change of the pattern to be transferred is required for a machining process, a plurality of holograms required for the machining process are arranged on the x-direction movable hologram holder 702 in advance of the machining operation. A movement of the movable hologram holder in the x-direction makes it possible to replace the hologram in use for the machining process at that time with another one and to easily adjust the position of the hologram. Therefore, it is not necessary to remove a current hologram mounted in a machining apparatus while the apparatus is machining in order to place another hologram in the apparatus. Thereby, the time required for machining can be reduced and the efficiency of machining can be improved.

Figure 84:
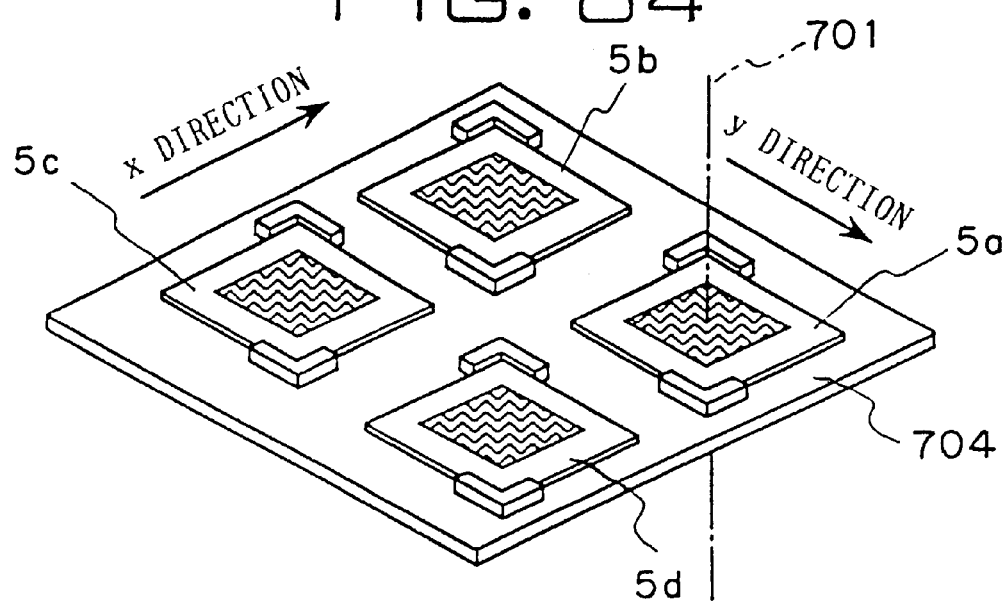
FIG. 84 is a diagrammatic view showing the structure of a laser transfer machining apparatus adapted to use four different holograms by selecting one of them according to an embodiment of the present invention.

FIG. 84 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light for machining; 704, a xy-directions movable hologram holder (means for arranging a generating means) movable in two directions (x-direction and y-direction) perpendicular to the optical axis 701 of the laser light for supporting four holograms; and 5a,5b, 5c and 5d, holograms. The first, second, third and fourth holograms 5a,5b 5c and 5d are arranged at vertices of a square on the xy-directions movable hologram holder 704.

The description will be directed to an operation of the embodiment. In FIG. 84, the first hologram 5a, which is selected from the four holograms attached on the xy-directions movable hologram holder 704, is arranged in the optical path of the laser light and is used for machining. When the first hologram 5a, which is being used for machining, is replaced by the second hologram 5b, the third hologram 5c, or the fourth hologram 5d, the xy-directions movable hologram holder 704 is translated in the x-direction, y-direction or both the directions so that the center of the second hologram 5b, the third hologram 5c or the fourth hologram 5d is on the optical axis 701 of the laser light.

When a plurality of holograms are required for a machining process, or a change of the pattern to be transferred is required for a machining process, a plurality of holograms required for the machining process are arranged on the xy-directions movable hologram holder 704 in advance of the machining operation in the same manner as the above embodiment. A movement of the xy-directions movable hologram holder in the x-direction, y-direction or both the directions makes it possible to replace a hologram being used for the machining process with another one and to easily adjust the position of the other hologram set up. Therefore, it is not necessary to remove a current hologram mounted in a machining apparatus while the apparatus is machining in order to place another hologram in the apparatus. Thereby, the time required for machining can be reduced and the efficiency of machining can be improved. Furthermore, dimensions of the hologram holder can be reduced without decreasing a number of holograms which are able to be attached on the holder because the plural holograms are arranged in a two-dimensional arrangement on the movable holder.

Figure 85:
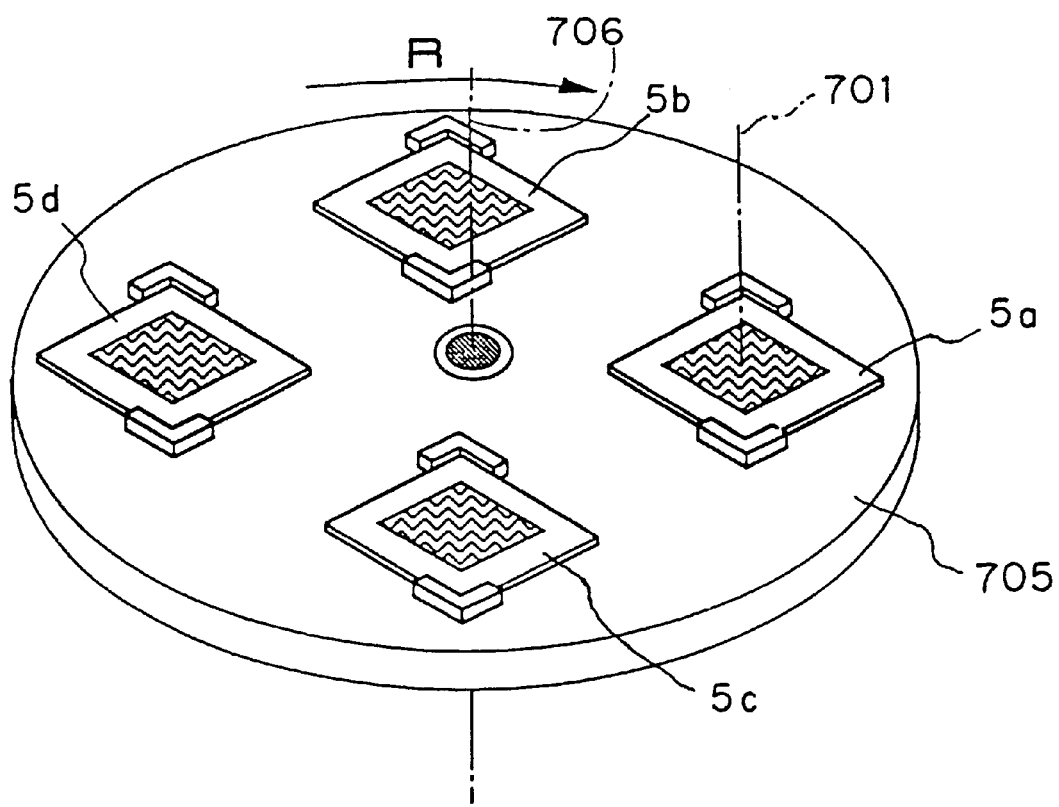
FIG. 85 is a diagrammatic view showing the structure of a laser transfer machining apparatus adapted to use four different holograms by selecting one of them according to an embodiment of the present invention.

FIG. 85 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light incident on a hologram; 705, a rotatable hologram holder (means for arranging a generating means) disposed rotatably about an axis parallel with the optical axis 701 of the laser light for supporting four holograms; 706, an axis of rotation of the rotatable hologram holder 705 in parallel with the optical axis 701; and 5a,5b, 5c and 5d, holograms. The first, second, third and fourth holograms 5a,5b 5c and 5d are arranged on the circumference of a circle, the center of which is on the axis of rotation 706, such that the distance between each center of each hologram and the axis of rotation 706 is substantially equal to the distance between the axis of rotation 706 and the optical axis of the laser light.

In FIG. 85, the first hologram 5a, which is selected from the four holograms attached on the rotatable hologram holder 705, is arranged in the optical path of the laser light and is used for machining. When the first hologram 5a, which is being used for machining, is replaced by the second hologram 5b, the third hologram 5c, or the fourth hologram 5d, the rotatable hologram holder 705 is rotated in the direction shown by the arrow R in the figure so that the center of the second hologram 5b, the third hologram 5c or the fourth hologram 5d is on the optical axis 701 of the laser light.

When a plurality of holograms are required for a machining process, or a change of the pattern to be transferred is required for a machining process, a plurality of holograms required for the machining process are arranged on the rotatable hologram holder 705 in advance of the machining operation in the same manner as the above embodiment. A rotation of the rotatable hologram holder about the axis of rotation 706 parallel with the optical axis 701 of the incident laser light makes it possible to replace a hologram being used for the machining process with another one and to easily adjust the position of the other hologram set up. Therefore, it is not necessary to remove a current hologram mounted in a machining apparatus while the apparatus is machining in order to place another hologram in the apparatus. Thereby, the time required for machining can be reduced and the efficiency of machining can be improved. Furthermore, dimensions of the hologram holder can be reduced without decreasing a number of holograms which are able to be attached on the holder because the plural holograms are arranged in a two-dimensional arrangement on the rotatable holder. Since only the axis of rotation of the rotatable hologram holder is controlled when exchanging the hologram for another one, the replacing and adjusting operations of hologram can be performed more easily.

Figure 86:
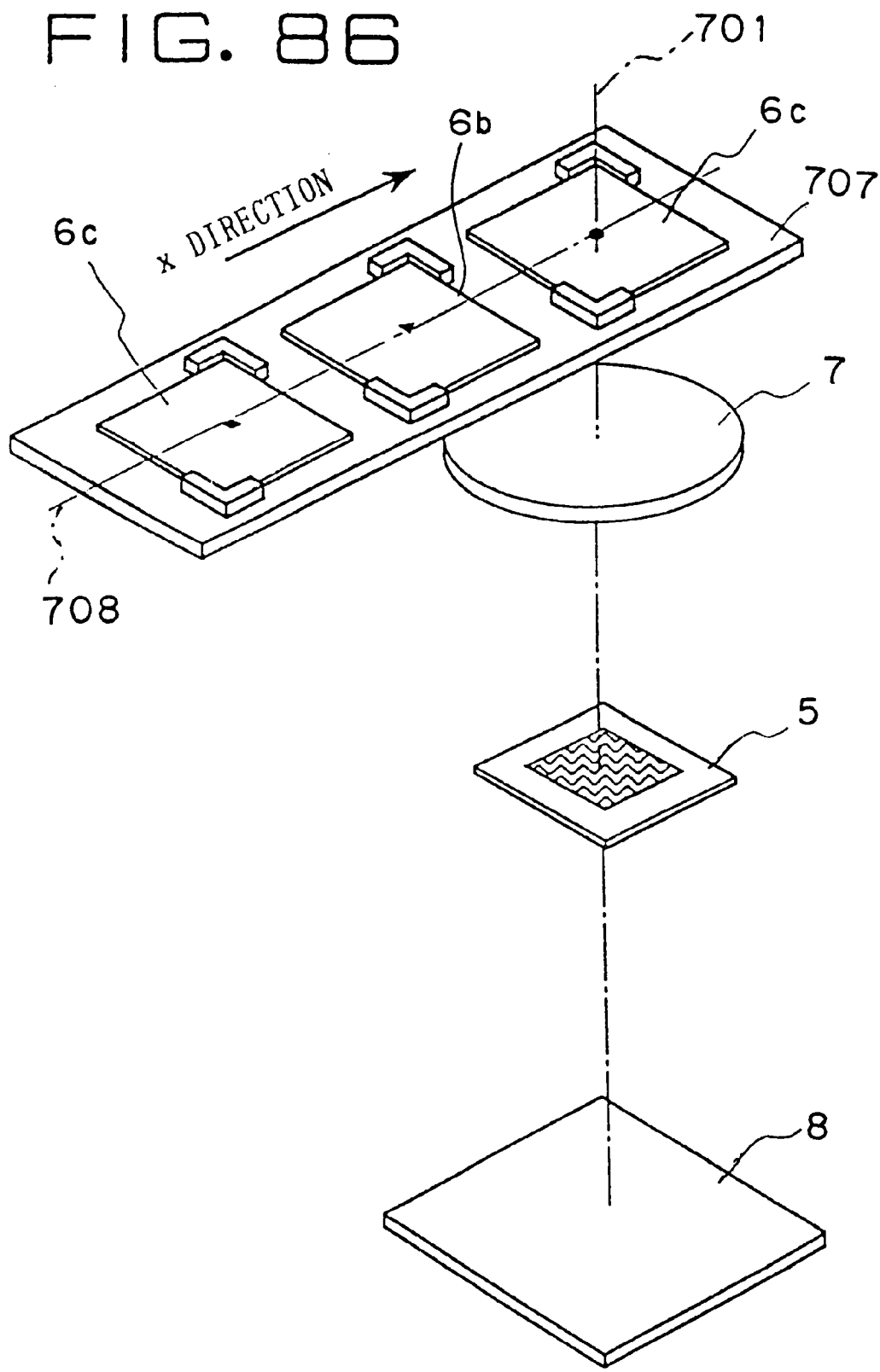
FIG. 86 is a diagrammatic view showing the structure of a laser transfer machining apparatus adapted to use three different masks by selecting one of them according to an embodiment of the present invention.

FIG. 86 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light for machining; 707, a x-direction movable mask holder movable in a direction (x-direction) perpendicular to the optical axis 701 of the laser light for supporting three masks; and 6a,6b and 6c, masks.

The first, second and third masks 6a,6b and 6c are arranged in a nearly linear arrangement on the x-direction movable mask holder 707. The masks are arranged along the x-direction such that the line 708 running on nearly the centers of the masks intersects with the optical axis 701 of the laser light.

In FIG. 86, the first mask 6a, which is selected from the three masks attached on the x-direction movable mask holder 707, is arranged in the optical path of the laser light and is used for machining. When the first mask 6a, which is being used for machining, is replaced by the second hologram 6b or the third mask 6c, the x-direction movable mask holder 707 is translated in the x-direction so that the center of the second mask 6b or the third mask 6c is on the optical axis 701 of the laser light.

The laser transfer machining apparatus according to the embodiment is effective in the case that the replacing operation of mask is needed when the mask pattern is changed or the mask is damaged by heat. A plurality of masks required for the machining process are arranged on the x-direction movable mask holder 707 in advance of the machining operation. A movement of the movable mask holder in the x-direction makes it possible to replace a mask being used for the machining process with another one and to easily adjust the position of the other mask set up. Therefore, it is not necessary to remove a current mask mounted in a machining apparatus while the apparatus is machining in order to place another mask in the apparatus. Thereby, the time required for machining can be reduced and the efficiency of machining can be improved.

Figure 87:
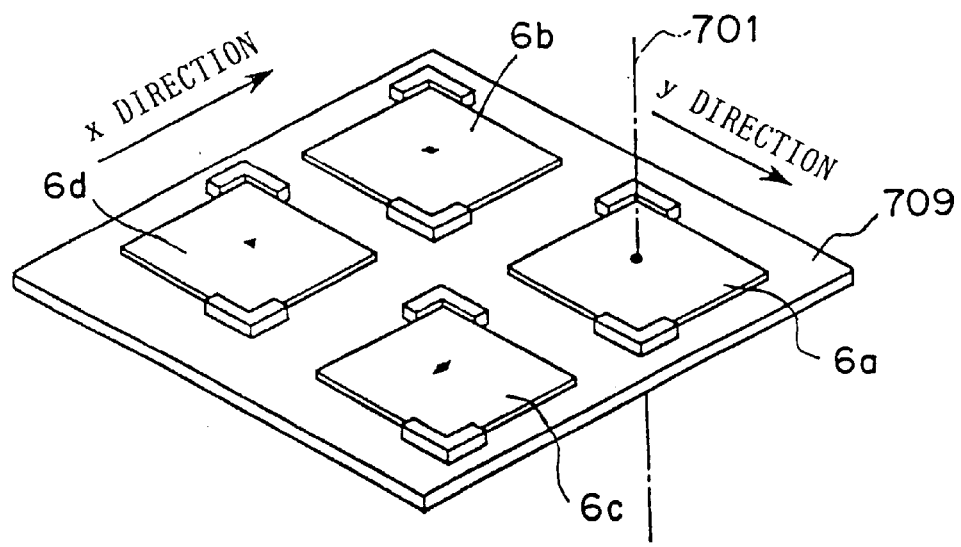
FIG. 87 is a diagrammatic view showing the structure of a laser transfer machining apparatus adapted to use four different masks by selecting one of them according to an embodiment of the present invention.

FIG. 87 is a diagrammatic view showing the structure of a laser transfer machining apparatus according to an embodiment of the present invention. In the figure, the same reference numeral as in FIG. 6 denotes the same part or a like part and a reference numeral 701 denotes an optical axis of the laser light for machining; 709, a xy-directions movable mask holder movable in two directions (x-direction and y-direction) perpendicular to the optical axis 701 of the laser light for supporting four masks; and 6a,6b, 6c and 6d, masks. The first, second, third and fourth masks 6a,6b 6c and 6d are arranged at vertices of a square on the xy-directions movable mask holder 709.

In FIG. 87, the first mask 6a, which is selected from the four masks attached on the xy-directions movable mask holder 709, is arranged in the optical path of the laser light and is used for machining. When the first mask 6a, which is being used for machining, is replaced by the second hologram 6b, the third mask 6c, or the fourth mask 6d, the xy-directions movable mask holder 709 is translated in the x-direction, y-direction or both the directions so that the center of the second mask 6b, the third mask 6c or the fourth mask 6d is on the optical axis 701 of the laser light.

The laser transfer machining apparatus according to the embodiment is effective in the same way as the above embodiment in the case that the replacing operation of mask is needed when the mask pattern is changed or the mask is damaged by heat. A plurality of masks required for the machining process are arranged on the xy-directions movable mask holder 709 in advance of the machining operation. A movement of the xy-directions movable mask holder in the x-direction, y-direction or both the directions makes it possible to replace a mask being used for the machining process with another one and to easily adjust the position of the other mask set up. Therefore, it is not necessary to remove a current mask mounted in a machining apparatus while the apparatus is machining in order to place another mask in the apparatus. Thereby, the time required for machining can be reduced and the efficiency of machining can be improved. Furthermore, dimensions of the mask holder can be reduced without decreasing a number of masks which are able to be attached on the movable mask holder because the plural masks are arranged in a two-dimensional arrangement on the movable holder.

Figure 88:
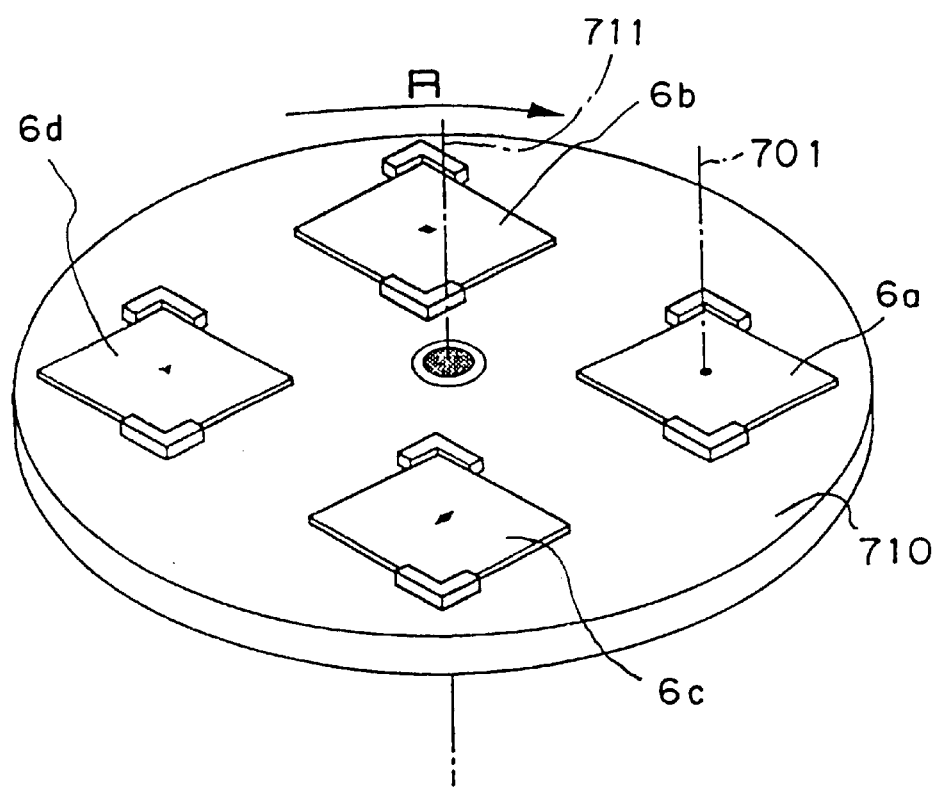
FIG. 88 is a diagrammatic view showing the structure of a laser transfer machining apparatus adapted to use four different masks by selecting one of them according to an embodiment of the present invention.

FIG. 88 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light for machining; 710, a rotatable mask holder (means for arranging a generating means) disposed rotatably about an axis parallel with the optical axis 701 of the laser light for supporting four masks; 711, an axis of rotation of the rotatable mask holder 710 in parallel with the optical axis 701; and 6a,6b, 6c and 6d, masks.

The first, second, third and fourth masks 6a,6b 6c and 6d are arranged on the circumference of a circle, the center of which is on the axis of rotation 711, such that the distance between each center of each mask and the axis of rotation 711 is substantially equal to the distance between the axis of rotation 711 and the optical axis of the laser light.

In FIG. 88, the first mask 6a, which is selected from the four masks attached on the rotatable mask holder 710, is arranged in the optical path of the laser light and is used for machining. When the first mask 6a, which is being used for machining, is replaced by the second hologram 6b, the third mask 6c, or the fourth mask 6d, the rotatable mask holder 710 is rotated in the direction shown by the arrow R in the figure so that the center of the second mask 6b, the third mask 6c or the fourth mask 6d is on the optical axis 701 of the laser light.

The laser transfer machining apparatus according to the embodiment is effective in the same way as the above embodiment in a case that the replacing operation of mask is needed when the mask pattern is changed or the mask is damaged by heat. In such a case, a plurality of masks required for the machining process are arranged on the rotatable mask holder 710 in advance of the machining operation in the same manner as the above embodiment. A rotation of the rotatable mask holder about the axis of rotation 711 parallel with the optical axis 701 of laser light makes it possible to replace a mask being used for the machining process with another one and to easily adjust the position of the other mask set up. Therefore, it is not necessary to remove a current mask mounted in a machining apparatus while the apparatus is machining in order to place another mask in the apparatus. Thereby, the time required for machining can be reduced and the efficiency of machining can be improved. Furthermore, dimensions of the mask holder can be reduced without decreasing a number of masks which are able to be attached on the holder because the plural masks are arranged in a two-dimensional arrangement on the rotatable holder. Since only the axis of rotation of the rotatable mask holder is controlled when exchanging the hologram for another one, the replacing and adjusting operations of mask can be performed more easily.

Figure 89:
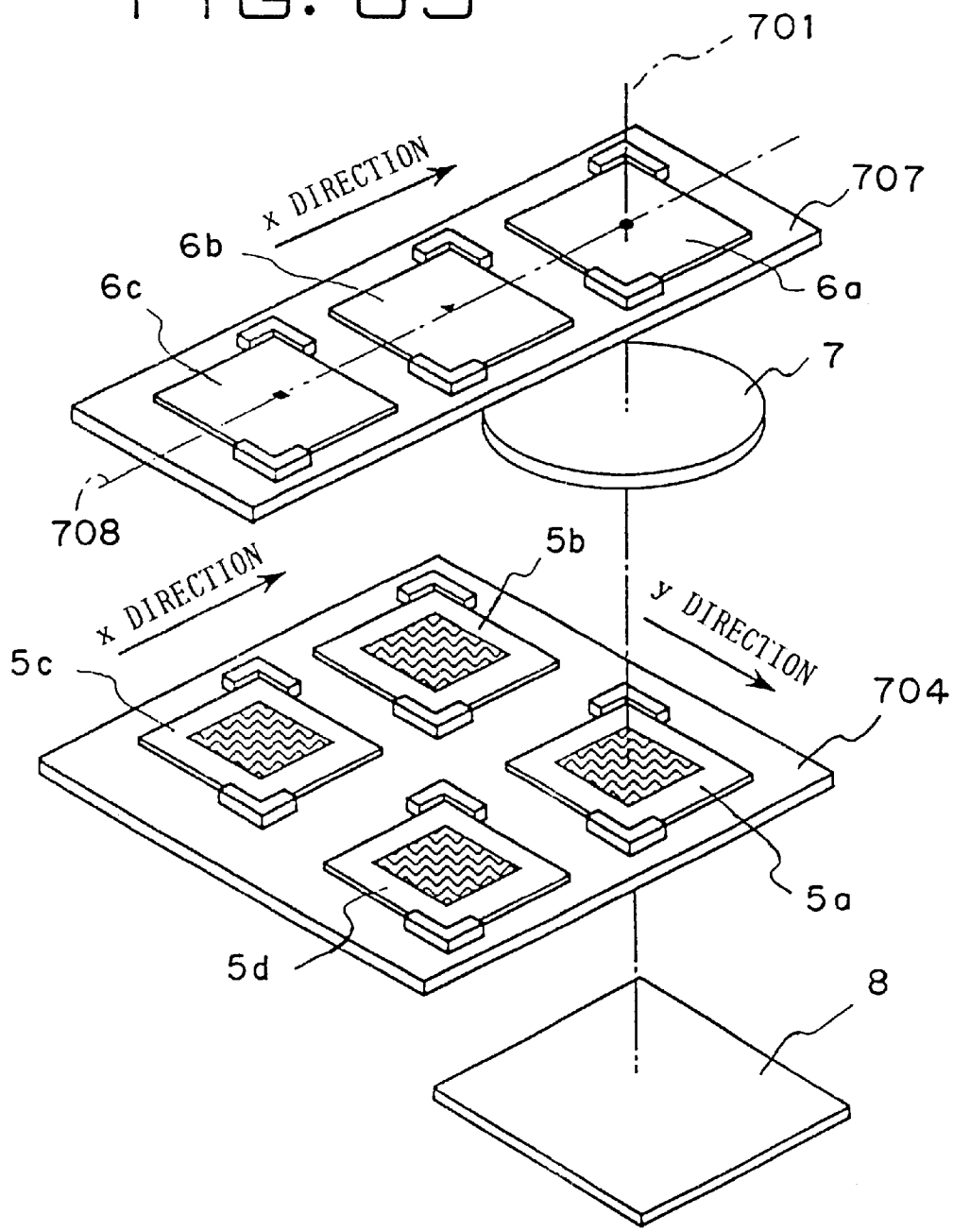
FIG. 89 is a diagrammatic view showing the structure of a laser transfer machining apparatus adapted to use three different masks by selecting one of them and to use four different holograms by selecting one of them according to an embodiment of the present invention.

FIG. 89 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light for machining; 707, a x-direction movable mask holder movable in a direction (x-direction) perpendicular to the optical axis 701 of the laser light for supporting three masks; 6a,6b and 6c, masks; 704, a xy-directions movable hologram holder movable in two directions (x-direction and y-direction) perpendicular to the optical axis 701 of the laser light for supporting four holograms; and 5a,5b, 5c and 5d, holograms.

This embodiment is a combination of the embodiment shown in FIG. 84 and the embodiment shown in FIG. 86. The first, second, third and fourth holograms 5a,5b 5c and 5d are arranged at vertices of a square on the xy-directions movable hologram holder 704. The first hologram 5a, which is selected from the four holograms attached on the xy-directions movable hologram holder 704, is arranged in the optical path of the laser light and is used for machining. When the first hologram 5a, which is being used for machining, is replaced by the second hologram 5b, the third hologram 5c, or the fourth hologram 5d, the xy-directions movable hologram holder 704 is translated in the x-direction, y-direction or both the directions such that the center of the second hologram 5b, the third hologram 5c or the fourth hologram 5d is on the optical axis 701 of the laser light.

On the other hand, the first, second and third masks 6a, 6b and 6c are arranged in a nearly linear arrangement on the x-direction movable mask holder 707. The masks are arranged along the x-direction such that the line 708 running on nearly the centers of the masks intersects with the optical axis 701 of the laser light. The first mask 6a, which is selected from the three masks attached on the x-direction movable mask holder 707, is arranged in the optical path of the laser light and is used for machining. When the first mask 6a, which is being used for machining, is replaced by the second hologram 6b or the third mask 6c, the x-direction movable mask holder 707 is translated in the x-direction so that the center of the second mask 6b or the third mask 6c is on the optical axis 701 of the laser light.

In the laser transfer machining apparatus having such a structure, when a plurality of holograms are required for a machining process, or a change of the mask pattern of the mask is required for a machining process, a plurality of holograms required for the machining process are arranged on the xy-directions movable hologram holder 704 in advance of the machining operation. Furthermore, a plurality of masks required for the machining process are arranged on the x-direction movable mask holder 707 in advance of the machining operation. A movement of the movable hologram holder in the x-direction, y-direction or both the directions makes it possible to replace a hologram being used for the machining process in the optical axis of the laser light with another one and to easily adjust the position of the other hologram set up. A movement of the movable mask holder in the x-direction makes it possible to replace a mask being used for the machining process in the optical axis of the laser light with another one and to easily adjust the position of the other mask set up.

Therefore, it is not necessary to remove a current hologram mounted in a machining apparatus while the apparatus is machining in order to place another hologram in the apparatus. Thereby, the time required for machining can be reduced and the efficiency of machining can be improved. Furthermore, dimensions of the hologram holder can be reduced without decreasing a number of holograms which are able to be attached on the holder because the plural holograms are arranged in a two-dimensional arrangement on the movable holder. In addition, since it is not necessary to remove a current mask mounted in a machining apparatus while the apparatus is machining in order to place another mask in the apparatus, the time required for machining can be reduced and the efficiency of machining can be improved. When plural holograms and plural masks are required for a machining process, since it is not necessary to remove both a hologram and a mask mounted in a machining apparatus while the apparatus is machining in order to place another hologram and another mask in the apparatus, the time required for machining can be reduced greatly and the efficiency of machining can be improved greatly.

In this embodiment, instead of the xy-directions movable hologram holder, a holder like the aforementioned x-direction movable hologram holder or the rotatable hologram holder may be used. The similar advantageous effects can be provided by the latter holder. Also, instead of the x-direction movable mask holder, a holder like the aforementioned xy-directions movable mask holder or the rotatable mask holder may be used. The similar advantageous effects can be provided by the latter holder.

Figure 90:
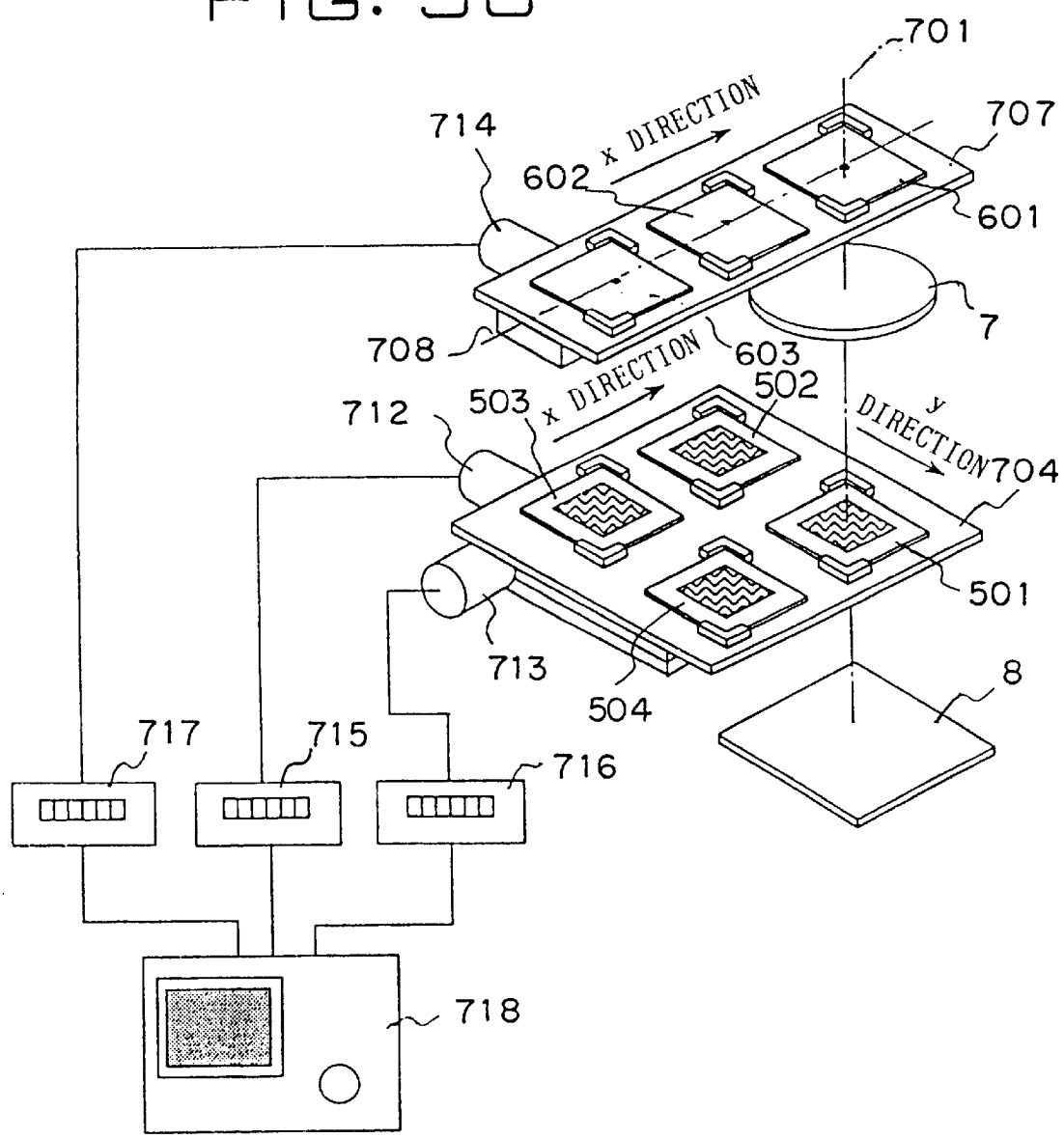
FIG. 90 is a diagrammatic view showing the structure of a laser transfer machining apparatus provided with a control unit for controlling a replacing operation of the embodiment of FIG. 89.

FIG. 90 is a diagrammatic view showing the structure of a laser transfer machining apparatus according to an embodiment of the present invention. In the figure, the same reference numeral as in FIG. 89 denotes the same part or a like part and a reference numeral 712 denotes a first pulse motor for moving the xy-directions movable hologram holder 704 in the x-direction; 713, a second pulse motor for moving the xy-directions movable hologram holder 704 in the y-direction; 714, a third pulse motor for moving the x-direction movable mask holder 707 in the x-direction; 715, a first pulse generator for generating a pulse driving the first pulse motor 712; 716, a second pulse generator for generating a pulse driving the second pulse motor 713; 717, a third pulse generator for generating a pulse driving the third pulse motor 714; 718, a control unit for controlling the number of pulses generated by the first, second and third pulse generators and the timing of the pulses generated. This embodiment is a preferred variant of the above embodiment shown in FIG. 89.

An angle of rotation of each pulse motor is proportional to the number of pulses provided by the control unit 718. When exchanging both a hologram and a mask being used while the transferring machining apparatus is in operation, the control unit 718 controls the number of pulses generated by the first, second and third pulse generators 715, 716 and 717 and the timing of the pulses generated in such a manner that the first, second and third pulse motors 712, 713 and 714 rotate simultaneously by a predetermined angle, respectively. The controlled movements make it possible to replace the hologram and the mask in synchronism with each other simultaneously. In addition to the advantages which the above embodiment in FIG. 89 offers, the machining apparatus of this embodiment can reduce the time required for machining and improve the efficiency of machining.

In this embodiment, instead of the xy-directions movable hologram holder, a holder like the aforementioned x-direction movable hologram holder or the rotatable hologram holder may be used. Similarly, the pulse motors can be used as a driving unit for these holders. The similar advantageous effects can be provided by the latter holder. Also, instead of the x-direction movable mask holder, a holder like the aforementioned xy-directions movable mask holder or the rotatable mask holder may be used. Similarly, the pulse motors can be used as a driving unit for these holders. The similar advantageous effects can be provided by the latter holder.

Figure 91:
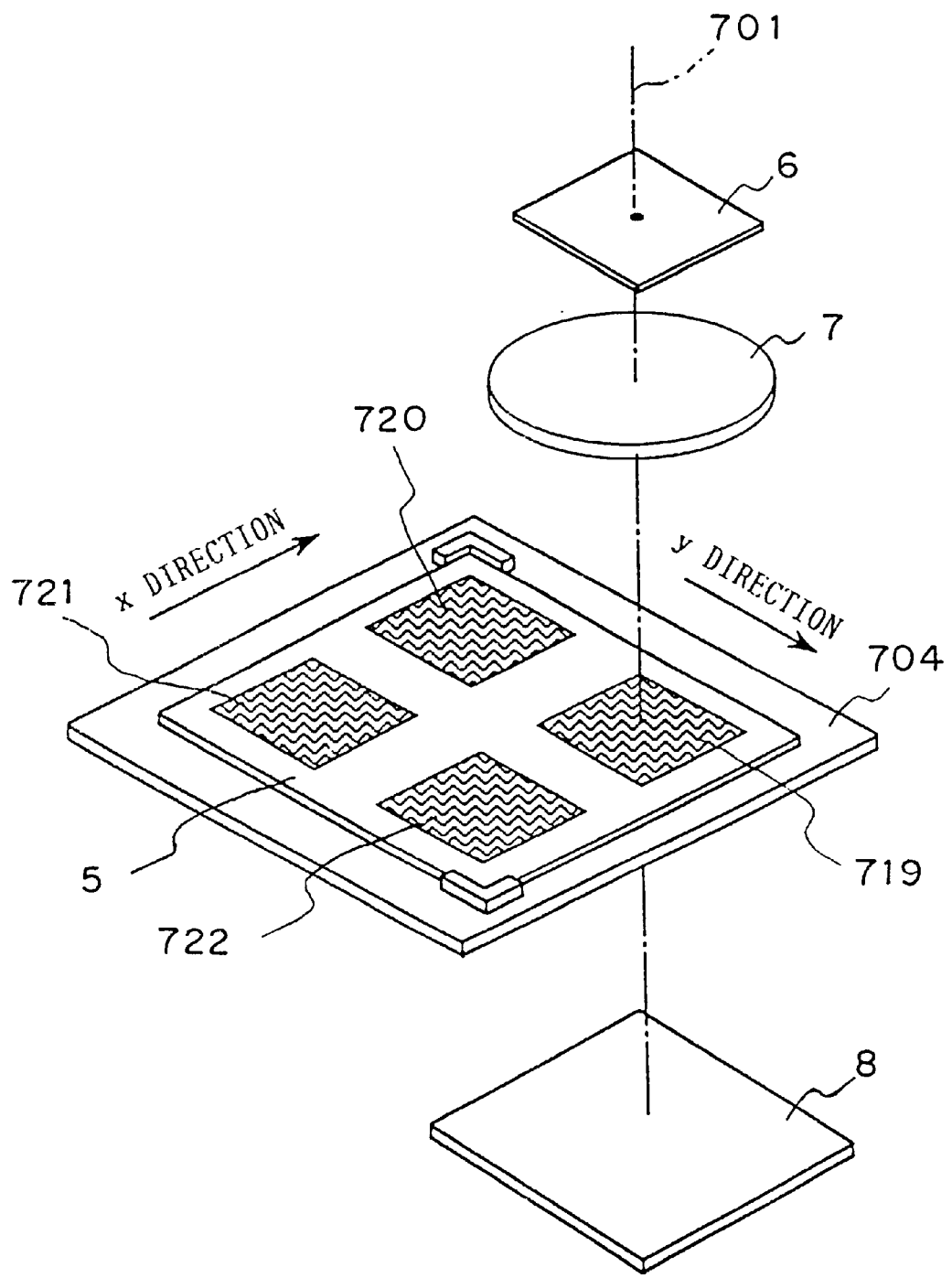
FIG. 91 is a diagrammatic view showing the structure of a laser transfer machining apparatus adapted to use four different hologram patterns disposed on a hologram by selecting one of them according to an embodiment of the present invention.

FIG. 91 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light for machining; 704, a xy-directions movable hologram holder movable in two directions (x-direction and y-direction) perpendicular to the optical axis 701 of the laser light for supporting the hologram 5; 719, a first hologram pattern formed on the hologram 5; 720, a second hologram pattern formed on the hologram 5; 721, a third hologram pattern formed on the hologram 5; and 722, a fourth hologram pattern formed on the hologram 5.

The first, second, third and fourth hologram patterns 719, 720, 721 and 722 are arranged on the hologram 5 attached in the xy-directions hologram holder 704 such that the centers of them are nearly at vertices of a square on the hologram 5.

The description will be directed to an operation of the embodiment. In FIG. 91, the first hologram pattern 719, which is selected from the four hologram patterns of the hologram, is arranged in the optical path of the laser light and is used for machining. When the first hologram pattern 719, which is being used for machining, is replaced by the second hologram pattern 720, the third hologram pattern 721, or the fourth hologram pattern 722, the xy-directions movable hologram holder 704 is translated in the x-direction, y-direction or both the directions such that the center of the second hologram pattern 720, the third hologram pattern 721 or the fourth hologram pattern 722 is on the optical axis 701 of the laser light. The hologram pattern can be easily replaced by the translation.

The cost of fabricating one substrate having a plurality of hologram patterns formed thereon is lower than that of fabricating a plurality of holograms each having a similar hologram pattern. When a plurality of hologram patterns are required for a machining process, or a change of the pattern to be transferred is required for a machining process, a hologram, on which a plurality of hologram patterns required for the machining process are arranged, is mounted on the xy-directions movable hologram holder in advance of the machining operation. A movement of the xy-directions movable hologram holder in the x-direction, y-direction or both the directions makes it possible to replace the hologram pattern being used for the machining process with another one and to easily adjust the position of the other hologram set up. Therefore, it is not necessary to remove a hologram mounted in a machining apparatus while the apparatus is machining in order to place another hologram in the apparatus, and it is not necessary to adjust the position of the other hologram set up in the apparatus. Thereby, the time required for machining can be reduced and the efficiency of machining can be improved. Furthermore, since the hologram is provided with the plural hologram patterns formed thereon and hence it is not necessary to prepare a plurality of mounting space for holograms on the hologram holder, dimensions of the hologram holder can be further reduced.

In a variant of the embodiment, the hologram 5 according to the embodiment and the means for holding a plurality of masks as shown in FIGS. 86 to 88 can be combined. The combination can eliminate a series of operations, i.e. removing a current mask mounted in a machining apparatus while the apparatus is machining, placing another mask in the apparatus and adjusting the position of the other mask set in the apparatus. Thereby, the efficiency of machining can be improved more greatly when a plurality of holograms and a plurality of masks are needed for machining.

Figure 92:
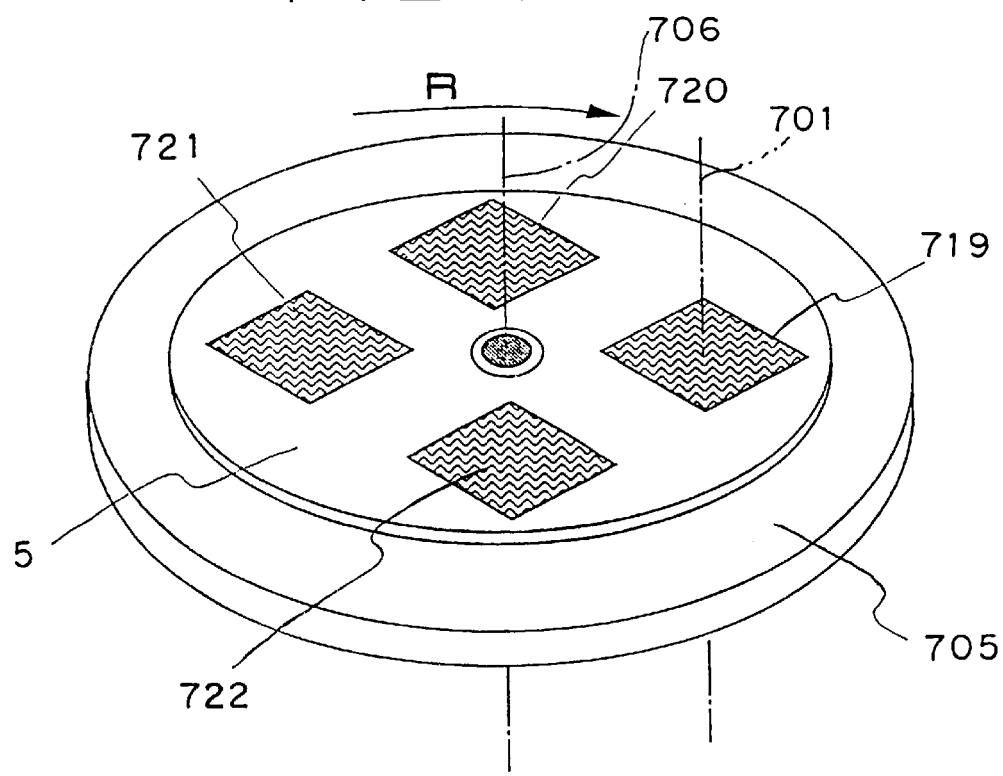
FIG. 92 is a diagrammatic view showing the structure of a laser transfer machining apparatus adapted to use four different hologram patterns disposed on a hologram by selecting one of them according to an embodiment of the present invention.

FIG. 92 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of a laser light incident on the hologram; 705, a rotatable hologram holder disposed rotatably about an axis parallel with the optical axis 701 of the laser light for supporting the hologram 5; 706, an axis of rotation of the rotatable hologram holder 705 in parallel with the optical axis 701; ; 719, a first hologram pattern formed on the hologram 5; 720, a second hologram pattern formed on the hologram 5; 721, a third hologram pattern formed on the hologram 5; and 722, a fourth hologram pattern formed on the hologram 5.

The first, second, third and fourth hologram patterns 719,720,721 and 722 are arranged on the circumference of a circle, the center of which is on the axis of rotation 706, such that the distance between each center of each hologram pattern and the axis of rotation 706 is substantially equal to the distance between the axis of rotation 706 and the optical axis 701 of the laser light.

The description will be directed to an operation of the embodiment. In FIG. 92, the first hologram pattern 719, which is selected from the four hologram patterns of the hologram 5, is arranged in the optical path of the laser light and is used for machining. When the first hologram pattern 719, which is being used for machining, is replaced by the second hologram pattern 720, the third hologram pattern 721, or the fourth hologram pattern 722, the rotatable hologram holder 705 is rotated in the direction shown by the arrow R in the figure such that the center of the second hologram pattern 720, the third hologram pattern 721 or the fourth hologram pattern 722 is on the optical axis 701 of the laser light. The hologram pattern can be easily replaced by the rotation.

The cost of fabricating one substrate having a plurality of hologram patterns formed thereon is lower than that of fabricating a plurality of holograms each having a similar hologram pattern. When a plurality of holograms are required for a machining process, or a change of the pattern to be transferred is required for a machining process, a plurality of hologram patterns required for the machining process are formed on the hologram in advance of the machining operation. A rotation of the rotatable hologram holder about the axis of rotation 706 parallel with the optical axis 701 of the laser light makes it possible to replace a hologram pattern being used for the machining process with another one and to easily adjust the position of the hologram. Therefore, the apparatus with the holder can eliminate a series of operations, i.e. removing a hologram mounted in a machining apparatus while the apparatus is machining, placing another hologram in the apparatus and adjusting the position of the other hologram set up in the apparatus. Thereby, the time required for machining can be reduced and the efficiency of machining can be improved. Furthermore, since the hologram is provided with the plural hologram patterns formed thereon and hence it is not necessary to prepare a plurality of mounting space for holograms on the hologram holder, dimensions of the hologram holder can be further reduced. Since only the axis of rotation of the rotatable hologram holder is controlled when exchanging a hologram pattern for another one, the replacing and adjusting operations of hologram pattern can be performed more easily.

In a variant of the embodiment, the hologram 5 according to the embodiment and the means for holding a plurality of masks as shown in FIGS. 86 to 88 can be combined. The combination can eliminate a series of operations, i.e. removing a mask mounted in a machining apparatus while the apparatus is machining, placing another mask in the apparatus and adjusting the position of the other mask set up in the apparatus. Thereby, the efficiency of machining can be improved more greatly when a plurality of holograms and a plurality of masks are needed for machining.

FIG. 93 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light for machining; 709, a xy-directions movable mask holder movable in two directions (x-direction and y-direction) perpendicular to the optical axis 701 of the laser light for supporting the mask 6; 651, a first mask pattern formed on the mask 6; 652, a second mask pattern formed on the mask 6; 653, a third mask pattern formed on the mask 6; and 654, a fourth mask pattern formed on the mask 6.

The description will be directed to an operation of the embodiment. The first, second, third and fourth mask patterns 651,652,653 and 654 are arranged on the mask 6 such that the centers of them are nearly at vertices of a square on the mask 6, respectively. In FIG. 93, the first mask pattern 651, which is selected from the four mask patterns of the mask 6, is arranged in the optical path of the laser light and is used for machining. When the first mask pattern 651, which is being used for machining, is replaced by the second mask pattern 652, the third mask pattern 653, or the fourth mask pattern 654, the xy-directions movable mask holder 709 is translated in the x-direction, y-direction or both the directions so that the center of the second mask pattern 652, the third mask pattern 653 or the fourth mask pattern 654 is on the optical axis 701 of the laser light. The mask pattern can be easily replaced by the translation.

The cost of fabricating one substrate having a plurality of mask patterns formed thereon is lower than that of fabricating a plurality of masks each having a similar mask pattern. The apparatus with the holder is effective when a change of the mask pattern is required for a machining process or the mask must be replaced by another mask having the same mask pattern for the reason that the current mask is damaged by heat, or the like. In such a case, a mask, on which a plurality of mask patterns required for the machining process are arranged, is mounted on the xy-directions movable mask holder in advance of the machining operation. A movement of the xy-directions movable mask holder in the x-direction, y-direction or both the directions makes it possible to replace a mask pattern being used for the machining process with another one and to easily adjust the position of the other mask pattern set up. As a result, it is not necessary to remove a mask mounted in a machining apparatus while the apparatus is machining in order to place another mask in the apparatus, and hence it is not necessary to adjust the position of the other mask. Thereby, the time required for machining can be reduced and the efficiency of machining can be improved. Furthermore, since the mask is provided with the plural mask patterns formed thereon and hence it is not necessary to prepare a plurality of mounting space for masks on the mask holder, dimensions of the mask holder can be further reduced.

In a variant of the embodiment, the mask 6 according to the embodiment and the means for holding a plurality of holograms as shown in FIGS. 82 to 85 can be combined. The combination can eliminate a series of operations, i.e. removing a hologram mounted in a machining apparatus while the apparatus is machining, placing another hologram in the apparatus and adjusting the position of the other hologram set up in the apparatus. Thereby, the efficiency of machining can be improved more greatly when a plurality of holograms and a plurality of masks are needed for machining.

Figure 94:
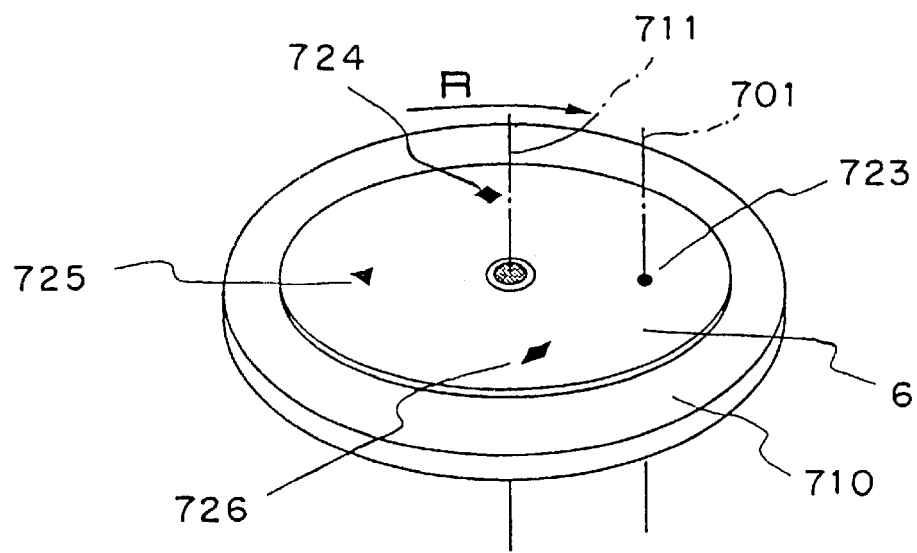
FIG. 94 is a diagrammatic view showing the structure of a laser transfer machining apparatus adapted to use four different mask patterns disposed on a mask by selecting one of them according to an embodiment of the present invention.

FIG. 94 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of the laser light for machining; 710, a rotatable mask holder disposed rotatably about an axis parallel with the optical axis 701 of the laser light for supporting the mask 6; 711, an axis of rotation of the rotatable mask holder 710 in parallel with the optical axis 701; 651, a first mask pattern formed on the mask 6; 652, a second mask pattern formed on the mask 6; 653, a third mask pattern formed on the mask 6; and 654, a fourth mask pattern formed on the mask 6.

The first, second, third and fourth mask patterns 651,652, 653 and 654 are arranged on the circumference of a circle, the center of which is on the axis of rotation 711, such that the distance between each center of each mask pattern and the axis of rotation 711 is substantially equal to the distance between the axis of rotation 711 and the optical axis 701 of the laser light.

Figure 96:
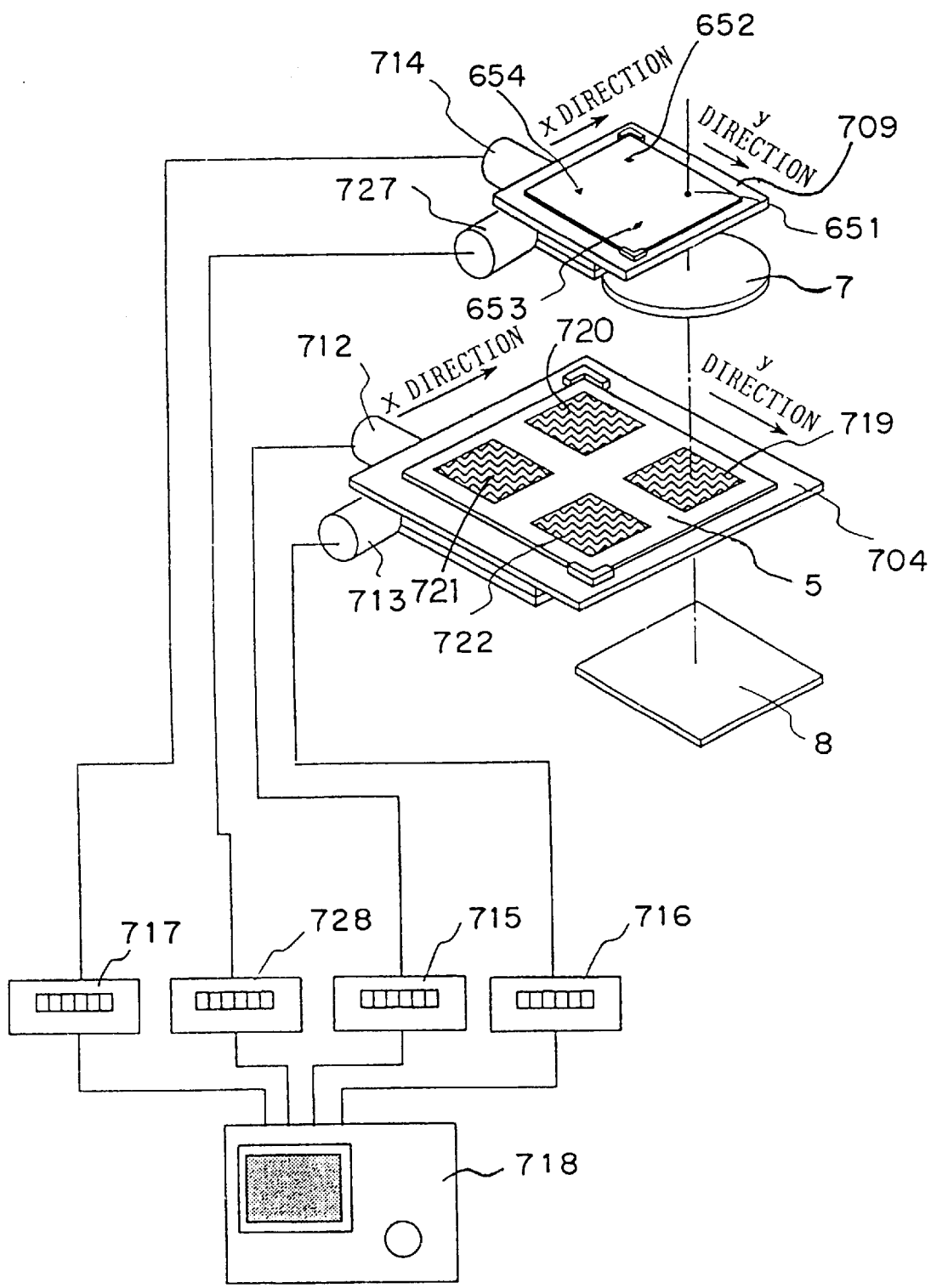
FIG. 96 is a diagrammatic view showing the structure of a laser transfer machining apparatus provided with a control unit for controlling a replacing operation of the embodiment of FIG. 95 according to an embodiment of the present invention.

The description will be directed to an operation of the embodiment. In FIG. 96, the first mask pattern 651, which is selected from the four mask patterns of the mask 6, is arranged in the optical path of the laser light and is used for machining. When the first mask pattern 651, which is being used for machining, is replaced by the second mask pattern 652, the third mask pattern 653, or the fourth mask pattern 654, the rotatable mask holder 710 is rotated in the direction shown by the arrow R in the figure so that the center of the second mask pattern 652, the third mask pattern 653 or the fourth mask pattern 654 is on the optical axis 701 of the laser light. The mask pattern can be easily replaced by the rotation.

The cost of fabricating one substrate having a plurality of mask patterns formed thereon is lower than that of fabricating a plurality of masks each having a similar mask pattern. The apparatus with the holder is effective when a change of the mask pattern is required for a machining process or the mask must be replaced by another mask having the same mask pattern for the reason that the current mask is damaged by heat, or the like. In such a case, a mask, on which a plurality of mask patterns required for the machining process are formed, is prepared. Then, the rotatable mask holder is rotated about the axis of rotation 711 parallel with the optical axis 701 of laser light to replace the mask pattern in use for the machining process with another one. The position of the mask pattern set up is easily adjusted. Therefore, the apparatus with the holder can eliminate a series of operations, i.e. removing a mask mounted in a machining apparatus while the apparatus is machining, placing another mask in the apparatus and adjusting the position of the other mask set up in the apparatus. Thereby, the time required for machining can be reduced and the efficiency of machining can be improved. Furthermore, since the mask is provided with the plural mask patterns formed thereon and hence it is not necessary to prepare a plurality of mounting space for masks on the mask holder, dimensions of the mask holder can be further reduced. Since only the axis of rotation of the rotatable mask holder is controlled when exchanging a hologram pattern for another one, the replacing and adjusting operations of mask pattern can be performed more easily.

In a variant of the embodiment, the mask 6 according to the embodiment and the means for holding a plurality of holograms as shown in FIGS. 82 to 85 can be combined. The combination can eliminate a series of operations, i.e. removing a hologram mounted in a machining apparatus while the apparatus is machining, placing another hologram in the apparatus and adjusting the position of the other hologram set up in the apparatus. Thereby, the efficiency of machining can be improved more greatly when a plurality of holograms and a plurality of masks are needed for machining.

Figure 95:
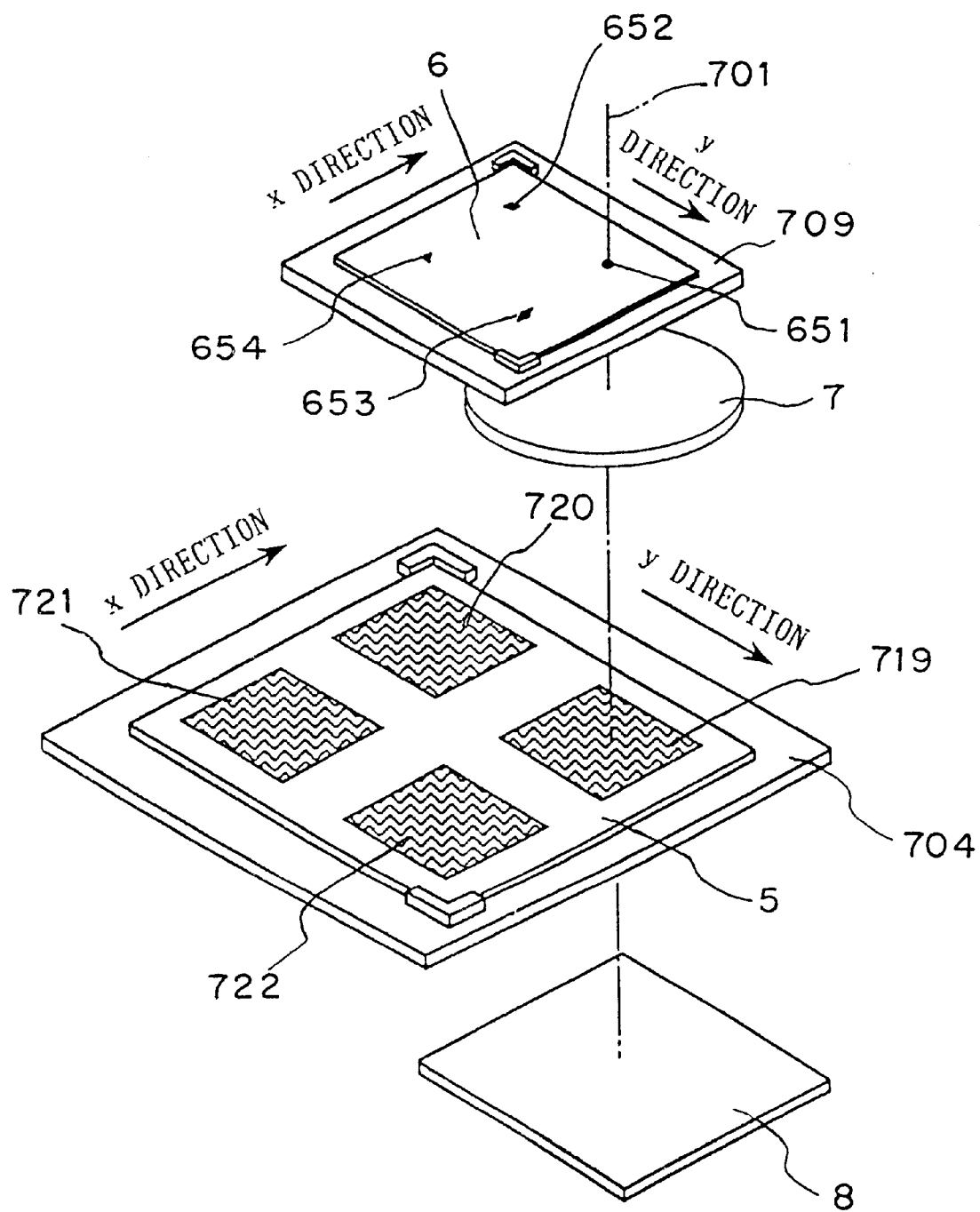
FIG. 95 is a diagrammatic view showing the structure of a laser transfer machining apparatus adapted to use four different hologram patterns disposed on a hologram by selecting one of them and to use four different mask patterns disposed on a mask by selecting one of them according to an embodiment of the present invention.

FIG. 95 is a diagrammatic view showing the structure of a laser transfer machining apparatus according to an embodiment of the present invention. In the figure, the same reference numeral as in FIG. 5 denotes the same part or a like part and a reference numeral 701 denotes an optical axis of a laser light incident on the mask; 709, a xy-directions movable mask holder movable in two directions (x-direction and y-direction) perpendicular to the optical axis 701 of the laser light for supporting the mask 6; 651, a first mask pattern formed on the mask 6; 652, a second mask pattern formed on the mask 6; 653, a third mask pattern formed on the mask 6; and 654, a fourth mask pattern formed on the mask 6; 704, a xy-directions movable hologram holder movable in two directions (x-direction and y-direction) perpendicular to the optical axis 701 of the laser light for supporting the hologram 5; 719, a first hologram pattern formed on the hologram 5; 720, a second hologram pattern formed on the hologram 5; 721, a third hologram pattern formed on the hologram 5; and 722, a fourth hologram pattern formed on the hologram 5. This embodiment is a combination of the embodiment shown in FIG. 91 and the embodiment shown in FIG. 93.

The description will be directed to an operation of the embodiment. The first, second, third and fourth hologram patterns 719,720,721 and 722 are arranged on the hologram 5 attached in the xy-directions hologram holder 704 such that the centers of them are nearly at vertices of a square on the hologram 5. In FIG. 95, the first hologram pattern 719, which is selected from the four hologram patterns of the hologram, is arranged in the optical path of the laser light and is used for machining. When the first hologram pattern 719, which is being used for machining, is replaced by the second hologram pattern 720, the third hologram pattern 721, or the fourth hologram pattern 722, the xy-directions movable hologram holder 704 is translated in the x-direction, y-direction or both the directions so that the center of the second hologram pattern 720, the third hologram pattern 721 or the fourth hologram pattern 722 is on the optical axis 701 of the laser light. The hologram pattern can be easily replaced by the translation.

On the other hand, the first, second, third and fourth mask patterns 651,652,653 and 654 are arranged on the mask 6 such that the centers of them are nearly at vertices of a square on the mask 6, respectively. In FIG. 95, the first mask pattern 651, which is selected from the four mask patterns of the mask 6, is arranged in the optical path of the laser light and is used for machining. When the first mask pattern 651, which is being used for machining, is replaced by the second mask pattern 652, the third mask pattern 653, or the fourth mask pattern 654, the xy-directions movable mask holder 709 is translated in the x-direction, y-direction or both the directions so that the center of the second mask pattern 652, the third mask pattern 653 or the fourth mask pattern 654 is on the optical axis 701 of the laser light. The mask pattern can be easily replaced by the translation.

A movement of the xy-directions movable hologram holder in the x-direction, y-direction or both the directions makes it possible to replace a hologram pattern being used for the machining process with another one and to easily adjust the position of the hologram pattern set up. A movement of the xy-directions movable mask holder in the x-direction, y-direction or both the directions makes it possible to replace a mask pattern being used for the machining process with another one and to easily adjust the position of the mask pattern set up.

Therefore, it is not necessary to remove a hologram mounted in a machining apparatus while the apparatus is machining in order to place another hologram in the apparatus, and hence it is not necessary to adjust the other hologram set up in the apparatus. Thereby, the time required for machining can be reduced and the efficiency of machining can be improved. Furthermore, since the hologram is provided with the plural hologram patterns formed thereon and hence it is not necessary to prepare a plurality of mounting space for holograms on the hologram holder, dimensions of the hologram holder can be further reduced. Furthermore, when a change of the mask pattern is required for a machining process or the mask must be replaced by another mask having the same mask pattern for the reason that it is damaged by heat, it is not necessary to remove a mask mounted in a machining apparatus while the apparatus is machining in order to place another mask in the apparatus, and hence it is not necessary to adjust the position of the other mask. Thereby, the time required for machining can be reduced and the efficiency of machining can be improved. Furthermore, since the mask is provided with the plural mask patterns formed thereon and hence it is not necessary to prepare a plurality of mounting space for masks on the mask holder, dimensions of the mask holder can be further reduced.

When a plurality of holograms and a plurality of masks are needed for machining, the apparatus with the holders can eliminate a series of operations, i.e. removing a hologram and a mask mounted in a machining apparatus while the apparatus is machining, placing another hologram and another mask in the apparatus and adjusting the positions of the other hologram and mask set up in the apparatus. Thereby, the time required for machining can be reduced more greatly and the efficiency of machining can be improved more greatly.

In this embodiment, instead of the xy-directions movable hologram holder, a holder like the aforementioned x-direction movable hologram holder or the rotatable hologram holder may be used. The similar advantageous effects can be provided by the latter holder. Also, instead of the x-direction movable mask holder, a holder like the aforementioned xy-directions movable mask holder or the rotatable mask holder may be used. The similar advantageous effects can be provided by the latter holder.

FIG. 96 is a diagrammatic view showing the structure of a laser transfer machining apparatus according to an embodiment of the present invention. In the figure, the same reference numeral as in FIG. 89 denotes the same part or a like part and a reference numeral 712 denotes a first pulse motor for moving the xy-directions movable hologram holder 704 in the x-direction; 713, a second pulse motor for moving the xy-directions movable hologram holder 704 in the y-direction; 714, a third pulse motor for moving the xy-directions movable mask holder 709 in the x-direction; 727, a fourth pulse motor for moving the xy-directions movable mask holder 709 in the y-direction; 715, a first pulse generator for generating a pulse driving the first pulse motor 712; 716, a second pulse generator for generating a pulse driving the second pulse motor 713; 717, a third pulse generator for generating a pulse driving the third pulse motor 714; 728, a fourth pulse generator for generating a pulse driving the fourth pulse motor 727; and 718, a control unit for controlling the number of pulses generated by the first, second, third and fourth pulse generators and the timing of the pulses generated. This embodiment is a preferred variant of the above embodiment shown in FIG. 95.

The description will be directed to an operation of the embodiment. An angle of rotation of each pulse motor is proportional to the number of pulses provided by the control unit 718. When exchanging both the hologram pattern and the mask pattern being used while the transferring machining apparatus is in operation, the control unit 718 controls the number of pulses generated by the first, second third and fourth pulse generators 715,716 717 and 728 and the timing of the pulses generated in such a manner that the first, second third and fourth pulse motors 712, 713, 714 and 727 rotate simultaneously by a predetermined angle, respectively. The controlled movements make it possible to replace the hologram pattern and mask pattern in synchronism with each other simultaneously. In addition to the advantages which the above embodiment in FIG. 95 offers, the machining apparatus of this embodiment can reduce the time required for machining and improve the efficiency of machining.

In this embodiment, instead of the xy-directions movable hologram holder, a holder like the aforementioned x-direction movable hologram holder or the rotatable hologram holder may be used. Similarly, the pulse motors can be used as a driving unit for these holders. The similar advantageous effects can be provided by the latter holder. Also, instead of the x-direction movable mask holder, a holder like the aforementioned xy-directions movable mask holder or the rotatable mask holder may be used. Similarly, the pulse motors can be used as a driving unit for these holders. The similar advantageous effects can be provided by the latter holder.

Next, the description will be directed to a zero-order diffracted light. In the aforementioned transferring machining with a laser such as an eximer laser using a phase hologram, the phases of components of a laser light incident on the phase hologram are shifted by half of the wavelength of the incident laser light by phase shift portions disposed on arbitrary positions on the phase hologram, and the result is that a pattern is formed on a target to be machined. Due to a limitation of accuracies when fabricating the phase hologram it is difficult to form phase portions with a width exactly equal to the half wavelength. Therefore, the laser light passing through. the phase shift portions has an error in the phase shift of the half wavelength and hence the laser light which is not affected by an interference action by the phase hologram travels straight in the phase hologram, emerging as a zero-order diffracted light. The zero-order light will be imaged on the target to be machined and will machine the target. Thus, the emergence of the zero-order diffracted light results in disturbing the pattern to be machined.

Figure 97:
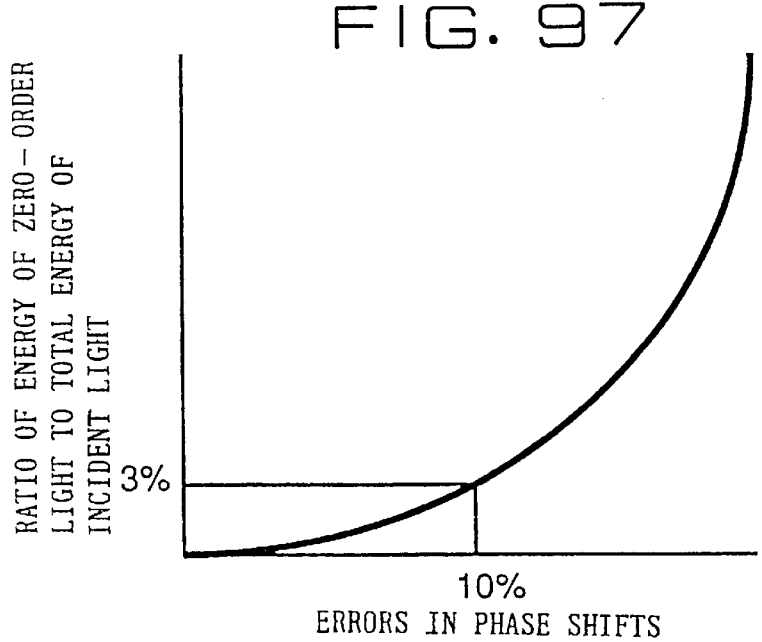
FIG. 97 is a graph showing a ratio of energy of zero-order diffracted light to total energy of incident laser light versus errors in phase shifts of half of the wavelength of the laser light passing through the phase shift portions of a typical phase hologram.

FIG. 97 is a graph showing a ratio of energy of zero-order diffracted light to total energy of incident laser light versus errors in phase shifts of half of the wavelength of the laser light passing through a typical phase hologram. As can be seen from the figure, if errors in phase shifts are within ±10%, the ratio of energy of zero-order diffracted light to total energy of incident laser light is 3% or less.

By controlling accuracies when fabricating the phase hologram, the laser transfer machining apparatus according to the embodiment can reduce the ratio of energy of the zero-order diffracted light. Thereby, the efficiency of utilization of incident laser light is improved and the accuracy of machining the target to be machined is improved. The reliability of the laser transfer machining apparatus is improved.

Figure 98:
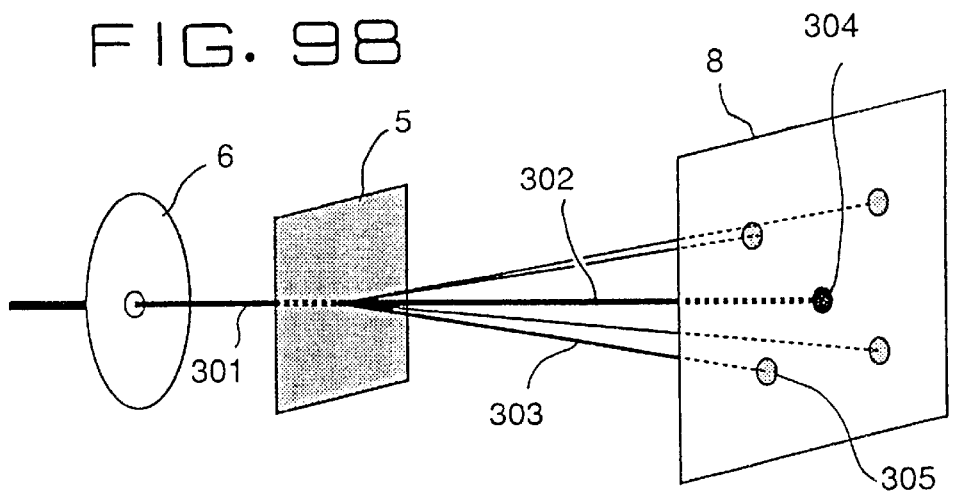
FIG. 98 is a diagrammatic view showing the partial structure of a laser transfer machining apparatus adapted to utilize zero-order diffracted light according to an embodiment of the present invention.

FIG. 98 is a diagrammatic view showing the partial structure of a laser transfer machining apparatus according to an embodiment of the present invention. In the figure, the same reference numeral as in FIG. 5 denotes the same part or a like part and a reference numeral 302 denotes a zero-order diffracted light emerging from the phase hologram. The embodiment is constructed so as to utilize the zero-order diffracted light positively.

Figure 99:
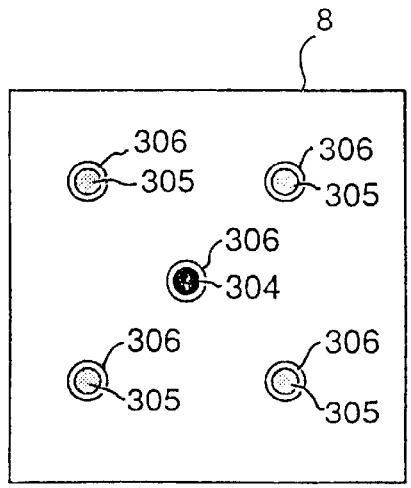
FIG. 99 is a plane view of an example of a target to be machined which is machined by the laser transfer machining apparatus according to the embodiment of FIG. 98.

In operation, the phase hologram 5 is illuminated with a laser light 301 passing through the mask 6. The laser light 301 incident on the phase hologram 5 is divided into the zero-order diffracted light 302 and a diffracted light 303. The lights are imaged on the target 8 to be machined, thereby machining the target 8. On the target 8 to be machined, a hole 304 by the zero-order diffracted light 302 and a hole 305 by the diffracted light 303 are drilled. Thus, as shown in FIG. 99 the hologram 5 should be designed such that the position of the machined hole 304 by the zero-order diffracted light is identical with one of desired positions 306 of patterns to be machined on the target 8. Thereby, the hologram can utilize the energy of the zero-order diffracted light 302 and hence the accuracy of machining is improved.

As mentioned above, the laser transfer machining apparatus according to the embodiment can utilize the energy of zero-order diffracted light directly, thereby eliminating the error of machining due to zero-order diffracted light and improving the efficiency of utilization of incident laser light, hence permitting reliable laser machining.

Figure 100:
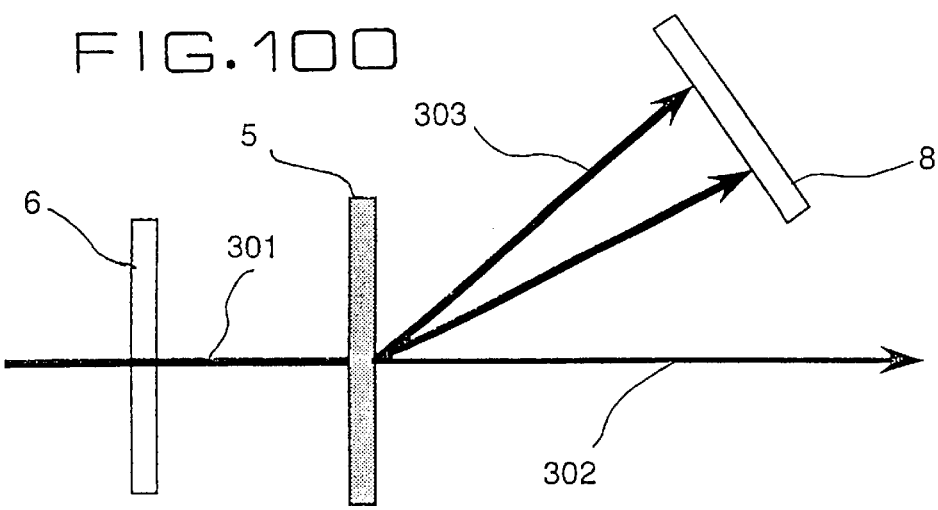
FIG. 100 is a diagrammatic view showing the partial structure of a laser transfer machining apparatus adapted to utilize zero-order diffracted light according to an embodiment of the present invention.

FIG. 100 is a diagrammatic view showing the partial structure of a laser transfer machining apparatus according to an embodiment of the present invention. In the figure, the same reference numeral as in FIG. 5 denotes the same part or a like part and a reference numeral 302 denotes a zero-order diffracted light emerging from the phase hologram 5.

In operation, a laser light 301 incident on the phase hologram 5 is divided into the zero-order diffracted light 302 and a diffracted light 303. The hologram 5 is designed such that the optical path of diffracted light 303 is separated from that of the zero-order diffracted light 302. Furthermore, the hologram 5 is arranged to illuminate the target 8 to be machined with only the diffracted light 303. The target is machined without being affected by the zero-order diffracted light 302, and therefore the accuracy of machining is improved.

That is, the laser transfer machining apparatus according to the embodiment provides more accurate and reliable laser machining by preventing zero-order diffracted light from being incident on the target to be machined.

Figure 101:
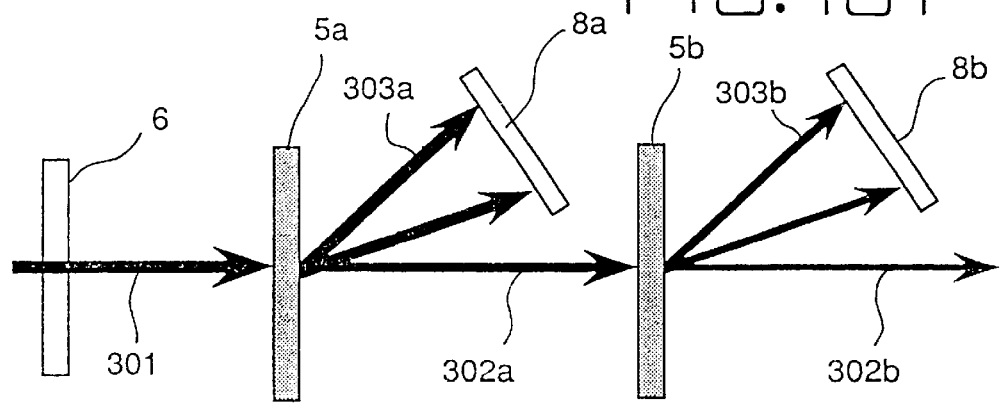
FIG. 101 is a diagrammatic view showing the partial structure of a laser transfer machining apparatus adapted to utilize zero-order diffracted light according to an embodiment of the present invention.

FIG. 101 is a diagrammatic view showing the partial structure of a laser transfer machining apparatus according to an embodiment of the present invention. In the figure, the same reference numeral as in FIG. 5 denotes the same part or a like part and a reference numeral 5a denotes a first phase hologram; 5b, a second phase hologram; 8a, a first target to be machined; 8b, a second target to be machined; 302a, a zero-order diffracted light emerging from the first phase hologram 5a; and 302b, a zero-order diffracted light emerging from the second phase hologram 5b.

In operation, a laser light 301 incident on the first phase hologram 5a is divided into the first zero-order diffracted light 302a and a first diffracted light 303a, as shown in FIG. 101. The first diffracted light 303a is imaged on the first target 8a to be machined, thereby machining the target. The second hologram 5b is disposed in the optical path of the first zero-order diffracted light 302a separated from the first diffracted light 303a. After the zero-order diffracted light 302a incident on the second phase hologram 5b is divided into the second zero-order diffracted light 302b and a second diffracted light 303b, the second diffracted light 303b is imaged on the second target 8b to be machined, thereby machining the target. By continuously utilizing the zero-order diffracted lights which do not enter the targets to be machined directly, the efficiency of utilization of incident light and the accuracy of machining are improved.

As mentioned above, the laser transfer machining appararus according to the embodiment can utilize the energy of zero-order diffracted light which does not enter a workpiece to be machined, thereby eliminating the error of machining due to zero-order diffracted light and improving the efficiency of utilization of incident laser light, hence permitting reliable laser machining.

Figure 102:
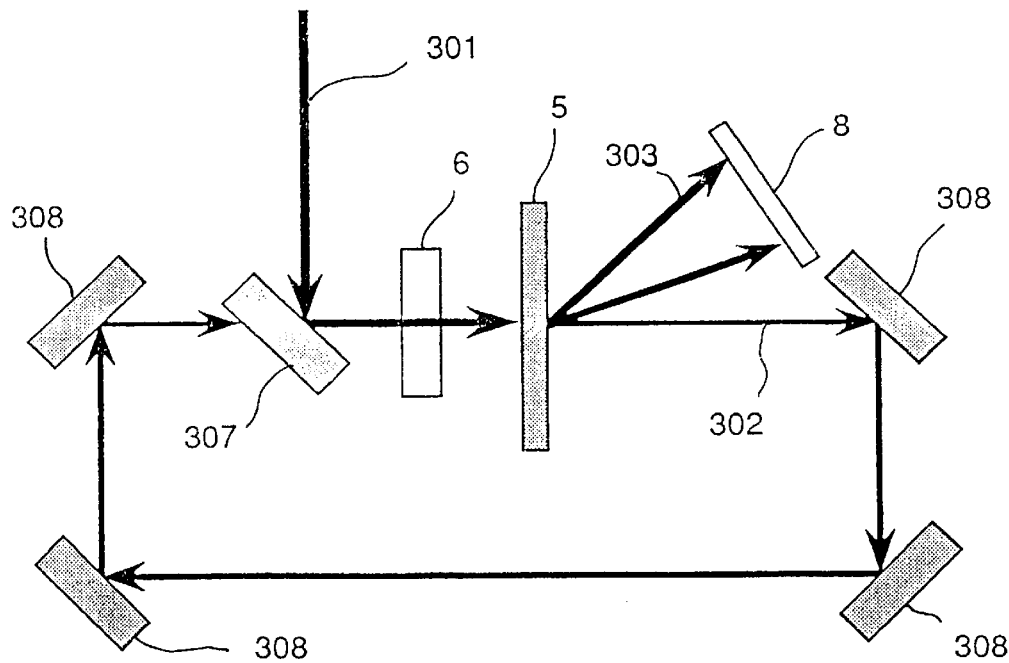
FIG. 102 is a diagrammatic view showing the partial structure of a laser transfer machining apparatus adapted to utilize zero-order diffracted light according to an embodiment of the present invention.

FIG. 102 is a diagrammatic view showing the partial structure of a laser transfer machining apparatus according to an embodiment of the present invention. In the figure, the same reference numeral as in FIG. 5 denotes the same part or a like part and a reference numeral 302 denotes a zero-order diffracted light emerging from the first phase hologram 5; 307, a partially reflecting mirror; and 308, fully reflecting mirrors disposed to utilize a zero-order diffracted light emitted by the phase hologram 5.

In operation, a laser light 301 reflected by the partially reflecting mirror 307 passes through the phase hologram 5 and then it is divided into the zero-order diffracted light 302 and a diffracted light 303, as shown in FIG. 102. The diffracted light 303 is imaged on the target 8 to be machined, thereby machining the target. After the zero-order diffracted light 302 separated from the diffracted light 303 is reflected by the plural fully reflecting mirrors 308 and is returned to the phase hologram 5 along the optical path of the laser light 301 through the partially reflecting mirror 307. By returning the zero-order diffracted light which does not enter the target to be machined directly, the efficiency of utilization of incident light and the accuracy of machining are improved.

As mentioned above, the laser transfer machining apparatus according to the embodiment can utilize the energy of zero-order diffracted light which does not enter a workpiece to be machined at first, thereby eliminating the error of machining due to zero-order diffracted light and improving the efficiency of utilization of incident laser light, hence permitting reliable laser machining.

Figure 103:
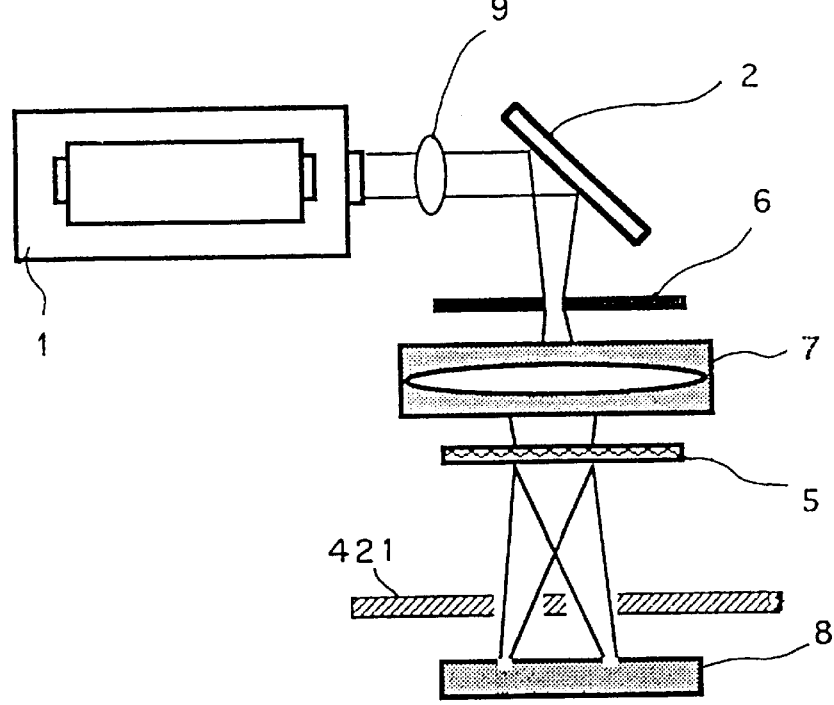
FIG. 103 is a diagrammatic view showing the partial structure of a laser transfer machining apparatus provided with a shielding plate for shielding a laser light unnecessary for machining such as zero-order diffracted light according to an embodiment of the present invention.
Figure 104:
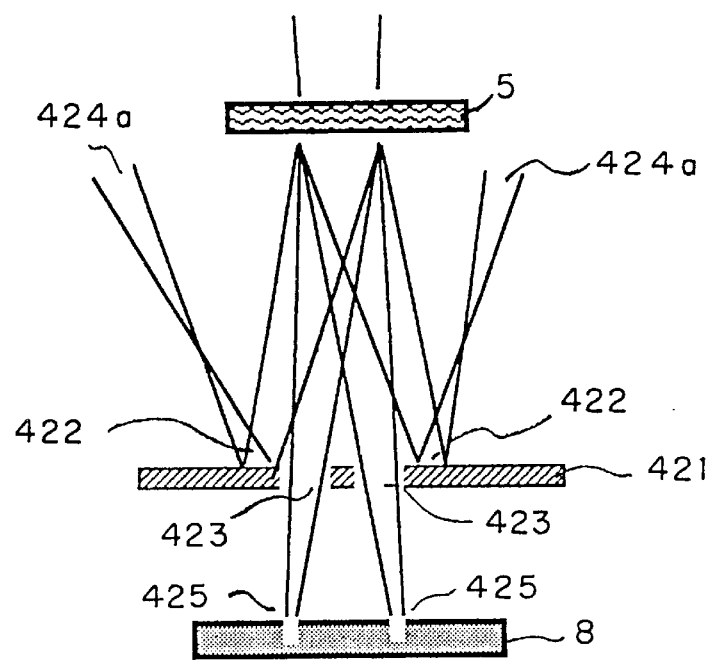
FIG. 104 is a diagrammatic view showing the structure of the shielding plate according to the embodiment of FIG. 103.

FIG. 103 is a diagrammatic view showing the partial structure of a laser transfer machining apparatus according to an embodiment of the present invention. In the figure, the same reference numeral as in FIG. 5 denotes the same part or a like part and a reference numeral 412 denotes a shielding plate. FIG. 104 is a view showing the structure of the shielding plate 421. In the figure, a reference numeral 422 denotes a shielding portion for shielding laser light of the shielding plate 421; and 423, a transparent portion, through which laser light is transmitted, of the shielding plate.

As previously mentioned, the phase hologram 5 provides the laser light passing therethrough with phase shifts by means of phase shift portions disposed on arbitrary positions on the phase hologram. A pattern to be transferred is determined by the amount of the phase shifts generated. Due to a limitation of accuracies when fabricating the phase hologram it is difficult to form phase portions with a width exactly equal to half of the wavelength of the incident laser light. Therefore, the laser light passing through the phase shift portions has an error in the phase shift of half of the wavelength and hence the laser light which is not affected by an interference action by the phase hologram travels straight in the phase hologram, emerging as a zero-order diffracted light. The zero-order diffracted light will be imaged on the target to be machined, and then it will damage the target or have a bad influence upon the target. Thus, the emergence of the zero-order diffracted light results in disturbing the pattern to be machined. In addition, a diffracted light, which is to be imaged at a position where any one of the desired transferred patterns cannot be imaged and any illuminated spots cannot appear, such as a conjugate light or a high order light may arrive at the target 8 to be machined, thereby disturbing the whole pattern to be machined.

The laser transfer machining apparatus according to the embodiment is adapted to shield the aforementioned zero-order diffracted light and an unnecessary diffracted light. As shown in FIG. 104, the shielding plate 421 is disposed between the phase hologram 5 and the target 8 to be machined. The shielding plate 421 is constituted by the shielding portion 422 for fully or partially shielding or attenuating the zero-order diffracted light and the diffracted lights unnecessary for machining such as a diffracted conjugate light and a high order diffracted light and the transparent 423 having a high transmissibility for transmitting the laser lights imaged on the target 8 to be machined for the purpose of machining.

In operation, a laser light incident on the shielding portion 422 is reflected by the shielding portion 422 and is dispersed as a reflected light 424a. The reflected light does not arrive at the target 8 to be machined. A laser light 425 passing through the transparent portion 423 is imaged on the target 8 to be machined, thereby machining the target 8. Thus, the machining apparatus can shield the unnecessary laser lights having a bad influence upon a target to be machined, and, therefore, it can efficiently manufacture a high quality workpiece in which only desired parts is machined.

The shielding plate 421 of the embodiment is adapted to fully reflect and shield an incident light with the shielding portion thereof. Preferably, the shielding portion 422 is made of a material which absorbs an incident light. The material may attenuate an incident light in such a manner that the attenuated light arriving at the target 8 to be machined cannot affect the target. Alteratively, the shielding portion may be constituted by a means for reducing a ratio of openings by using a mesh, a hibachi structure or the like, or by using a polarizer for shielding a laser light polarized in a certain direction in order to reduce its own transmissibility.

Figure 105:
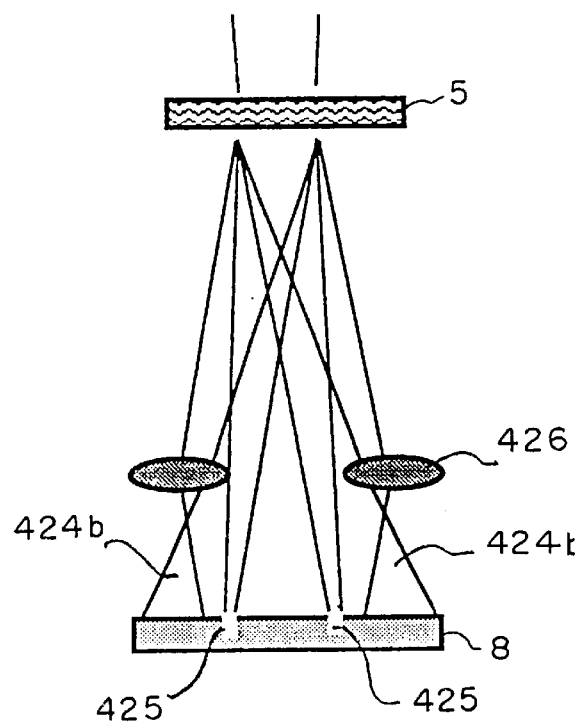
FIG. 105 is a diagrammatic view showing the partial structure of a laser transfer machining apparatus provided with a lens for shielding a laser light unnecessary for machining such as zero-order diffracted light according to an embodiment of the present invention.

FIG. 105 is a diagrammatic view showing the partial structure of a laser transfer machining apparatus according to an embodiment of the present invention. In the figure, the same reference numeral as in FIG. 104 denotes the same part or a like part and a reference numeral 426 denotes a lens. The lens 426 is disposed to prevent laser lights unnecessary for machining from being imaged on the target 8 to be machined. The lens 426 corresponds to the shielding portion 422 of the embodiment in FIG. 103.

In operation, a laser light such as a diffracted light unnecessary for machining is reflected by the lens 426 and it is therefore not imaged on the target 8 to be machined. Even if the laser light is projected on the target 8 to be machined, since the intensity of the laser light is too feeble compared with that of transferred laser beams and hence it is lower than the intensity required for machining, the target 8 to be machined is not affected. Thus, the laser transfer machining apparatus with the lens makes it possible to attenuate an unnecessary laser light which has a bad influence upon a target to be machined and therefore to efficiently manufacture a high quality workpiece in which only desired parts are machined. Furthermore, a laser light unnecessary for machining is not returned to the phase hologram 5, unlike a reflected light in the case of the shielding plate mentioned above. In addition, the lens offers an advantage that there is no rise of temperature in the lens, unlike the shielding plate the temperature of which rises because the plate absorbs the unnecessary light.

Figure 106:
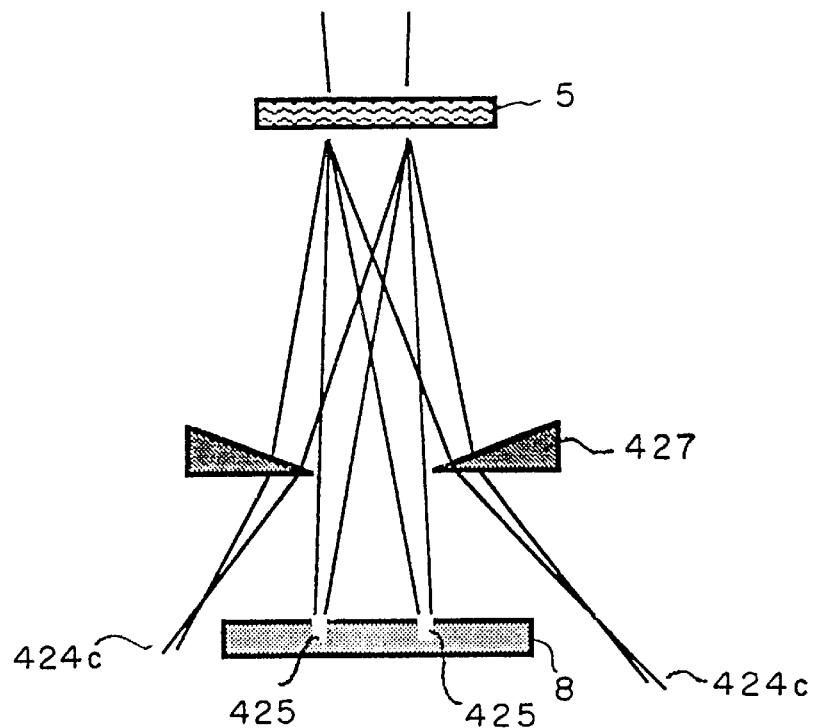
FIG. 106 is a diagrammatic view showing the partial structure of a laser transfer machining apparatus provided with a prism for shielding a laser light unnecessary for machining such as zero-order diffracted light according to an embodiment of the present invention.

FIG. 106 is a diagrammatic view showing the partial structure of a laser transfer machining apparatus according to an embodiment of the present invention. In the figure, the same reference numeral as in FIG. 104 denotes the same part or a like part and a reference numeral 427 denotes a prism. The prism 427 is disposed to prevent laser lights unnecessary for machining from being imaged on the target 8 to be machined. The prism 427 corresponds to the shielding portion 422 of the aforementioned embodiment.

In operation, a laser light unnecessary for machining such as a diffracted light is reflected by the prism 427 and is dispersed as a reflected light 424c in a direction different from that toward the target 8 to be machined. The reflected light is not imaged on the target 8 to be machined. Because of the refraction the optical length of the reflected light 424c is increased compared with those of laser lights necessary for machining which are not affected by the prism 427. The position where the reflected light is imaged varies. Thus, the laser transfer machining apparatus with the prism makes it possible to prevent an unnecessary laser light which has a bad influence upon a target to be machined from illuminating the target. Even if the target is illuminated by the unnecessary laser light, since the intensity of the laser light is too feeble compared with that of transferred laser beams and hence it is lower than the intensity required for machining, the target 8 to be machined is not affected. Thus, the laser transfer machining apparatus with the prism makes it possible to efficiently manufacture a high quality workpiece in which only desired parts are machined. Furthermore, a light unnecessary for machining is not returned to the phase hologram 5, unlike a reflected light in the case of the shielding plate mentioned above. In addition, the prism offers an advantage that there is no rise of temperature therein, unlike the shielding plate the temperature of which rises because the plate absorbs the unnecessary light.

Figure 107:
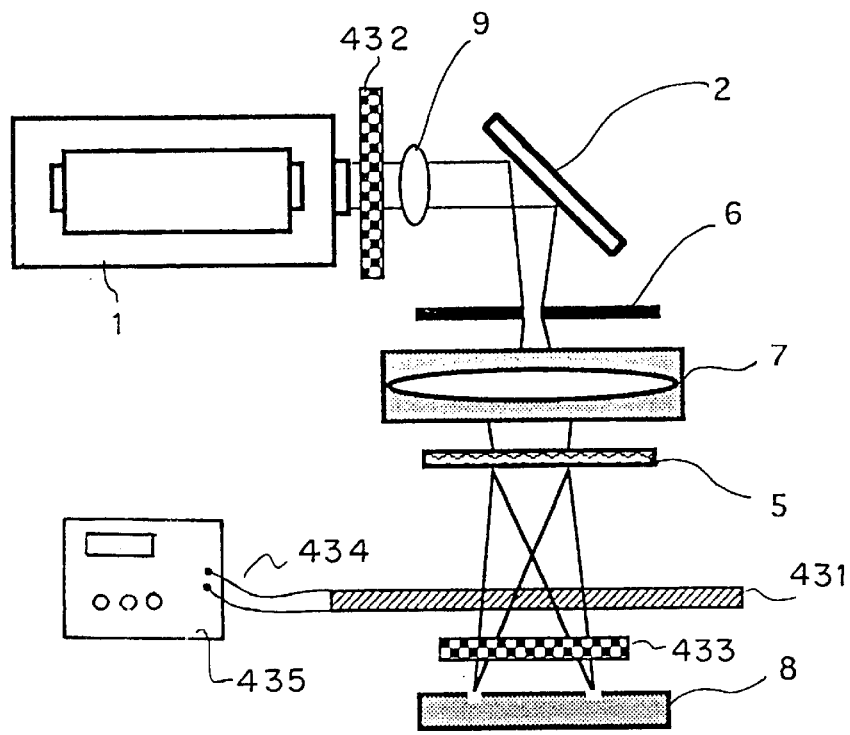
FIG. 107 is a diagrammatic view showing the structure of a laser transfer machining apparatus provided with an electro-optical element plate for shielding a laser light unnecessary for machining such as zero-order diffracted light according to an embodiment of the present invention.
Figure 108:
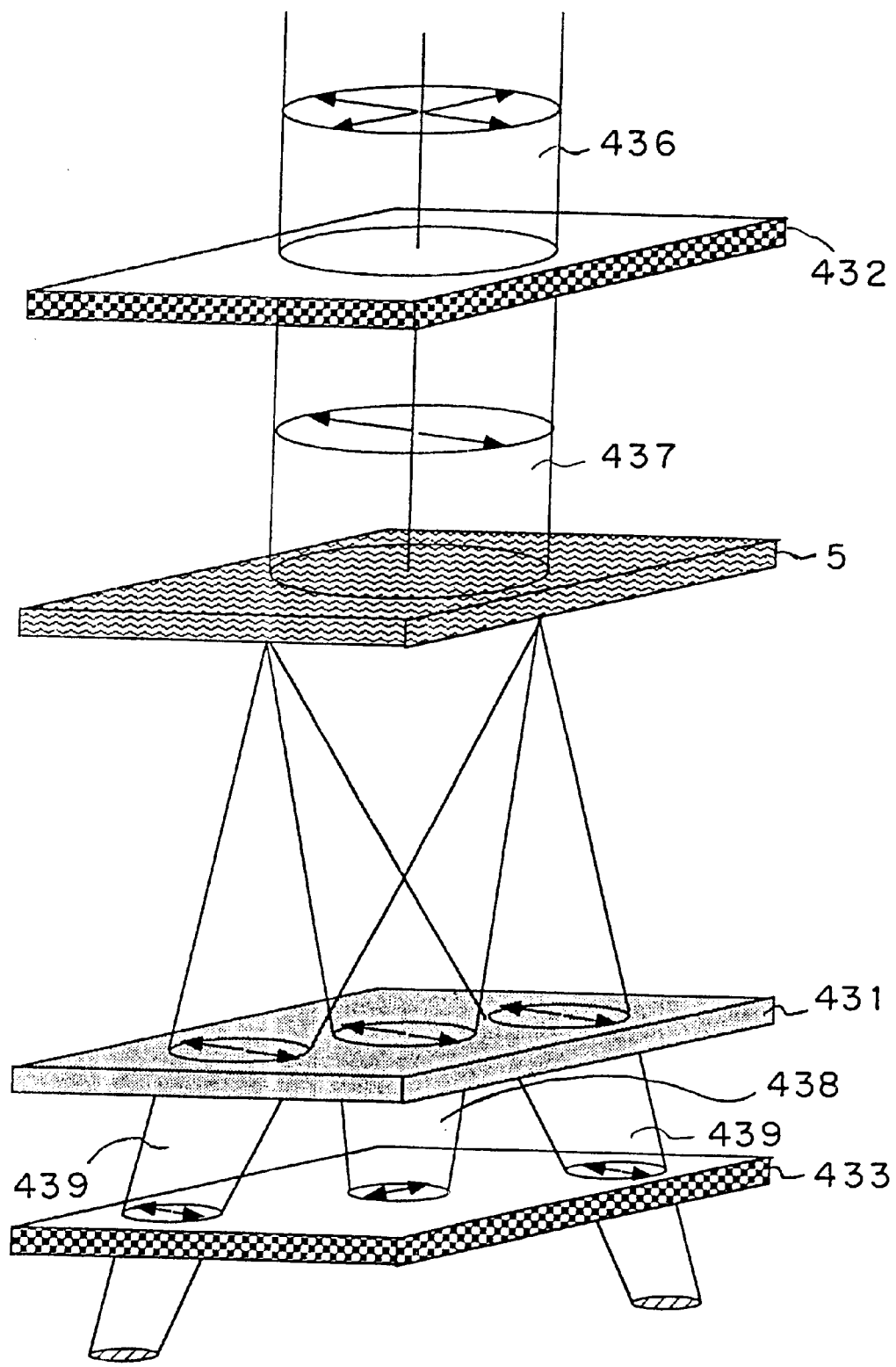
FIG. 108 is a diagrammatic view of the electro-optical element plate according to the embodiment of FIG. 107.

FIG. 107 is a diagrammatic view showing the structure of a laser transfer machining apparatus according to an embodiment of the present invention. In the figure, the same reference numeral as in FIG. 5 denotes the same part or a like part and a reference numeral 431 denotes a electro-optical element plate; 432, a polarizer disposed between the laser oscillator 1 and the electro-optical element plate 431; 433 an analyzer disposed between the target 8 to be machined and the electro-optical element plate 431; 434, a lead line for supplying an arbitrary part of the electro-optical element plate 431 with a voltage; and 435, a control power supply for supplying an arbitrary part of the electro-optical element plate 431 with a voltage. FIG. 108 is a schematic view of the phase hologram of the embodiment and a reference numeral 436 denotes a laser light incident on the polarizer 432; 437, a laser light linearly polarized by the polarizer 432; 438, a laser light the direction of polarization of which is turned by 90° by the electro-optical element plate 431; and 439, a laser light the direction of polarization of which does not vary when the laser light is transmitted by the electro-optical element plate 431.

As previously mentioned, the phase hologram 5 provides the incident laser light passing therethrough with phase shifts by means of phase shift portions disposed on arbitrary positions on the phase hologram. A pattern to be transferred is determined by the amount of the phase shifts generated. Due to a limitation of accuracies when fabricating the phase hologram it is difficult to form phase portions with a width exactly equal to half of the wavelength of the incident laser light. Therefore, the laser light passing through the phase shift portions has an error in the phase shift of half of the wavelength and hence the laser light which is not affected by an interference action by the phase hologram travels straight in the phase hologram, emerging as a zero-order diffracted light. The zero-order light will be imaged on the target to be machined, and then it will damage the target or have a bad influence upon the target. Thus, the emergence of the zero-order diffracted light results in disturbing the pattern to be machined. In addition, a diffracted light, which is to be imaged at a position where any one of the desired transferred patterns cannot be imaged and any illuminated spots cannot appear, such as a conjugate light or a high order light may arrive at the target 8 to be machined, thereby disturbing the whole pattern to be machined.

The laser transfer machining apparatus according to the embodiment is constructed so as to shield the zero-order diffracted light and unnecessary diffracted lights. In operation, the laser light 436 passing through the polarizer 432 becomes the laser light 437 which is linearly polarized in the direction defined by the direction of the polarizer 432, as shown in FIGS. 107 and 104. The laser light 437 is incident on the phase hologram 5, and then it is diffracted by the phase hologram 5 and is divided into laser lights for machining, the zero-order diffracted light, a conjugate light and a high order light, which are unnecessary for machining. When these laser lights pass through the electro-optical element plate 431, a voltage is applied to a part of the electro-optical element plate 431, through which the lights unnecessary for machining pass, via a part of the lead lines 434 by the power supply 435. Only the part of the electro-optical element plate 431, through which the lights unnecessary for machining are transmitted, is affected by the electro-optical effect. The direction of polarization of the lights 438 passing through the part is turned by 90°. Both the laser lights 438 the direction of polarization of which is turned by 90° after passing the electro-optical element 431 and the laser light 439 the direction of polarization of which does not vary upon passing the electro-optical element plate 431 are directed to the analyzer 433 disposed behind the electro-optical element plate 431. The analyzer 433 is arranged so as to shield the laser light 438 the direction of polarization of which is turned by the electro-optical element 431. Thus, the passing laser lights 438 the direction of polarization of which is turned by 90° can be separated from the passing laser light 439 the direction of polarization of which does not vary. Only the passing laser light 439 the direction of polarization of which does not vary is incident on the target 8 to be machined. Therefore, the laser transfer machining apparatus is able to efficiently fabricate a high quality workpiece in which only desired parts are machined.

In the embodiment, the laser lights, the direction of polarization of which is turned by 90°, are shielded by the analyzer. Alternatively, the laser light the direction of polarization of which does not vary upon passing through the electro-optical element plate 431 may be transmitted by the analyzer. In this case, the direction of polarization of the laser light necessary for machining is turned by 90° by the electro-optical element plate.

The polarizer 432 of the embodiment is arranged for defining the direction of polarization of the laser light emitted by the laser oscillator 1. In a preferred embodiment, the polarizer 432 is inserted in the laser oscillator, or the polarizer is omitted if the laser oscillator is adapted to emit a linearly polarized light by using another means.

Figure 109:
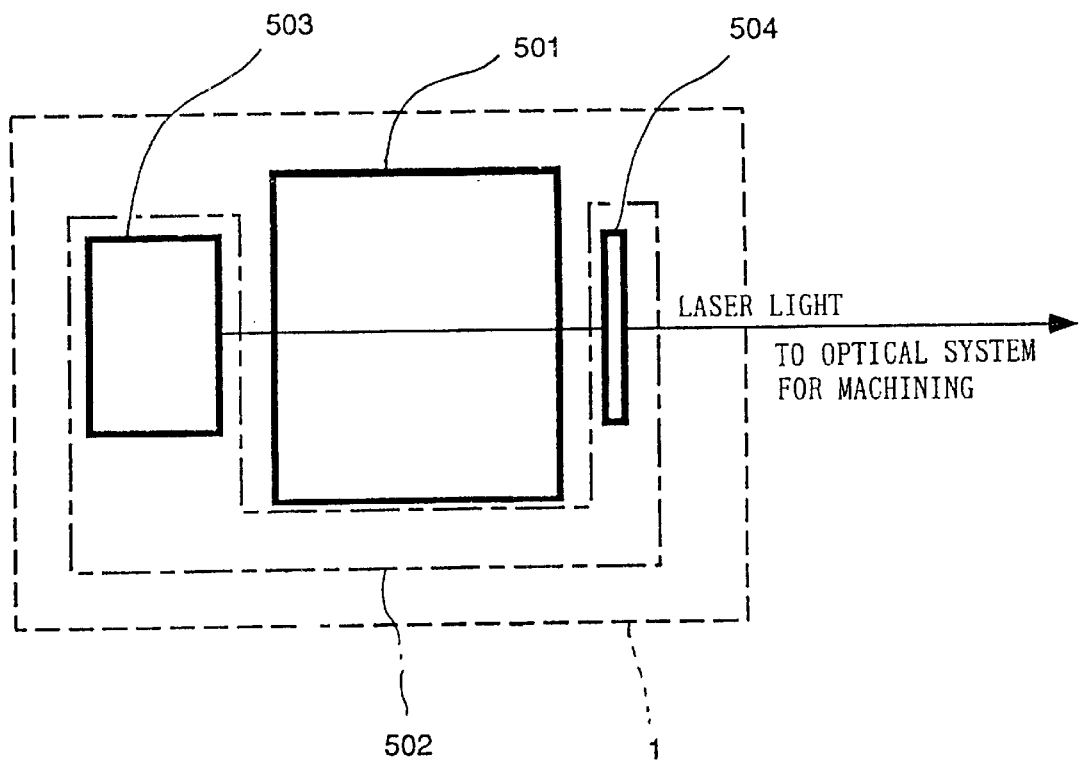
FIG. 109 is a diagrammatic view showing the structure of a laser transfer machining apparatus provided with a laser oscillator having a unit for narrowing a band of wavelengths of laser light according to an embodiment of the present invention.

FIG. 109 is a diagrammatic view showing the structure of a laser oscillator of a laser transfer machining apparatus according to an embodiment of the present invention. In the figure, the same reference numeral as in FIG. 5 denotes the same part or a like part and a reference numeral 501 denotes a laser medium; 502, an optical cavity; 503, a unit for narrowing a band of wavelengths (a means for narrowing a band width of wavelength); and 504, a partially reflecting mirror. The laser oscillator 1 is an eximer laser typically.

In general, laser light has a certain amount of wavelength broadening. The direction in which a laser light incident on a hologram is diffracted by the hologram depends on the wavelength of the laser light. Therefore, images each having an amount of fuzziness, i.e. an error depending on the amount of wavelength broadening are transferred on a target to be machined. The wavelength broadening of laser light has a bad influence upon the accuracy of machining. When a laser oscillator for emitting a laser light with a wavelength $\lambda$ and a hologram transferring optical system with a spatial frequency a and a matrix element B in the ABCD ray matrix are used, the position of a re-created light on a target to be machined is shifted by a length x (=B$\lambda$a) by the hologram. If the incident laser light has a band width of $\Delta\lambda$, the position of the transferred image has a width $\Delta$x (=Ba $\Delta\lambda$). This effect is a kind of chromatic aberration. If no optical system is disposed between the hologram and the target to be machined, the matrix element B is equal to the distance L between them. Assuming that the typical distance is L=100 mm, the spatial frequency is a=5×10$^5$, and the band width of wavelengths is $\Delta\lambda$=400 pm, the width of the position of the transferred. image is $\Delta$x=20 $\mu$m. This value is at the same level as the present target accuracy of machining of a conventional laser transfer machining apparatus using an eximer laser.

If the target accuracy of machining is $\Gamma$ the condition: the inequality $\Gamma$>$\Delta$x, i.e. $\Gamma$>Ba$\Delta\lambda$ must be satisfied. To this end, the B, a or $\Delta\lambda$ must be reduced. In order to reduce the matrix element B, the distance between the hologram and the other element should be shortened. In order to decrease the spatial frequency a, the minimum pitch of the hologram should be increased. In view of the nature of the condition, it must be satisfied in the case of another laser oscillator as well as in the case of eximer lasers.

In order to reduce $\Delta\lambda$, the wavelength of the laser light in use for machining should be narrowed. Since the accuracy of machining required for laser transfer machining is 2 $\mu$m at most, it is enough to reduce the band width of wavelengths $\Delta\lambda$ to be 40 pm or less. To realize the reduction, for example, a method disclosed by the reference entitled "Spectral-narrowing techniques for eximer laser oscillators", Can. J. Phys. Vol.63, issued to Terrence J. Mckee on 1985, can be used. As shown in FIG. 109, the laser oscillator 1 comprises the laser medium 1 and the optical cavity 502. The optical cavity 502 is constituted by the unit 503 for narrowing band and the partially reflecting mirror 504 disposed opposite to the unit 503 for narrowing band. The laser medium 501 is sandwiched between the unit 503 and the mirror 504. The unit 503 for narrowing band comprises an element for separating different wavelengths of incident light such as a prism, a Fabry-Perot etalon, a grating or the like and some mirrors for reflecting light. If a grating is arranged in the Littrow arrangement, the unit 503 for narrowing band needs no mirror. A light generated in the laser medium 501 is amplified in the laser medium to become a laser light during the round trip in the optical cavity 502. In this case, only a light with a predetermined wavelength is selected by the unit 503 for narrowing band disposed in the optical cavity and is amplified and emitted by the laser oscillator 1.

When a laser light with a higher intensity is needed, the laser light emitted by the oscillator 1 may be amplified by a laser amplifier arranged at the downstream side of the laser oscillator, or the laser light is bounced back and forth along the cavity to be amplified in the same laser medium of the oscillator. By narrowing the band of wavelengths of a laser light in use for machining, there is provided an advantage that an achromatic design of a lens for transferring machining can be easily performed.

Figure 110:
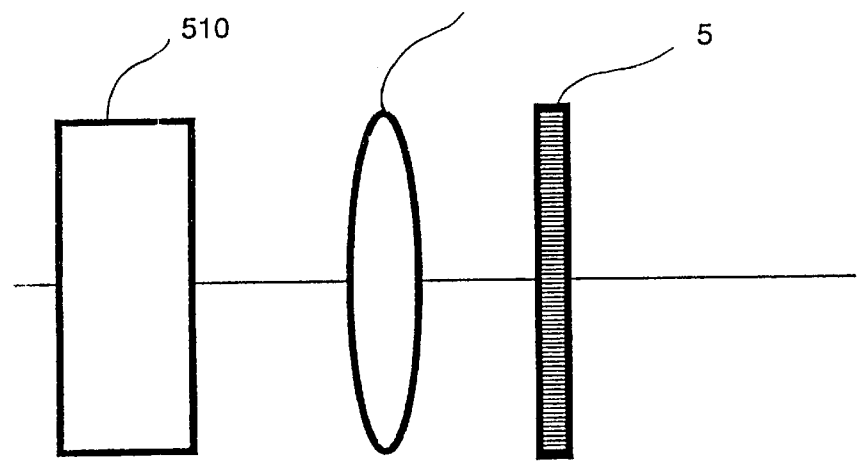
FIG. 110 is a diagrammatic view showing the partial structure of a laser transfer machining apparatus provided with a unit for cancelling chromatic aberration according to an embodiment of the present invention.

FIG. 110 is a diagrammatic view showing the partial structure of a laser transfer machining apparatus according to an embodiment of the present invention. In the figure, the same reference numeral as in FIG. 5 denotes the same part or a like part and a reference numeral 510 denotes a unit for cancelling chromatic aberration.

The laser transfer machining apparatus according to the embodiment is provided with the unit 510 for cancelling chromatic aberration providing a reverse chromatic aberration, which serves as a means for cancelling a chromatic aberration of the phase hologram 5, as shown in FIG. 110. The unit 510 for cancelling chromatic aberration is inserted in the optical system of the laser transfer machining apparatus and fulfills its function in cooperation with the hologram 5. For example, the unit 510 for cancelling chromatic aberration is a prism or a grating which functions as an element for separating different wavelengths of incident light.

In operation, a laser light incident on the unit 510 for cancelling chromatic aberration is provided with a previous variation of the optical path in a direction opposite to that of a variation of the optical path to be caused by the chromatic aberration of the phase hologram 5. When the laser light having this previous variation is incident on the hologram 5 after passing through the transferring lens 7, a plurality of images to be transferred are reproduced and a fuzziness of each image is cancelled at the moment when each image emerges from the hologram. For example, a chromatic aberration of $\Delta$x=B(dn/d$\lambda$)$\Delta\lambda$/n is caused by a prism, where n is the index of refraction of a material forming the prism. If the matrix element is B=100 mm, the dispersion is dn/d$\lambda$=−1.4×10$^6$, the band width of wavelengths is $\Delta\lambda$=400 pm, and the index of refraction is n=1.5 (in the case of quartz), the chromatic aberration $\Delta$x is about 40 $\mu$m. The direction of the chromatic aberration is opposite to that of the aberration $\Delta$x caused by the hologram 5. Therefore, the chromatic aberration of the hologram can be cancelled by changing the distance between the prism and the workpiece to be machined or the like to adjust the matrix element B. Thereby, the accuracy of machining can be improved.

In the laser transfer machining apparatus of the embodiment, a previous variation is given to a light before the light is incident on the hologram. Alteratively, the element for separating different wavelengths of incident light such as a prism or the like may be arranged to provide a light passing through the hologram with the previous aberration.

When using a grating, the direction of a diffracted light must be taken into consideration. The aberration of a grating is given by the equation $\Delta$x=±mBa$\Delta\lambda$, where m is the order of diffracted light, and the sign of the equation depends on in which direction an emergent light is diffracted to the with respect to the surface from which the light emerges. The laser machining apparatus utilizes a light traveling in such a direction that the aberration $\Delta$x given to the light has a minus sign. Furthermore, the optimum order m, the optimum matrix element B and the optimum spatial frequency a are chosen to cancel the chromatic aberration of the hologram 5. The result is that the chromatic aberration of the hologram can be cancelled. In the embodiment, instead of the grating composed of simple lines, a plurality of holograms designed to cancel their chromatic aberrations in cooperation with each other can be employed as the element 510 for separating different wavelengths of incident light.

Figure 111:
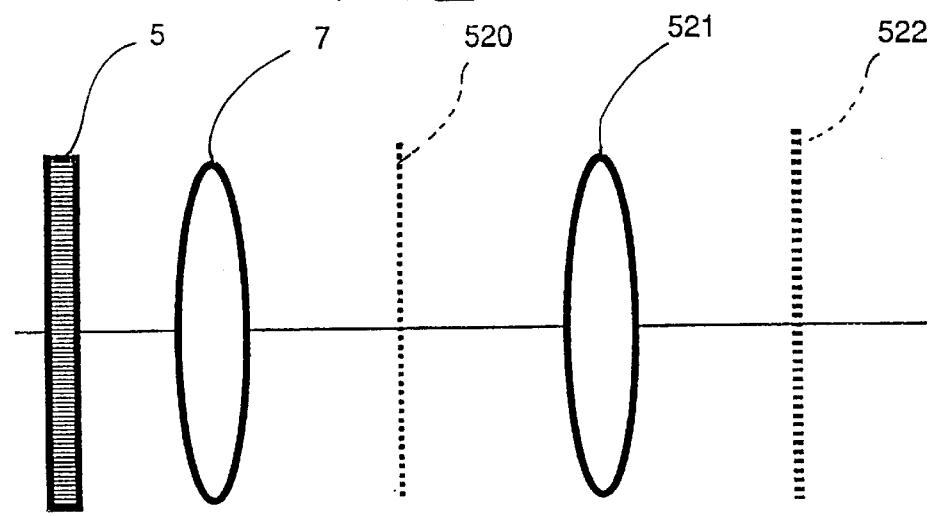
FIG. 111 is a diagrammatic view showing the partial structure of a laser transfer machining apparatus provided with a relay optical system for cancelling chromatic aberration according to an embodiment of the present invention.

FIG. 111 is a diagrammatic view showing the partial structure of a laser transfer machining apparatus according to an embodiment of the present invention. In the figure, the same reference numeral as in FIG. 5 denotes the same part or a like part and a reference numeral 521 denotes a lens for cancelling chromatic aberration.

In general, when an image generated by interference is utilized as a light source and a light emitted by the light source, i.e. the image is affected by interference again, different wavelengths of the interference image generated by the latter interference are not separated. As shown in FIG. 111, the laser transfer machining apparatus according to the embodiment uses a relay optical system including the hologram 5 and a plurality of lenses as a means for providing a previous variation to cancel the chromatic aberration of the hologram 5. For simplicity, a grating with a spatial frequency a will be described hereinafter. The space d' between adjacent bright lines 520 running in a row, which are generated by the grating 5 and the lens 7, is given by the equation d'=B'a$\lambda$. This equation means that the grating is one having a spatial frequency 1/d'. Second diffracted images 522 are generated from the row of the bright lines by the lenses 521 and the space d between the adjacent finally generated images is given by the equation d=B$\lambda$/d'=(B/B')a. As a result, the variable $\lambda$ (wavelength of incident light) is eliminated from the equation of the space d and this means that the optical system is fully achromatic. Thereby, the accuracy of machining is improved.

Thus, by producing a secondary image using a self image by means of such a relay optical system including a plurality of lenses, the aberration of the hologram can be eliminated. For convenience of explanation, the grating is mentioned above to merely explain the function of the aforementioned relay optical system for eliminating chromatic aberration and therefore the relay optical system can be applied to the hologram.

Figure 112:
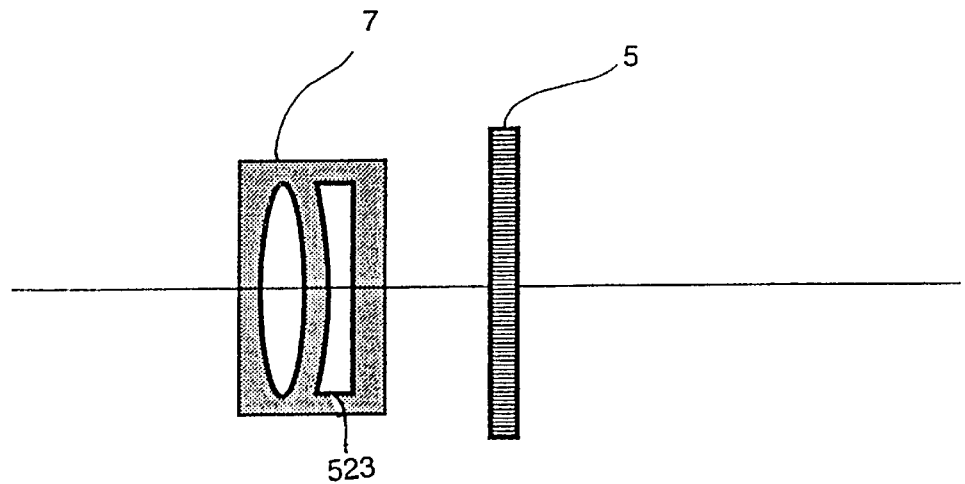

FIG. 112 is a diagrammatic view showing the partial structure of a laser transfer machining apparatus according to an embodiment of the present invention. In the figure, the same reference numeral as in FIG. 5 denotes the same part or a like part and a reference numeral 523 denotes a lens for cancelling chromatic aberration.

Figure 113:
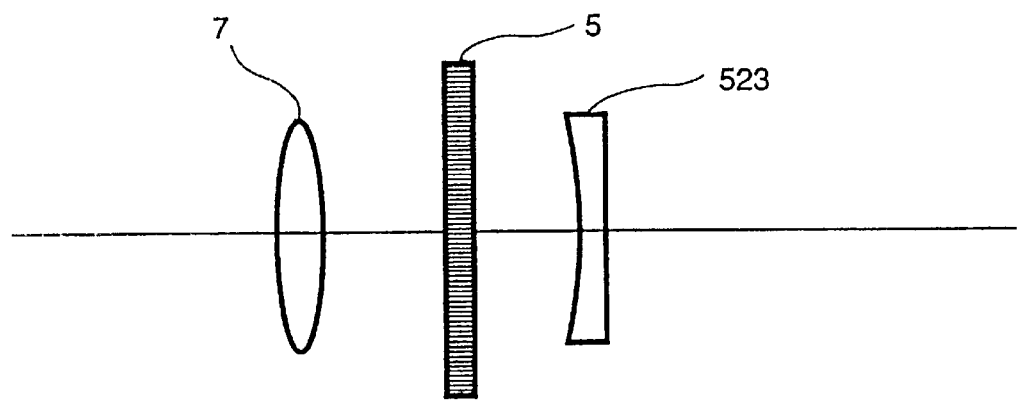

The laser transfer machining apparatus according to the embodiment employs the combination of a transferring lens 7 and a concave lens as a means for providing a previous variation to cancel the chromatic aberration of the phase hologram. The transferring lens 7 is a combination of a convex lens and a concave lens. Foe example, if the focal length of a lens is f, the chromatic aberration of the lens is given by the equation $\Delta f = -dn/d\lambda \cdot \Delta\lambda f/(n-1)$. Therefore, by using the lens 523 in which a convex lens with $\Delta f$ and a concave lens with $-\Delta f$ are combined, the chromatic aberration of the lens can be reduced. Furthermore, the transferring optical system can be designed such that the whole chromatic aberration including the chromatic aberration due to the hologram is reduced. Thereby, the accuracy of machining is improved. The convex lens and the concave lens may be arranged separately as shown in FIG. 113. The hologram 5 is not necessarily disposed in the arrangement as shown in FIG. 113 and can be placed at an arbitrary location.

Figure 114:
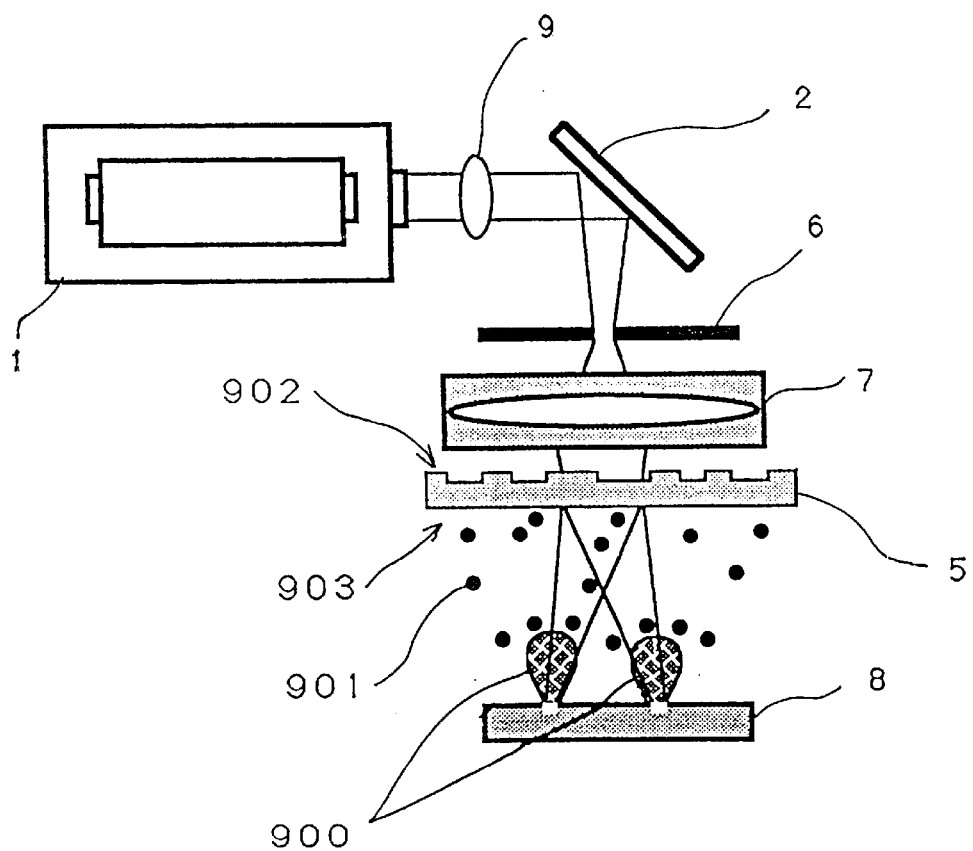

FIG. 114 is a diagrammatic view showing the partial structure of a laser transfer machining apparatus according to an embodiment of the present invention. In the figure, the same reference numeral as in FIG. 5 denotes the same part or a like part and a reference numeral 900 denotes a bloom generated by a laser light when the light is incident on the target 8 to be machined which is a workpiece; 901, a particulate scattered from the target 8 to be machined; 902, a front face of the phase hologram 5 on which a phase distribution is formed; and 903, a back face of the phase hologram 5 which is opposite to the front face 902 of the phase hologram.

In a real machining operation, a part removed from a workpiece made of a material is scattered as particulate at the moment when a workpiece is illuminated by a laser light. The scattered particulate can arrive at the hologram 5 and adhere to it. A dust floating in the vicinity of the hologram 5 can also adhere to the hologram. When such a particulate or a dust sticks to the hologram 5, the transmissibility of the hologram 5 for incident laser light is reduced and therefore the machining operation is performed incompletely. Furthermore, if the surface of the hologram, on which the phase distribution of the hologram is formed, is covered with particulate or the like, positions different from the predetermined positions to be machined are machined in an extreme case and this results in providing inferior goods. In order to resolve the problem, the laser transfer machining apparatus of the embodiment is constructed as shown in FIG. 114.

In operation, when a laser light is incident on the target 8 to be machined which is an object to be machined, the material of the part of the target which is illuminated by the incident laser light is ionized into the plasma state at the moment when the light is incident on the part and blooms 900 are generated in the vicinity of the part. Furthermore, particulate 901 are scattered over the area of the blooms and then adhere to the surface of the hologram 5. Thereby, the performance of the hologram is getting worse. As shown in FIG. 114, in the laser transfer machining apparatus of the embodiment, since the hologram 5 is arranged such that the front face 902 of the hologram 5 faces the direction from which the laser light travels; that is, the back face 903 of the hologram 5 is opposite to the target 8 to be machined, the front face 902 of the hologram can be prevented from being covered with the particulate 901 and hence deformation of the pattern to be machined can be prevented at least. In addition, the life time of the hologram 5 can be increased greatly and the reliability of machining is improved. However, in the arrangement of the hologram 5 according to the embodiment while the hologram 5 is used during a long period of time some particulate 901 may stick to the back surface 903, thereby making the performance of the hologram worse gradually. In order to prevent the deterioration, the back face 903 of the phase hologram should be cleaned periodically.

Figure 115:
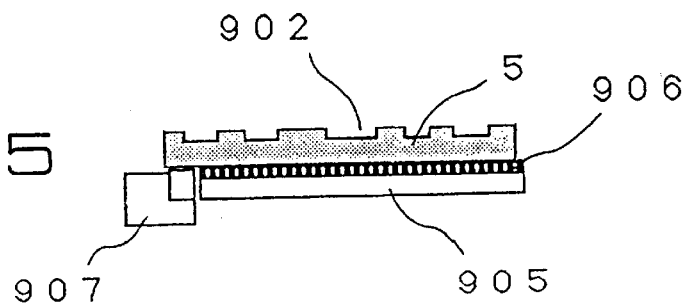
Figure 116:
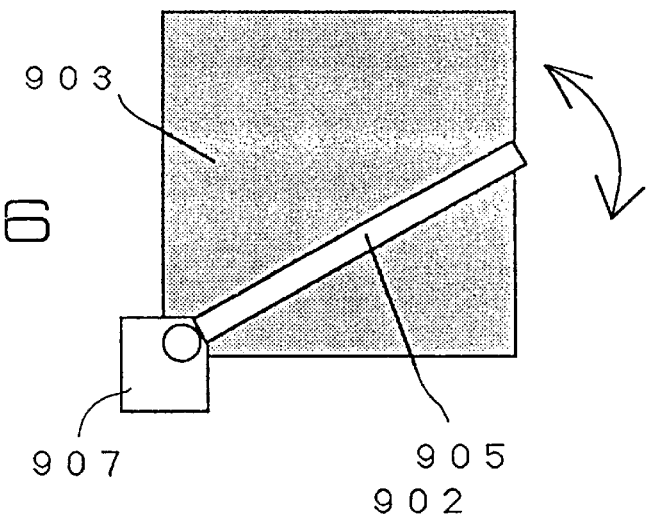

FIG. 115 is a diagrammatic view showing the structure of a cleaning mechanism of a laser transfer machining apparatus according to an embodiment of the present invention. In the figure, the same reference numeral as in FIG. 114 denotes the same part or a like part and a reference numeral 905 denotes a sweeping arm for cleaning the back face of the phase hologram; 906, a cleaning unit of the cleaning mechanism; and 907, a driving unit for driving the sweeping arm 903. FIG. 116 is a front view of FIG. 115.

In the laser transfer machining apparatus of the aforementioned embodiment in FIG. 114, the phase hologram is arranged such that an incident light enters the hologram through the front surface of the phase hologram on which the phase distribution is formed to provide the incident laser light with predetermined variations of phase, so that particulate generated by machining are not able to arrive at the front face of the phase hologram. Furthermore, it is necessary to clean the back face of the phase hologram periodically in order to prevent the performance of the hologram from getting worse. However, it is difficult to do the periodical cleaning of the hologram mounted in a manufacturing line of a factory in consideration of the rate of operation and the time required for adjusting the position of the hologram when attaching the hologram in the line. The embodiment provides the cleaning mechanism in order to resolve such a problem.

The driving unit 907 for driving the sweeping arm is disposed at one side of the back face 903 of the phase hologram. The sweeping arm 905 is connected rotatably to the driving unit 907 at one end of the arm to extend over the back face of the phase hologram. The cleaning member 906 made of a brush, a rubber or the like is attached on the surface of the sweeping arm 905 facing the back face 903 of the phase hologram.

In operation, the sweeping arm 905 is rotated about the axis of rotation of the driving unit 907 for driving the arm by the driving unit 907 and is moved on the back face of the phase hologram, as shown in FIG. 116. During the movement, the cleaning member 906 attached on the sweeping arm 905 strokes the back face 903 of the phase hologram and removes particulate adhered to the back face. The driving unit 907 for driving the sweeping arm drives the sweeping arm 905 every time when one machining operation is completed or at predetermined intervals, depending on the rate of operation of the laser transfer machining apparatus.

Figure 117:
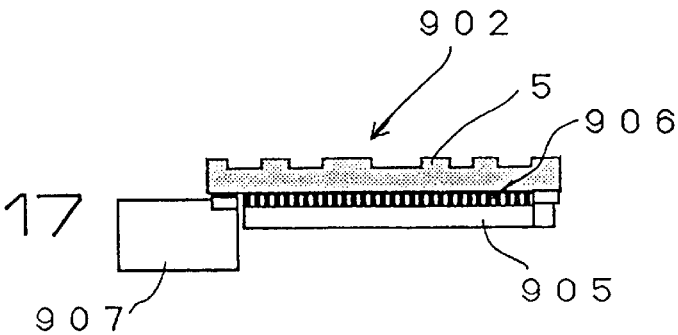
Figure 118:
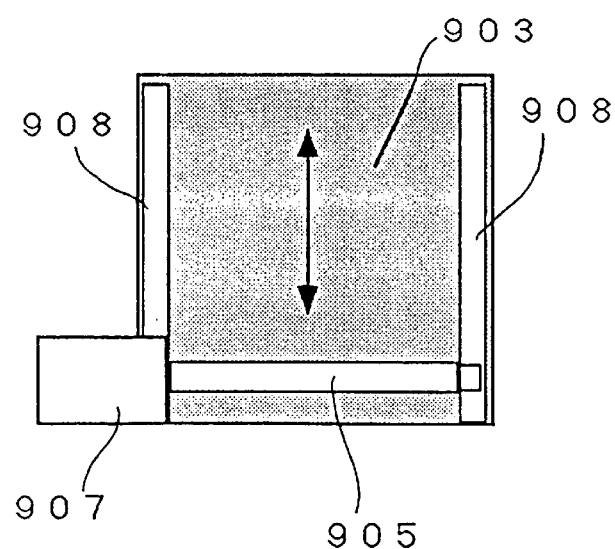

FIG. 117 is a diagrammatic view showing the structure of a cleaning mechanism of a laser transfer machining apparatus according to an embodiment of the present invention. In the figure, the same reference numeral as in FIG. 116 denotes the same part or a like part and a reference numeral 908 denotes a guide for translating the sweeping arm 905. FIG. 118 is a front view of FIG. 117. The two guides 908 are disposed on the back face 903 of the phase hologram at two sides of the back face opposite to each other, respectively. The hologram of the embodiment is provided with the cleaning mechanism similar to the cleaning mechanism of the aforementioned embodiment in FIG. 115 in order to achieve the same object.

In operation, the sweeping arm 905 is swept along the two guides 908 on the back face 903 of the phase hologram by the driving unit 907 for driving the arm. Therefore there is provided the compact cleaning mechanism marks it possible to clean the whole back face 902 of the phase hologram without increasing the sweeping arm 905 in length.

FIG. 119 is a diagrammatic view showing the structure of a cleaning mechanism of a laser transfer machining apparatus according to an embodiment of the present invention. In the figure, the same reference numeral as in FIG. 5 denotes the same part or a like part and a reference numeral 915 denotes a laser light transparent sheet; 916, a feeding unit for feeding the laser light transparent sheet 915; 917, a winding unit for winding up the laser light transparent sheet 915; and 918, a driving unit for driving the winding unit 917.

In operation, the laser light transparent sheet 915 is disposed between the phase hologram 5 and the target 8 to be machined as shown in FIG. 119, thereby preventing particulate 901 from arriving at the hologram 5 and being adhered to the hologram 5. While the laser light transparent sheet 915 is used during a long period of time, the sheet is covered with particulate adhered thereto and the transmissibility of the sheet is reduced gradually. In order to prevent the reduction of the transmissibility, the driving unit 918 is controlled to drive the winding unit 917 to feed a new laser light transparent sheet from the feeding unit 916 before the performance of machining is affected by the reduction of the transmissibility. The polluted sheet is winded up by the winding unit 917 and is withdrawn. The replacement of the laser light transparent sheet 915 is performed periodically and therefore the stable performance of machining can be always maintained.

The front face of the phase hologram faces the direction from which the laser light enters in this embodiment. Alteratively, the hologram is arranged such that the back face of the phase hologram may face the direction from which the laser light enters because the laser light transparent sheet prevents particulate from arriving at the phase hologram and sticking to the face.

FIG. 120 is a diagrammatic view showing the structure of a laser transfer machining apparatus according to an embodiment of the present invention. In the figure, the same reference numeral as in FIG. 5 denotes the same part or a like part and a reference numeral 920 denotes a gas nozzle; and 921, a gas flow. The two gas nozzles 920 are arranged as shown in FIG. 120 and are adapted to feed the gas flow 921 toward the back face of the phase hologram 5.

In operation, the gas flow 921 flows out of the two gas nozzles 920 and conflicts with the back face of the phase hologram 5, as shown in FIG. 120. Thus, there occurs a gas flow in the vicinity of the back face 903 of the phase hologram. Particulate 901 are pushed back toward the target 8 to be machined by the gas flow exists near the face of the hologram and therefore are prevented from arriving at the back face 905 of the phase hologram and sticking to the face. Thereby the condition of machining can be maintained relatively stably. By the way, the gas used for this embodiment must be transparent to the laser light and inactive to materials constituting elements included in the laser transfer machining apparatus.

The front face of the phase hologram faces the direction from which the laser light enters in this embodiment. Alteratively, the hologram is arranged such that the back face of the phase hologram may face the direction from which the laser light enters because the gas flow prevents particulate from arriving at the phase hologram and sticking to the face.

Figure 121:
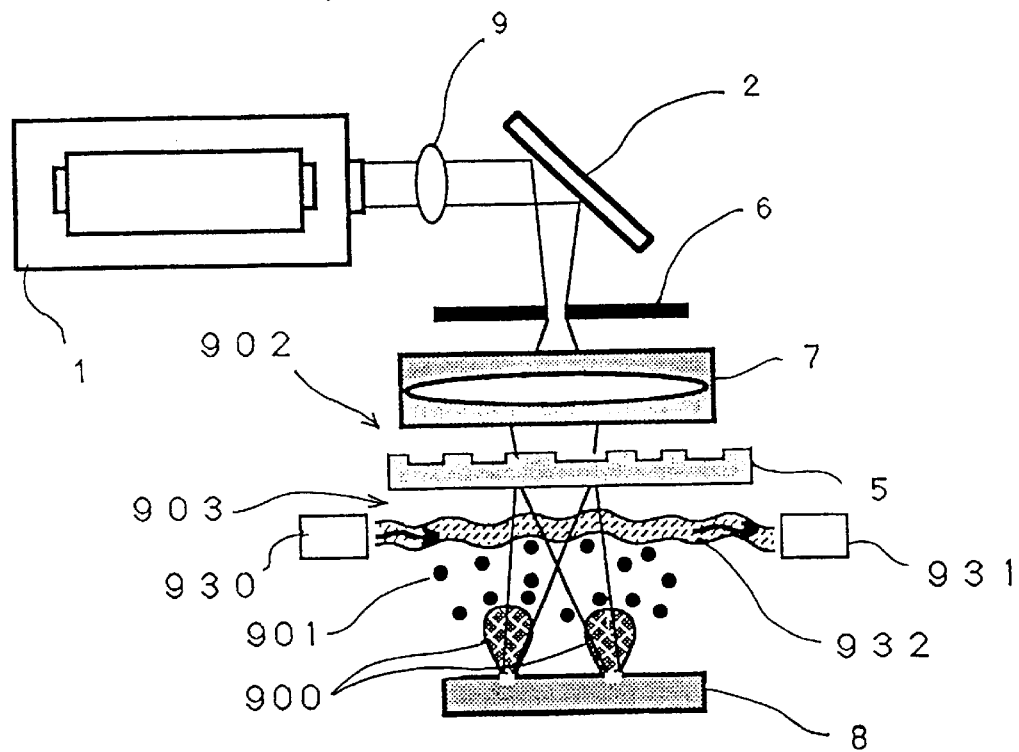

FIG. 121 is a diagrammatic view showing the structure of a laser transfer machining apparatus according to an embodiment of the present invention. In the figure, the same reference numeral as in FIG. 5 denotes the same part or a like part and a reference numeral 930 denotes a duct for feeding gas; 931, a duct for drawing gas; and 932, a gas flow layer. The duct 930 for feeding gas and the duct 931 for drawing gas are arranged between the phase hologram 5 and the target 8 to be machined such that they do not shield a laser light and face each other, as shown in FIG. 121.

In operation, the duct 930 for feeding gas feeds a gas toward the duct 931 for drawing gas. The fed gas is drawn by the duct 931 for drawing gas and therefore the gas flow layer 932 is formed between the phase hologram 5 and the target 8 to be machined, as shown in FIG. 121. The gas flow layer 932 is so-called an air curtain and is able to shield particulate 901 scattered from the target 8 to be machined. Thereby the condition of machining can be maintained stably. In the case of this embodiment, particulate can be shielded more effectively than in the case that a gas flow is fed to the phase hologram and are prevented from sticking to the phase hologram 5. Thereby the condition of machining can be maintained relatively stably. By the way, the gas used for the embodiment must be transparent to the laser light.

The front face of the phase hologram faces the direction from which the laser light enters in this embodiment. Alteratively, the hologram is arranged such that the back face of the phase hologram may face the direction from which the laser light enters because the gas flow layer prevents particulate from arriving at the phase hologram and sticking to the face.

Figure 122:
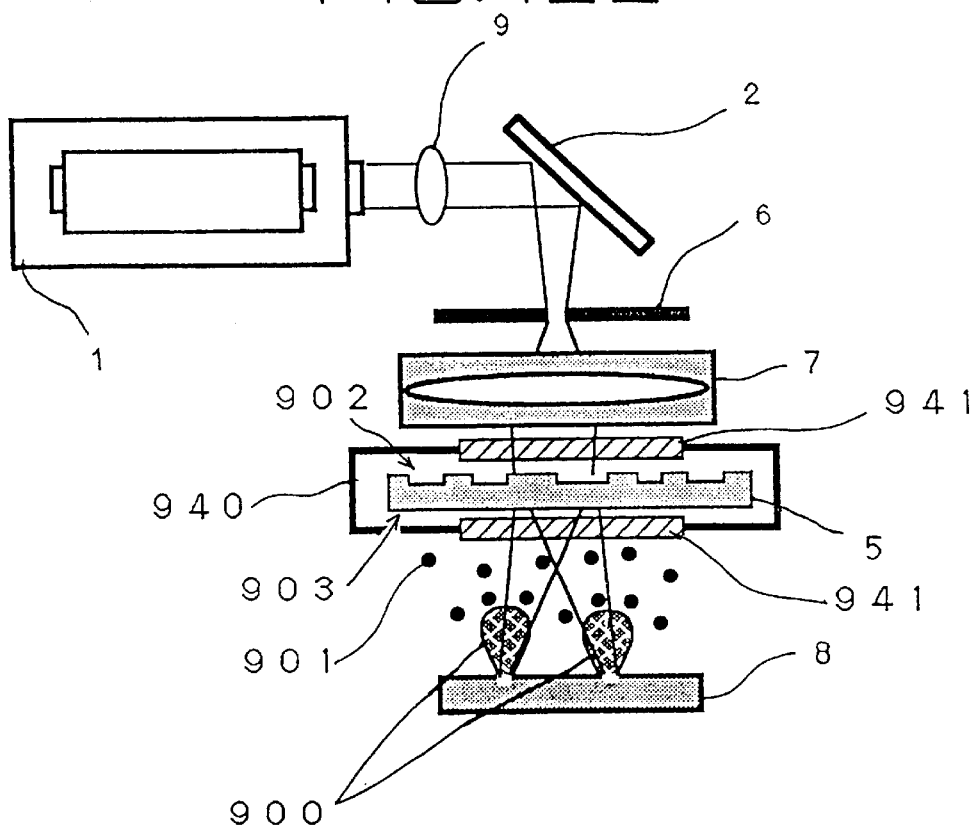

FIG. 122 is a diagrammatic view showing the structure of a laser transfer machining apparatus according to an embodiment of the present invention. In the figure, the same reference numeral as in FIG. 5 denotes the same part or a like part and a reference numeral 940 denotes a container for preventing pollution; 941, a laser light window disposed on the container 940 for preventing pollution for transmitting laser light. The container 940 for preventing pollution encloses and accommodates the hologram 5 and the windows 941 for transmitting laser light are disposed on the container 940 at one side surface thereof through which a laser light passing through the transferring lens 7 enters the hologram 5 and at the opposite surface thereof from which laser lights emitted by the hologram 5 emerges, respectively.

In operation, since the phase hologram 5 is disposed within the container 940 for preventing pollution, the phase hologram 5 is not affected by particulate 901 and dust. Preferably, dust is removed from the container 940 for preventing pollution and then the container 940 is filled with an inactive gas transparent to laser light in advance of the machining operation. Thus, the container for preventing pollution according to the embodiment encloses the phase hologram 5 completely and keeps the hologram in a clean air or an inactive gas, and therefore the container is able to guard the phase hologram during a longer period of time compared with the embodiments shown in FIGS. 114 to 121.

During a long period of time, particulate 901 and dust stick to the laser light window 941, but the reverse effect of them on the window can be reduced to the minimum by cleaning the window periodically. In a preferred embodiment, the cleaning mechanism of the embodiment as shown in FIGS. 116 and 117 may be applied to the container 940 for preventing pollution to clean the surface of the window 941 for transmitting laser light. Preferably, the laser light transparent sheet 915 as shown in FIG. 119, the gas flow 921 as shown in FIG. 120 or the gas flow layer as shown in FIG. 121 may be disposed. A combination of these embodiments makes it possible to maintain the stable performance of machining during a long period of time and make perfect the advantageous effect of this embodiment the more.

The front face of the phase hologram faces the direction from which the laser light enters in this embodiment. Alteratively, the hologram is arranged such that the back face of the phase hologram may face the direction from which the laser light enters because the container for preventing pollution prevents particulate from arriving at the phase hologram and sticking to the face.

Figure 123:
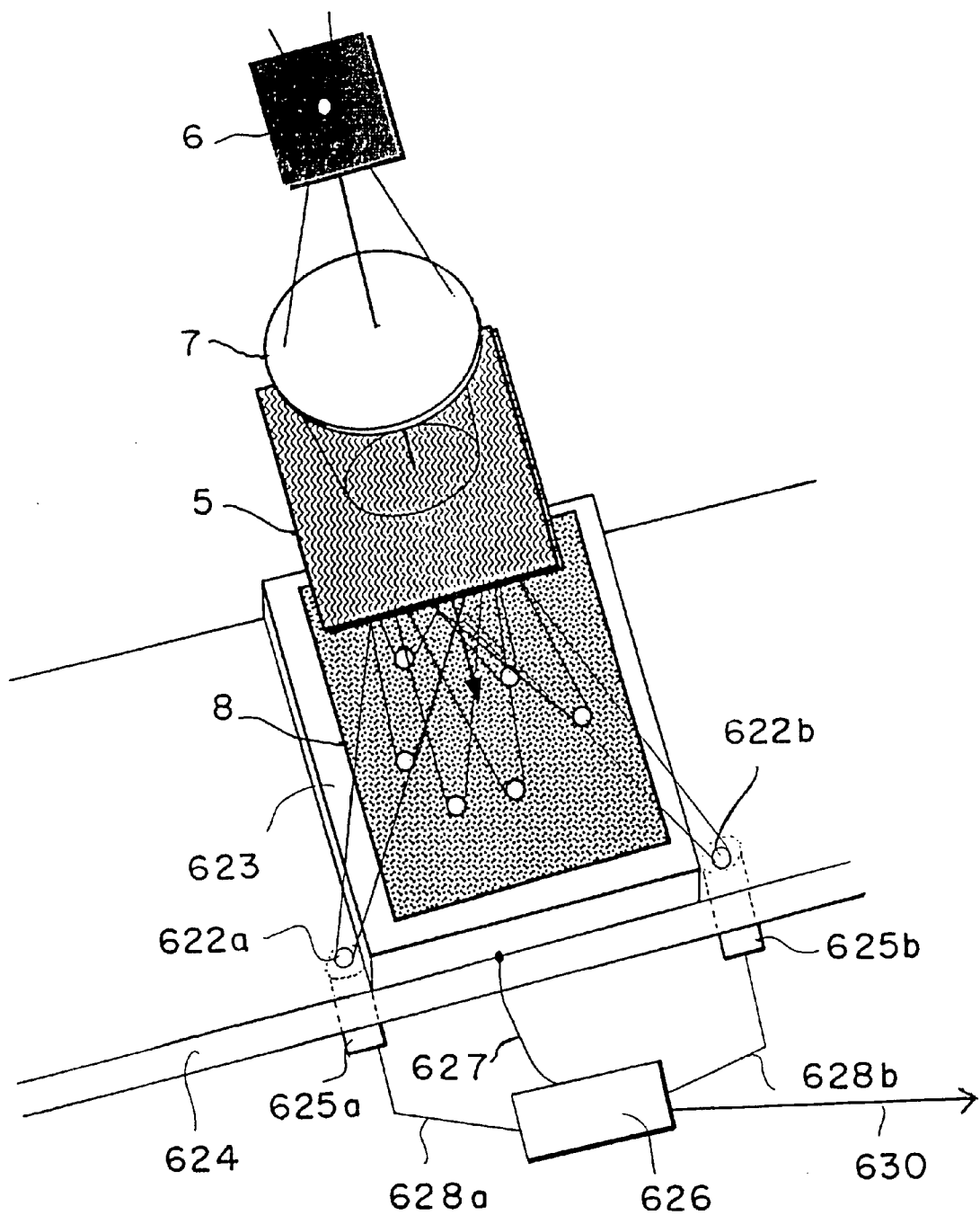

FIG. 123 is a diagrammatic view showing the structure of a laser transfer machining apparatus according to an embodiment of the present invention. In the figure, the same reference numeral as in FIG. 5 denotes the same part or a like part and a reference numeral 622a and 622b denote transferred images for monitoring a relative relationship between the positions of the hologram image and the workpiece to be machined; 623, a first base for carrying the target to be machined; 624, a second base for carrying the target to be machined; 625a and 625b, photo detectors for monitor; 626, a control unit for delivering a control signal to the bases for carrying the target and the laser oscillator 1 in response to a signal supplied from the photo detector 625 for monitor; 627, a signal line for transmitting the control signal from the control unit 626 to the first and second bases 623 and 624 for carrying the target; 628a and 628b, signal lines for transmitting the monitor signal from the photo detector 622 to the control unit 626; and 630, a signal line for transmitting the control signal from the control unit 626 to the laser oscillator 1.

The description will be directed to an operation of the embodiment. The laser light which is emitted by the laser oscillator is focused and is incident on the pattern to be transferred on the mask 6 by the illuminating lens. As previously mentioned, the mask 6 is an element for allowing a component of incident laser light with a beam pattern for machining to pass therethrough. The shaped pattern is expanded or reduced in size by the transferring lens 7 of the transferring optical system before it is transferred on the target 8 to be machined and becomes a basic element of the pattern to be machined. The hologram 5, e.g. a phase hologram spatially modulates the incident laser light passing through the transferring lens 7 to form a number of transferred images. The plural spatially modulated laser beams are projected on the target 8 to be machined, forming the transferred images respectively.

The target 8 to be machined is disposed on the first base 623 for carrying the target and the first base is adapted to move on the second base 624 for carrying the target to position the target 8 at a place where the target is to be illuminated by a laser light, as shown in FIG. 123. It is necessary to detect whether or not the target 8 to be machined is positioned correctly before the laser machining operation. According to the embodiment, the hologram 5 is designed such that the two images 622a and 622b are formed at positions outside the target 8 to be machined in addition to transferred images in use for machining which illuminate the target 8 to be machined, in order to monitor a relative relationship between the positions of the hologram images and the target to be machined which is an object to be machined. The detectors 625a and 625b for monitor are disposed at the positions where the two images 622a and 622b are imaged.

The control unit 626 stops the target carrying base 624 traveling toward the target position in order to detect the position of the base. Then the control unit 626 controls the laser oscillator in such a manner that the laser oscillator emits a light the intensity of which is enough for the photo detectors 625a and 625b for monitor to detect the light, but, not enough to machine the target 8 to be machined. Furthermore, the control unit 626 controls the positions of the first and second bases 623 and 624 for carrying the target to be machined by transmitting a control signal to them. When the photo detectors 625a and 625b for monitor detect the lights of the images 622a and 622b, the control unit 626 judges that the positioning operation is completed and outputs a signal for increasing the power of the laser light emitted by the laser oscillator to the oscillator via the signal line 630. Then the positioning operation of the target 8 to be machined is completed and the laser machining operation is started. The monitoring system does not always require the two images for positioning the target, however, the system can provide the precise positioning operation by positioning the target 8 to be machined using the two images as shown in FIG. 123. Preferably, the images for monitor may be line-shaped.

In a preferred embodiment, the photo detectors 625a and 625b for monitor are adapted to detect reflected lights of images projected on one of the bases or the like instead of directly detecting the images for monitor. The similar advantage is provided.

Preferably, the laser transfer machining apparatus is adapted to move the hologram or change the optical path of a laser light passing through the hologram, with the target 8 to be machined being fixed, instead of moving the target 8 to be machined to position it. The similar advantage is obtained.

In a preferred embodiment, the laser transfer machining apparatus is adapted to monitor a relative relationship between the positions of the hologram image and the target to be machine by using a light which is different from the laser light emitted by the laser oscillator for machining. The similar advantage is provided.

FIG. 124 is a diagrammatic view showing the structure of a laser transfer machining apparatus according to an embodiment of the present invention. In the figure, the same reference numeral as in FIG. 123 denotes the same part or a like part and a reference numeral 629a and 629b denote perforating holes for monitoring a relative relationship between the positions of the hologram image and the workpiece to be machined.

The description will be directed to an operation of the embodiment. The laser light which is emitted by the laser oscillator is focused and is incident on the pattern to be transferred on the mask 6 by the illuminating lens. As previously mentioned, the mask 6 is an element for allowing a component of the incident laser light with a beam pattern for machining to pass therethrough. The shaped pattern is expanded or reduced in size by the transferring lens 7 of the transferring optical system before it is transferred on the target 8 to be machined and becomes a basic element of the pattern to be machined. The hologram 5, e.g. a phase hologram spatially modulates the incident laser light passing through the transferring lens 7 to form a number of transferred images. The plural spatially modulated laser beams are projected on the target 8 to be machined, forming the transferred images respectively.

The target 8 to be machined is disposed on the first base 623 for carrying the target and the first base is adapted to move on the second base 624 for carrying the target to position the target 8 at a place where the target is to be illuminated by a laser light, as shown in FIG. 124. It is necessary to detect whether or not the target 8 to be machined is positioned correctly before the laser machining operation. According to the embodiment, the hologram 5 is designed such that two images pass through in the two perforating holes 629a and 629b of the target 8 to be machined in addition to transferred images in use for machining which illuminate the target 8 to be machined, in order to monitor a relative relationship between the positions of the whole hologram image and the target to be machined which is an object to be machined. The photo detectors 625a and 625b for monitor are disposed under the perforating holes 625a and 625b through which the two images are passed to receive the images imaged on the surfaces of the detectors, respectively.

The control unit 626 stops the target carrying base 624 traveling toward the target position in order to detect the position of the base. Then the control unit 626 controls the laser oscillator in such a manner that the oscillator emits a light the intensity of which is enough for the photo detectors 625a and 625b for monitor to detect the light, but, not enough to machine the target 8 to be machined. Furthermore, the control unit 626 controls the positions of the first and second bases 623 and 624 for carrying the target to be machined by transmitting a control signal to them. When the photo detectors 625a and 625b for monitor detect the lights of the images 622a and 622b, respectively, the control unit 626 judges that the positioning operation is completed and outputs a signal for increasing the power of the laser light emitted by the laser oscillator to the oscillator via the signal line 630. Then the positioning operation of the target 8 to be machined is completed and the laser machining operation is started. The monitoring system does not always require the two images for positioning the target, however, the system can provide the precise positioning operation by positioning the target 8 to be machined using the two images as shown in FIG. 124. Preferably, the perforating holes for monitor may be line-shaped.

In a preferred embodiment, the photo detectors 625a and 625b for monitor are adapted to detect reflected lights of the images passing through the perforating holes for monitor by an object instead of directly detecting the images for monitor passing through the perforating holes. The similar advantage is provided.

Preferably, the laser transfer machining apparatus is adapted to move the hologram or change the optical path of a laser light passing through the hologram, with the target 8 to be machined being fixed, instead of moving the target 8 to be machined to position it. The same advantage as mentioned above is obtained.

In a preferred embodiment, the laser machining apparatus is adapted to monitor a relative relationship between the positions of the hologram image and the target to be machine by using a light which is different from the laser light emitted by the laser oscillator for machining. The same advantage as mentioned above is provided.

FIG. 125 is a diagrammatic view showing the partial structure of a laser transfer machining apparatus according to an embodiment of the present invention. In the figure, a reference numeral 5 denotes a hologram; 500, a hologram holder for the hologram 5; 729, a contact face of the hologram holder 500 on which the hologram 5 is placed; 730, a lower locking block projecting from the contact face 729; 731, an upper presser block; 732, an upper presser nut; and 733, an upper locking screw. The hologram 5 is rectangle-shaped. The lower locking block 730 is formed integrally on the contact face 729. The upper presser nut 732 is secured to the contact face 729 of the hologram. By turning the upper locking screw 733 screwed in the upper presser nut 732, the upper presser block 731 can be moved in the direction shown by the arrow E in the figure.

The description will be directed to an operation of the embodiment. When the hologram 5 is mounted on the contact face 729 of the holder, the hologram is fixed in such a manner that either the surface of the hologram on which the hologram pattern is formed or the opposite surface is in contact with the contact face of the holder, the lower edge of the hologram 5 is in parallel with and in contact with the flat side wall of the linear difference in level formed by the contact face 729 and the lower locking block 730, and the upper presser block 731 is pressed down onto the upper edge of the hologram 5 by turning the upper locking screw 733 screwed in the upper presser nut 732.

Thus, if the hologram 5 has at least one linear edge portion on the peripheries thereof, the linear difference in level formed by the contact face 729 and the lower locking block 730 makes it possible to easily position the linear edge portion on the peripheries of the hologram by making contact with the linear edge portion to fix it on the contact face 729 of the hologram. Thereby a rotation of the hologram 5 about an axis parallel with the normal line of the hologram 5 can be prevented and a transferred pattern can be always obtained on the same position on the target to be machined which is a workpiece, and therefore the stability and reliability of transferring machining are improved.

FIG. 126 is a diagrammatic view-showing the partial structure of a laser transfer machining apparatus according to an embodiment of the present invention. In the figure, the same reference numeral as in FIG. 5 denotes the same part or a like part and a reference numeral 734 denotes a side locking block. The hologram 5 is rectangle-shaped. The lower locking block 730 is formed integrally on the contact face 729. The lower locking block 730 and the side locking block 734 are arranged on the contact face 729 in such a way that the longitudinal directions thereof cross at right angles.

The upper presser nut 732 is secured to the contact face 729 of the hologram. By turning the upper locking screw 733 screwed in the upper presser nut 732, the upper presser block 731 can be moved in the direction shown by the arrow E in the figure.

Two linear differences in level perpendicular to each other are formed on the hologram contact face 729 by the lower locking block 730 and the side locking block 734. The hologram 5 is fixed in such a manner that the lower edge of the hologram 5 is in parallel with and in contact with the flat side wall of the difference in level formed by the lower locking block 730 and simultaneously one side edge of the hologram 5 is in parallel with and in contact with the flat side wall of the difference in level formed by the side locking block 734, and the upper presser block 731 is pressed down onto the upper edge of the hologram 5 by turning the upper locking screw 733 screwed in the upper presser nut 732.

Thus, if the hologram 5 has at least two linear edge portions on the peripheries thereof, the two linear differences in level perpendicular to each other and formed on the hologram contact face 729 make it possible to easily position the two perpendicular linear edge portions on the peripheries of the hologram by making contact with the linear edge portions to fix them on the contact face 729 of the hologram. Thereby a rotation of the hologram 5 about an axis parallel with the normal line of the hologram 5 can be prevented more effectively than in the case of the aforementioned embodiment in FIG. 125, and therefore the stability and reliability of transferring machining are improved. Furthermore, since two linear edges on the peripheries, which are not in parallel with each other, of the hologram can be positioned, the correct position and angle of the hologram 5 can be determined and hence the attachment and adjustment of the hologram in the laser transfer machining apparatus can be easily performed.

FIG. 127 is a diagrammatic view showing the partial structure of a laser transfer machining apparatus according to an embodiment of the present invention. In the figure, the same reference numeral as in FIG. 126 denotes the same part or a like part and a reference numeral 734*a* denotes a first side is locking block disposed on the hologram contact face 729; 743*b*, a second side locking block disposed on the hologram contact face 729; 735, a perforating hole disposed in the hologram 5; and 736, a locking pin disposed on the hologram contact face 729 for defining the position of the perforating hole 735 of the hologram 5, the diameter of the pin being a little smaller than that of the perforating hole 735. The hologram 5 is rectangle-shaped. The first and second locking blocks 734*a* and 734*b* are secured to the hologram contact face 729 in such a manner that the longitudinal directions thereof are in parallel with each other. The distance between the side faces of the blocks opposite to each other is equal to the width of the hologram 5.

In operation, when the hologram 5 is mounted on the hologram holder 500, the hologram 5 is fixed on the hologram contact face 729 in such a manner that the locking pin 736 is passed through the perforating hole 735 of the hologram 5 and the hologram 5 is sandwiched between the first and second side locking blocks 734*a* and 734*b*.

In the embodiment, the apparatus with the hologram 5 and the hologram holder 500 makes it possible to easily position the perforating hole 735 disposed in the hologram 5 and therefore place the hologram 5 in a predetermined position within the apparatus. Thereby the maintenance performance of the apparatus is improved. Furthermore, since a rotation of the hologram 5 is prevented, the stable transferring machining operation can be performed.

FIG. 128 is a diagrammatic view showing the partial structure of a laser transfer machining apparatus according to an embodiment of the present invention. In the figure, the same reference numeral as in FIG. 127 denotes the same part or a like part and a reference numeral 737 denotes a laser for detecting the position of the hologram; 738, an adjusting mirror for adjusting a laser light emitted by the laser 737 for detecting the position of the hologram in such a manner that the laser light travels along a predetermined optical path; 739, a photo detector for detecting the laser light emitted by the laser 737. The first and second locking blocks 734*a* and 734*b* are secured to the hologram contact face 729 in such a manner that the longitudinal directions thereof are in parallel with each other, in the same way as the above embodiment in FIG. 127. The distance between the side faces of the blocks opposite to each other is equal to the width of the hologram 5.

In operation, the optical path of the laser light emitted by the laser 737 is adjusted by using the adjusting mirror 738 such that the laser light for detecting the position of the hologram is passed through the perforating hole 735 of the hologram 5 after the hologram 5 is fixed at a predetermined position on the hologram holder 500. On the optical path of the adjusted laser light the photo detector 739 is arranged and the detector detects the light intensity of the laser light passing through the perforating hole 735.

The laser transfer machining apparatus according to the embodiment with such a structure makes it possible to immediately detect and modify a shift from the predetermined position of the hologram 5 in the apparatus by monitoring the output signal of the photo detector 739 when the hologram 5 is mounted on the contact face 729 of the hologram holder 500 because the light intensity of the laser light for detecting the position of the hologram which arrives at the photo detector 739 is reduced as the hologram is placed in a position apart from the predetermined position. Thereby the reliability of transferring machining is improved.

FIG. 129 is a diagrammatic view showing the partial structure of a laser transfer machining apparatus according to an embodiment of the present invention. In the figure, a reference numeral 735*a* denotes a first perforating hole disposed in the hologram 5; 735*b*, a second perforating hole disposed in the hologram 5; 736*a*, a first locking pin disposed on the hologram contact face 729 for defining the position of the first perforating hole 735*a* of the hologram 5, the diameter of the pin being a little smaller than that of the perforating hole 735*a*; and 736*b*, a second locking pin disposed on the hologram contact face 729 for defining the position of the second perforating hole 735*b* of the hologram 5, the diameter of the pin being a little smaller than that of the perforating hole 735*b*.

In operation, when the hologram 5 is mounted on the hologram holder 500, the hologram 5 is fixed on the hologram contact face 729 in such a manner that the locking pin 736*a* is passed through the perforating hole 735*a* of the hologram 5 and simultaneously the locking pin 736*b* is passed through the perforating hole 735*b* of the hologram 5.

In the embodiment, the apparatus with the hologram 5 and the hologram holder 500 makes it possible to easily position the first and second perforating holes 735*a* and 735*b* disposed in the hologram 5 and therefore to place and adjust the hologram 5 in a predetermined position within the apparatus. Thereby the maintenance performance of the apparatus is improved. Furthermore, since a rotation of the hologram 5 about an axis parallel with the normal line of the hologram 5 is prevented without providing the difference in level formed on the hologram contact face 729 as shown in FIGS. 125 to 128, the stability of transferring machining can be improved.

FIG. 130 is a diagrammatic view showing the partial structure of a laser transfer machining apparatus according to an embodiment of the present invention. In the figure, the same reference numeral as in FIG. 129 denotes the same part or a like part.

In the embodiment, the elements constituting the hologram and the hologram holder and the method of fixing the hologram are the same as those of the aforementioned embodiment in FIG. 129, except that the diameter of the first perforating hole 735*a* is larger than that of the second perforating hole 735*b* and hence the diameter of the first locking pin 736*a* is larger than that of the second locking pin 736*b*.

In operation, when the hologram 5 is mounted on the hologram holder 500, the hologram 5 is fixed on the hologram contact face 729 in such a manner that the locking pin 736*a* is passed through the perforating hole 735*a* of the hologram 5 and simultaneously the locking pin 736*b* is passed through the perforating hole 735*b* of the hologram 5.

In the embodiment, the apparatus with the hologram and the hologram holder makes it possible to easily position the first and second perforating holes 735*a* and 735*b* disposed in the hologram 5 and therefore to place and adjust the hologram 5 in a predetermined position within the apparatus. Thereby the maintenance performance of the apparatus is improved. Furthermore, since a rotation of the hologram 5 about an axis parallel with a normal line of the hologram 5 is prevented without providing the difference in level formed on the hologram contact face 729 as shown in FIGS. 125 to 128, the stability of transferring machining can be improved. In addition, an incorrect attachment of the hologram 5 can be prevented because the hologram 5 cannot be placed on the hologram contact face 729 of the hologram holder 500 unless each perforating hole is engaged with the corresponding locking pin correctly.

FIG. 131 is a diagrammatic view showing the partial structure of a laser transfer machining apparatus according to an embodiment of the present invention. In the figure, the same reference numeral as in FIG. 130 denotes the same part or a like part and a reference numeral 737 denotes a longitudinally central line of the hologram 5; 738, a transversely central line of the hologram 5; and 739, a central point of the hologram 5. The first and second perforating holes 735*a* and 735*b* are not on the longitudinally central line 737 and the transversely central line 738, as shown in FIG. 131. Furthermore, the first perforating hole 735*a* and the second perforating hole 735*b* are not symmetric with respect to any one of the longitudinally central line 737 of the hologram 5, the transversely central line 738 of the hologram 5 and the central point 739 of the hologram 5. The first and second locking pins 736*a* and 736*b* are arranged such that the hologram 5 is positioned in a nearly central place of the hologram contact face when the hologram 5 is placed at a correct position on the hologram contact face 729 of the hologram holder 500.

In the embodiment, the apparatus with the hologram and the hologram holder makes it possible to easily position the first and second perforating holes 735*a* and 735*b* disposed in the hologram 5 and therefore to place and adjust the hologram 5 in a predetermined position within the apparatus. Thereby the maintenance performance of the apparatus is improved. Furthermore, since a rotation of the hologram 5 about an axis parallel with a normal line of the hologram 5 is prevented without providing the difference in level formed on the hologram contact face 729 as shown in FIGS. 125 to 128, the stability of transferring machining can be improved. In addition, an incorrect attachment of the hologram 5, which is associated with not only the combination of the perforating holes and the locking pins, but also the orientation of the front face of the hologram 5, can be detected immediately because the hologram 5 is no longer in the center of the hologram contact face 729 unless the hologram is placed correctly with respect to the orientation of the front face of the hologram, or each perforating hole is engaged with the corresponding locking pin correctly. Thereby, an incorrect attachment of the hologram 5 can be prevented more effectively.

FIG. 132 is a diagrammatic view showing the partial structure of a laser transfer machining apparatus according to an embodiment of the present invention. In the figure, the same reference numeral as in FIG. 131 denotes the same part or a like part and a reference numeral 740 denotes a block disposed on the hologram contact face 729 for preventing an incorrect attachment of the hologram. The hologram holder 500 is the combination of the above embodiment shown in FIG. 131 and the block 740 for preventing incorrect attachments. The other structure elements are the same as those of the embodiment of FIG. 131. As shown in FIG. 134, the first and second perforating holes 735*a* and 735*b* are not on the longitudinal central line 737 and the transverse central line 737.

When the hologram holder 500 and the hologram 5 according to the aforementioned embodiment of FIG. 131 are used, there are three kinds of expected incorrect attachments as follows:

(a) incorrect attachment 1; the front face of the hologram is directed correctly and the combination of the perforating holes and the locking pins is not correct.

(b) incorrect attachment 2; the front face of the hologram is not directed correctly and the combination of the perforating holes and the locking pins is correct.

(c) incorrect attachment 3; the front face of the hologram is not directed correctly and the combination of the perforating holes and the locking pins is not correct.

FIG. 133 is a view showing areas on the hologram contact face 729 which are occupied by the hologram 5 in the cases of the correct attachment and the above three kinds of the incorrect attachments. In FIG. 133, reference numerals 741*a* and 741*b* denote areas occupied by the first and second locking pins. The area 742 is an area occupied by the hologram which is mounted correctly. The area 743 is an area occupied by the hologram in the case of the incorrect attachment 1. The area 744 is an area occupied by the hologram in the case of the incorrect attachment 2. The area 745 is an area occupied by the hologram in the case of the incorrect attachment 3. In the figure, the hatched area 746 is an area which is located outside the area 742 occupied by the hologram attached correctly and which is included in all the areas occupied by the hologram in the cases of the incorrect attachments.

In the hatched area in FIG. 133 the block 740 for preventing incorrect attachments is disposed as shown in FIG. 132. Since the hologram 5 cannot be mounted on the hologram contact face 729 unless the hologram 5 is placed correctly, the incorrect attachments can be prevented certainly.

The apparatus with the hologram and the hologram holder of the embodiment makes it possible to easily position the first and second perforating holes 735*a* and 735*b* disposed in the hologram 5 and therefore place and adjust the hologram 5 in a predetermined position within the apparatus. Thereby the maintenance performance of the apparatus is improved. Furthermore, since a rotation of the hologram 5 about an axis parallel with a normal line of the hologram 5 is prevented without providing the difference in level formed on the hologram contact face 729 as shown in FIGS. 125 to 128, the stability of transferring machining can be improved.

In the embodiment, only one block for preventing incorrect attachments is disposed in only one area. If there is no area located outside the area occupied by the hologram mounted correctly and included in the areas occupied by the hologram in the cases of the aforementioned three kinds of the incorrect attachments, a plurality of blocks for preventing incorrect attachments may be disposed outside the area occupied the hologram mounted correctly in accordance with the three kinds of the incorrect attachments.

FIG. 134 is a diagrammatic view showing the partial structure of a laser transfer machining apparatus according to an embodiment of the present invention. In the figure, the same reference numeral as in FIG. 133 denotes the same part or a like part and a reference numeral 737 denotes a laser for detecting the position of the hologram; 738, an adjusting mirror for adjusting a laser light emitted by the laser 737 for detecting the position of the hologram in such a manner that the laser light travels along a predetermined optical path; 739, a photo detector for detecting the laser light emitted by the laser 737. The hologram 5 of the embodiment comprises two perforating holes 735a and 735b, and the first perforating hole 735a serves as a means for defining the locking pin 736 according to the aforementioned embodiment as shown in FIG. 132 and the second perforating hole 735a serves as a means through which the laser light for detecting the position of the hologram is passed for detecting whether or not the hologram 5 is placed at a predetermined position according to the aforementioned embodiment as shown in FIG. 128.

In operation, the optical path of the laser light emitted by the laser 737 is adjusted by using the adjusting mirror 738 such that the laser light for detecting the position of the hologram is passed through the perforating hole 735 of the hologram 5 after the hologram 5 is fixed at a predetermined position on the hologram holder 500 while the locking pin 736 is passed through the first perforating hole 735a. On the optical path of the adjusted laser light the photo detector 739 is arranged and the detector detects the light intensity of the laser light passing through the perforating hole 735.

Thus, the laser transfer machining apparatus according to the embodiment makes it possible to define the position of the hologram 5 using one perforating hole and therefore to easily position and adjust the hologram 5 at a predetermined place in the apparatus, thereby improving the maintenance performance of the apparatus. Furthermore, the laser transfer machining apparatus makes it possible to immediately detect and modify a shift from the predetermined position of the hologram 5 in the apparatus by virtue of the means of detecting whether or not the other perforating hole is positioned at a predetermined position because the light intensity of the laser light for detecting the position of the hologram which arrives at the photo detector 739 is reduced if the hologram 5 is out of position on the hologram contact face 729 with respect to an angle around the central axis of the first perforating hole 735a. Thereby the reliability of transferring machining is improved.

FIG. 135 is a diagrammatic view showing the partial structure of a laser transfer machining apparatus according to an embodiment of the present invention. In the figure, a reference numeral 735a denotes a first perforating hole disposed in the hologram 5; 735b, a second perforating hole disposed in the hologram 5; 735c, a third perforating hole disposed in the hologram 5; 736a, a first locking pin disposed on the hologram contact face 729 for defining the position of the first perforating hole 735a of the hologram 5, the diameter of the pin being a little smaller than that of the perforating hole 735a; 736b, a second locking pin disposed on the hologram contact face 729 for defining the position of the second perforating hole 735b of the hologram 5, the diameter of the pin being a little smaller than that of the perforating hole 735b; and 736c, a third locking pin disposed on the hologram contact face 729 for defining the position of the third perforating hole 735c of the hologram 5, the diameter of the pin being a little smaller than that of the perforating hole 735c. The three perforating holes are arranged such that the triangle 747 obtained by joining the centers of the first, second and third perforating holes 735a, 735b and 735c is a scalene one.

In operation, when the hologram 5 is mounted on the hologram holder 500, the hologram 5 is fixed on the hologram contact face 729 in such a manner that the first, second and third locking pins 736a, 736b and 736c are passed through the first, second and third perforating holes 735a, 735b and 735c of the hologram 5, respectively.

The laser transfer machining apparatus with such a structure according to the embodiment makes it possible to easily position the first, second and third perforating holes 735a, 735b and 735c disposed in the hologram 5 and therefore to place and adjust the hologram 5 in a predetermined position within the apparatus. Thereby the maintenance performance of the apparatus is improved. Furthermore, since the three positions of the hologram 5 is defined, the stability of the position and angular of the hologram mounted on the hologram contact face 729 is improved greatly. In addition, since the triangle constituted by the central points of the three perforating holes is a scalene one, the hologram 5 cannot be mounted on the hologram contact face 729 unless the hologram 5 is placed correctly with respect to the orientation of the front face of the hologram. Incorrect attachments of the hologram can be prevented certainly without providing another means for preventing incorrect attachments according to the aforementioned embodiment as shown in FIG. 132.

FIG. 136 is a diagrammatic view showing the partial structure of a laser transfer machining apparatus according to an embodiment of the present invention. In the figure, the same reference numeral as in FIG. 5 denotes the same part or a like part. The hologram 5 has three perforating holes, the diameter of one of the perforating holes being different from the diameters of the other holes. For example, the diameter of the third perforating hole 735c is larger than the diameters of the first and second perforating holes 735a and 735b and the diameter of the third locking pin 736c is larger than the diameters of the first and second locking pins 736a and 736b, as shown in FIG. 136. The diameter of third perforating hole 735c is a little larger than that of the third locking pin 736c. In the embodiment, the hologram 5 is fixed on the hologram contact face 729 of the hologram holder 500 in the same way as the aforementioned embodiment shown in FIG. 135.

In the laser transfer machining apparatus according to the embodiment, in the case that the triangle obtained by joining the centers of the three perforating holes arranged in the hologram 5 is an isosceles one except an equilateral one, the diameter of one perforating hole at the base of the isosceles triangle is intended to be different from that of the other perforating hole at the base. Thereby, since the hologram 5 cannot be mounted on the hologram contact face 729 unless the hologram 5 is placed correctly with respect to the orientation of the front face of the hologram, incorrect attachments of the hologram can be prevented certainly without providing another means for preventing incorrect attachments according to the embodiment as shown in FIG. 132.

Preferably, the shape of one of the three perforating holes may be different from the shapes of the other holes instead of the diameter of one perforating hole being different from the diameters of the other holes.

FIG. 137 is a diagrammatic view showing the partial structure of a laser transfer machining apparatus according to an embodiment of the present invention. In the figure, the same reference numeral as in FIG. 5 denotes the same part or a like part. The hologram 5 has three perforating holes having different diameters. For example, the order of size of the three holes is equal to the order of the first, second and third perforating holes 735*a*, 735*b* and 735*c*, as shown in FIG. 137; that is, the third hole is larger than any of the other holes. The order of size of the locking pins is equal to the order of the first, second and third locking pins 736*a*, 736*b* and 736*c* in accordance with the holes; that is, the diameter of the third locking pin is larger than that of any of the other holes. The diameter of each perforating hole is a little larger than that of each locking pin. In the embodiment, the hologram 5 is fixed on the hologram contact face 729 of the hologram holder 500 in the same way as the aforementioned embodiment shown in FIG. 136.

In the laser transfer machining apparatus according to the embodiment, even if the triangle obtained by joining the centers of the three perforating holes arranged in the hologram 5 is an equilateral one, the hologram 5 cannot be mounted on the hologram contact face 729 unless the hologram 5 is placed correctly with respect to the orientation of the front face of the hologram. Thereby, incorrect attachments of the hologram can be prevented certainly without providing another means for preventing incorrect attachments according to the embodiment as shown in FIG. 132.

Preferably, the shapes of the three perforating holes may be different from each other instead of the diameter of the three perforating holes being different from each other.

FIG. 138 is a diagrammatic view showing the partial structure of a laser transfer machining apparatus according to an embodiment of the present invention. In the figure, the same reference numeral as in FIG. 137 denotes the same part or a like part and a reference numeral 737 denotes a laser for detecting the position of the hologram; 738, an adjusting mirror for adjusting a laser light emitted by the laser 737 for detecting the position of the hologram in such a manner that the laser light travels along a predetermined optical path; and 739, a photo detector for detecting the laser light emitted by the laser 737. The hologram 5 of the embodiment comprises three perforating holes 735*a*, 735*b* and 735*c*, and the first and second perforating holes 735*a* and 735*b* serve as the means for defining the first and second locking pins 736*a* and 736*b* according to the aforementioned embodiment as shown in FIG. 137 and the third perforating hole 735*c* serves as the means through which the laser light for detecting the position of the hologram is passed for detecting whether or not the hologram 5 is placed at a predetermined position according to the aforementioned embodiment as shown in FIG. 134. The three perforating holes are arranged such that the triangle obtained by joining the centers of the three perforating holes is a scalene one.

In operation, the optical path of the laser light emitted by the laser 737 is adjusted by using the adjusting mirror 738 such that the laser light for detecting the position of the hologram is passed through the perforating hole 735*c* of the hologram 5 after the hologram 5 is fixed at a predetermined position on the hologram holder 500 while the first and second locking pins 736*a* and 736*b* is passed through the first and second perforating holes 735*a* and 735*b*. On the optical path of the adjusted laser light the photo detector 739 is arranged and the detector detects the light intensity of the laser light passing through the perforating hole 735*c*.

Thus, the laser transfer machining apparatus according to the embodiment makes it possible to define the position of the hologram 5 using the two perforating holes and therefore to easily position and adjust the hologram 5 at a predetermined place in the apparatus, thereby improving the maintenance performance of the apparatus. Furthermore, the laser transfer machining apparatus makes it possible to prevent incorrect attachments of the hologram 5 in the apparatus by virtue of the means of detecting whether or not the third perforating hole is positioned at a predetermined position because the light intensity of the laser light for detecting the position of the hologram which arrives at the photo detector 739 is reduced if each perforating hole is not engaged with each locking pin correctly and the hologram 5 is placed incorrectly on the hologram contact face 729.

FIG. 139 is a diagrammatic view showing the partial structure of a laser transfer machining apparatus according to an embodiment of the present invention. In the figure, the same reference numeral as in FIG. 130 denotes the same part or a like part and a reference numeral 748*a* denotes a first screw formed in the first locking pin 736*a*; 748*b*, a second screw formed in the second locking pin 736*b*; 749*a*, a first locking nut for fixing the hologram 5 in cooperation with the first locking screw 748*a*; and 749*b*, a second locking nut for fixing the hologram 5 in cooperation with the second locking screw 748*b*.

In operation, when the hologram 5 is fixed on the hologram holder 500, the hologram 5 is placed on the hologram contact face 729 in such a manner that the first and second locking pins 736*a* and 736*b* are passed through the first and second perforating holes 735*a* and 735*b* of the hologram 5, respectively and then the hologram 5 is attached firmly by turning the first and second locking nuts 749*a* and 749*b* around the first and second locking screws 748*a* and 748*b*, respectively.

In the laser transfer machining apparatus with the hologram and the hologram holder according to the embodiment, since the locking pins are provided with the locking screws, the locking pins function as a means for holding the hologram and therefore make it possible to easily fix the hologram to the hologram holder.

Furthermore, the laser transfer machining apparatus makes it possible to easily position the first and second perforating holes 735*a* and 735*b* disposed in the hologram 5 and therefore to place and adjust the hologram 5 in a predetermined position within the apparatus. Thereby the maintenance performance of the apparatus is improved. In addition, since a rotation of the hologram 5 about an axis parallel with a normal line of the hologram 5 is prevented without providing the difference in level formed on the hologram contact face 729 as shown in FIGS. 125 to 128, the stability of transferring machining can be improved.

FIG. 140 is a diagrammatic view showing the partial structure of a laser transfer machining apparatus according to an embodiment of the present invention. In the figure, a reference numeral 750 denotes a mark disposed on one surface of the hologram, and the mark is positioned in an area except the central area of the hologram 5.

When attaching the hologram 5 on the hologram holder, an operator can easily obtain information about which face of the hologram 5 can be seen and in which direction the hologram 5 is arranged by looking at the mark 750. Thus, the hologram is easily mounted on the hologram holder by correctly directing the mark with respect to the holder. Therefore, the hologram according to the embodiment makes it possible to prevent incorrect attachments of the hologram.

FIG. 141 is a diagrammatic view showing the partial structure of a laser transfer machining apparatus according to an embodiment of the present invention. In the figure a reference numeral 751 denotes a projection disposed on one surface of the hologram, and the projection is positioned in an area except the central area of the hologram 5.

In operation, when attaching the hologram 5 on the hologram holder, an operator can easily obtain information about which face of the hologram 5 can be seen and in which direction the hologram 5 is arranged by looking at the projection 750 and touching it with the tip of his finger or the like. Thus, the hologram is easily mounted on the hologram holder by correctly directing the projection with respect to the holder. Therefore, the hologram according to the embodiment makes it possible to prevent incorrect attachments of the hologram. Furthermore, since the projection can be easily detected by touching it with the top of a finger or the like, incorrect attachments can be prevented more effectively.

FIG. 142 is a diagrammatic view showing the partial structure of a laser transfer machining apparatus according to an embodiment of the present invention. In the figure, a reference numeral 752 denotes a blind hole consists of a hollow not perforating and disposed on one surface of the hologram, and the blind hole is positioned in an area except the central area of the hologram 5.

In operation, when attaching the hologram 5 on the hologram holder, an operator can easily obtain information about which face of the hologram 5 can be seen and in which direction the hologram 5 is arranged by looking at the blind hole 752 or by touching it with the tip of his finger or the like.

Thus, the hologram is mounted on the hologram holder so that the blind hole is positioned at a predetermined position of the holder. Therefore, the hologram according to the embodiment makes it possible to prevent incorrect attachments of the hologram. Furthermore, since the blind hole can be easily detected by touching it with the top of a finger or the like, incorrect attachments can be prevented more effectively. In addition, since the blind hole suffers from wear and tear and damage very rarely when the blind hole is touched by another object such as fingers, the blind hole can provide a more reliable means for informing which face of the hologram can be seen and in which direction the hologram is arranged.

FIG. 143 is a diagrammatic view showing the partial structure of a laser transfer machining apparatus according to an embodiment of the present invention. In the figure, the same reference numeral as in FIG. 130 denotes the same part or a like part and a reference numeral 753 denotes a chamfered corner of the hologram 5. That is, one of the four corners of the hologram 5 is chamfered. Furthermore, a reference numeral 754 denotes a part cut off when the chamfered corner 753 is formed. The hologram 5 is rectangle-shaped.

In operation, when attaching the hologram 5 on the hologram holder, an operator can easily obtain information about which face of the hologram 5 can be seen and in which direction the hologram 5 is arranged by judging the positions of the shorter and longer sides of the rectangular hologram 5 and the position of the chamfered corner 753 with his eyes. Thus, the hologram is correctly mounted on the hologram holder since the positions of the shorter and longer sides of the rectangular hologram 5 and the position of the chamfered corner 753 can be easily judged. Therefore, the hologram according to the embodiment makes it possible to prevent incorrect attachments of the hologram.

In the case of a square-shaped hologram, since all the sides of the hologram are equal to each other in length, an operator is not able to obtain information about which face of the hologram 5 can be seen and in which direction the hologram 5 is arranged with his eyes. In such a case, the part 754, which was cut off when forming the chamfered corner 753, should not be an isosceles triangle with the vertex formed by the two equal sides being identical to the vertex of the corner chamfered, as shown in FIG. 143(b). If the triangle is scalene-shaped, an operator can easily obtain information about which face of the hologram can be seen and in which direction the hologram is arranged by looking at the shape of the chamfered corner 753. Thereby incorrect attachments can be prevented.

In the case that the chamfered corner is arc-shaped or consists of a curved edge linking the two sides of the hologram 5 perpendicular to each other, the same advantage is provided.

FIG. 144 is a diagrammatic view showing the partial structure of a laser transfer machining apparatus according to an embodiment of the present invention. In the figure, a reference numeral 750 denotes a mark disposed on one surface of the hologram 5; and 753, a chamfered corner of the hologram 5. That is, one of the four corners of the hologram 5 is chamfered. The hologram 5 is rectangle-shaped.

In operation, when attaching the hologram 5 on the hologram holder, an operator can easily obtain about information about which face of the hologram 5 can be seen and in which direction the hologram 5 is arranged by looking at the mark 750 and the chamfered corner 753. Thus, in the case that the hologram according to the embodiment is used, an operator is able to know which face of the hologram 5 can be seen and in which direction the hologram 5 is arranged with his eyes more easily than in the case that a hologram with either a chamfered corner or a mark is used. Therefore, the hologram of the embodiment makes it possible to prevent incorrect attachments of the hologram more effectively. In addition, even if the hologram 5 is square-shaped and the part 754, which was cut off when forming the chamfered corner 753, is sosceles triangle-shaped, with the vertex formed by the two equal sides being identical to the vertex of the corner chamfered, the operator is able to obtain information about which face of the hologram 5 can be seen and in which direction the hologram 5 is arranged with his eyes because the front and back faces of the hologram 5 are distinguishable from each other by the mark. Thereby incorrect attachments can be prevented.

Instead of the mark disposed on the hologram, either the projection or the blind hole may be disposed according to the above embodiments shown in FIGS. 141 and 142. The same advantage as mentioned above is provided.

FIG. 145 is a diagrammatic view showing the partial structure of a laser transfer machining apparatus according to an embodiment of the present invention. In the figure, the same reference numeral as in FIG. 126 denotes the same part or a like part and a reference numeral 753 denotes a chamfered corner of the hologram 5; and 755, a projection for preventing incorrect attachments disposed on the hologram contact face 729. That is, one of the four corners of the hologram 5 is chamfered. The projection 755 for preventing incorrect attachments is arranged such that it abuts on the side of the chamfered corner when the hologram 5 is mounted in a predetermined position on the hologram contact face 729. The hologram 5 is rectangle-shaped. A lower locking block 730 and an upper locking block 734 are disposed on the hologram contact face 729 to define the positions of two linear edges, which are not parallel with each other, of the hologram 5.

In operation, when attaching the hologram 5 on the hologram holder 500, the hologram 5 is placed such that the chamfered corner 753 abuts on the projection 755 for preventing incorrect attachments and the orthogonal two sides of the hologram abut the lower locking block 730 and then upper locking block 734, respectively.

The laser transfer machining apparatus with the hologram and the hologram holder makes it possible to prevent incorrect attachments of the hologram because the hologram 5 cannot be fixed on the hologram contact face of the hologram holder unless the front face of the hologram is directed correctly or the hologram is arranged correctly in a predetermined direction.

FIG. 146 is a diagrammatic view showing the partial structure of a laser transfer machining apparatus according to an embodiment of the present invention. In the figure, a reference numeral 756 denotes a notch disposed at a part, not the central part, of one of the four side edges of the hologram. The notch 756 is not on the longitudinally central line 737 and is not on the transversely central line 738. The hologram 5 is rectangle-shaped.

In operation, when attaching the hologram 5 on the hologram holder, an operator is able to easily obtain information about which face of the hologram 5 can be seen and in which direction the hologram 5 is arranged by observing the position of the notch 750. The hologram according to the embodiment makes it possible to prevent incorrect attachments of the hologram because the hologram 5 is mounted correctly on the hologram contact face of the hologram holder by correctly directing the notch with respect to the holder.

FIG. 147 is a diagrammatic view showing the partial structure of a laser transfer machining apparatus according to an embodiment of the present invention. In the figure, a reference numeral 750 denotes a mark disposed on one surface of the hologram 5; and 756, a notch disposed at a part of one of the four side edges of the hologram. The hologram 5 is rectangle-shaped.

In operation, when attaching the hologram 5 on the hologram holder, an operator is able to easily obtain information about which face of the hologram 5 can be seen and in which direction the hologram 5 is arranged by observing the positions of the notch 756 and the mark 750. The hologram according to the embodiment makes it possible to prevent incorrect attachments of the hologram more effectively because the operator can discriminate between the front and back faces of the hologram and know the direction of the hologram more easily compared with a hologram with either the notch or the mark. Therefore, even if the notch 756 is at the central part of one side edge of the rectangle-shaped hologram 5, the operator can easily discriminate between the front and back faces of the hologram and easily know the direction of the hologram, and incorrect attachments of the hologram can be prevented similarly.

Instead of the mark disposed on the hologram 5, either the projection in FIG. 141 or the blind hole in FIG. 142 can be disposed. In such a case the same advantage as mentioned above is provided.

FIG. 148 is a diagrammatic view showing the partial structure of a laser transfer machining apparatus according to an embodiment of the present invention. In the figure, the same reference numeral as in FIG. 145 denotes the same part or a like part and a reference numeral 755 denotes a projection for preventing incorrect attachments disposed on the hologram contact face 729; and 756, a notch disposed at a part of one of the four side edges of the hologram 5. The projection 755 for preventing incorrect attachments is arranged such that it abuts on the inner sides of the notch 755 when the hologram 5 is mounted in a predetermined position on the hologram contact face 729. The hologram 5 is rectangle-shaped. A lower locking block 730 and an upper locking block 734 are disposed on the hologram contact face 729 to define the positions of two linear edges, which are not parallel with each other, of the hologram 5.

In operation, when attaching the hologram 5 on the hologram holder 500, the hologram 5 is placed such that the inner sides of the notch 756 abut on the projection 755 for preventing incorrect attachments and the orthogonal two sides of the hologram abut the lower locking block 730 and then upper locking block 734, respectively. Then, the notch 756 is engaged with the projection 755. The laser transfer machining apparatus with the hologram makes it possible to prevent incorrect attachments of the hologram because the hologram 5 cannot be fixed on the hologram contact face of the hologram holder unless the front face of the hologram is directed correctly or the hologram is arranged correctly in a predetermined direction.

FIG. 149 is a diagrammatic view showing the partial structure of a laser transfer machining apparatus according to an embodiment of the present invention. In the figure, a reference numeral 757 denotes a label, in which an arbitrary row of characters including at least one numeral, a symbol, a figure or a combination of these is recorded, disposed on the surface of the hologram.

When a plurality of hologram patterns are used for machining or various kinds of workpieces are to be machined in the aforementioned laser transfer machining apparatus according to the present invention, various kinds of holograms are needed. In such a case, the label disposed on the hologram of this embodiment is very useful to distinguish one hologram from other holograms. On the label 757 disposed on one surface of the hologram, pieces of information on the function of the hologram, the laser used for machining and the like are recorded using an arbitrary row of characters including at least one numeral, a symbol or the like. Thereby, one desired hologram can be discriminated from other holograms and therefore the desired hologram can be easily chosen. Furthermore, when a machining operation which needs a plurality of holograms is performed, the time required for replacements of the plural holograms can be reduced by attaching a label with each hologram and therefore the efficiency of machining is improved. In addition, the label provides an advantage that a mistake of mounting an undesired hologram in the laser transfer machining apparatus can be prevented. Thus, the reliability of the laser machining apparatus can be improved.

In the embodiment, the design of label is not limited to an arbitrary row of characters including at least one numeral, a symbol, a figure or a combination of these. For example, the label may be painted a color or a color scheme in accordance with information on the function of the hologram 5, the laser used for the apparatus and the like. Alternatively, the label may be shaped in accordance with information on the function of the hologram 5, the laser used for the apparatus and the like.

In a preferred embodiment, information on the function of the hologram 5, the laser used for the apparatus and the like may be recorded on the label in the form of a machine-readable code, which can be easily processed by a computer, such as a bar code. The label in the form of a bar code or the like can record pieces of information. The bar code can be read with a bar code reader and the information of the bar code can be processed by a computer or the like. Thereby, the maintenance of holograms can be easily performed even if a number of holograms are used. Furthermore, since types of holograms can be specified easily by using the label in the form of the bar code or the like, the label is useful for the automatization of replacements of holograms.

The label disposed on one surface of each hologram may serve as the mark according to the aforementioned embodiment shown in FIG. 140, too.

FIG. 150(*a*) is a diagrammatic view showing the partial structure of a laser transfer machining apparatus according to an embodiment of the present invention. In the figure, a reference numeral 758 denotes an elastic frame made of an elastic body and surrounding the hologram 5. FIG. 150(*b*) is a cross-sectional along the line II–II' of FIG. 150(*a*). The elastic frame 758 is disposed in the circumference of the hologram 5 to expose the central area of the hologram 5, as shown in FIG. 150(*a*). The width of the frame is larger than that of the hologram 5. The hologram with the elastic frame 758 according to the embodiment makes it possible to absorb a shock given to the main body of the hologram 5 from outside the hologram and therefore to prevent itself from being damaged more effectively.

FIG. 151 is a diagrammatic view showing the partial structure of a laser transfer machining apparatus according to an embodiment of the present invention. In the figure, a reference numeral 760 denotes a fluorescent material painted on one surface of the hologram in the circumference of the hologram pattern 719 of the hologram. When the fluorescent material 760 is illuminated by the laser light in use for transferring machining, a visible light is emitted by the fluorescent material. Therefore, when the direction of the laser light is slightly shifted from the hologram pattern of the hologram 5 due to a shift of the optical axis of the laser light, a shift of the position of the hologram 5 or the like, the laser light shifted is incident on the fluorescent material 760 and the fluorescent material emits a visible light even if the wavelength of the laser light in use for transferring machining is in a range of wavelengths except the visible range of wavelengths. Thus, the shift of the laser light can be detected immediately with the eye and then the modification of the optical axis of the laser light or the like can be performed immediately. Thereby, the reliability of the apparatus is improved.

As described above in detail, the laser transfer machining apparatuses according to the present invention offer many advantages.

In particular, the laser transfer machining apparatus can provide a high efficiency of utilization of light and reduce the time required for machining since the laser transfer machining apparatus comprises a shaping unit for shaping a laser beam so that the laser beam has a beam pattern which corresponds to a desired pattern to be machined in an object to be machined and a generating unit disposed separately from the shaping unit for simultaneously generating a plurality of laser beams each having the beam pattern from the laser beam shaped by the shaping unit, and the generating unit is adapted to emit the plural laser beams while simultaneously defining a plurality of radiation directions of the generated plural laser beams to the object to be machined.

In the case that the generating unit of the laser transfer machining apparatus comprises a Fourier-transform hologram, since the Fourier-transform hologram has a high efficiency of utilization of light, the hologram can reduce the time required for machining. Furthermore, the hologram can be applied to a laser with a relatively low spatially coherence such as an eximer laser.

In the case that the Fourier-transform hologram is a digital phase hologram having two-level phases in a symmetric pattern arrangement with respect to the incident laser beam for generating the plural laser beams, since the phase hologram can be easily fabricated and has a high efficiency of utilization of light, the laser transfer machining apparatus permits low cost laser machining capable of providing a symmetric and precise pattern to be machined.

In the case that the Fourier-transform hologram is a digital phase hologram having three-level phases, since the phase hologram has a high efficiency of utilization of light, the laser transfer machining apparatus permits laser machining capable of providing an unsymmetric and precise pattern to be machined.

In the case that the Fourier-transform hologram is a hologram consists of a plurality of hologram elements, which are arranged like tiles, with the same hologram pattern, since the Fourier-transform hologram has a large area and the numeral aperture of the whole optical system is high, the laser transfer machining apparatus can transfer images to be transferred for machining with a high efficiency and a high resolution.

In a preferred embodiment of the invention, the laser transfer machining apparatus is adapted to machine the object to be machined by utilizing a zero-order diffracted light emitted by the Fourier-transform hologram.

In the case that the shaping unit of the laser transfer machining apparatus comprises a beam shaping optical system for adjusting the size of the laser beam emitted by the laser light source and a mask, on which a laser beam with a beam pattern adjusted by said optical system is incident, for allowing a component of the incident laser light with a beam pattern which corresponds to a desired pattern to be machined to pass therethrough, the laser light transmissibility of the mask is increased and hence the efficiency of utilization of the laser light is improved.

In the case that the shaping unit of the laser transfer machining apparatus comprises an optical fiber for guiding the laser beam emitted by the laser light source and a mask, on which a laser beam with a beam pattern emerges from the optical fiber is incident, for allowing a component of the incident laser light with a beam pattern which corresponds to a desired pattern to be machined to pass therethrough, the laser transfer machining apparatus provides a high efficiency of utilization of laser light and the light intensity distribution of the laser light passing through the optical fiber is uniform. Thereby the apparatus can provide an uniform and stable pattern to be machined.

In the case that the shaping unit of the laser transfer machining apparatus comprises an optical fiber, the output face of which is shaped like the beam pattern which corresponds to a desired pattern to be machined, for guiding the laser beam emitted by the laser light source, the laser transfer machining apparatus provides a high efficiency of utilization of laser light and the light intensity distribution of the laser light passing through the optical fiber is uniform. Thereby the apparatus can provide an uniform and stable pattern to be machined.

In the case that the shaping unit of the laser transfer machining apparatus is disposed in an optical cavity of the laser light source and comprises a mask for defining a beam pattern of a laser beam generated in the optical cavity so that the laser beam has the beam pattern which corresponds to a desired pattern to be machined, and for transmitting a laser beam with the shaped beam pattern, the efficiency of utilization of laser light is increased because the laser light emitted by the laser source are passed through the mask and hence the laser light transmissibility of the mask is improved and the laser beam has a high quality. Thereby the laser transfer machining apparatus provides a precise machining operation with a high accuracy of machining.

In the case that the generating unit is arranged between the transferring optical system and the object to be machined, the positions of transferred images are adjusted by translating the generating unit in parallel with the optical axis of the laser light. Therefore the positions to be machined of a workpiece can be adjusted with high precision and patterns to be machined each having a similar pattern arrangement can be provided easily.

In the case that the generating unit is arranged between the transferring optical system and the shaping unit, the laser transfer machining apparatus can perform a three-dimensional machining operation when a three-dimensional structure or the like is formed on a surface of a workpiece.

In the case that the lens of the transferring optical system is disposed on optical paths of the laser beams generated by the generating unit and the object to be machined is arranged at the image focal point of the lens, the laser transfer machining apparatus permits stable laser machining.

In the case that the lens of the transferring optical system is disposed on optical paths of the laser beams generated by the generating unit and the aperture stop of the lens in the downstream side of the generating unit is equal to the object focal length of the lens and the generating unit is positioned at the object focal point of the lens, the laser transfer machining apparatus is able to machine a relatively thick or hard object to be machined.

In the case that the laser transfer machining apparatus comprises a shielding unit for selectively shielding a part of the plural laser beams which emerge from the generating unit, the laser transfer machining apparatus is able to easily change a pattern to be machined by shielding a part of laser beams which are projected as transferred images in accordance with a desired pattern to be machined.

In the case that the generating unit of the laser transfer machining apparatus is adapted to simultaneously generate the plurality of laser beams each having its own light intensity depending upon the light intensity of the incident laser beam, the laser transfer machining apparatus is able to define the laser light intensity of each transferred image and to simultaneously provide a plurality of images to be transferred with different capabilities to machine a workpiece.

In the case that the generating unit of the laser machining apparatus is adapted to simultaneously generate the plurality of laser beams in such a manner that each of images to be transferred corresponding to the plural generated laser beams overlap or abut on at least another image to be transferred on the object to be transferred, a continuous machined hole is made at positions where the plural images are imaged such that the corresponding plural laser beams overlap or abut on at least another beam on the object. The laser transfer machining apparatus is able to provide a pattern to be machined with a large area and a complicated pattern to be machined.

In the case that the laser light source of the laser transfer machining apparatus comprises a unit for narrowing a band width of wavelengths of the laser light emitted thereby, the chromatic aberration of the optical system including the hologram can be reduced and hence the laser transfer machining apparatus permits high quality laser machining with a high accuracy of machining.

In the case that the generating unit of the laser transfer machining apparatus is adapted to generate at least one laser beam for positioning the plurality of laser beams on the object to be machined in addition to the plural laser beams for machining the object to be machined, by detecting the added laser beam the adjustment of the positions of the generating unit and the like can be easily performed and hence the laser transfer machining apparatus is able to easily control the position of a pattern to be machined and to provide a high quality laser machining operation with a high accuracy of machining.

In the case that the laser transfer machining apparatus comprises a plurality of generating units and an arranging unit for choosing one of the plural generating units and for arranging the chosen generating unit on the optical path of the laser light from the shaping unit to the object to be machined, by selecting a desired generating unit and replacing one unit already set with another one, the plural generating units are used together for machining. The laser transfer machining apparatus is able to provide various kinds of patterns to be machined.

Many widely different embodiments of the present invention may be constructed without departing from the spirit and scope of the present invention. It should be understood that the present invention is not limited to the specific embodiments described in the specification, except as defined in the appended claims.

What is claimed is:

1. A laser transfer machining apparatus for machining an object to be machined by using a laser beam emitted by a laser source, comprising:

a shaping means for modifying the laser beam to form a pattern, said pattern corresponding to a desired pattern to be machined in said object to be machined; and a generating means disposed between said shaping means and said object to be machined, including a digital phase hologram having at least three phases, for generating a plurality of laser beams each having said pattern formed on said laser beam by said shaping means, said generating means defining a plurality of unsymmetric radiation directions of the generated plural laser beams toward said object to be machined.

2. A laser transfer machining apparatus according to claim 1, wherein said digital phase hologram comprises a Fourier-transform hologram.

3. A laser transfer machining apparatus according to claim 2, wherein said Fourier-transform hologram is a hologram including a plurality of hologram elements, arranged in a grid, with the same hologram pattern.

4. A laser transfer machining apparatus according to claim 2, wherein said laser transfer machining apparatus is adapted to machine said object to be machined by utilizing a zero-order diffracted light emitted by said Fourier-transform hologram.

5. A laser transfer machining apparatus according to any one of claims 1, 2, 3, or 4, wherein said shaping means comprises a beam shaping optical system and a mask, said optical system adjusting the size of the laser beam emitted by said laser light source by expanding or reducing the size of the beam such that a cross-sectional beam shape is similar to a pattern on said mask, said mask allowing a component of the incident laser light with said beam pattern, which corresponds to said desired pattern to be machined, to pass therethrough.

6. A laser transfer machining apparatus according to claim 5, wherein said laser light source comprises a means for narrowing a band width of wavelength of the laser light emitted thereby, such that a chromatic aberration of the optical system and the hologram is reduced.

7. A laser transfer machining apparatus according to any one of claims 1, 2, 3 or 4, wherein said shaping means further comprises an optical fiber for guiding the laser beam emitted by said laser light source and a mask, on which a laser beam with a beam pattern emerges from the optical fiber is incident, for allowing a component of the incident laser light with a beam pattern which corresponds to a desired pattern to be machined to pass therethrough.

8. A laser transfer machining apparatus according to any one of claims 1, 2, 3 or 4, wherein said shaping means is disposed in an optical cavity of said laser light source and comprises a mask for defining a beam pattern of a laser beam generated in said optical cavity such that the laser beam has the beam pattern which corresponds to a desired pattern to be machined and for transmitting a laser beam with the shaped beam pattern.

9. A laser transfer machining apparatus according to any one of claims 1, 2, 3 or 4, wherein said laser transfer machining apparatus comprises a transferring optical system for projecting images to be transferred corresponding to the plural laser beams generated by said generating means onto said object to be machined, and wherein said generating means is arranged between said transferring optical system and said object to be machined.

10. A laser transfer machining apparatus according to any one of claims 1, 2, 3 or 4, wherein said laser transfer machining apparatus comprises a transferring optical system for projecting images to be transferred corresponding to the plural laser beams generated by said generating means onto said object to be machined, and wherein said generating means is arranged between said transferring optical system and said shaping means.

11. A laser transfer machining apparatus according to any one of claims 1, 2, 3 or 4, wherein said laser transfer machining apparatus comprises a transferring optical system for projecting images to be transferred corresponding to the plural laser beams generated by said generating means onto said object to be machined, and wherein said transferring optical system comprises at least one lens disposed on optical paths of the laser beams generated by said generating means and said object to be machined is arranged at the image focal point of the lens.

12. A laser transfer machining apparatus according to any one of claims 1, 2, 3 or 4, wherein said laser transfer machining apparatus comprises a transferring optical system for projecting images to be transferred corresponding to the plural laser beams generated by said generating means onto said object to be machined, and wherein said transferring optical system comprises at least one lens disposed on optical paths of the laser beams generated by said generating means, and wherein an aperture stop of the lens in the downstream side of said generating means is equal to the object focal length of the lens and said generating means is positioned at the object focal point of the lens.

13. A laser transfer machining apparatus according to any one of claims 1, 2, 3 or 4, wherein said laser transfer machining apparatus comprises a shielding means for selectively shielding a part of said plural laser beams which emerge from said generating means, said part of said beams comprising zero-order diffracted light and unnecessary diffracted light.

14. A laser transfer machining apparatus according to any one of claims 1, 2, 3 or 4, wherein said generating means is adapted to simultaneously generate said plurality of laser beams each having its own light intensity depending upon the light intensity of the incident laser beam.

15. A laser transfer machining apparatus according to any one of claims 1, 2, 3 or 4, wherein said generating means is adapted to simultaneously generate said plurality of laser beams in such a manner that each of images to be transferred corresponding to the plural generated laser beams overlap or abut on at least another image to be transferred on said object to be machined.

16. A laser transfer machining apparatus according to any one of claims 1, 2, 3 or 4, wherein said generating means is adapted to generate at least one laser beam for positioning said plurality of laser beams on the object to be machined in addition to said plural laser beams for machining the object to be machined.

17. A laser transfer machining apparatus according to any one of claims 1, 2, 3 or 4, wherein said laser transfer machining apparatus comprises a plurality of said generating means and an arranging means for choosing one of said plural generating means and for arranging the chosen generating means on the optical path of the laser light from said shaping means to said object to be machined.

18. A laser transfer machining apparatus according to any one of claims 2, 3 or 4, wherein said Fourier-transform hologram is designed such that reproduced images have an arbitrary phase distribution.

19. A laser transfer machining apparatus for machining an object to be machined by using a laser beam emitted by a laser source, comprising:

a shaping means for modifying the laser beam to form a pattern, said pattern corresponding to a desired pattern to be machined in said object to be machined, said shaping means comprises an optical fiber, the output face of which is shaped like the beam pattern which corresponds to a desired pattern to be machined, for guiding the laser beam emitted by said laser light source; and a generating means disposed between said shaping means and said object to be machined for generating a plurality of laser beams each having said pattern formed on said laser beam by said shaping means, said generating means defining a plurality of radiation directions of the generated plural laser beams toward said object to be machined.

20. A laser transfer machining apparatus for machining an object to be machined by using a laser beam emitted by a laser source, comprising:

a mask means in which a predetermined pattern is formed on the laser beam passing therethrough such that the laser beam has a beam pattern which corresponds to a desired pattern to be machined in said object to be machined; and a Fourier-transform hologram including a digital phase hologram having at least three phases for generating a plurality of laser beams each having said pattern formed on said laser beam passing through said mask means, said hologram defining a plurality of unsymmetric radiation directions of the generated plural laser beams toward said object to be machined.

21. A laser transfer machining apparatus according to claim 20, wherein said Fourier-transform hologram is a hologram including a plurality of hologram elements, arranged in a grid, with the same hologram pattern.

22. A laser transfer machining apparatus according to claim 20, wherein said laser transfer machining apparatus is adapted to machine said object to be machined by utilizing a zero-order diffracted light emitted by said Fourier-transform hologram.

23. A laser transfer machining apparatus according to any one of claims 20, 21 or 22, wherein said laser machining apparatus comprises a beam shaping optical system for adjusting the size of the laser beam emitted-by said laser light source, and wherein said mask means is arranged in a downstream side of said optical system with respect to the optical path of the laser beam.

24. A laser transfer machining apparatus according to claim 23, wherein said laser light source comprises a means for narrowing a band width of wavelength of the laser light emitted thereby, such that a chromatic aberration of the optical system and the hologram is reduced.

25. A laser-transfer machining apparatus according to any one of claims 20, 21 or 22, wherein said laser transfer machining apparatus comprises an optical fiber for guiding the laser beam emitted by said laser light source, and wherein said mask means is arranged in a downstream side of said optical system with respect to the optical path of the laser beam.

26. A laser transfer machining apparatus according to any one of claims 20, 21 or 22, wherein said mask means is disposed in an optical cavity of said laser light source.

27. A laser transfer machining apparatus according to any one of claims 20, 21 or 22, wherein said laser transfer machining apparatus comprises a transferring optical system for projecting images to be transferred corresponding to the plural laser beams generated by said generating means onto said object to be machined, and wherein said Fourier-transform hologram is arranged between said transferring optical system and said object to be machined.

28. A laser transfer machining apparatus according to any one of claims 20, 21 or 22, wherein said laser transfer machining apparatus comprises a transferring optical system for projecting images to be transferred corresponding to the plural laser beams generated by said generating means onto said object to be machined, and wherein said Fourier-transform hologram is arranged between said transferring optical system and said mask means.

29. A laser transfer machining apparatus according to any one of claims 20, 21 or 22, wherein said laser transfer machining apparatus comprises a transferring optical system for projecting images to be transferred corresponding to the plural laser beams generated by said generating means onto said object to be machined, and wherein said transferring optical system comprises at least one lens disposed on optical paths of the laser beams generated by said Fourier-transform hologram and said object to be machined is arranged at the image focal point of the lens.

30. A laser transfer machining apparatus according to any one of claims 20, 21 or 22, wherein said laser transfer machining apparatus comprises a transferring optical system for projecting images to be transferred corresponding to the plural laser beams generated by said generating means onto said object to be machined, and wherein said transferring optical system comprises at least one lens disposed on optical paths of the laser beams generated by said Fourier-transform hologram, and wherein the aperture stop of the lens in the downstream side of said Fourier-transform hologram is equal to the object focal length of the lens and said Fourier-transform hologram is positioned at the object focal point of the lens.

31. A laser transfer machining apparatus according to any one of claims 20, 21 or 22, wherein said laser transfer machining apparatus comprises a shielding means for selectively shielding a part of said plural laser beams which emerge from said Fourier-transform hologram, said part of said plural laser beams comprising zero-order diffracted light and unnecessary diffracted light.

32. A laser transfer machining apparatus according to any one of claims 20, 21 or 22, wherein said Fourier-transform hologram is adapted to simultaneously generate said plurality of laser beams each having its own light intensity depending upon the light intensity of the incident laser beam.

33. A laser transfer machining apparatus according to any one of claims 20, 21 or 22, wherein said Fourier-transform hologram is adapted to simultaneously generate said plurality of laser beams in such a manner that each of images to be transferred corresponding to the plural generated laser beams overlap or abut on at least another image to be transferred on said object to be transferred.

34. A laser transfer machining apparatus according to any one of claims 20, 21 or 22, wherein said Fourier-transform hologram is adapted to generate at least one laser beam for positioning said plurality of laser beams on the object to be machined in addition to said plural laser beams for machining the object to be machined.

35. A laser transfer machining apparatus according to any one of claims 20, 21 or 22, wherein said laser transfer machining apparatus comprises a plurality of said Fourier-transform holograms and an arranging means for choosing one of said plural Fourier-transform holograms and for arranging the chosen Fourier-transform hologram on the optical path of the laser light from said mask means to said object to be machined.

36. A laser transfer machining apparatus according to any one of claims 20, 21 or 22, wherein said Fourier-transform hologram is designed such that reproduced images have an arbitrary phase distribution.

37. A laser transfer machining apparatus for machining an object to be machined by using a laser beam emitted by a laser source, comprising:

a mask means in which a predetermined pattern is formed on the laser beam passing therethrough such that the laser beam has a beam pattern which corresponds to a desired pattern to be machined in said object to be machined, said mask means comprises an optical fiber, the output face of which is shaped like the beam pattern which corresponds to a desired pattern to be machined, for guiding the laser beam emitted by said laser light source; and a Fourier-transform hologram for generating a plurality of laser beams each having said pattern formed on said laser beam passing through said mask means, said hologram defining a plurality of radiation directions of the generated plural laser beams toward said object to be machined.

* * * * *